United States Patent [19]

Morscheck et al.

[11] Patent Number: 6,076,080

[45] Date of Patent: Jun. 13, 2000

[54] FORMS ORDER ENTRY SYSTEM

[75] Inventors: William F. Morscheck, Franklin; Kenneth W. Miller, Tipp City; Thomas J. Ryan, Trotwood; David M. Ohlemacher, Dayton; C. Thomas Russell, Springboro; Mark A. Burgbacher, Mason; Christopher L. Schweikert, Cincinnati, all of Ohio

[73] Assignee: The Standard Register Company, Dayton, Ohio

[21] Appl. No.: 08/992,495

[22] Filed: Nov. 4, 1997

[51] Int. Cl.[7] .................................................... G06F 17/00
[52] U.S. Cl. ............................................................ 705/400
[58] Field of Search ................................ 705/400, 26, 28, 705/27

[56] References Cited

U.S. PATENT DOCUMENTS

| | | | |
|---|---|---|---|
| 4,839,829 | 6/1989 | Freedman | 345/329 |
| 4,887,208 | 12/1989 | Schneider et al. | 705/28 |
| 4,937,439 | 6/1990 | Wanninger et al. | 235/456 |
| 4,939,670 | 7/1990 | Freiman et al. | 395/10 |
| 4,992,940 | 2/1991 | Dworkin | 705/26 |
| 5,060,980 | 10/1991 | Johnson et al. | 283/70 |
| 5,091,868 | 2/1992 | Pickens et al. | 707/506 |
| 5,144,693 | 9/1992 | Morgan | 345/342 |
| 5,241,464 | 8/1993 | Greulich et al. | 705/26 |
| 5,361,199 | 11/1994 | Shoquist et al. | 705/26 |
| 5,383,129 | 1/1995 | Farrell | 705/400 |
| 5,446,653 | 8/1995 | Miller et al. | 705/4 |
| 5,493,490 | 2/1996 | Johnson | 705/26 |
| 5,666,493 | 9/1997 | Wojcik et al. | 705/26 |

*Primary Examiner*—Emanuel Todd Voeltz
*Assistant Examiner*—Thomas A. Dixon
*Attorney, Agent, or Firm*—Killworth, Gottman, Hagan & Schaeff, LLP

[57] ABSTRACT

An order entry system is provided comprising a first computer system, a printing station computer system, a form design repository, a second computer system, a validation engine, and a pricing engine. The first computer system captures form design data and the second computer generates a form price, validates the form, and transmits a validated and priced order to the printing station computer system. The second computer is also programmed to store an index of form design files in the form design repository. The forms order entry system is also programmed to determine manufacturability of an ordered form by comparing its form design data to a set of validation rules and route manufacturability exceptions to a selected one of a plurality of exception handling locations. The pricing engine determines identified labor, material, burden, and mark-up cost components, and applies a set of pricing rules to them, to enable calculation of a form price.

28 Claims, 8 Drawing Sheets

FORMS ORDER ENTRY SYSTEM

BACKGROUND OF THE INVENTION

The present invention relates to a forms order entry system and, more particularly, to a forms order entry system including a first computer system including an order entry user interface, a second computer system remote from and in communication with the first computer system, and a printing station computer system, wherein the second computer system is operative to price, validate, and transmit a forms order entered at the user interface in the first computer system.

Comprehensive business form design, manufacture, and pricing is problematic because it is difficult to accurately coordinate form design, manufacturing, and pricing. For example, to create a form, one must create a form design, determine if the form is manufacturable, determine the steps necessary to manufacture the form, locate a manufacturing facility capable of manufacturing the form, determine the cost of manufacturing the form, etc. Each of these form design, manufacturing, and pricing determinations are often subject to the unique expertise of a number of individuals. Further, each of these individuals are likely to be located across an extended geographical area. The result is a form design, manufacturing, and pricing process that is subject to significant delay and inaccurate design, pricing, and manufacture. Accordingly, there is a need for a forms order entry system that provides for automation of a significant portion of the design, manufacture, and pricing mechanisms. Further, there is a need for a forms order entry system that does so in an efficient and user-friendly manner.

BRIEF SUMMARY OF THE INVENTION

This need is met by the present invention where an order entry system is provided comprising a first computer system, a printing station computer system, a form design repository, a second computer system, a validation engine, and a pricing engine. The first computer system captures form design data and the second computer generates a form price, validates the form, and transmits a validated and priced order to the printing station computer system. The second computer is also programmed to store an index of form design files in the form design repository. The forms order entry system is programmed to determine manufacturability and usability of an order or quote by comparing the form design data to a set of validation rules and routing manufacturability and usability exceptions to a selected one of a plurality of exception handling locations. The pricing engine applies a set of pricing rules to labor, material, burden, and mark-up cost components to enable calculation of a form price.

In accordance with one embodiment of the present invention, a forms order entry system is provided comprising: a first computer system, a printing station computer system, and a second computer system. The first computer system includes a user interface and is programmed to capture form design data representative of a forms order entered at the user interface. The second computer system is remote from and in communication with the first computer system and the printing station computer system and is programmed to (i) generate a price corresponding to the form design data as a function of a set of pricing rules, (ii) validate the forms order by comparing the form design data with a set of validation rules, and (iii) transmit a validated and priced order to the printing station computer system.

The form design data may comprise order specifications designated within the first computer system, a graphic form design file designated within the first computer system, or order specifications designated within the first computer system and a graphic form design file designated within the first computer system. Further, the second computer system may be programmed to associate and populate the order specifications from the graphic form design file and generate a form design populate report.

In accordance with another embodiment of the present invention, a forms order entry system is provided comprising: a first computer system, a form design repository, and a second computer system. The first computer system includes a first server coupled to a first plurality of user interfaces and is programmed to capture form design data representative of a forms order entered at one of the first plurality of user interfaces. Form design files corresponding to the forms order entered at one of the first plurality of user interfaces are stored in the first server. The form design repository is remote from and in communication with the first computer system.

The first computer system may include a least one additional server coupled to a second plurality of user interfaces. The first computer system may be programmed to capture form design data representative of a forms order entered at one of the second plurality of user interfaces. Form design files corresponding to the forms order entered at one of the second plurality of user interfaces may be stored in the additional server and the index of form design files created by the second computer system may correspond to the form design files stored in the first server and the second server.

In accordance with yet another embodiment of the present invention, a forms order entry system is provided comprising a user interface and a computer system in communication with the user interface. The computer system is programmed to (i) generate manufacturing steps based on form design data representative of a forms order entered at the user interface, wherein the form design data defines the appearance and construction of an ordered form and wherein the manufacturing steps correspond to a specific manufacturing process for creating the ordered form, (ii) determine manufacturability of the ordered form by comparing the form design data to a set of validation rules, and (iii) transmit the manufacturing steps to a printing station according to whether the ordered form is determined to be manufacturable.

The computer system may be remote from and in communication with the user interface. The printing station may include a digital press and data indicative of the form design data and the manufacturing steps may be transmitted to the digital press in digital format or reproduced at the printing station in a printed format.

In accordance with yet another embodiment of the present invention, a forms order entry system is provided comprising a user interface and a computer system in communication with the user interface. The computer system is programmed to (i) generate manufacturing steps based on form design data, wherein the form design data defines the appearance and construction of an ordered form and wherein the manufacturing steps correspond to a specific manufacturing process for creating the ordered form, (ii) determine manufacturability of the ordered form by comparing the form design data to a set of validation rules, (iii) generate a manufacturability exception corresponding to a violation of one of the validation rules, and (iv) route the exception to a selected one of a plurality of exception handling locations according to the nature of the exception.

In accordance with yet another embodiment of the present invention, a forms order entry system is provided comprising a user interface, a validation engine, and a pricing engine. The validation engine is in communication with the user interface and is programmed to (i) generate manufacturing steps based on form design data generated at the user interface, wherein the form design data defines the appearance and construction of an ordered form, and wherein the manufacturing steps correspond to a specific manufacturing process for creating the ordered form, (ii) determine manufacturability/usability of the ordered form by comparing the form design data to a set of validation rules, and (ii) generate manufacturability/usability exceptions based upon the manufacturability determination. The pricing engine is in communication with the user interface and is programmed to calculate a price corresponding to the ordered form as a function of a set of pricing rules.

The pricing engine and the validation engine may be resident on a second computer system remote from and in communication with the user interface. The second computer system may be programmed to route the exceptioned manufacturing plan to a selected one of a plurality of exception handling locations according to the nature of the exception. The second computer system may be programmed to select a manufacturing plant as a function of the manufacturing steps and the form design data and the pricing engine may be programmed to calculate the price as a function of characteristics of the selected manufacturing plant or a hypothetical manufacturing plant. The price may comprise a combination of a form price, a freight price, and a storage price.

In accordance with yet another embodiment of the present invention, a forms order entry system is provided comprising a first computer system and a pricing engine. The first computer system includes a user interface and is programmed to capture form design data representative of a forms order entered at the user interface. The form design data defines the appearance and construction of an ordered form. The pricing engine is in communication with the user interface and is programmed to calculate a price corresponding to the ordered form by (i) identifying a set of manufacturing steps corresponding to a specific manufacturing process for said ordered form, (ii) determining a labor cost component for at least one of the manufacturing steps, (iii) determining a material cost component for at least one of the manufacturing steps, (iv) determining a burden cost component and a mark-up cost component for the ordered form, and (v) applying a set of pricing rules to the identified labor, material, burden, and mark-up cost components to enable calculation of the price. The forms order entry system typically further comprises a validation engine programmed to generate said manufacturing steps for input to said pricing engine.

The pricing engine is preferably programmed to calculate the price by determining a labor cost component for each of the manufacturing steps. The pricing engine may be programmed to initialize cost component inputs prior to applying the pricing rules, calculate the price by determining a plurality of labor cost components to set up and run at least one of the manufacturing steps and by determining a plurality of material cost components for consumption and waste for at least one of the manufacturing steps. The pricing engine may further be programmed to produce a pricing exception in response to application of the pricing rules and route the pricing exception to a selected one of a plurality of pricing exception handling locations according to the nature of the pricing exception. The pricing exception may be selected from the group consisting of a paper weight limit, a press impression limit, a single ply equivalents limit, an estimated total form price limit, a special customer account identifier, and combinations thereof.

The pricing engine may also be programmed to operate in an override mode wherein at least one of the labor cost components, the material cost components, the burden cost components, and the mark-up cost components for the ordered form are replaced by an override value, and wherein the pricing engine is programmed to calculate the price based upon the override value.

Accordingly, it is an objective of the present invention to provide a forms order entry system that provides for automation of a significant portion of the design, manufacture, and pricing mechanisms, and does so in an efficient and user-friendly manner. Other objectives of the present invention will be apparent in light of the description of the invention embodied herein.

DETAILED DESCRIPTION OF THE PREFERRED EMBODIMENTS

Figure 1:
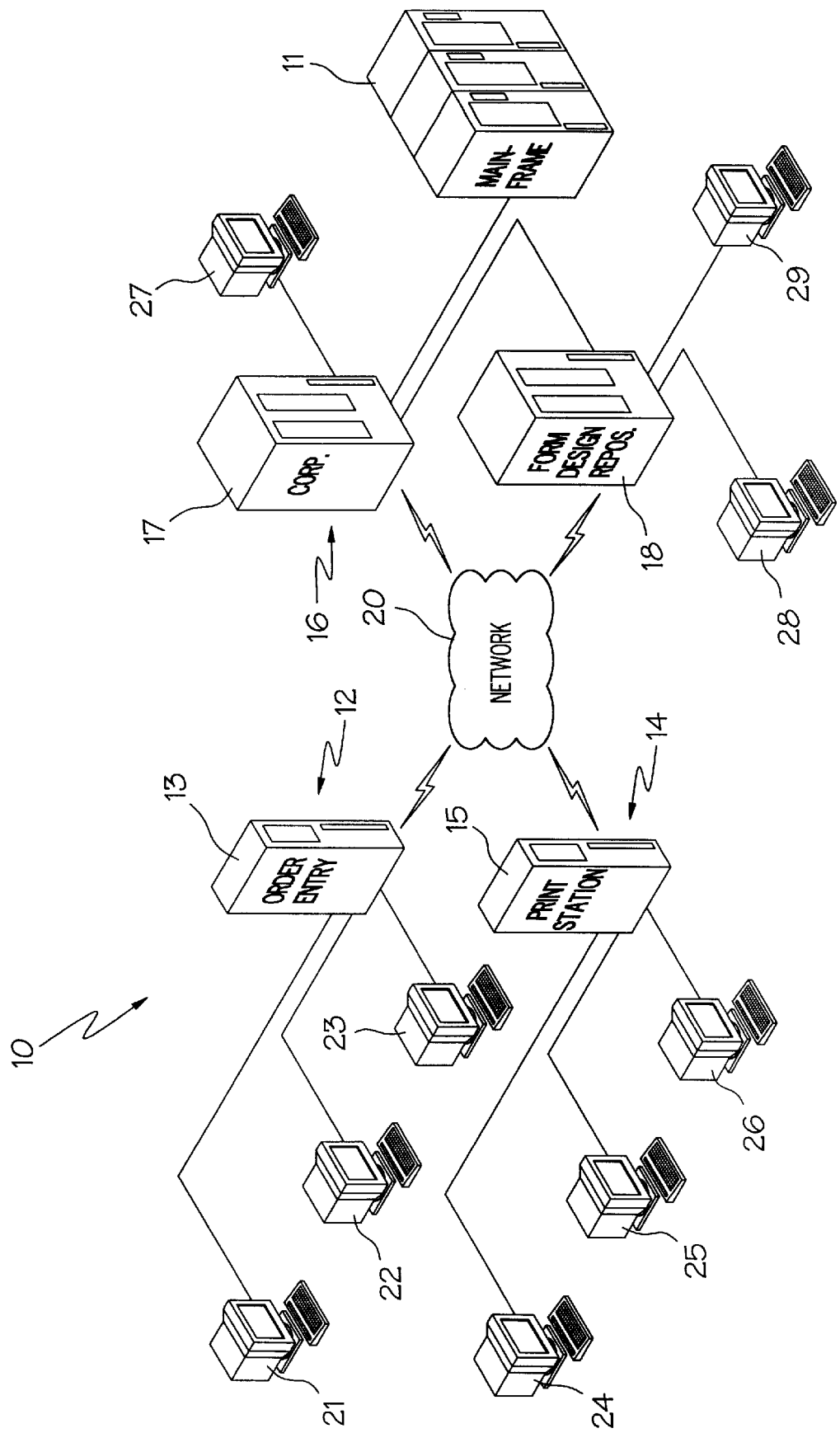
FIG. 1 is an illustration of the general structure of the forms order entry system of the present invention.

The general structure of the forms order entry system 10 of the present invention is illustrated in FIG. 1. The order entry system 10 comprises a first computer system 12, a printing station computer system 14, a second computer system 16, and a form design repository 18 linked together via a communications network 20. The first computer system 12 typically comprises a district or regional office computer system and includes a plurality of user interfaces 21–29 and a first server 13. Typically, a plurality of first computer systems 12 corresponding to a plurality of district or regional offices are included within the order entry system 10, however, for the purpose of clearly describing the present invention, only one first computer system 12 is illustrated in FIG. 1. Each user interface 21–29 is coupled to a computer programmed to embody the structure and function of the present invention, as described in detail herein.

In the illustrated embodiment, a first user interface 21 of the first computer system 12 is arranged to accommodate the needs of a district or regional office customer service representative (CSR). As is described in further detail herein, the CSR is one of the primary users of the order entry system 10 and inputs a significant amount of order entry data into the order entry system 10. A second user interface 22 of the first computer system 12 is arranged to accommodate the needs of a district or regional office forms designer. As is described in further detail herein, the forms designer is primarily responsible for the input of form graphics. Finally, a third user interface 23 of the first computer system 12 is arranged to function as an auxiliary or walk-up user interface arranged to serve as an order entry or system-wide information source at the district or regional office.

The printing station computer system 14 comprises a computer system located at a printing station or in communication with a printing station. Typically, the printing station computer system 14 is located at a form manufacturing plant or another form printing facility and includes three user interfaces 24–26 and a printing station server 15. A plurality of printing station computer systems 14 corresponding to a plurality of manufacturing plants are ordinarily included within the order entry system 10. However, for the purpose of clearly describing the present invention, only one printing station computer system 14 is illustrated in FIG. 1. A first user interface 24 of the printing station computer system 14 is arranged to accommodate the needs of a pre-press forms designer. Specifically, the user interface 24 is arranged such that the pre-press forms designer has the ability to make changes to a form design files to account for unique or irregular characteristics of a specific press or change of press designated for printing an order. A second user interface 25 of the printing station computer system 14 is arranged to accommodate the needs of a plant specialist. Specifically, the user interface 25 is arranged such that the plant specialist has the ability to access and view an order and communicate across the order entry system 10 to resolve order validation exceptions. Finally, a third user interface 26 of the printing station computer system 14 is arranged to accommodate the needs of an order coordinator. Specifically, the user interface 26 is arranged such that the order coordinator has the ability to change the identity of a manufacturing plant designated in a form order, generate a commitment to print a specific form order, and view the details of a specific order.

The second computer system 16 is typically a centrally located corporate computer system including at least one user interface 27, a mainframe 11, and a corporate server 17. The user interface 27 of the second computer system 16 is arranged to accommodate the needs of a central computer system user, e.g., a corporate user. Specifically, the user interface 27 of the second computer system 16 comprises a pair of user interfaces. One of the user interfaces is arranged such that the corporate or central system user has access to, and may maintain, a wide range of order entry data. The other user interface of the second computer system 16 is arranged such that the corporate or central system user may access, list, review, and edit the operating software of the order entry system 10. The mainframe 11 and the corporate server 17 hold system-wide operating software and additional software responsible for the system structure and functions described in detail herein.

The form design repository 18 is coupled directly to the corporate server 17, to the communications network 20, and to a pair of form design user interfaces 28, 29. The repository 18 holds in memory an index of form design files, as is described in further detail herein. The user interfaces 28, 29 are coupled to respective computers equipped with form design software such that form design functions performed at the second user interface 22 of the first computer system 12 may also be performed at the user interfaces 28, 29 coupled directly to the repository 18. All of the user interfaces 21–29 are arranged to communicate across the order entry system 10 via a conventional electronic mail system.

Figure 2:
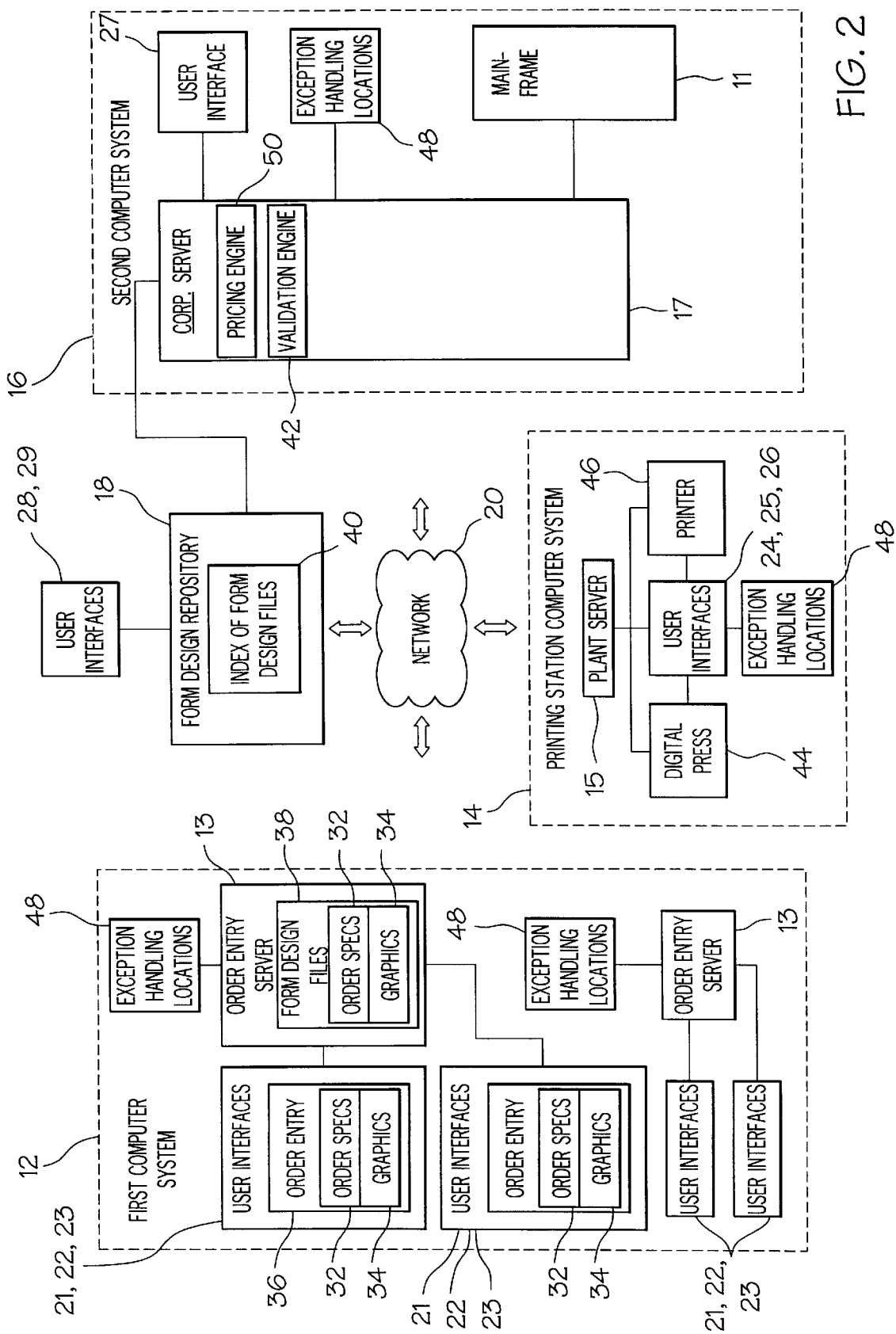
FIG. 2 is a more detailed illustration of the general structure of the forms order entry system of the present invention.

Referring now to FIG. 2, although the user interfaces 21–29 are condensed into a single block element within respective portions of the order entry system 10, other aspects of the order entry system 10 of the present invention are illustrated in more detail than in FIG. 1, where like structure is referenced by like reference numerals. FIG. 2 includes a plurality of order entry servers 13 and associated components, as opposed to a single order entry server 13, so as to more clearly illustrate the fact that the order entry system 10 typically includes a plurality of order entry servers 13 within the first computer system 12. The specific block elements represented in FIG. 2 are discussed in detail herein in describing the operational structure represented in FIGS. 3–7.

The general operational structure of the present invention is illustrated with reference to FIG. 3 and can be divided into four distinct components: order entry 100, order validation 200, order pricing 300, and order transmission 400. The flow charts of FIGS. 4–7 are detailed or exploded illustrations of each of these distinct components within the general operational structure of FIG. 3.

Figure 4:
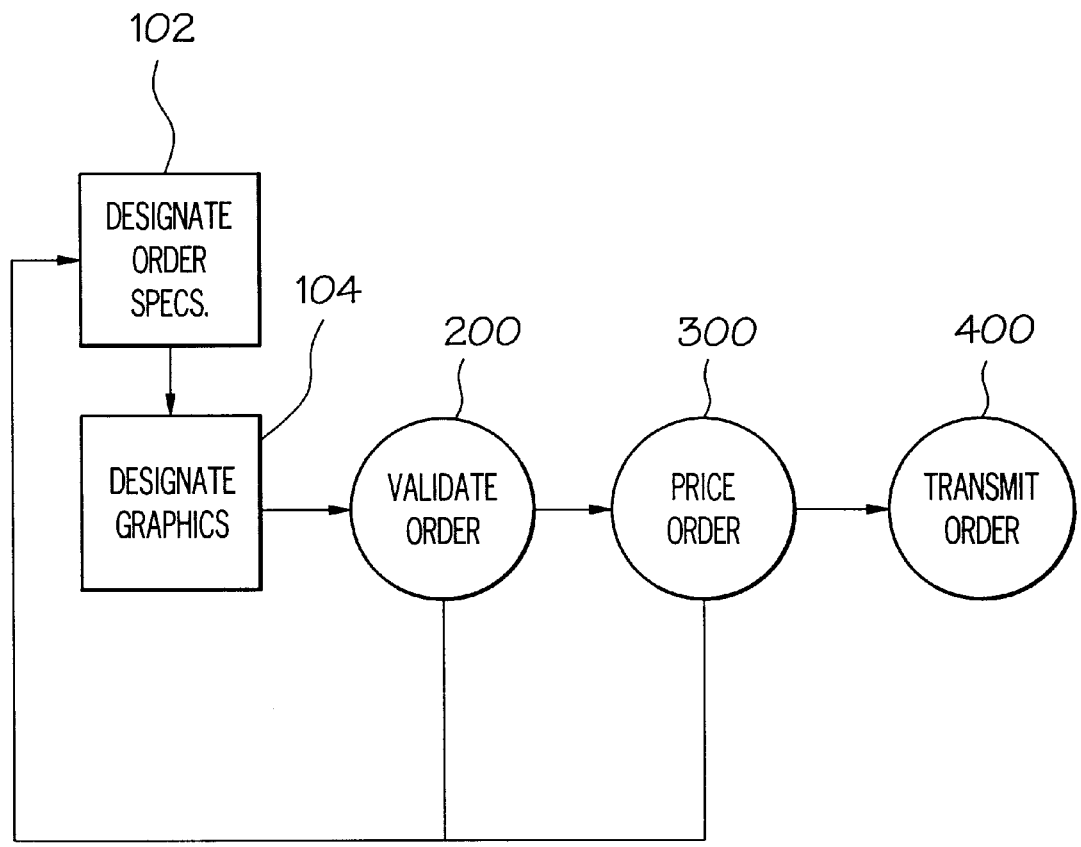
FIGS. 4–7 are detailed or exploded illustrations of each of the distinct components within the general operational structure of FIG. 3.

Referring initially to FIG. 4, the order entry component 100 of the order entry system 10 of the present invention comprises a first step 102 wherein order specifications 32, see FIG. 2, are designated. Specifically, the CSR either creates an original form order by designating specific form information or retrieves an existing or archived form order and modifies the existing order to meet the requirements of a specific customer. The order specifications 32 designated at step 102 depend upon the characteristics of the desired form. The order entry portion also comprises a second step 104 wherein order graphics 34, i.e., a graphic form design file 34, see FIG. 2, are designated. Specifically, the forms designer either creates an original form order by designating specific form graphics 34 to complement the order specifications 32 or retrieves an existing or archived graphics file and modifies it to compliment the order specifications 32.

As is noted herein, the order entry system 10 of the present invention is a computer based system which operates with the aid of a conventional operating system, e.g., the Microsoft® Windows® 95 operating system available from the Microsoft Corporation. Accordingly, an order entry screen includes standard Windows® 95 features such as the title bar, the control-menu box, the menu bar, the minimize, maximize, and close buttons, scroll bars, and the taskbar. A toolbar is provided immediately beneath the menu bar. The toolbar contains several icon buttons which provide quick access to many of the most commonly used system functions (creating a new order, placing an order, pricing an order, reordering, requesting a quote, designating an order entry as a work in progress (WIP), creating a template, saving, printing, exiting, accessing an order log, accessing customer data).

Figure 8:
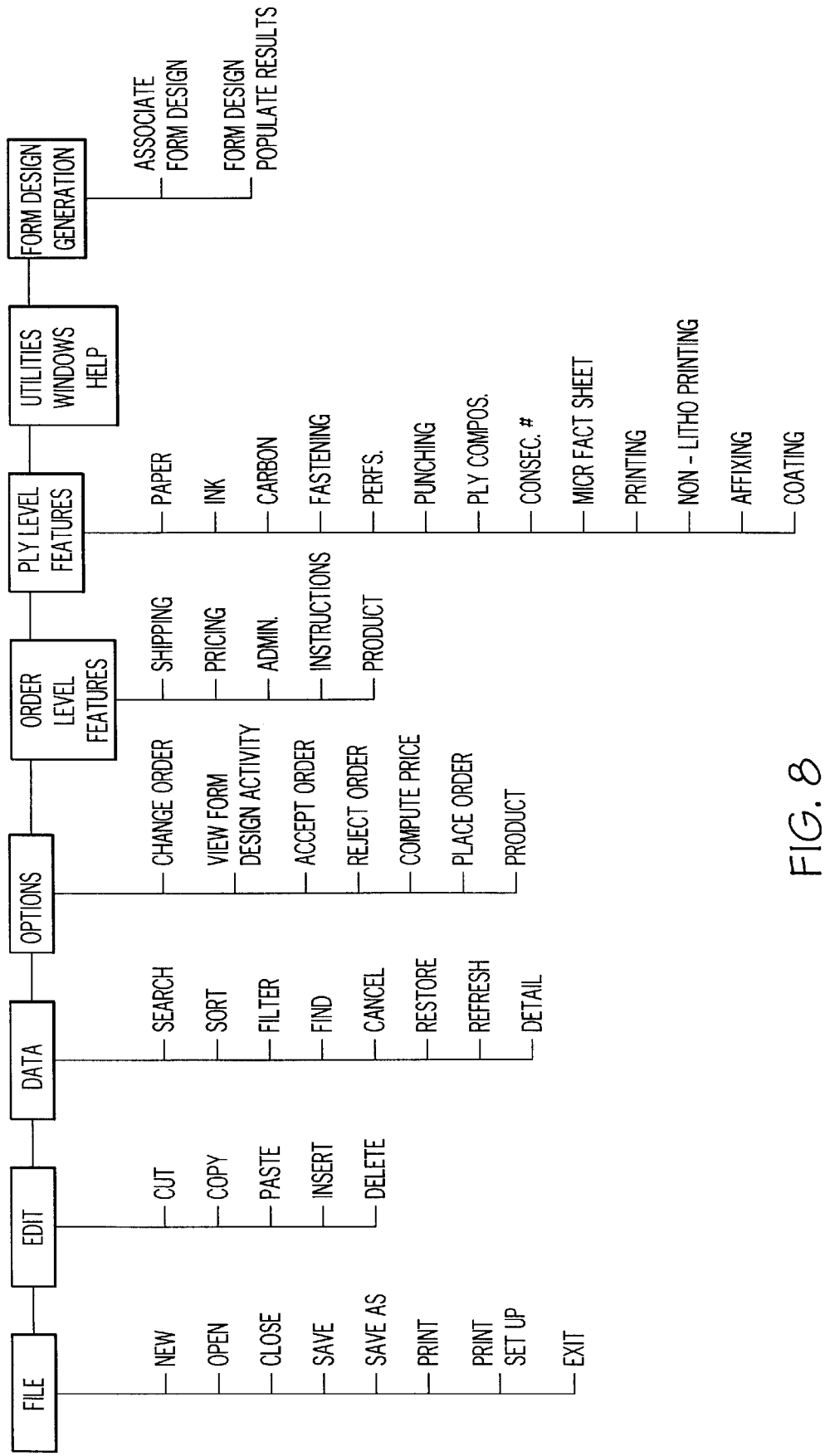
FIG. 8 is an illustration of the menus and commands available within the order entry system of the present invention.

Preferably, the order entry system 10, and specifically the first computer system 12, are arranged to enable a user, e.g., the CSR, to select operations from the following menu items: File, Edit, Data, Options, Order Level Features, Ply Level Features, Utilities, Window, and Help. In addition, the first computer system 12 is arranged to generate graphic form design data. These menu items, the commands available within each menu item, and the graphic form design data generation are illustrated in FIG. 8 and described in detail herein with reference to FIG. 8. As will be appreciated by those practicing the present invention, a number of these menu items represent standard operating system functions. Specifically, the File menu describes commands to create, open, save, and print orders, the Edit menu describes commands to copy, move, insert and delete text, the Data menu describes commands to sort and find data, as well as show details, and the Window, and Help menus describe commands to change the user password, check user roles, change the appearance of windows, show the toolbar, and open Help. The Options menu, the Order Level Features menu, and the Ply Level Features menu describe commands which are unique to the operations of the order entry system 10. The Options menu describes commands to change, accept, reject, price, and place orders, the Order Level Features menu describes commands to enter information regarding features for orders, and the Ply Level Features Menu describes commands to enter information regarding features for each ply level of orders. The command items available within the respective menu items are set forth below.

Referring now to FIG. 8, the File menu includes commands to create, open, save, and print orders. A new order can be created by choosing "New" from the File menu. This opens the Products dialog box which allows a user to select the product and manufacturing process. For example, choosing "Carbonless Sets" selects carbonless sets which may or may not be pre-collated, choosing "Continuous Singles" selects single-ply continuous forms, choosing "Labels" selects pressure sensitive labels, choosing "Mailer: Cont. Flat Glue" selects the flat-glued mailer form set, choosing "Mailer: Zipmailer" selects a mailer product manufactured with clean, die-cut inserts, easy opening, exposed return flap, and high ply with excellent feeding performance though a computer printout, choosing "Mailer: Zip Flat Glue" selects a zipset form with part of the set glued on several sides to form a pocket envelope, choosing "Rolls" selects preprinted or blank forms on jumbo rolls, choosing "Sheeted Singles" selects single ply forms, choosing "Standard Envelopes" selects non-continuous envelopes, choosing "Stanfast Sheets" selects the least complicated sheet form (sometimes called flat forms, cut forms, and singles, choosing "Stanset" selects continuous form products having multiple plies, choosing "Zipset" selects a unit set produced with either a limited or custom set of features, and choosing "Other Product" displays the Other Product dialog box. This feature allows a user enter another product description. It also covers subcontracted unmakable products. The number of plies for the product may be specified by clicking a Total Plies drop-down arrow within the Products dialog box.

A Navigator list box is also available within the Products dialog box. The Navigator enables the CSR or other user to enter information at order entry by selecting screens that require data input during order entry. Choosing "Writing Device" from the Navigator list box opens a Writing Device window. This window allows a user to specify one or more primary writing devices and secondary devices. Choosing "Paper" from the Navigator list box opens a Paper/Ply window. This window allows a user to specify the paper and ply size at a ply level. Choosing "Ink" from the Navigator list box opens an Ink/Ply window. This window allows a user to select the ink for the front and back faces of a ply. Choosing "Ply Composition" from the Navigator list box opens a Ply Composition window. This window allows a user to identify the face change complexity (in relation to a previous order, if one exists) and the individual plates that are used on a ply-by-ply basis. Choosing "Perforations" from the Navigator list box opens a Perforations window. This window allows a user to specify perforation types and locations at a ply level. Choosing "Punching" from the Navigator list box opens a Punching window. This window allows a user to specify what punches will be used and where they will be located on the form. Choosing "Consecutive Numbers" from the Navigator list box opens a Consecutive Numbering window. This window allows a user to specify the format and location of consecutive numbers. Choosing "Fastening" from the Navigator list box opens a Fastening window. This window allows a user to identify stubs and specify types of fastening, as well as which plies to fasten together. Choosing "Non-Litho Printing" from the Navigator list box opens a Non-Litho Printing window. This window allows a user to select patch unit printing types for the order. Choosing "Printing" from the Navigator list box opens a Printing window. This window allows a user to select special printing types such as Pantographs and Prismatic for the order. Choosing "Sold to Customer Search" from the Navigator list box opens a Sold To Customer Search Window. This window allows a user to select a single customer address and return the selected address and associated customer information to the originating window. Choosing "Ship to/Bill to Customer" from the Navigator list box opens a Ship to/Bill to Summary window. This window allows a user to add, edit, or delete destinations. Choosing "Miscellaneous Charges" from the Navigator list box opens a Miscellaneous Charges window. This window allows a user to apply miscellaneous charges to an order. Choosing "Sales Split" from the Navigator list box opens a Sales Split window. This window allows a user to assign the sales split percentages by Sales Representative, Sales Teams, and Special Reserves. A "Search" feature enables a user to search for possible Sales Split Recipients at the district or corporate level. Choosing "Folios" from the Navigator list box opens a Folios window. This window allows a user to specify a folio (sample) distribution and quantities. Choosing "Proofs" from the Navigator list box opens a Proofs window. This window allows a user to specify a proof type, distribution, and quantity. Choosing "Storage" from the Navigator list box opens a Storage window. This window allows a user to select the storage type and the time of invoicing. Choosing "Packaging" from the Navigator list box opens the Packaging window. This window allows a user to choose the type of packaging, the amount of units per package, and various container options. Inner Packaging and Palletizing are also options within this window. Choosing "Special Instructions" from the Navigator list box opens a Special Instructions window. This window allows a user to select coded and invoice unit-of-measure instructions, enter invoice, additional, and CSR free-form instructions, and view (read-only) plant free-form instructions. Choosing "Bindery" from the Navigator list box opens a Bindery window. This window displays all types of bindery operations available for a given product. Choosing "MICR Fact Sheet" from the Navigator list box opens a MICR Fact Sheet window. This window allows a user to enter the form specifications for Magnetic Ink Character Recognition (MICR) printing. Data entered in this window normally includes account numbers, routing information, and related bank information. Choosing "Affixing" from the Navigator list box opens an Affixing window. This window allows a user to enter specifications regarding the placement of eyelets, transfer tapes, reinforcement patches, and other affixed items on the form. Choosing "Coating" from the Navigator list box opens a Coating window. This window allows a user to enter various coating (desensitized spots, spot carbons, etc.) and security (microprinting, simulated and artificial watermarks, etc.) features.

According to one aspect of the present invention, choosing a product from the Products list dialog box automatically selects a Manufacturing Process: Limited, Custom, Stanfast, Subcontracted Unmakable, etc. The following table presents examples of which manufacturing processes are selected and available when specific products are chosen:

| Products: | Manufacturing Process: |
| --- | --- |
| Carbonless Sets | Stanfast |
| Continuous Singles | Limited; Custom is available |
| Labels | Custom |
| Mailer: Cont. Flat Glue | Custom |
| Mailer: Zipmailer | Custom |
| Mailer: Zipset Flat Glue | Custom |
| Rolls | Custom |
| Sheeted Singles | Limited; Custom is available |
| Standard Envelopes | Stanfast |
| Stanfast Sheets | Stanfast |
| Stanset | Limited; Custom is available |
| Zipset | Limited; Custom is available |
| Other | Subcontracted Unmakable |

A user can open and access any one of the following items by choosing "Open" from the File menu: Quote, WIP, Template, Order, Exception In Basket, Exception List, Exception Detail, Pricing Results, Order Log, and Customer Search. Some of these items may be disabled based on security access, i.e., user ID and password. A quote, a WIP, and a template each describe a form order but are identified with different terms merely to provide a means of distinguishing their respective status's. For example, a quote is a priced order, a WIP is an order in the process of being priced, and a template is an archived order utilized to create new orders. Accordingly, the Open Quote, Open WIP, Open Template, and Open Order windows are substantially identical in appearance and functionality. Only the Open Quote window will be discussed herein in detail since it is representative of the Open WIP, Open Template, or Open Order windows.

Choosing "Quote" from the File/Open menu or clicking on the quote tool button displays the Open Quote window. Access to Quotes may be limited by requiring different passcodes for files associated with different districts, regions, etc. Quotes, WIPs, and Templates are retrieved by entering Primary and Secondary Search Criteria (tracking number, production order number, customer address, etc.). Choosing "Exception In Basket" from the Open menu or clicking on the Exception In Basket toolbar button displays an Exception In Basket window. Exceptions, which are described in further detail herein, must be viewed and resolved by exception handlers. When exceptions are routed, the order entry system 10 automatically sends an E-mail to the first/next Exception Handler in the routing sequence. This message alerts the Exception Handler to check the Exception In-Basket. The Exception Handler then processes the exceptions that are present. The exceptions are tracked by the Quote/WIP tracking number. After all exceptions have been accepted or rejected, the CSR will receive E-mail notification that the quote/WIP has been returned. Choosing "Exception List" from the Open menu displays an Exception List window for the active Quote/WIP/Order. If a Quote/WIP does not pass validation for any reason, all exceptions are automatically displayed to the CSR. The Exception List window indicates if the exceptions are for the CSR to resolve or if they need to be routed to another area. Any exceptions that can be resolved by the CSR must be resolved before any of the other exceptions can be routed. Choosing "Exception Detail" from the Open menu displays an Exception Detail window. This window is only available if an exception has been resolved. The Exception Detail window allows a user to view specific information related to an exception. This allows a user to research any information regarding a request (Exception handling location, exception originating office, status, ply, and date completed information, exceptions description, text description, description of the feature causing the exception, written description of the resolution to the problem, etc.). Choosing "Pricing Results" allows a user to view a detailed breakdown of pricing exceptions and pricing information. Access may be controlled by user ID and password. Choosing "Order Log" from the Open menu displays an Order Log Search Criteria window. In order to access the Order Log, a user must enter the appropriate search criteria into the Order Log Search Criteria window (mail code, date order entered, parent name/division name, customer name, purchase order number, form number, sales representative, shipment status, etc.). The Order Log window displays fields representing various information about the orders shown (date entered, tracking #, prod. order #, sales rep ID, sales rep name, parent name, division name, customer name, PO #, form #, form name, warehouse quantity, direct qty., order type, date desired, scheduled ship date, ship complete date, plant order status, change order, sell price, list price, diff %, direct amount, total amount, comments, etc.). To access the Order Log, a user must enter the appropriate search criteria into the Order Log Search Criteria window, as described above. Choosing "Customer Search" from the Open menu displays a Customer Search window. This window allows a user to search for specific customer information and return this information to the calling screen. The Customer Detail window allows a user to view detailed information about the customer selected in the Customer Search window, such as: parent name, division name, legal group number, etc.

Choosing "Close" from the File menu closes the active window. Choosing "Save" from the File menu saves the active window. The quote can be saved as one of three types: Quote, Work In Progress (WIP), or Template. The save type designation is a choice a user makes while creating the quote. Choosing "Print" from the File menu prints current field information entered in the open window. Choosing "Print Setup" from the File menu provides a list of installed printers, sets the default printer, and provides access to other printing options for the printer selected. Choosing "Exit" from the File menu ends an order entry session. Clicking "OK" closes the Products window and opens a New Quote. Clicking "Cancel" closes the Products window. Clicking "Help" brings up the associated help topic for the window. Analogous "OK," "Cancel," and "Help" commands are available throughout the order entry system 10 windows.

The Edit menu, see FIG. 8, includes commands to cut, copy, paste, insert, and delete text. Choosing "Cut" from the Edit menu removes selected text and graphics and puts them on a temporary storage area for cut or copied text, e.g., a clipboard. Choosing "Copy" from the Edit menu copies selected text to the clipboard. Choosing "Paste" from the Edit menu inserts a copy of the clipboard contents at the insertion point, replacing the selection (if any) with the text on the clipboard. Choosing "Insert" from the Edit menu when in the Customer Search window brings up a Customer Detail/Iinsert Prospect window where a new customer is added initially as a prospect. Choosing "Delete" from the Edit menu allows a user to delete selected text entered into window text fields.

The Data menu, see FIG. 8, includes commands to sort and find data and show details. Some of these commands may be disabled based on security access (i.e., user ID and password). When in the Order Log, choosing "Search Criteria" from the Data menu displays an Order Log Search Criteria window and choosing "Sort" from the Data menu displays a Specify Sort Columns window. The sort process allows a user to sort by a specific column in the Order Log. When in the Order Log, choosing "Filter" from the Data menu displays a Specify Filter window. Order Log entries may be filtered based on specific needs. The filter feature is useful to quickly obtain a list of log entries based on some filtering criteria. The filter feature allows a user to locate and view a list of records that meet criteria for many fields. Some common filters might include: display an order with a specific tracking number; display all orders entered on a specific date, display all orders at a specific plant, display all orders scheduled on a specific date, etc. In most cases, filtering is a simple matter of defining the criteria in a mathematical equation. A common example is to find an order in the Order Log that is associated with a specific tracking number. The expression for this filter criteria is: Cust_order_id=tracking#. Once a filter criteria is written, a Verify button can be used to be sure the filter criteria is valid. Other mathematical expressions may need to be used to locate the needed information (Less than, Greater than, Less than or equal to, Greater than or equal to, etc.). When in the Order Log, choosing "Find" from the Data menu brings up a Search Order Log window. A user can go directly to the order's log entry by using the Search Order Log window. A user can logically delete a prospect record from a Customer Search window by using the "Cancel" function. Choosing "Restore" from the Data menu allows a user to restore a prospect to the record list in the Customer Search window. When the Order Log is open, choosing "Refresh" from the Data menu updates the Order Log data. Choosing "Detail" from the Data menu takes a user to the next level of detail available depending on the window that is currently open.

The Options menu, see FIG. 8, includes commands to change, reopen, accept, reject, price, and place orders. In addition, this menu allows a user to enter or view a forms design request and make column settings to the Order Log. Some of these items may be disabled based on security access (i.e., user ID and password). When an order is open, choosing "Change Order" from the Options menu displays the Change Order window. The Change Order window allows a user indicate the reason for changing the order. It also enables a user define the criteria for customer acceptance. "Reason for Change" enables a user to indicate the reason for changing the order. Selections include: Data Entry Error, Sales Rep Error, Customer Request, Cancel Order, etc. Specifying the reason for change enables the "Cost" and "Schedule" sections in Customer Acceptance Criteria. The "Cost" section allows a user to indicate whether or not the customer accepts a change to the cost as a result of the order modifications. The "Schedule" section allows a user to indicate whether or not the customer accepts a change to the schedule as a result of the order modifications. Choosing "Reopen Order" from the Options menu enables a District Operations Manager (DOM) to reopen an order to make changes (typically, the CSR will not have security access to this menu option).

Choosing "View Forms Design Activity" from the Options menu displays a Forms Design Activity window. The Forms Design Activity window allows a user to enter or view a design request. An Action Gram field within this window allows a user to enter the Action Gram number. Clicking a Search button allows a user to see if any forms design activity is already associated with the Action Gram. If activity exists, "Requested Date" and "Due Date", as well as the "Started" and "FD Activity ID" information is presented in the center display field. Clicking the Add button adds a design request. The Requested Column field displays the current date. This enables a Due Date field, where the due date for the design request is entered. The Started and Completed fields are populated when the forms designer starts and completes the form. The FD Activity ID # represents the number a user must copy onto the Action Gram. This number is sent to the designer along with samples, artwork, or mock-ups. This information helps tie hardcopy information to on-line documentation. A user can use the Delete button to remove a design request that has not been started (no Started date showing). A user can ask a designer to stop work on an iteration that has been started (started date is showing) but it cannot be deleted. A Forms Design Compare Results window appears when there is a mismatch between the forms design and order entry specifications. It may show that a specification appears in the forms design but not in order entry, or visa versa. In either case, validation and pricing cannot proceed until the mismatch is resolved. Depending on the nature of the mismatch, a user may either need to change the specifications in order entry or have the forms design modified.

When changes are made to an order and a "Change Order" is sent to a plant for evaluation, a plant can choose to accept or reject the changes. Selecting "Accept" overwrites the old order. A change notice is printed at the plant and a new work ticket is generated. Selecting "Reject" deletes the "Change Order" from the system.

Choosing "Compute Price" from the Options menu allows a user to request a list price for a Quote/WIP. The pricing process sends the quote through the validation and pricing engines. The list price is returned and displayed in the Pricing section of the Order Level Detail View. When initiating the pricing process, there is always the possibility of an exception. If this occurs, an Exception List will be displayed on the screen and no list price is returned. Selecting "Compute Price" when the Product is "Other" opens up a Subcontracted Pricing window.

Choosing "Place Order" from the Options menu places an order. Placing the order causes the system to go through a validation process to ensure order completeness. If exceptions are found, those exceptions must be reviewed and handled before the order can be placed.

Choosing "Set Order Log" from the Options menu displays an Order Log Profile window. The Order Log Profile allows a user to hide any columns from the Order Log. The Order Log Profile is user specific. The same CSR cannot set different profiles for different customers, but different CSRs in the same district, region, etc. can have different profiles depending on the needs of their Sales Reps and customers. To configure the Order Log Profile, simply select the columns to hide on the log and select the Save As Default button. To return and view a column previously hidden on the Order Log (without modifying the profile), de-select the columns to display and click the OK button.

The Order-Level Features menu, see FIG. 8, allows a user to access specific feature windows to enter detailed order-level information. These features are found in the Shipping, Pricing, Administration, Instructions, and Product sections of Order Level View. Each of these windows can be opened from Order Level View by using the drop-down menu on the menu bar, a shortcut menu by clicking the right mouse button, or by clicking on the raised button on Order Level View. All of these windows have similar screen conventions that follow Windows® standards. Certain windows may be "view only" based on security.

The Shipping section allows a user to specify the "Sold To" and "Shipping" information for a quote. Clicking on the raised Total Shipping Destinations button brings up a Bill to/Ship to Summary window. The Bill to/Ship to Summary window contains "Quantity," "Bill To," and "Ship To" information. Clicking an Add button brings up a Bill to/Ship to Detail window. In order to complete billing and shipping information, a user must identify the "Ship To" and "Bill To" addresses and other pertinent details. Once a user has completed the "Ship To" and "Bill To" information on the Bill to/Ship to Detail window, specific details are entered in a Details section of the window (quantity, delivery method, delivery point, customer P.O. number, requisition number, cost center, consecutive numbering start number, prefix, and suffix, destination specific "Ship to" instructions, information to print on the shipping label, etc.). Clicking the OK button on the Bill to/Ship to Detail window returns a user to the Bill to/Ship to Summary window. Clicking the OK button on the Bill to/Ship to Summary window enters the number of destinations into a Total Shipping Destinations field of the Shipping section on the Order Level View. Clicking on raised Sold To buttons brings up the Sold To Customer Address Search window. This window allows a user to select a single customer address and return the selected address to the Sold To field in the Shipping section. A Freight Terms drop-down list box allows a user to specify if the shipment is Prepaid, Prepay and Charge, or C.O.D. Typically, the default is Prepaid Charge. If there are no other customer requirements, Freight and Storage are based on the list price. If it is to be based on the sell price, a user must enter the sell price. A Desired Ship Date field allows a user to indicate when the plant is to ship the order. A Not Before checkbox is selected if a user does not want the order to be shipped before the specified date, even if it is completed sooner. A Commitment Number field allows a user to specify an agreed-to ship date. A number is assigned to verify the commitment. This field is entered by the plant. After the order is shipped, the actual quantity shipped is indicated. A Qty/Carton field indicates the number of forms per carton.

The Pricing section of the Order Level Features menu allows a user to capture list, sell, and contractual prices. A Contract No. field allows a user to enter a contract number for non-automatic contractual pricing. An Order Qty. field allows a user to enter the total of the destination quantities. The order entry system 10 compares the List and Sell price and provides a differential figure in percent. Alternatively, the differential may be entered and the sell price calculated. An operational check may be provided to ensure the differential is acceptable. When pricing is initiated, and a list price is received, an expiration date, typically 30 days from when the price was first calculated, is assigned by the system. In other words, the quote is valid until the expiration date. The Charges Incl. On field allows pricing to be assigned to one order in the case of multi-plant orders. For example, in the case of a continuous form with a blown-on label, the label order can be marked that the charges are included on the continuous form order, allowing the two to be cross-referenced. The order entry system also provides for order grouping.

Clicking on the raised Misc. Charges button within the Pricing section of the Order Level Features menu brings up the Miscellaneous Charges window. This window allows a user to apply miscellaneous charges to an order. Clicking the Charge drop-down list arrow allows a user to select the charge code for Consulting, Forms Design, Excessive Iterations, Scanning, Rushes, Special Services, Testing, etc. A user can add or delete charges from the list by clicking the Add or Delete button. Depending on the charge selected, certain fields and function buttons are enabled. For example, selecting Forms Design enables Description, List Amount, Sell Amount, Per Order, Display on Invoice, and Charge District. A Description field describes the Charge. For example, if a user selects "Special Services" from the Charge drop-down list box, a user can enter a specific description such as "Presentation Materials."

A List Amount field of the Pricing section allows a user to specify the list amount. A Sell Amount field allows a user to define the sell amount. Clicking the Per Order checkbox allows a user to designate a charge as Per Order. For example, Forms Design is a flat, order-level fee. If this is not selected, the charge will be calculated on a Per M (per thousand) basis. Clicking a Display on Invoice checkbox allows a user to present the charges on the invoice. Not selecting this checkbox incorporates the charges into the total list amount. Clicking a Charge District checkbox allows a user to charge a district to absorb the cost as a service to the customer. This also allows a user to document this action. A district charge code must then be entered. The system totals the Per Order and Per Thousand List and Sell amounts.

The Administrative section allows a user to request folios, request proofs, and identify storage options. This window also displays sales commission split and account code information, tracking numbers, order numbers, and production numbers. The Administrative section displays the order type and allows the CSR to change it. The CSR can also turn a quote into a WIP. An "Action Gram" field allows a user to enter the Action Gram Form number. The Action Gram is a sequentially numbered form used by a sales rep to communicate with the CSR. A "Date" field allows a user to enter the date a user received the Action Gram. A "Doc ID\Version" field within the Administrative section is used to associate the forms design and the order entry document. Clicking on a raised Doc ID\Version button brings up the Associate Forms Design window. This window allows a user to associate the order graphics (or graphic form design file) with a quote or populate the quote with the information stored in the design file. Document ID and Version fields in a Form Design File section of the window allow a user to identify the specific document and version number. Clicking on an Associate button in the Options section ties the Quote/WIP and the design together, but does not change any data that may have been entered in the Quote/WIP. Clicking a Populate button fills in the available information on the Order- and Ply-Level windows. This will also overwrite information existing on the Quote/WIP. A Date Populated field indicates the date the forms design was populated or associated.

Clicking on the raised Sales Rep # button in the administrative section brings up a Sales Split window. This window allows a user to identify the sales rep and specify the sales percentage for commission purposes. A user can either enter recipient's number, if known, or click on the Search button to locate and select a sales split recipient from a list. Clicking the Search button brings up a Sales Recipient Search window. This window allows a user to select a sales split recipient. A user can narrow the search by clicking either a District or a Corporate button in the Search Domain section. Clicking the OK button returns the selected sales split recipient information to the Sales Split window. The Sales Split window also requires a user to identify a Primary sales rep. The sales split values for all Sales Reps must total to 100%. Sales split values greater than 100% will not be validated.

Clicking the raised Folios button in the administrative section brings up a Folios window. This window allows a user to specify who will receive samples when the order is completed. Clicking the Distribution drop-down list arrow presents four different options for distribution: Attach to Invoice, Customer, Sales Rep, and System Library. Quantity is always entered in multiples of 5. Clicking the Add button allows a user to assign other distributions. A user can assign up to four (4) distributions, but cannot repeat any of them. Clicking on the Delete button deletes a specified distribution. Selecting "Customer" requires a user to complete Quantity and Select Address fields within the administrative section. Clicking a Select Address drop-down list arrow allows a user to select the appropriate customer address. Address displays addresses for the Ship to, Bill to, and Sold to.

Clicking on a Proofs button in the administrative section brings up a Proofs window. This window operates similarly to the Folios window. Clicking on a Proof Types drop-down list arrow allows a user to specify the type of proof, such as B&W Acetate, B&W, Color Key, Coloron, Dylux, Multilith, and PMT. Clicking on a Distribution drop-down list box allows a user to select either Customer or Sales Rep. Clicking a Grid button indicates a grid background should be printed on the proof. Clicking the Add button allows a user to assign other distributions. Clicking the Delete button deletes a specified distribution.

Clicking on a raised Storage button in the administrative section brings up a Storage window. This window is used to define storage terms and specify requirements for orders shipping to warehouses. Clicking a Storage Order checkbox enables various fields and button selections to be completed (some of these may be enabled or disabled based on the customer profile). Goods may be invoiced at the time of release or at the time of storage by clicking either the Invoice at Release or Invoice at Storage button within the Administrative section. Clicking the Storage Charges drop-down list arrow allows a user to add storage charges as a separate line item to the invoice, include storage charges in the price of the form, or use a short storage option if the items are going to be stored in the warehouse for a short period of time. A user can specify the % Overrun to Storage. A HVCO (High Volume Storage) field is typically only enabled only per unique customer requirements and terms. Negotiated Freight and Storage and Storage Override Allowed fields are enabled only per unique customer requirements and terms. Full Carton Release and PIC/PAC button selections are enabled only per unique customer requirements and terms. Clicking the Packing Unit drop-down list arrow allows a user to select the desired packing unit. A FormPac section allows a user to specify FormPac information: Estimated Monthly Storage, Number of Months Supply, Product Types, Remarks, Forms Management Indicator, Max. Release Units, Form Functions, etc.

After a quote is saved, a Tracking Number is assigned by the system. It is a unique, sequential number that will follow the quote through the order stage. It will also feed into the order log. This provides a means for sorting and filtering the Order Log in the same sequence as a Monthly Sales Statement for reconciliation. When a user Is processing a reorder, the Previous Order Number (the last order in the reorder chain) is displayed in this field. The Prev. Order No.: Reference checkbox is used to identify a reference to a previous order. For example, suppose Customer A requests the same kind of form as Customer B. Because there is something very unique about the construction of the form, Prev. Order No.: Reference allows a user to reference Customer A's order. The Order No. is filled in when the order is placed. It will remain blank during most of the order entry process. Clicking an Order Type drop-down list arrow allows a user to select the Order Type: (Quote, Template, or WIP) for logical grouping of a users work. An Account Code field allows a user to enter an account code used for a variety of business transactions. Examples include stopping automatic invoicing, placing special orders, accessing authorization, etc.

The Instructions section allows a user to specify packaging instructions, as well as overrun and underrun information and other special instructions. Clicking either a raised Inner Packaging or Packaging button brings up a Packaging window. This window allows a user to specify inner packaging, packaging types, and palletizing. Selecting either a No Overruns or No Underruns checkbox specifies whether or not an overrun or underrun is allowed.

Clicking on an Invoice Copies drop-down list arrow in the instructions section allows a user to specify the number of invoice copies required. Clicking an Invoice Coded, Special Coded, CSR FreeForm, or Invoice Free Form raised buttons brings up the Special Instructions window. Clicking a Coded Special Instructions drop-down list arrow within the Special Instructions window allows a user to select a commonly used coded special instruction such as CAR on Previous Order, Export Order, Full Cartons Only, Flag All Breaks, Back Printing-Tumble Style, Test Order, List Missing Numbers, Print the Byline, Print the Symbol, etc. A user can select multiple instructions from the list by simply clicking on the desired special notices.

A "Sales Office Special Instructions" field allows a user to enter special sales instructions. Pressing the Add button allows a user to add a row. Entry of special instructions in this field will cause the Quote/WIP to be routed to the plant when pricing is attempted. The plant cannot modify the information contained in this field. Pressing the Delete button removes the selected instruction. A "Plant Special Instructions" field allows the plant to enter special instructions after reviewing Sales Office Special Instructions. The CSR cannot modify the information contained in this field. The plant uses the Add, Delete, and OK buttons in the same fashion as described in the Sales Office Special Instructions section. An Invoice section allows a user specify invoicing instructions. Clicking the Billing Unit drop-down list arrow allows a user to select one of the following: Per Eaches, Per Carton/Roll, Per Package, Per Pad/Book, or Per Inner Carton. The default unit is Per M (per thousand).

The Product section captures product information from the Products dialog box when the quote was first created. A user can change product information and assign a form number and form name. These items can be used to identify the form for later retrieval. The total plies (including carbons) previously selected is entered into a Plies field. Clicking on the associated raised buttons opens the initial Product dialog box where ply information (quantity) may be changed. A Form number field allows a user to enter the form number. A Form Name field allows a user to enter the form name. If a user were creating a template, a user could enter "three-part carbonless" to identify the template by name. A Fold length field relates to fold length of continuous forms. Clicking a raised Writing Device button brings up a Writing Device window. This window allows a user to select a printer and specify one or more primary and secondary writing devices.

If a product is "Other," a Subcontractor Name field allows a user to enter the name of the subcontractor with which the order is placed. Selecting "Compute Price" from the Options menu when the product is "Other," opens a Subcontracted Pricing window. An Associate Distributor checkbox is selected when the subcontractor and product is listed in the catalog with specifications and pricing information. The Subcontractor Price per thousand for the product that the subcontractor quoted, the per thousand markup percentage, and the flat (per order) markup in dollars may be entered within the Subcontractor Pricing window. Clicking OK resumes pricing. The Subcontractor Price, Markup %, and Markup (Flat) are used to calculate the marked-up price used as the List price for the subcontracted order.

A Pre-Collated Set checkbox is provided in the product window for pre-collated carbonless sets. Clicking a raised Bindery button brings up a Bindery window. This window allows a user to specify bindery requirements (binding method, binding types, Folding Method, fold orientation, Face Out/Face In folding, binding color, stub location, cover printing, cover material, cover type, special binding instructions or requirements, quantity for padding, chipboard backing, Glue Edge, number of pages for a book, Left or Right glue application, number of plies booked, number of loose plies, etc. Depending on the binding method selected, certain fields and function buttons are enabled. For example, selecting Perfect Binding enables Pages per Book and Location (i.e., Left or Right glued). Selecting Comb binding enables Color, Pages per Book, and Location. Selecting Stitching enables Face Out, Cover Printed, and Chipboard. Selecting Spiral Binding enables Color, Pages per Book, and Location. If Folding were available, selecting this method would enable Folding Method, Orientation, and Face Out.

The Ply-Level Features menu, see FIG. 8, allows a user to access specific features windows to enter information for each ply level of orders: Paper, Ink, Carbon, Fastening, Perforations, Punching, Ply Composition, Consecutive Numbers, MICR Fact Sheet, Printing, Non-Litho Printing, Affixing, and Coating. A Ply-Level View window is a high-level view of an order. Each ply-level feature is available as a section in this window. For each section, there are multiple lines determined by the number of plies specified in the Products window. Each feature from the Ply-Level Features menu allows a user to access a specific ply number. If information is the same for all plies, a user may apply this data to all papers using the Apply To All Paper and/or Apply To All Carbons features. The following sections describe each Ply-Level feature in detail. Each section contains a functional explanation of the features window, as well as field-level and button descriptions, navigation tips, and information on how ply-level information ties into the Ply-Level Detail window. Analogous Apply to All commands are available throughout the order entry system 10 menu commands.

The Paper window allows a user to specify ply size and paper at a ply level. This information can be applied to all plies. If an envelope product is chosen, a user can select the envelope number, weight, color, and paper description from this window. If there is a forms design associated with the quote/WIP, the size will be populated by that design but the paper weight/color/description must be entered. A user can choose to view only those papers for the selected writing device(s) related to the quote/VIP. Selecting an Approved for Writing Device button allows a user to select from approved papers for the writing device(s). Selecting an All Papers button allows a user to view all paper combinations, regardless of the selected writing device(s). Choosing an envelope product type disables the Paper Display feature. When no writing device is chosen, an Approved for Writing Device button is disabled and the All Papers button is selected. When a writing device is selected for the quote/WIP, the system defaults to Approved for Writing Device.

Selecting Envelope as the product type enables the Envelope drop-down list box. Clicking on the drop-down arrow allows a user to select any one of the available envelope sizes. Selecting an envelope number populates the Width and Length fields. Ply size is entered in the Paper window as well. Clicking a Weight drop-down arrow allows a user to select the appropriate paper weight. Clicking a Color drop-down arrow allows a user to select the desired paper color. A Description drop-down list box is populated after a user selects or changes both a color and weight. A user can click on the Other button and manually enter a paper description in the adjacent field.

An Ink window allows a user to specify the ink for front and back faces of a ply. If there is a forms design associated with this quote/WIP, this window can be partially populated by that design. Clicking an appropriate drop-down list arrow allows a user to select an available system ink. Clicking the "Other" selection opens an Other FreeForm window. This window allows a user to enter a description of an ink not present on a system list. Selecting the "Other" ink option causes routing to determine if the request can be produced. The system ink Number field allows a user to enter a numbered ink as opposed to a named ink. A Group Name field identifies the Group Name for the selected Named Ink or Number. An orientation buttons allow a user to specify the ink(s) for either Front or Back side of the current ply.

A Carbon window allows a user to select the type and orientation of a carbon on a ply-by-ply basis. If there is a forms design associated with a quote/WIP, this window can be populated by that design. Width and Length fields allow a user to specify carbon dimensions. Selecting a Formula drop-down list arrow allows a user to specify the carbon formula. Selecting a Formula type, enters a description in a Description drop-down list box. Clicking a Narrow Carbon checkbox allows a user to specify a narrow (or short) carbon at a specific location of a form. Clicking a location drop-down list arrow allows a user to choose the Narrow Carbon location: Right, Left, Top, Bottom. A Distance field allows a user to enter the distance between the paper ply and the narrow carbon from the specified Location. A KS Holes drop-down list box allows a user to indicate the marginal punching: None, Right, Left, Both. Selecting a Feather Edge button allows a user to specify a carbon-free "pull-out" strip edge to cleanly remove carbons. Clicking a Length drop-down list arrow allows a user to select the length of the feather edge. Clicking a Strip Carbon button indicates that the carbon coated tissue is to be produced with an uncoated strip within the sheet. Orientation buttons allow a user to specify the orientation of the carbon: Face Down or Face Up. Clicking a View Other button allows a user to view the "Other" carbon selections for the current ply. A user must specify "Other" as a carbon type to enable and select this button.

A Fastening window allows a user to specify a type of fastening, as well as which plies of the order to fasten together. If there is a forms design associated with this quote/WIP, this window can be populated by that design. Clicking a Fastening Feature drop-down list arrow allows a user to specify a fastening feature. Fields are enabled/disabled based on the fastening feature selected. An Attached Ply field is used to indicate the ply to which a user is attaching. A Distance From Edge field is used to indicate the distance from the edge of the form in inches. Clicking a Location 1 drop-down list arrow allows a user to specify the location of the first fastening feature: Top, Bottom, Left, or Right. A Width 1 field is used to specify the width of the first stub. Clicking the Location 2 drop-down list arrow allows a user to specify the location of second stub: Top, Bottom, Left, or Right. A Width 2 field is used to specify the width of the second stub. A Primary Stub checkbox indicates which stub, if there is more than one stub, is the primary. Clicking a Prongs drop-down list arrow allows a user to specify the number of prongs for crimping. Clicking a Staple Direction drop-down list arrow allows a user to specify the direction of the staple. Options include: Horizontal, Vertical, Left Diagonal, or Right Diagonal. Clicking an Add or a Delete button allows a user to specify another fastening feature or remove a specified fastening feature from the Fastening section. Clicking a View Other button allows a user to view the "Other" fastening selection for the ply.

The Perforations window allows a user to select perforation types and location at a ply level. If there is a forms design associated with this quote/WIP, this window can be partially populated by that design. Clicking a Feature drop-down list arrow presents a list of perforation features, such as Letteredge, Standard, or Score. When Standard perforation is selected, a Type drop-down list box presents the following options: Fold, Full, or Partial. Clicking the Orientation drop-down list arrow presents orientation options for a perforation. Based on selections previously made, Starting and Ending distance fields are enabled or disabled. A user must enter information into the enabled fields.

The Punching window allows a user to specify what punches are used and where they are to be located on the form. It also allows a user to view punches already defined for an order. In addition, the Punches window allows a user to specify which plies the punches apply to. If there is a forms design associated with the quote/WIP, this window can be populated by that design. Clicking a Punch Type drop-down list arrow presents a list of standard round-hole Punch Types to select such as: Round holes, Corner cut, Keyhole meeting, Keyhole extended, KS punch, Slit file holes, Slotted file holes, Pegboard, Cheshire, Kalamazoo, VISIrecord, McBee, Credit Card Carrier, Window, Mosier telematic, Round corners, 2 hole, 3 hole, and 5 hole, etc. A user can define holes for pricing purposes without a forms design. A Location drop-down list box allows a user to select where the punches will be located. Options include: Top, Bottom, Left, and Right. A Distance: Center to Edge field is used to define the distance from the center of the hole to the edge of the paper. A Center to Center field is used to define the distance from the center of one hole to the center of another. A From Left field is used to define the "x" punch distance from the left. A From Top field is used to define the "y" punch distance from the top. Clicking an Add button adds another punch to the ply. Pressing a Delete button deletes a punch from a ply. Clicking a View Other button allows a user to view punches already defined for a current order.

Choosing Ply Composition opens a Ply Composition window. This window allows a user to identify the face Change Complexity (in relation to a previous order, if one exists) and the individual plates that are used on a ply-by-ply basis. A Plate window, which works in concert with the Ply Composition window, allows a user to describe each plate used on the form. A Description field within the Plate window allows a user to describe the Plate. When the Forms Design populates the Plate window, the required fields will contain the specified values. Clicking an Add button allows a user to specify an additional plate. Clicking a Delete button allows a user to remove a specified plate from the Plate section. Clicking a Change Type drop-down list arrow allows a user to select the appropriate type of change. Options include: 1 Line Change, Camera Ready, Camera Ready w/1 Line Change, Exact Reorder, and New. Selecting "New" enables the system to estimate the number of minutes involved in composing the form for pricing purposes. Selecting "1 Line Change" from the Change Type drop-down list enables a "One Line Change Description" field, allowing a user to enter a detailed description of the one line change. A "Quadrants Changed" field indicates which portion of the negative requires changes. This field is populated by a Forms Design. It is also enabled when Camera Ready is chosen from the Change Type drop-down list. Clicking Reverse Printing and/or Screening checkboxes indicates a reversed and/or screened area appears on the ply face. Top Lockup, Split Lockup, and Bottom Lockup fields allow a user to enter the space requirements for the lockup area of the plate. The lockup area is the non-printable section of the plate that is held (locked) by the press cylinder. Validation checks the lockup values and determines whether it is adequate for the product. Once the Plate window is completed, the Ply Composition window displays the plates used for the Front Face and Back Face in a Highlight plates used for this face box.

The Consecutive Numbering window allows a user to specify the format and type of consecutive numbers to be described. If there is a forms design associated with a quote/WIP/template, this window can be partially populated by that design. Clicking on the Consecutive Numbering Locations drop-down list arrow allows a user to select the consecutive number name such as Regular, MICR, and Other. Clicking a Type drop-down list arrow allows a user to select one of two types of numbering: Press or Copysafe. Press numbers are printed on each ply of the form individually and great care must be taken to ensure the numbers match from ply to ply when the parts are collated. Copysafe (also known as "crash numbering") works like a typewriter with carbon or carbonless paper. The first ply gets the number imprinted on it in ink. The subsequent plies receive the number from the impression. This ensures the numbers always match on all plies. Clicking a Name drop-down list arrow allows a user specify the ink color for the consecutive number. Clicking the Format drop-down list arrow allows a user to specify Normal, Digital, or Split numbering format. A Number of Chars. field is used to specify the number of digits in the consecutive number. Distance From: Left and Top fields are used to indicate the location of the consecutive number on the form. Clicking an Orientation drop-down list arrow allows a user to specify the orientation of the consecutive number. Clicking a Machine Readable checkbox specifies the use of special numbers that are readable by a machine. Clicking a High Number Stacking drop-down list arrow allows a user to specify how the consecutive numbered forms are going to be stacked in the box. A user can specify high numbers on Top or Bottom. Clicking a Formula drop-down list arrow allows a user to select the mathematical formula (equation) used to determine the check digit. Check digits are used to verify the correct consecutive number. Clicking a Check Digit: Location drop-down list arrow allows a user to specify whether the check digit is to the Right or Left of the consecutive number. A Digits field is used to specify the number of digits in the check digit. Clicking a Separator drop-down list arrow allows a user to specify a separator between the consecutive number and check digit. Options include None, Space, and Dash. Book and Page fields are used to enter the Repeat Quantity, Starting Number, and Pages Per Book. Repeat Quantity is used indicate the repeat quantity. Starting Number is used to indicate the starting number for the book and page. Pages Per Book is used to indicate the number of pages in the book.

Clicking an Add or Delete button allows a user to specify another Location to the Face or remove a number from the ply.

Clicking a Zero Suppress button indicates leading zeros should be dropped. When a numbered form ships to multiple destinations and a specific starting number is not required for each location, clicking a Continue Up button allows a user to continue up the numbering sequence regardless of what occurs in the process. Clicking a Guarantee No Missing button ensures no missing documents (i.e., loss of numbers due to breaks, changing paper, waste, etc.) when forms are delivered to the customer. Face orientation buttons allow a user to specify consecutive number(s) for either the Front or Back side of the current ply.

The MICR Fact Sheet window allows a user to enter manufacturing specifications for Magnetic Ink Character Recognition (MICR) printing. If there is a forms design associated with a quote/WIP, this window can be partially populated by that design. The MICR window is divided into two sections: MICR Repetitive and MICR Consecutive information. Orientation buttons allow a user to specify the MICR application for either the Front or Back side of the current ply. Clicking a MICR Repetitive checkbox indicates MICR Repetitive functions. Clicking a MICR Consecutive checkbox indicates MICR Consecutive Numbering. A Measurement Bar field located at the top of the window represents width of the form. From Left and From Top fields are used to indicate the location of the repetitive number on the form. Clicking a PMS#/Name drop-down list arrow allows a user to specify the ink color used for MICR repetitive numbering. Information in the MICR Consecutive section will be completed if the MICR Consecutive information in the Consecutive Numbering window is completed. All associated fields within this section are enabled for entry. Clicking a Type drop-down list arrow allows a user to specify Press or Copysafe. A Number of Chars. field is used to specify the number of digits in the consecutive number. Clicking a Guarantee No Missing button ensures no missing documents (i.e., loss of numbers due to breaks, changing paper, waste, etc.) when forms are delivered to the customer. Clicking a Check Digit drop-down list arrow allows a user to select the mathematical formula (equation) used to determine the check digit.

The Printing window enables a user to establish printing specifications such as embossing, pantograph, and prismatic methods. If there is a forms design associated with a quote/WIP, this window can be partially populated by that design. An Available Print Types field allows a user to specify print types such as Bar Codes, Embossing, High Resolution, Microprinting, Pantograph, Printing Other, Prismatic, and Security Shield. Selecting Embossing enables the fields within the Emboss section. Selecting Pantograph enables the fields within the Pantograph section. Selecting Prismatic enables the fields within the Prismatic section. A Description field is used to enter a free-form description of the desired embossing. Clicking a Type drop-down list arrow allows a user to specify a pantograph type. Clicking a Custom checkbox indicates custom application. A PMS Number field is used to specify the desired PMS Numbered Ink for the Pantograph. Clicking a Named Ink drop-down list arrow allows a user to specify the Named Ink for the Pantograph. A Prismatic section allows a user to indicate the ink sequence, as well as specify the Divider Width of the Prismatic band as it flows from one color to the next. A user can select printing for either the Front or Back Face of the ply. Clicking a View Other button allows a user to view the "Other" print type selections for the current ply.

The Non-Litho Printing window enables a user to establish non-litho printing specifications such as titles, stock phrases, outline phrases, distinguishing figures, and the type of ink. If there is a forms design associated with a quote/WIP, this window can be partially populated by that design. Clicking a Select Title drop-down list arrow allows a user to select a stock title, such as "Acknowledgment Copy." If a Custom Title selection is chosen, then the Custom Title fields will be enabled, allowing a user to enter up to two lines for a custom title. A user can specify the orientation of the printing. Options include Horizontal and Vertical. Clicking a Number of Lines drop-down list arrow allows a user to specify the number of lines required for the custom title. A font size must be selected for a custom title. A Stock Phrases field and a Select Outline Phrase fields allow a user to select stock and outline phrases and their respective orientations from a drop-down list. If the use of different paper colors alone does not meet the form separation requirements, a user can use Distinguishing Figures. A user can specify an ink for the Selected Title, Stock Phrase, Outline Phrase, and Distinguishing Figure. A user has the choice of selecting either a Non-Litho Named Ink or PMS Numbered Ink. A user can select non-litho printing for either the Front or Back Face of the ply.

The Affixing window enables a user to establish affixing specifications such as eyelet, transfer tape, reinforcement patch, and other methods. If there is a forms design associated with a quote/WIP, this window can be partially populated by that design. Clicking an Eyelet drop-down list arrow allows a user to specify the type and diameter size of eyelet. Clicking a Transfer Tape drop-down list arrow allows a user to specify the type and size of transfer tape. Clicking a Reinforcement Patch drop-down list arrow allows a user to specify the type and size of reinforcement patch. Clicking an Affixing drop-down list arrow allows a user to specify the type of affixing method. Options may include: Avery Standard, Envelope Cut, Letterhead Cut, Other Affixing, Overall Label, Remoist Strip, etc. An orientation buttons allow a user to specify the affixing for either the Front or Back side of the current ply.

The Coating window allows a user to view, add, edit, and delete Security and Coating features to an order. If there is a forms design associated with a quote/WIP, this window can be partially populated by that design. Clicking a Coating drop-down list arrow allows a user to specify the type of coating material to be used on the ply. Clicking an Add button adds another instance of coating to the ply. Clicking a Delete button removes a specified Coating from the ply. Clicking a View Other button allows a user to view the "Other" coating selection for the ply. Clicking a Security drop-down list arrow allows a user to specify the required security feature. A Description field allows a user to better define the selected Security feature. Clicking an Add button adds another instance of security to the ply. Clicking a Delete button removes a specified Security feature from the field. An Orientation buttons allow a user to specify the coating for either the Front or Back side of the current ply.

The Utilities menu, see FIG. 8, contains commands to change the logon user password and view roles. A Change Password command allows a user to change the current password being used. A user can view the user roles by selecting a View Roles command. The Window menu, see FIG. 8, contains commands to arrange the system windows on the screen to meet unique display requirements. It also contains a command to display the toolbar. A Tile command arranges the windows so that an equal portion of each window is on the screen. A Layer command arranges the system windows in horizontal strips, one above the other. A Cascade command arranges the windows on the screen in an overlapping diagonal arrangement. A Show Toolbar command allows a user to display helpful buttons to execute commands. The Help menu, see FIG. 8, contains items for quickly getting on-line help or information about the order entry system 10.

The forms design process is used to create a design for a customer form. FIG. 8 illustrates two significant aspects of the forms design process, as embodied in the order entry system 10 of the present invention. The process is typically initiated when the CSR sends samples, mock-ups, artwork, etc. to a forms designer and enters the appropriate data in the View Form Design Activity window described in detail above with reference to the Options menu. The designer creates a graphic form design file corresponding to the desired form design using suitable form design software, e.g., ProDesigner® for Windows available from the F3 Software Corporation, Burlington, Mass. As is described in further detail herein with reference to FIG. 2, the graphic form design file is saved in an appropriate order entry server 13 and indexed in the forms design repository 18, see FIG. 1, so that it is accessible to the CSR. It may be preferable for a forms designer at the user interfaces 28, 29 to perform a portion of the form design activity, e.g., production of the artwork related to the form design. It is contemplated by the present invention that all or part of a specific graphic form design file may originate from a previously archived graphic form design file stored, for example, in the order entry server 13.

Referring again to FIG. 8, the order entry system 10 enables the CSR to associate a graphic form design file with a corresponding set of order specifications e.g., a quote or WIP, and then populate the order specifications with the information stored in the design file. An Associate Form Design window available under the Order Level Features menu enables a user to select "Associate" and tie the order specifications with the corresponding graphics without changing any data within the order specifications. The Associate Form Design window also enables a user to select "Populate" to fill in information on the Order and Ply Level screens of the order specifications, if none has been previously added, and overwrite information existing in the order specifications if it is inconsistent with the form design graphics. A Form Design Populate Results window is displayed upon population. A Default Values portion of the Results window displays fields that were not populated by the Forms Design. This serves as a notice that these field values may need to be reviewed by the CSR. The second half of the Results window displays warning messages. These are items that may have populated and caused discrepancies within the form.

Referring now to FIG. 2, the structure and function of the order entry system 10 of the present invention is illustrated in detail. The forms order entry system 10 comprises the first computer system 12, the printing station computer system 14, and the second computer system 16. The first computer system 12 includes user interfaces 21, 22, 23 and is programmed to capture form design data representative of a forms order 36 entered at one or more of the user interfaces 21, 22, 23. The second computer system 16 is remote from, and in communication with, the first computer system 12 and the printing station computer system 14 and is programmed to: (i) generate a price corresponding to the form design data as a function of a set of pricing rules; (ii) validate the forms order 36 by comparing the form design data with a set of validation rules; and, (iii) transmit a validated and priced order to the printing station computer system 14. The forms order 36 may comprise a modified existing forms order or an original forms order.

The price generated by the second computer system 16 comprises a list price corresponding to the form design data. The form design data comprises order specifications 32 designated within the first computer system 12 and a graphic form design file 34 designated within the first computer system 12. The second computer system 16 is further programmed to associate and populate the order specifications 32 from the graphic form design file 34 and generate a form design populate report. The form design populate report is indicative of non-populated portions of the order specifications 32 and are indicative of discrepancies between the graphic form design file 34 and the order specifications 32.

FIG. 2 further illustrates that form design files 38 corresponding to the forms order 36 entered at the user interfaces 21, 22, 23 are stored in the first server 13. The form design repository 18 is remote from, and in communication with, the first computer system 12. The second computer system 16 is remote from, and in communication with, the first computer system 12 and the form design repository 18. The second computer system 16 is programmed to (i) create an index of form design files 40 corresponding to the form design files 38 stored in the first server 13 and (ii) store the index of form design files 40 in the form design repository 18. As is illustrated in FIG. 2, the first computer system 12 includes a least one additional server 13 coupled to a second plurality of user interfaces 21, 22, 23. Form design files 38 corresponding to a forms order 36 entered at one of the second plurality of user interfaces 21, 22, 23 are stored in the additional server 13 and the index of form design files 40 created by the second computer system 16 corresponds to the form design files 38 stored in the first server 13 and the second server 13. Accordingly, where a plurality of order entry servers 13 are provided in the first computer system 12, form design files 38 are stored in the order entry server 13 corresponding to the user interfaces 21, 22, 23 at which the order was entered and the index 40 for accessing the form design files 38 is held in a central location. In this manner, data transfer across the network 20 is minimized because the form design files 38 are stored proximate the user interfaces 21, 22, 23 where they are most likely to be accessed in the future.

Figure 3:
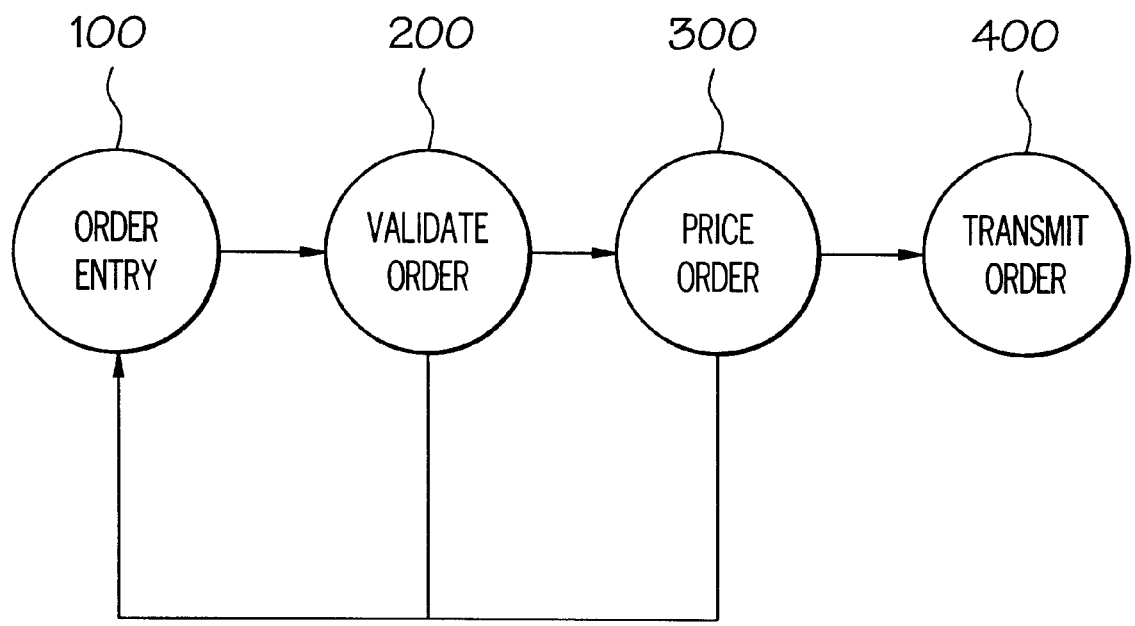
FIG. 3 is a flow chart representing the general operational structure of the forms order entry system of the present invention.
Figure 5:
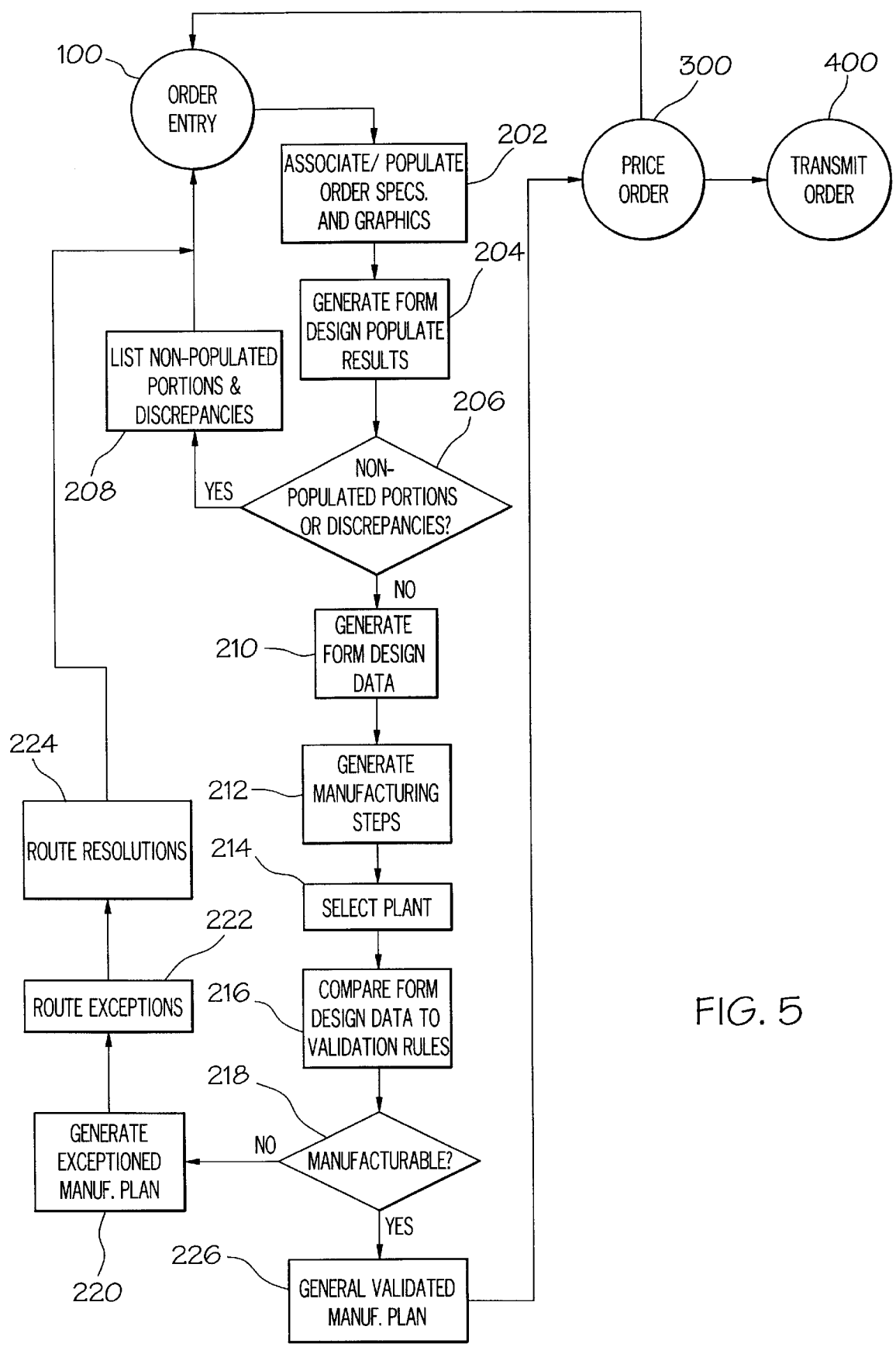

Referring now to FIGS. 2, 3 and 5, forms order validation 200 is described in detail. The second computer system 16, which is typically remote from and in communication with a user interface 21, 22, 23 at which an order is entered, includes the corporate server 17 and a validation engine 42 resident therein. The validation engine 42 operates in accordance with a set of validation rules which are integral to order validation 200. In order validation 200, the order specifications 32 and the graphic form design file 34 are associated and the order specifications 32 are populated from the graphic form design file 34, see step 202. Upon population, the second computer system generates form design populate report, see step 204. If portions of the order specifications 32 have not been populated by the graphic form design file 34, the order entry system 10 enables a user to list or print the non-populated portions and return to order entry 100 to complete the non populated portions, see steps 206 and 208. Similarly, if discrepancies exist between the order specifications 32 and the graphic form design file 34, the order entry system 10 enables a user to list or print the discrepancies and return to order entry 100 to correct the discrepancies, see steps 206 and 208. In general, form design data representative of the forms order 36 is captured if there are no non-populated portions or discrepancies, see step 210. However, it is contemplated by the present invention that the order entry system 10 may be programmed such that some discrepancies and some non-populated portions will be sufficiently minor in nature to permit the capture of form design data.

The second computer system 16 is programmed to generate manufacturing steps based on form design data representative of an entered forms order 36, see step 212, and select an appropriate manufacturing plant or printing station computer system 14 based on the manufacturing steps and the form design data, see step 214. The form design data defines the appearance and construction of the ordered form, i.e., its components and appearance. The manufacturing steps correspond to, and typically describe, a specific manufacturing process for creating the ordered form. Typically, the manufacturing process includes initialization of printing machinery and the subsequent printing steps necessary to produce a form.

Following generation of the manufacturing steps, the second computer system 16 determines whether the ordered form is manufacturable and usable by comparing the form design data to a set of validation rules, see steps 216, 218. If the ordered form is determined to be manufacturable and usable, no manufacturability or usability exceptions are generated and a validated manufacturing plan is transmitted to the selected printing station after order pricing, see steps 226, 300, and 400.

Referring specifically to FIG. 2, the printing station computer system 14 includes the plant server 15, user interfaces 24, 25, 26, a digital press 44, and a printer 46. In accordance with one embodiment of the present invention, the manufacturing steps are transmitted to the digital press 44 in digital format. Alternatively, data indicative of the manufacturing steps is reproduced at the printer 46 in a printed format.

If the ordered form is determined to be non-manufacturable or non-usable, an exceptioned manufacturing plan is generated, see step 220. The exceptioned manufacturing plan includes one or more manufacturability or usability exceptions that must be resolved prior to printing. Accordingly, the manufacturability exceptions are routed to one or more exception handling locations 48 within the order entry system 10, see step 222. The exception handling locations typically correspond to a purchasing department, an engineering department, a manufacturing plant, a pricing department, a customer accounting department, etc. Typically, the exceptions are first routed to the CSR to permit modification of the order entry 100 prior to further routing to exception handling specialists at the exception handling locations 48 throughout the system 12. The exception handlers generate resolutions and the resolutions are routed to the CSR to enable the CSR to modify the order entry 100, see step 224.

The validation rules comprise a set of rules and values for determining whether all the information necessary for manufacturing an ordered form is present and correct in the form design data. Exceptions are generated and routed where the conditions of a rule are violated. These validation rules fall into two classes, the general validation rules and the specific product validation rules. The rules within each of these classes are described in detail below.

General Validation Rules

According to one embodiment of the present invention, the follow rules, i.e., the general validation rules, are applied to every order regardless of the product ordered: Form Length, Form Width, Ply, Primary Writing Device, Quantity, Polywrap, Transfer Tape, Bursting, Reinforcement Patch, Check Press Perfs, Overrun, Packaging, Press Printing Units, Calculate Impressions, Determine Number Wide, Determine Possible Plants, Paper, Pantographs, Carbon, Lockup, Barcode, MICR, Home Plant Assignment, Security Features, Press Selection, Product Code, Ink, Non-Litho Printing, Folios, Ship List Quantity, Proofs, Administrative, Coded Invoice Instructions, Release I Exclusions, Invalid Combinations, and Grouping. Other general validation rules, e.g., Secondary Equipment, Check Press Punches, Blockouts, are applied in special circumstances.

Form Length. If the order is for a continuous form, all lengths must be the same. Similarly, if the order is for a form using stubs, all stub lengths must be the same. If they are not all the same, an exception is generated in the manner described above. Preferably, fold lengths are also checked to ensure that they are above a predetermined minimum fold length, below a predetermined maximum fold length, and an even multiple of the form length.

Form Width. The order entry system 10 checks the form width to ensure that it is not below a minimum form width or above a maximum form width. An exception is generated if the form width is outside the maximum/minimum range.

Ply. The system 12 checks the number of plyies and carbons to ensure that they are not below a minimum number of plies/carbons or above a maximum number of plies/carbons. An exception is generated if the form width is outside the maximum/minimum range.

Primary Writing Device. The system 12 requires that some selection be made for the primary writing device be selected. The available selections are: No Device Specified, Primary, and Secondary. Front-first or back-first imaging and the device type, manufacturer, model, and throw are also identified. If no selection is made, the CSR is prompted to specify primary writing device. The system 12 determines the specifications for the device selected and uses the type of the selected device, e.g., impact or non-impact, to validate the specifications.

For impact printers, if there is no carbon on the form ordered, the number of plies must be equal to or less than the maximum number of plies. If there is carbon on the order, the number of plies must be equal to or less than the maximum number of plies less the number of carbons. The length of the form must be equal to or less than a predetermined maximum form length and equal to or greater than the selected writing device's minimum form length. The order entry system 10 checks the basis Weight for each paper on the ordered form to ensure that it is equal to or less than a predetermined maximum value for the selected writing device. Other values and specifications checked by the system 12 for compatibility with the selected impact printers include: weight of the last copy of the form, paper weight, paper caliper, paper width, and printer throw (the throw must be evenly divisible into the form length).

For non-impact printers, the width, length, and basis weight of the form are checked, by the order entry system 10, to ensure these values are compatible with the selected writing device. Further, the order entry system 10 checks the print method (direct thermal, xerographic, thermal transfer, ion deposition, etc.) for the selected printer to determine if a compatible paper type has been selected. Also, the order entry system 10 checks the fuse method for the selected printer to determine whether a compatible ink has been selected. For example, if the fuse method is heat, pressure, or heat and pressure, heat resistant ink must be used. If there are horizontal or vertical perforations on the form, the order entry system check to ensure the selected printer is compatible for horizontal or vertical perforations. The system 12 checks for punches on each ply of the Form. If there are punches, predetermined criteria must be met (e.g., less than 5 punches, round, ¼" diameter, at least ½" from the trailing edge of the form, etc.). As is the case for impact printers, the system 12 checks the throw to ensure that it is evenly divisible into the Form Length.

Secondary Equipment. Preferably, appropriate rules are processed for the specific secondary equipment selected. For example, separate rules may be applied if a scanner, a MICR reader, or a burster are selected.

Quantity. The system compares the ordered quantity to predetermined maximum and minimum quantities.

Polywrap. If there is polywrap, the quantity per package must be entered. If the quantity is not entered, or selected from a list, an exception is set. If the quantity per pack is not one of a set of predetermined standard quantities, an exception is set. If there are to be labels on the product, the order entry system 10 displays a request for the necessary label information.

Transfer Tape. The order entry system 10 checks the order for transfer tape. If there is transfer tape, the system 12 checks to see if the selected tape is available for the ordered product and checks each ply for the location of the tape. The acceptable location values are front and back. For each ply that has transfer tape, the system 12 adds one to the total number of plies on the order and reevaluates to determine if the maximum number of plies has been exceeded. If there is transfer tape on more than one ply in the set, all tapes must be on the front or on the back of the plies. The orientation of the tape must be parallel to the form's KS holes. Certain features (Carbon, Carbonless impression area, Perforations, Punches, Printing, etc.) must fall within ¼" of either side of the tape. The system 12 checks the size of tape specified on the order to ensure that it is compatible with the remainder of the order.

Bursting. If the order includes carbon, the order entry system 10 compares the form width on the order with preset minimum and maximum widths, compares the form length on the order with preset minimum and maximum lengths, and compares the weight of the papers and carbons on the order with preset minimum and maximum weights. Further, the system 12 checks for horizontal perforations located less than 1" from a fold perf.

Reinforcement Patch. The order entry system 10 checks the order to ensure that the form quantity is equal to or greater than a minimum number of features for the form, that the basis weight of the paper complies with predetermined minimum and maximum values, and that the form width and the form length comply with the predetermined minimum and maximum values.

Check Press Perfs. The order entry system 10 ensures that, if diagonal, horizontal, vertical, or letteredge perforations are selected, they are compatible with the form design and manufacturable.

Press Punches. The order entry system 10 determines whether punches, if selected for the ordered form, are available for the current product. If a three-hole punch is selected, the following specifications must be met: (i) Form Size: at least one dimension of the form must be 8½; (ii) Number of punches: 3, (iii) Size: ¼" ROUND; (iv) Location: Parallel to the 8½" dimension, and ⅜" from the edge of the form; (v) Distance from the edge of the form (edge that is perpendicular to the 8½" dimension): 1¼", 2¾", 5½". Similarly, if a five-hole punch is selected, the following specifications must be met: (i) Form Size: 8½×11; (ii) Number of punches: 5; (iii) Size: ½" ROUND; (iv) Location: Left side only, ⅜" from left edge of form; (v) Location: Distance from top of form: 1¼", 4⅛", 5½", 6⅞", 9¾". Similar requirements are set for a seven-hole punch.

Packaging. The packaging rules are preferably not applied to orders for standard envelopes, roll products, or laser packs. Further, the packaging rules are not processed for any of the following features: remoist strip, transfer tape, eyelet, reinforcement patch, coating, staple, zipline glue, flexifast glue, spot paste, cross web glue, kraft wrap, mailable carton, banding, chipboard, inserts, inner cartons, stitching, KS removal, bursting, booking, tape binding, comb binding, spiral binding, perfect binding, spot coating, and desensitized area. The packaging rules include separate components for unique features (A), standard packaging (B), type of order (new, reorder, etc.) (C), stanfast envelopes (D), laser pack option (E), and customer specified packaging (F). The functionality of each of these components is represented as follows, where a form to be ordered is referred to as a proposal:

A. UNIQUE FEATURES

A.1. The order entry system 10 will check the FEATURE TYPE: PACKAGING.

1.1.1. Only one of the FEATURE LIST elements may be selected:
   STANDARD
   LASER PACK
   SPECIAL
   ROLLS
   OTHER
      1.1.2. If more than one of the above has been selected, set exception for the CSR:
   MESSAGE: #G1120 SELECTED PACKAGING TYPES ARE EXCLUSIVE If OTHER is selected: Discontinue validation, Set exception for Plant:

MESSAGE: #G1130 APPROVE PACKAGING TYPE.

A.2. The order entry system 10 will check the FEATURE TYPE: INNER PACKAGING.

1.2.1. Only one of the FEATURE LIST elements may be selected:
   POLYWRAP
   KRAFT WRAP
   BANDING 1.2.2. If more than one of the above has been selected, set exception for the CSR:
   MESSAGE: #G1220 SELECTED PACKAGING TYPES ARE EXCLUSIVE A.3. The order entry system 10 will check the FEATURE TYPE: BINDERY.

1.3.1. Only one of the FEATURE LIST elements may be selected:
   FOLDING
   PADDING
   STITCHING
   BURSTING
   BOOKING
   TAPE BINDING
   COMB
   SPIRAL BINDING
   PERFECT BINDING 1.3.2. If more than one of the above has been selected, set exception for the CSR:

MESSAGE: #G1320 SELECTED PACKAGING TYPES ARE EXCLUSIVE
1.4. If any exceptions are generated in Section A. UNIQUE FEATURES, discontinue processing the rules for PACKAGING.

B. STANDARD PACKING 1.50 CALCULATE STANDARD PACKING
- 1.50.1. The order entry system 10 will refer to the structures for PAPER and CARBON to SUM the caliper for all the papers and carbons in the form set.
- 1.50.1.1. If any paper or carbon in the set does not have a CALIPER, set exception for Eng:

MESSAGE #G1502 (WGT, COL, TYPE) NEEDS CALIPER

- 1.50.2. If the Proposal has any features that are listed in the structure: FEATURES CALIPER, the order entry system 10 will add the caliper for that feature to the SUM.
- 1.50.3 This rule is to be used only when one of the following FEATURES are on the proposal:
    - 1.50.3.1. AFFIX LABEL
    - 1.50.3.2. EYELET
    - 1.50.3.3. TAPE and/or TRANSFER TAPE
    - 1.50.3.4. EMBOSSING
    - 1.50.3.5. COMBINATION OF FEATURES In the following calculations, the order entry system 10 will treat a fold length as a form.
- 1.50.3.1. AFFIX LABEL
    - 1.50.3.1.1. The order entry system 10 will determine if any of the area for the label(s) on one form overlays any area of the label(s) on the succeeding form when the forms are folded.
    - 1.50.3.1.2. If no area of the label overlays another label, use ½ the caliper of the label.
    - 1.50.3.1.3. If any area of the label overlays another label, use the full caliper of the label.
    - 1.50.3.1.4. If there is more than one label of different calipers on the same form, use the largest of the calipers.
- 1.50.3..2. EYELET
    - 1.50.3.2.1. The order entry system 10 will determine if any area of the EYELET on one form overlays the area of an EYELET on the succeeding form when the forms are folded.
    - 1.50.3.2.2. If no area of the EYELET overlays another EYELET, use ½ the caliper of the EYELET.
    - 1.50.3.2.3. If any area of the EYELET overlays another EYELET, use the full caliper of the label.
- 1.50.3.3. TAPE and/or TRANSFER TAPE
    - 1.50.3.3.1. The order entry system 10 will determine if any area of the TAPE or TRANSFER TAPE on one form overlays the area of the TAPE or TRANSFER TAPE on the succeeding form when the forms are folded.
    - 1.50.3.3.2. If no area of the TAPE overlays another tape, use ½ the caliper of the tape.
    - 1.50.3.3.3. If any area of the TAPE overlays another TAPE, use the full caliper of the TAPE.
- 1.50.3.4. EMBOSSING
    - 1.50.3.4.1. If there is EMBOSSING on the order, add 30 to the Paper Caliper.
- 1.50.3.5. COMBINATION OF FEATURES
    - 1.50.3.5.1. If there is a combination of more than one different FEATURE on the proposal, use the caliper of the FEATURE with the highest caliper only, and delete the caliper for the other features.

The order entry system 10 will then select the proper column for determining STANDARD PACKING. The options are:

| COLUMN | PRODUCT |
| --- | --- |
| CUSTOM CONTINUOUS | Custom Continuous |
|  | Limited Custom Continuous |
|  | **** |
| SINGLES-NO PERF | All products where Ply = 1 |
| or | except: ROLLS |
| SINGLES-PERFORATED | StanFast Envelopes |
|  | **** |
| ZIPSET | Custom Zipset |
|  | Limited Zipset |

- 1.50.5 The order entry system 10 will then refer to the PACKING CHART—TOTAL SET CALIPER, and the appropriate column as selected above.

If the exact TOTAL SET CALIPER is not in the list, use the next higher TOTAL SET CALIPER.

- 1.50.6. If the ORDER SPECS-FLDLENGTH is larger than ORDER SPECS-FRMLENGTH, determine the factor. (1, 2, 3, etc.)
    - 1.50.6.1. Multiply the NUMBER OF FORMS/STACK by the factor.
- 1.50.7. If the ORDER SPECS-FLDLENGTH is smaller than ORDER SPECS-FRMLENGTH, determine the factor. (1, 2, 3, etc).
    - 1.50.7.1. Divide the NUMBER OF FORMS/STACK by the factor.
    - 1.50.7.2. Update ORDER SPECS-PACKING-STD QTY.
- 1.50.8.. If the FACTOR in 1.50.7. is not 1:
    - 1.50.8.1. If the FACTOR is 2, round the STD QTY to the nearest multiple of 4.
    - 1.50.8.2. If the FACTOR is 3, round the STD QTY to the nearest multiple of 6.
- 1.50.8 Update ORDER SPECS: STANDARD=(QTY) PER PACK
- 1.50.9. If the TOTAL Order Quantity is less than the quantity per pack, change the STANDARD QUANTITY PER PACK to the TOTAL ORDER QUANTITY 1.51 CALCULATE PACK HEIGHT
- 1.51.1. The pack height obtained in rule 1.50 is for a 12" high pack.
    - 1.51.1.1. Select FRMWIDTH and FRMLENGTH from the Data File: PACK HEIGHT.
    - 1.51.1.2. If the FRMWIDTH or FRMLENGTH is not in file, use the next higher FRMWIDTH and/or FRMLENGTH.
    - 1.51.1.3 If the FRMWIDTH or FRMLENGTH is larger than the largest size on the chart, set exception for the Plant::

MESSAGE #G1511 LARGE FORM—DETERMINE PACK HEIGHT

MESSAGE #G81014 THIS ORDER MUST BE PRICED MANUALLY

- 1.51.1.4 Update ORDER SPECS-PACKING-STD HEIGHT=Height of carton
- 1.51.1.5. If ORDER SPECS-PACKING-STD HEIGHT is not 12", calculate the number of sets in the STD HEIGHT.
- 1.51.2. If the order has any packaging type that is less than a full carton, the order entry system 10 will determine the height of the package and the number of packages per carton.

1.51.2.1 See Data File: PACKAGING—TYPE for the types of packages that may be less than a full carton.
a. If any of these types are specified, the quantity per package must also be specified. The order entry system 10 will then calculate the height of the package—based on the quantity per 12" pack; and the number of packages that will fit into 12".
    1.51.2.3. If the height of one package is greater than PACKAGING-MAXPACK, set a flag for review by the Plant.
  MESSAGE #G1512 PACK HEIGHT EXCEEDS SPECS
    1.51.2.4. The number of packages per 12" stack must be rounded down to the next whole number of packs.
    1.51.2.5. Update ORDER SPECS:
      Number of sets/pack
        Number of packs/carton
        Number of sets/carton
  1.51.3 The order entry system 10 will then determine if more than one stack of forms or packages may be put into a carton.
    1.51.3.5. The Datafile (PACKING.XLS-HEIGHT) shows the number of stacks for each carton size. If there is more than 1, multiply the number of sets/carton by the number of stacks.
    1.51.3.5. If there is more than 1 stack, multiply the number of packs/carton by the number of stacks.

C. TYPE OF ORDER (NEW, REORDER, ETC)

1.2. The order entry system 10 will check to see if the Proposal is for a New order, Reorder, or Reference Order.
  1.2.1. Skip to the appropriate rule, depending on the type of previous order:
  REORDER Skip to rule: 1.3.
  REFERENCE Skip to rule: 1.3.
  NEW ORDER Skip to rule: 1.4.
  REORDER
  1.3.1. The order entry system 10 will compare the Proposal with the specifications on the previous order.
  Product
  Type of product
  Form Width
  Form length
  Fold length
  Ply
  Basis weight of any paper
  Number of carbons
  Method of fastening
  Location of perforations (horizontal and vertical)
  Affix Label
    Material
    Location
  Transfer Tape
  Reinforcement Patch
  1.3.2. If any of the elements listed above is different from the previous order, skip to RULE: 1.4.—NEW ORDER.
    1.3.2.1. If the Sales Rep has not specified a quantity per pack or carton, update ORDER SPECS with the quantity/pack or carton from the previous order.
    1.3.2.2. If the quantity per pack or carton is within the PACK QUANTITY VARIANCE of the calculated quantity, update ORDER SPECS: STANDARD PACKING.
    1.3.2.3. If the quantity per pack or carton is not within the PACK QUANTITY VARIANCE, update ORDER SPECS: SPECIAL PACKING.

1.4. NEW ORDER
  1.4.1. If a TYPE has been entered, check the Data File: PACKAGING to see if the type is available for the Product. If not, set flag and return to Sales Rep.
  MESSAGE #G1410 PACKAGING NOT AVAILABLE FOR THIS PROD.
  1.4.2. If no PACKAGING TYPE has been selected, default to STANDARD.
  1.4.3. MORE THAN ONE TYPE OF PACKING If more than one type of packing is specified, the quantity per carton/pack must be specified for the smallest unit of packaging. All other units must be a multiple of this unit. If not, set flag and return Proposal to the Sales Rep.
  MESSAGE #G1340 CTN QTY NOTA MULTIPLE OF PACK QTY
D. STANFAST ENVELOPES
  All packaging must be in multiples of 500. If not, set flag for review by the Plant.
  MESSAGE #G23500 APPROVE QTY PER PACKAGE
E. LASER PACK OPTION
1.6 The order entry system 10 will calculate LASERPAK
  1.6.1 If any of the following data has been entered, exception to CSR:
  PACKAGING (other than LASER PACK, including: Quantity per Pack)
  INNER PACKAGING: (any)
  TRANSFER TAPE
  EYELET
  REINFORCEMENT PATCH
  REMOIST STRIP
  BINDERY (ANY)
  MESSAGE: #G1610 (*******) NOT ALLOWED FOR LASERPACK
  1.6.2. The LASERPAK Packaging will be used for the following:

| BASIS WT. | QUANTITY |
| --- | --- |
| 20 | 2500 |
| 24 | 2000 |

If the Basis Weight of the Paper is any other than 20# or 24#, exception to the Plant:
  MESSAGE: #G1111 FURNISH QUANTITY FOR LASER PACK
  1.6.3. Update MFG PLAN: LASERPACK
    Update MFG PLAN: QTY per CARTON
    Update MFG PLAN: CARTON HEIGHT=10"
F. CUSTOMER SPECIFIED
1.7. This rule is to be processed only if the CSR has specified the number of sets per Carton, or has specified the Carton Height.
  1.7.1. Prior to processing this rule calculate STANDARD PACKING, rule #1.50.
    1.7.1. If the quantity/carton entered by the CSR= STANDARD QTY/CTN, skip the balance of this rule.
    1.7.2. If the quantity/carton entered by the CSR is greater than STANDARD QTY/CTN, set exception for the Plant:
  MESSAGE #G23730 APPROVE QTY PER CARTON
  1.7.4 If the quantity/carton entered by the CSR is less than STANDARD QTY/CTN, calculate the height if the carton. Note: STANDARD QTY/CTN is for a 12" carton.

1.7.4.1. Update the MFG PLAN: Carton Height=XX
1.7.5. If the CSR has entered the Carton Height:
    1.7.5.1. If the entered Carton Height is greater than the height of a Standard Carton, set exception for the Plant:
MESSAGE #G23751 APPROVE CARTON HEIGHT
    1.7.5.2. If the entered Carton Height is less than the height of a Standard Carton, update the Mfg. Plan: Carton Height=XX
    1.7.5.3. Calculate the number of sets/carton for the entered carton height.
NOTE: STANDARD QTY/CTN is for a 12" carton.
    1. Update the Mfg. Plan: QTY/CTN=XX
Overrun. The functionality of the Overrun rule may be described as follows:
    1.1. The order entry system 10 will check the proposal to see if NO OVERRUN or NO UNDERRUN is specified. If either of these items is specified on the proposal, update ORDER SPECS-QUANTITY=Proposal Quantity
        1.1.1. Skip the balance of Rule
    1.2. If the proposal quantity is up to and including 100000:
        1.2.1. Add 10% to the proposal quantity.
    1.3. If the proposal quantity is greater than 100000 but less than 1000000:
        1.3.1. Add 5% to the proposal quantity
    1.4. If the proposal quantity is greater than 1,000,000:
        1.4.1. Add 2% to the proposal quantity
    1.5. Round the new quantity to the nearest multiple of SETS/CARTON.
        1.5.1. If the rounding results in a quantity that is less than the Proposal Quantity, do not round
        1.5.2. If the amount of change due to rounding is greater than 30% of the Proposal Quantity, do not round.
        1.5.3. If the proposal quantity, plus the overrun is less than a full carton, do not round.
    1.6. Update ORDER SPECS-QUANTITY to the new quantity.
Press Printing Units. The functionality of the Press Printing Units rule may be illustrated as follows:
25. PRESS PRINTING UNITS
    25.1. For each ply:
        25.1.1. Add the number of inks on the front
        25.1.2. Add the number of inks on the back
        25.1.3. If there is a picture-frame border, and the vertical leg of the border is more than ½ the form length, or if the border is solid, and more than ⅛" thick, set flag for review by the plant.
MESSAGE G25002 PICTURE FRAME BORDER
        25.1.5. If there is a desensitized spot, and the desensitized area is greater than ½ the area of the form, set flag for review by the Plant.
MESSAGE: G25001 LARGE DESENSITIZED AREA
    25.2. Select the ply with the greatest total of front and back inks, excluding Non-litho printing.
        ORDER SPECS–FRONTUNITS=Total number of front units
        ORDER SPECS–BACKUNITS=Total number of back units
    25.3. For each ply, if INK=PRISMATIC then ORDER SPECS–PRESS FEATURES–PRISM=Number of COLORS in the PRISMATIC PRINTING.
Calculate Impressions. The functionality of the Calculate Impressions rule may be illustrated as follows:

26. CALCULATE IMPRESSIONS
    26.1. The order entry system 10 will calculate number of 1-WIDE IMPRESSIONS. This will be used for the feed to pricing and for determining the Number Wide.
        26.1.1. If the NUMBER AROUND had been entered by the Plant, go directly to: 26.3.
    26.2. Select FORM LENGTH from ORDER SPECS.
        26.2.1. Select IMPRESSION FILE—FRM LENGTH and PRS LENGTH.
        26.2.2. If the FRM LENGTH and the PRS LENGTH are not found, set flag for review by the Plant.
MESSAGE #G26001 ENTER NUMBER AROUND CYLINDER
    26.3. The order entry system 10 will calculate the Number of 1-wide impressions: Divide the Proposal Quantity by the Number around
        26.3.1. Round up to the next whole number
    26.4. Update Order Specs: # AROUND
    26.5. Update Order Specs: 1-WIDE IMPS=(quotient from 26.3)
Determine Number Wide. The functionality of the Determine Number Wide rule may be illustrated as follows:
27. Determine Number Wide:
Assigned Variables:
    ORG=ORIGINAL NUMBER WIDE
    CUR=CURRENT NUMBER WIDE (Cannot be <1)
    FILE=STRUCTURE: NO WIDE: STANSET, SINGLES
    27.1. Whenever CUR=1, then NUMBER WIDE=1. Skip remaining edits.
    27.2. If PROPOSAL: LENGTH=STRUCTURE: IMPRESSION FILE-FLD LENGTH, ORG= STRUCTURE: IMPRESSION FILE-MAXWIDE
    27.3. IF ORG=0 THEN ORD=FILE-WIDE
    27.4. CUR=ORG
    27.5. If PROPOSAL-PRESS NOS-REG=1 then subtract FILE-IMPS-REG from CUR
    27.6. IF PROPOSAL-PRESS NOS-REG=2 then subtract FILE-IMPS-DOUBLE from ORG. If result<CUR then CUR=Result
    27.7. IF PROPOSAL-PRESS NOS-MICR=1 then subtract FILE-IMPS-MICR from ORG. If result<CUR then CUR=Result.
    27.8. If PROPOSAL-PRESS PUNCHES<=3 then subtract FILE-IMPS-PCH #1 from ORG. If result<CUR then CUR=Result.
    27.9. If PROPOSAL-PRESS PUNCHES>3 and <5 then subtract FILE-IMPS-PCH #2 from ORG. If result<CUR then CUR=Result.
    27.10. If PROPOSAL-PRESS PUNCHES>5 then subtract FILE-IMPS-PCH #3 from ORG. If result<CUR then CUR=Result.
    27.11. If PROPOSAL-NOS-MICR>0 subtract FILE-IMPS-MICR from ORG. If result<CUR then CUR= Result.
    27.12. If PROPOSAL-PUNCH=CORNER CUT then subtract FILE-CORCUT from ORG. If result<CUR then CUR=Result
    27.13. If PROPOSAL-HORIZ PERFS>1 then subtract FILE-HORIZ from ORG. If result<CUR then CUR= Result.
    27.13. If PROPOSAL-PERFS-HIT SKIP>1 then subtract FILE-HIT-SKIP form ORG. If result<CUR then CUR= result.

27.14. If PROPOSAL-PERFS=LITHO then subtract FILE-LITHO from ORG. If result<CUR then CUR=Result.

27.15. If PROPOSAL-PERFS=DIAGONAL then subtract FILE-DIAG from ORG. If result<CUR then CUR=Result.

27.16. If 1-WIDE IMPRESSIONS<FILE-IMPS then subtract FILE-QTY from ORG. If Result<CUR then CUR=Result.

27.17. If not found, set flag for Plant: MESSAGE G27041 ASSIGN NUMBER WIDE 27.18. ORDER SPECS-PRESS-WIDE=CUR Determine Possible Plants. The functionality of the Determine Possible Plants rule may be illustrated as follows:

28. DETERMINE POSSIBLE PLANTS 28.1. The order entry system 10 will compare the specifications in the ORDER SPECS FILE with the specifications in the Data File: PLANT SPECS for each plant.

28.1.1. If any false condition (N, or value in ORDER SPECS exceeds value in PLANT SPECS) is encountered, eliminate that plant from the list of possible plants.

28.2. The order entry system 10 will maintain a list of the possible plants for the proposal.

Paper. The functionality of the Paper rule may be illustrated as follows: For each ply, compare the PROPOSAL data with the values in the PAPER FILE.

1.1. The order entry system 10 will check the BASIS WGT., COLOR and TYPE against the PAPER FILE.

1.1.1. If the paper is found, go to the next edit;

1.1.3. If any paper is not found, set a flag: PURCHASING/ENGINEERING

MESSAGE #G34001 NEW PAPER.

1.2. If the paper is found, but the flag: CBNTST is on, set a flag:
ENGINEERING

MESSAGE #G34002 CARBON TEST REQUIRED.

1.3. If the paper is found, but the flag: TEMP is on, set a flag:
PURCHASING/ENGINEERING

MESSAGE #G34001 NEW PAPER.

Blockouts. The functionality of the Blockouts rule may be illustrated as follows:

35. BLOCKOUTS 35.1. Data Entry will display a list of the Blockouts that are available. Blockouts may be selected only from the list.

35.2. If the area of the blockout exceeds 50% of the total area of the form, update ORDER SPECS-PRESS-FRONTUNITS or ORDER SPECS-PRESS-BACKUNITS=+1.

Pantographs. The functionality of the Pantographs rule may be illustrated as follows:

36. PANTOGRAPHS 36.1. Pantographs may be selected only from the Data File: Pantographs.

36.2. If a pantograph is selected, the order entry system 10 will request the INK NUMBER, the % of screen, and the angle (if not standard).

36.3 If any ink is selected that is not VOID-1, set flag for review by Engineering

MESSAGE #VL011 VOID PANTO INK

Carbon. The functionality of the Carbon rule may be illustrated as follows:

41. CARBON

If there is no carbon on this PROPOSAL, skip this edit. For each carbon, compare the PROPOSAL data with the values in the CARBON FILE.

41.1. The order entry system 10 will check the CARBON FORMULAS against the CARBON FILE.

41.1.1. If the carbon is found, go to the next edit;

41.1.2. If any carbon is not found, set a flag: PURCHASING/ENGINEERING—NEW CARBON.

MESSAGE #G41003 NEW CARBON 41.2. The order entry system 10 will check the number of carbon plies on the order.

41.2.1. If the number of plies is greater than PRODUCT-MAX CBN, set exception flag:

A. If the PRODUCT=LIMITED, exception to CSR:

MESSAGE #G41210 TOO MANY CARBONS FOR (product type)

B. If the PRODUCT=CUSTOM, exception to plant:

MESSAGE #G41211 NUMBER OF CARBONS EXCEEDS SPEC 41.41. If the carbon is found, but the flag: CBNTST is on, set a flag: ENGINEERING-CARBON TEST REQUIRED.

MESSAGE #G41002 CARBON TEST REQUIRED 41.3. If CARBON is last in the set, set flag

MESSAGE #G41004 CARBON ON BOTTOM 41.4. If the carbon is found, but the flag: TEMP is on, set a flag:
PURCHASING/ENGINEERING—NEW CARBON.

MESSAGE #G41003 NEW CARBON 41.5. FEATURES 41.5.1. If the carbon is narrow, there must be a location. The valid locations are:
RIGHT
LEFT
else exception to CSR:

MESSAGE #G41510 NARROW LOCATION REQUIRED 41.5.2. One carbon may not have FEATHEREDGE and NARROW; else exception to CSR:

MESSAGE #G41520 BOTH FEATHEREDGE AND NARROW NOT ALLOWED

Lockup. The functionality of the Lockup rule may be illustrated as follows:

47. LOCKUP 47.1. The order entry system 10 will check to determine if there is sufficient lockup on the forms.

47.1.1. Refer to Data File: PRODUCTS to obtain the minimum lockup required.

47.2. For each color of printing there must be a clear area (NO PRINTING) across the form width, equal to or greater than PRODUCTS-LOCKUP.

47.2.2. This area may be at the top, bottom, or within the form.

47.2.3. If the clear area is at the top and bottom of the form, the length of the clear area may be split between the top and the bottom.

47.2.4. If there is sufficient LOCKUP, skip the balance of rule #47.

47.3. If there is not sufficient area for LOCKUP on any plate on the proposal, set flag for review by the Plant.

MESSAGE #G47144 INSUFFICIENT LOCKUP

Barcode. The functionality of the Barcode rule may be illustrated as follows:

48. BARCODE
- 48.1. If the order is an Exact Reorder, or a Reorder with Change—and there are not copy changes, skip this rule.
- 48.2. NEW ORDERS, REORDER WITH (COPY) CHANGE:
  - If there is BARCODE on the PROPOSAL, display the BARCODE SPEC SHEET.
- 48.3. Set a flag for ENGINEERING REVIEW.

MESSAGE #G48009

MICR. A form may have MICR repetitive and/or MICR consecutive numbers. In either event, any proposal that specifies MICR must be processed through this validation. The functionality of the MICR rule may be illustrated as follows:

49. MICR
- 49.1. ORDER TYPE
  - 49.1.2. The order entry system 10 will check the REORDER TYPE, and execute the validation rules depending on the TYPE:
    - 49.1.2.1. EXACT REORDER: Rule #49.3. PAPER
    - 49.1.2.2. REORDER W/CHANGE: All rules
    - 49.1.2.3. NEW ORDER: All rules
    - 49.1.2.4. REFERENCE: All rules
  - 49.1.3. The following rules apply to MICR Printing on any part that is machine read:
  - 49.1.4. Other parts in the set may have MICR Numbers, but those plies do not have to conform to the rules below.
- 49.2. FORM SIZE:
  - 49.2.1. Minimum form length: 2¾"
  - If not, set flag for review by the Sales Rep.

MESSAGE #G49848 FORM SIZE—MICR

- 49.3. PAPER
- 49.3. Ply #1.
  - 49.3.1. Any paper with MICR must be approved for MICR. See Data File: PAPER-MICR
  - 49.3.2. Minimum Basis Wgt: 20 #
  - 49.3.3. If any paper is not OK for MICR, set flag for review by ENGR.

MESSAGE #G49039 APPROVE PAPER FOR MICR

- 49.4. INK
  - 49.4.1. Ink for MICR printing must be approved for MICR. See Data File: INK-MICR
  - 49.4.2. If any INK is not OK for MICR, set flag for review by ENGR

MESSAGE #G49040 APPROVE INK FOR MICR

- 49.5. CLEAR BAND
  - 49.5.1. An area, ⅝" deep, and extending ¼" to the left edge of the form must be free of all other MICR ink.
    - 49.5.1.1. Printing in other inks—not MICR—may appear in this clear band. If any other ink is in this area, the system will check the Data File: INK-MICR to assure that the ink is not approved for MICR.
  - 49.5.2. If not true, set flag for review by the Sales Rep.

MESSAGE #G49849 MICR CLEAR BAND NOT CLEAR

- 49.6. MICR AREA
  - 49.6.1. All MICR printing must be located within an area ½" deep, and parallel to the bottom edge of the form.
    - 49.6.1.1. The bottom edge of the form may be defined as:
      - The edge of the form
      - A full horizontal perf immediately below the MICR Band area (for checks with a bottom stub)
  - 49.6.2. The bottom edge of the MICR characters must be 3/16" from and parallel to the bottom of the form.
  - 49.6.3. If the above is not true, set flag for review by the Sales Rep.

MESSAGE #G49850 MICR PRINTING OUTSIDE MICR AREA

- 49.7. CONSTRUCTION
  - 49.7.0. If the Product is SHEETED SINGLES, skip this rule.
  - 49.7.1. The form must have a full vertical perf (regular or letter edge), or a slit mark to the right of the MICR area.
  - 49.7.2. If there is no Vertical Perf or SLIT specified for the right side, set flag for review by the Sales Rep.

MESSAGE #G49851 KS REMOVAL REQUIRED ON RIGHT

Home Plant Assignment. The functionality of the Home Plant Assignment rule may be illustrated as follows (references to specific plant codes are included merely for illustrative purposes):

50. HOME PLANT ASSIGNMENT
- 50.1. The order entry system 10 will compare the Customer Data on the order with the Data file: ORDER PLANT ASSIGNMENT.
  - 1. If all of the following data on the Order match the data in the ORDER PLANT ASSIGNMENT file, the HOME PLANT=the PLANT in the ORDER PLANT ASSIGNMENT file:
    - Parent Number for the SOLD-TO
    - SOLD-TO number
    - SHIP-TO number
    - FORM NAME
    - FORM WIDTH
    - FORM LENGTH
  - 50.1.2. Skip balance of rule 50.
- 50.2. The order entry system 10 will check to see if the Home Plant had been assigned by MFG, ENGR or PURCH.
  - 50.2.1. If the Home Plant had been assigned by any Corporate Involvement function (MFG, ENGR, PURCH), skip the balance of Rule #50.
- 50.3. The order entry system 10 will select the Home Plant from the Data File: PLANT-DISTRICT
  - 50.3.1. If a HOME PLANT cannot be selected set flag for review by MFG.

MESSAGE #P50174 PLANT ASSIGNMENT

- 50.3.2. Skip the balance of Rule #50.

There may be exceptions to the HOME PLANT that are peculiar to certain products. If so, these exceptions will be noted below. These rules should be invoked only if the HOME PLANT has been determined by Rule #50.3. If the HOME PLANT has been determined by any other rule, skip Rule #50.4

- 50.4. REVISIONS to HOME PLANT ASSIGNMENT by PRODUCT: NOTE: REGION is the $1^{st}$ digit of the SALES REP MAIL CODE
  - 50.4.1. Carbonless Sets
  - 50.4.2. Continuous Singles Custom
    - 50.4.2.1. If the paper=Thermobond:
      - 50.4.2.1.1. If the Form Length=4¼", Home Plant=DPC 50.4.2.1.2. If the Form Length=5½", and
If the Region=R, T, V, X: Home Plant=DPC
If the Region=Y, Z: Home Plant=FAY 50.4.2.2. If the APPLICATION=KV:
50.4.2.2.1. If the Region=R, T, V: Home Plant=SAL
50.4.2.2.2. If the Region=X, Y, Z: Home Plant=KIR 50.4.2.3. If the APPLICATION=OID: Home Plant=DPC
50.4.2.4. If the APPLICATION=Tally Rolls: Home Plant=KIR 50.4.3. Continuous Singles Limited
50.4.4. Labels

| 50.4.5. Mailer: Continuous Flat Glue | | | |
|---|---|---|---|
| 50.4.5.1. FORM LENGTH | REGION | DISTRICT | Home Plant |
| 4 | ALL | | FAY |
| 5 | ALL | | FAY |
| 5 ⅔ | ALL | | SAL |
| 6 | ALL | | FAY |
| 7 ⅓ | ALL | | FAY |
| 8 | ALL | | FAY |
| 10 | ALL | | FAY |
| 14 | ALL | | PTV |
| 17 | ALL | | FAY |

| 50.4.6. Mailer: Zipmailer | | |
|---|---|---|
| 50.4.6.1. FORM LENGTH | REGION | Home Plant |
| 4 ⅔ | ALL | MID |
| 6 | ALL | FAY |
| All others except: 5 ½ & 11 | | SPG |

50.4.7. Mailer: Zipset Flat Glue
50.4.8. Rolls
50.4.9. Sheeted Singles Custom
　50.4.9.1. If the Form Length=11", and there are MICR Consecutive Numbers, Home Plant=YRK
　50.4.9.2. If the APPLICATION=Teller Receipt: Home Plant=YRK
50.4.10 Sheeted Singles Limited
50.4.11. Standard Envelopes
50.4.12. Stanfast Sheets
50.4.13. Stanset Custom
　50.4.13.1. If the APPLICATION=KV: Home Plant=KIR
50.4.14. Stanset Limited with MICR
50.4.15. Stanset Limited without MICR
50.4.16. Zipset Custom
　50.4.16.1. If the APPLICATION=Teller Receipt: Home Plant=YRK
　50.4.16.2 If the APPLICATION=Guest Checks

| REGION | Home Plant |
|---|---|
| X,Y,Z | KIR |
| R,T,V | RMO |

50.4.17. Zipset Limited 50.5 GROUPED ORDERS
50.5.1. NOTE: This rule should be invoked only if the HOME PLANT has been determined by Rule #50.3. and GROUP is NOT equal to NONE. If the HOME PLANT has been determined by any other rule, skip Rule #50.5

50.5.2. If the HOME PLANT=PTV, SHV or MUR, make no changes and skip the balance of Rule 50.5
50.5.3. If the PRODUCT=ZIPSET, change HOME PLANT to YRK
50.5.4. This rule should be invoked only of the MARKET=FN:
　50.5.4..1 If the PRODUCT=ZIPSET, change the HOME PLANT to RMO
　50.5.4.1. If the PRODUCT=STANSET, change the HOME PLANT to FAY
50.5.5. This rule should be invoked for all other valid groups:
　50.5.5.1. If the PRODUCT=ZIPSET, change the HOME PLANT to YRK
　50.5.5.2. If the PRODUCT=STANSET, and the HOME PLANT=SPG or KIR, change the HOME PLANT to FAY.
　50.5.5.3. If the PRODUCE=STANSET, and the HOME PLANT=SAL, change the HOME PLANT to MID.
　50.5.5.4. If the PRODUCT=CONTINUOUS SINGLES, change the HOME PLANT to DAY.

Security Features. The functionality of the Security Features rule may be illustrated as follows:

51. SECURITY FEATURES
51.0. Data Entry will present a list of the Security Features that are available for the selected Product. Depending on the selection(s), the following Validation rules will apply:

| | |
|---|---|
| CHEMICAL VOID | 51.01. |
| VOID PANTOGRAPH | 51.02. |
| WARNING BAND | 51.03. |
| COPYBAN + | 51.04. |
| SIMULATED WATERMARK | 51.05. |
| HIGH RESOLUTION BORDER | 51.06. |
| MICROPRINTING | 51.08. |
| SECURITY SHIELD | 51.09. |
| DUAL IMAGE NUMBERS | 51.10. |
| ARTIFICIAL WATERMARK | 51.11. |
| PRISMATIC PRINTING | 51.12. |
| EMBOSSING | 51.13 |

51.01. CHEMICAL VOID
　51.1.1. Data Entry will request the Ply Number.
　51.1.2. When papers are selected for the designated ply, Data Entry will display only those papers that are marked Y for: SAFBASE
　　51.1.2.1. If a paper has already been selected for the PLY with CHEMICAL VOID, the paper must be marked Y for SAFBASE. If not, set flag for review by the Sales Rep.
MESSAGE #VL PAPER NOT APPROVED FOR CHEMICAL VOID (SALES—NORMAL)
51.02. VOID PANTOGRAPH
　51.02.1. Data Entry will request the Ply Number.
　51.02.2. When papers are selected for the designated ply, Data Entry will display only those papers that are included in PAPER GROUP: B3 (Safety Papers)
　　51.02.2.1. If a paper has already been selected for the PLY with VOID PANTOGRAPH, the paper must be included in PAPER GROUP: B3 (Safety Papers). If not, set flag for review by the Sales Rep.
MESSAGE #VL51201 PAPER NOT APPROVED FOR PANTO 51.02.3 If the INK-VOID flag is not on set a flag for ENGINEERING REVIEW.
MESSAGE #VL011
  51.02.4. If the PROPOSAL is a reorder:
    51.02.4.1. There must be a reference number
    51.02.4.2. If not, notify the Sales Rep that a reference number is required before the PROPOSAL can become an order;
MESSAGE #VL809
    51.02.4.3. Add to PLANT SPECIAL INSTRUCTIONS: "PLY #(X), CUSTOM VOID PANTO REFERENCE NO: (XXXXXXX)".
  51.02.5. If the PROPOSAL is a new order:
    51.02.5.1. Send a message to the Sales Rep indicating that he must send copy for the Custom Void Panto to the producing plant as soon as it is known. The order cannot be scheduled until this copy is received.
Message #VL810
51.03. WARNING BAND
This rule has been deleted per Validation Team.
There are no Paper Restrictions for WARNING BAND.
51.04. COPYBAN+
  51.4.1. Data entry will display a list of the Panto Patterns that are available for this feature.
  51.4.2. Data Entry will request the Ply Number.
  51.4.3. INK:
    51.4.3.1. Data Entry will display the inks that have: COPYBAN=Y for selection.
    51.4.3.2. If the desired ink cannot be selected from this list, Data Entry will display all inks that have: COPYBAN=(blank)
      51.4.3.2.1. If one of these inks is selected, set a flag for review by the Plant.
      Also note: it requires approx 3–4 weeks to qualify an ink.
51.05. SIMULATED WATERMARK
  51.5.1. If SIMULATED WATERMARK is selected, the INK must be SIMULATED WATERMARK.
  51.5.2. Update ORDER SPECS: NON-LITHO=+1
51.06. HIGH RESOLUTION BORDER
  51.06.1. Data Entry will require an INK color if HIGH RESOLUTION BORDER is selected.
51.08. MICROPRINTING
  51.08.1. If MICROPRINTING is selected, there must be a callout on F3 for MICROPRINTING.
  51.08.2. If there is a callout for MICROPRINTING on F3, MICROPRINTING must be selected. If not, set flag for message to the Sales Rep.
51.09. SECURITY SHIELD
  51.09.1. If Security Shield is selected, the WRITING DEVICE-TYPE must be: IMPACT. If not, set flag for the Sales Rep:
MESSAGE #VL SECURITY SHIELD NOT ALLOWED ON THIS PRINTER
  51.09.2. Update ORDER SPECS: SECOPS-SHIELD=1
  51.09.3 If the PROPOSAL has SECURITY SHIELD, add SECURITY SHIELD to the MFG PLAN, and set flag for review by the Home Plant.
MESSAGE #G51093 SECURITY SHIELD
  51.09.4. If the PROPOSAL has SECURITY SHIELD, the ink must have the flag set for SECURITY SHIELD. If not, set exception for Engineering:
MESSAGE #G51094 APPROVE INK FOR SECURITY SHIELD 51.10. DUAL IMAGE NUMBERS
  51.10.1 If DUAL IMAGE NUMBERS is selected, Data Entry will restrict the Paper Selections to papers with Basis Wgt of 26# or less.
  51.10.2. Update ORDER SPECS: PRESS FEATURES-NUMBER COLOR=DUAL IMAGE.
  51.10.2. Update ORDER SPECS: PRESS FEATURES-NUMBERS=+1
51.11. ARTIFICIAL WATERMARK
  51.11.1. If ARTIFICIAL WATERMARK is selected, the INK must be ARTIFICIAL WATERMARK.
  51.11.2. Update ORDER SPECS: PRESS-BACKUNITS=+1
51.12 PRISMATIC PRINTING
  51.12.1. If there is PRISMATIC PRINTING, the order entry system 10 will request the following information:
    51.12.1.1. Number of Colors of Ink
      Up to 3 Ink colors are allowed. If there are more than 3, set exception for CSR:
      NOTE: The same ink color may be used twice. In this case, it is counted as two inks.
MESSAGE #G51121 MAX: 3 COLORS ALLOWED FOR PRISMATIC
    51.12.1.2. Sequence of Colors
      O/E will show the sequence of the colors. No edits are required.
    51.12.1.3. Width of each Color Band
      The width of each color band must be entered. This width must be shown in whole numbers and fractions (e.g. 1⅜"). If there is not a dimension for each ink color in the Prismatic Area, set exception for the CSR:
MESSAGE #G51123 WIDTH OF PRISMATIC BAND REQUIRED
    51.12.1.4. Total width of Prismatic Printing.
      The total combined widths of all the color bands may not exceed the total width of the form. Minus 1". If it does, set exception for the CSR:
MESSAGE #G51124 PRISMATIC BAND TOO WIDE
51.13 EMBOSSING
  If the Proposal has EMBOSSING, set flag for review by the Plant
MESSAGE #VL208 APPROVE EMBOSSING
Press Selection. The functionality of the Press Selection rule may be illustrated as follows:
53. DETERMINE POSSIBLE PRESSES:
  53.1. FOR EACH ORDER:
  Compare ORDER SPECS DATA with PLANT SPECS-PRESS FILE (06-17-1). Save the PLANT and PRESS Number for any line items that match:
    53.1.1. Select only those presses for the specified product.
    53.1.2. ORDER SPECS-FLDLENGTH=PLANT SPECS-PRESS-FLDLENGTH
    53.1.3. ORDER SPECS-PRESS-DELIVERY=PLANT SPECS-SELECTED PRESS-DELIVERY
  53.2. FOR EACH PLY:
    53.2.1. ORDER SPECS-PRESS FEATURES-UNITS=<PLANT SPECS-(SELECTED PRESS) PRESS FEATURES-UNITS
    53.2.2. ORDER SPECS-PRESS FEATURES-NUMBER-1=PLANT SPECS (SELECTED PRESS) PRESS SPECS-NUMBER-1
      53.2.2.1. ORDER SPECS-PRESS FEATURES-NUMBER-2=PLANT SPECS (SELECTED PRESS) PRESS SPECS-NUMBER-2

53.2.3. ORDER SPECS-PRESS FEATURES NO-TYPE=PLANT SPECS-(SELECTED PRESS) PRESS FEATURES-NO-TYPE 53.2.4. ORDER SPECS-WIDTH*WIDE=<PLANT SPECS-(SELECTED PRESS) PRESS-WEB 53.2.5. ORDER SPECS-PRESS-PUNCH-1=PLANT SPECS-(SELECTED PRESS) PRESS-PUNCH-1

53.2.5.1. ORDER SPECS-PRESS-PUNCH-2= PLANT SPECS-(SELECTED PRESS) PRESS-PUNCH-2

53.2.6. ORDER SPECS-PRESS FEATURES-HEATSET=PLANT SPECS-(SELECTED PRESS) PRESS FEATURES-DRYER.

53.2.7. ORDER SPECS-PRESS FEATURES-SPOT= PLANT SPECS-(SELECTED PRESS) PRESS FEATURES-SPOT.

53.2.8. ORDER SPECS-PRESS FEATURES-TITLES=PLANT SPECS-(SELECTED PRESS) PRESS FEATURES-RUBBER 53.2.9. ORDER SPECS-PRESS FEATURES (UNITS/UNITS)=PLANT SPECS-(SELECTED PRESS) PRESS FEATURES (UNITS/UNITS)

The plant can be determined from the first two digits of the press number. Refer to: STRUCTURE: PLANTS for a list.

53.3. For each PLANT selected, check the Secondary Operations for that plant: SECONDARY OPS. If the PROPOSAL has any secondary operation that is not available at the selected plant(s) delete all presses for that plant(s) from the selected list of presses.

53.4 If any selected plant=SHV go to Rule No. 32

53.5 If any selected plant=MUR go to Rule No. 33

If no plants are found, set flag: MSG #45

Product Code. The functionality of the Product Code rule may be illustrated as follows:

54. PRODUCT CODE 54.1. A 5-digit Product Code will be assigned by Validation to each proposal at the time of PLACE ORDER.

54.2. Whenever the criteria is met to assign the product code, skip the balance of the edits.

54.2.1. If any digit cannot be assigned, either because the feature is not detectable or it is not in the current product release, mark the Product Code: (x)0000, and skip the balance of the rules. Add COMMENT to the Order:

MESSAGE #C54210 ASSIGN PRODUCT CODE 54.2.2. If the CSR has selected a product from the Order Detail window, use the associated Product Code, and skip the balance of this rule.

54.3. Whenever changes are made to a PROPOSAL or to an ORDER, the PRODUCT CODE EDIT must be re-done so that the current PROPOSAL/ORDER has the correct code.

54.4 The first digit (0–9) of the PRODUCT CODE will be entered by the CSR. If this digit has not been entered, set flag for the CSR:

MESSAGE: G54400 PRODUCT CODE (1 DIGIT) REQUIRED 54.5. The $2^{nd}$, $3^{rd}$, $4^{th}$, and $5^{th}$ digits of the Product Code will be assigned according to the characteristics of the form so as to identify the form in a convenient manner.

Ink. The functionality of the Ink rule may be illustrated as follows:

55. INK

For each ply, compare the PROPOSAL-INK with the INK FILE.

55.1. If any ink is not found, set a flag for ENGINEERING REVIEW.

55.2. If the PROPOSAL has match ink:

55.2.1. If the PROPOSAL is a reorder:

55.2.1.1. There must be a reference order number.

55.2.1.2. If not, notify the Sales Rep that a reference number, or a new INK SAMPLE is required before the PROPOSAL can become an order.

MESSAGE #G55816 MATCH INK SAMPLE REQUIRED 55.2.1.3. Add to PLANT SPECIAL INSTRUCTIONS: "PLY #(X), MATCH INK REFERENCE NO. (XXXXXXX).

55.2.2. If the PROPOSAL is a new order:

55.2.2.1. Send a message to the Sales Rep indicating that he must send a sample to the producing plant as soon as it is known. The order cannot be scheduled until this sample is received.

MESSAGE #C55816 MATCH INK SAMPLE REQUIRED 55.3. If the order is not Camera Ready, and there is at least one plate, then at least one ink must be entered. If not, set exception for the CSR:

MESSAGE #G55512 INK MUST BE ENTERED 55.5. If any INK requires a DRYER, add DRYER to the ORDER SPECS FILE and set a flag for review by the Home Plant.

MESSAGE #G55120 DRYER REQUIRED 55.5.5. If any INK is marked HEATSET, add HEATSET to the ORDER SPECS FILE.

55.7. If the Proposal has COPY BAN+, check the ink file for inks with the same COLOR.

55.7.1. If there is no ink with the same COLOR, and OK for COPY BAN set flag, and send a message to the Sales Rep.

MESSAGE #G55803 Ink not available for COPY BAN+

55.7.2. If there is an ink with the same COLOR, and OK for COPY BAN+, add a message for the Plant to the SPECIAL INSTRUCTIONS on the PROPOSAL.

MESSAGE #G55501 MUST USE COPY BAN+

55.7.3. Add: COPY BAN to the ORDER SPECS FILE 55.11. If the Proposal has a VOID PANTO, check the ink file for inks with the same COLOR.

55.11.1. If there is no ink with the same COLOR, and OK for VOID PANTO, set flag, and send a message to the Sales Rep.

MESSAGE #G55821 INK NOT AVAILABLE FOR VOID PANTO 55.11.2. If there is an ink with the same COLOR, and OK for VOID PANTO, add a message for the Plant to the SPECIAL INSTRUCTIONS on the PROPOSAL.

MESSAGE #C55511 MUST USE VOID PANTO INK 55.11.3. Add: VOID PANTO to the ORDER SPECS FILE 55.12. SOY INK. If Soy Base Ink is selected for any ink, the order entry system 10 will check the particular ink to see if it is available in SOY BASE.

55.12.1. If the Soy Base Ink opt is not on, set exception for the CSR:

MESSAGE #G55121 SOY BASE INK NOT AVAILABLE FOR (Ink Name)

55.12.2. For each ink that is selected as SOY, the order entry system 10 will add a comment to the Order:

MESSAGE #C55122 USE SOY BASE INK FOR (Ink Name)
55.13 HEAT RESISTANT INK (Customer Specified)
   55.13.1. If the Customer (CSR) has entered HR INK, the order entry system 10 will check to see if the HR Ink opt if on for the ink.
   55.13.2. If the HR ink opt is not on, set exception for the CSR:
MESSAGE #G55132 HEAT RESISTANT INK NOT AVAILABLE
   55.13.3. If the HR opt is on, add comment to the order:
MESSAGE #C55133 MUST USE HEAT RESISTANT INK Non-Litho Printing. The functionality of the Non-Litho Printing rule may be illustrated as follows:

56. NON-LITHO PRINTING
   56.0. The order entry system 10 will display the selections for non-litho printing that are available for this product, along with the sizes (type sizes) for each. If none of them are selected, skip rule #56.
      56.0.1. The F3 file must show the location of the NON-LITHO printing, but not the text, except for back printing.
      56.0.2. If any of these non-litho features are selected, Data Entry will also ask for the form is "Y-Wired".
If one or more of these features are on the Proposal, go to the appropriate rule(s):
TITLES Rule: 56.1.
DISTINGUISHING FIGURES Rule: 56.2.
STOCK PHRASES Rule: 56.3.
CONSEC. NUMBER INK Rule: 56.5.
GENERAL EDITS Rule: 56.8.
   56.1. TITLES
      56.1.1. If there are TITLES on the Proposal, Data Entry will request:
      PLY NUMBER
      FRONT
      BACK
      INK (Selected from List)
      STOCK (Selected from List)
      CUSTOM (Input text)
      56.1.2. The location for the Titles must be shown on F3.
         56.1.2.1. The location of the titles on all plies must be the same. If not, the order entry system 10 will check the Data File to see if STAGGERED TITLES are allowed on this product.
            56.1.2.1.1. If Staggered Titles are allowed, add message to the Order File:
MESSAGE #C56001 STAGGERED TITLES
            56.1.2.1.2. If Staggered Titles are not allowed, set flag for review by the Sales Rep:
MESSAGE #G56003 STAGGERED TITLES NOT ALLOWED
      56.1.3. If any other printing or rules appear within the title, set flag for SALES REP:
MESSAGE #G56002 TITLES CANNOT BE REGISTERED
      56.1.4. If Custom Titles had been selected, Data Entry will request the text for the Titles. The maximum length for the title is: 5" (approx. 60 Characters)
         56.1.4.1. Up to two lines are allowed for the Title, but if two lines are input, they must be adjacent, and the total depth may not exceed ¼".
         56.1.4.2. If only one line is used for the Title, the type may be 10 point type to 18 point type. If the type size is not within this range, set exception for CSR:
MESSAGE #G56142 TYPE SIZE OUT OF RANGE FOR TITLE
         56.1.4.3. If two lines are used for the Title, only 10 point type may be used. If not, set exception for CSR:
MESSAGE #G56143 2-LINE TITLE MUST BE 10 POINT TYPE
      56.1.5. Update ORDER SPECS
      PRESS-RUBBER-UNITS=Add 1.
      PRESS-RUBBER-INK=Selected Title Ink
      PRESS-RUBBER-STAGGER=YES (if selected)
      56.1.6. Only one TITLE (Stock or Custom) is allowed per form, except:
         56.1.6.1. If the form is "Y-Wired", one title is allowed on each side (right or left) of the form.
         56.1.6.2. If the form length is greater than 11", two TITLES per form are allowed.
   56.2. DISTINGUISHING FIGURES
If there are DISTINGUISHING FIGURES on the Proposal, Data Entry will request:
PLY NUMBER
   TEXT FRONT:
   TEXT BACK:
INK (Selected from List)
      56.2.1. The location for the Distinguishing Figure must be shown on F3.
      56.2.2. Data Entry will allow only one Distinguishing Figure per ply except:
         56.2.2.1. If the form is "Y-Wired", one Distinguishing Figure is allowed on each side (right or left) of the form.
         56.1.6.2. If the form length is greater than 11", two Distinguishing Figures per form are allowed.
      56.2.3. Update Order Specs:
      PRESS-RUBBER-UNITS:
      FRONT=Add 1. or
      BACK=Add 1.
      PRESS-RUBBER-INK=Selected Distinguishing Figure Ink
   56.3. STOCK PHRASES
If there are STOCK PHRASES on the Proposal, Data Entry will request:
PLY NUMBER
FRONT:
BACK:
INK (Selected from List)
TEXT (Selected from List)
SIZE (Selected from List)
   56.3.1. Update ORDER SPECS
   PRESS-RUBBER-UNITS:
   FRONT:=Add 1. or
   BACK:=Add 1.
   PRESS-RUBBER-INK=Selected Title Ink
   56.3.2. Data Entry will allow only one STOCK PHRASE per ply except:
      56.3.2.1. If the form is "Y-wired", one stock phrase is allowed on each side (right or left) of the form.
      56.3.6.2. If the form length is greater than 11", two STOCK PHRASES per form are allowed.
   56.5. CONSECUTIVE NUMBER INK. If there are PRESS CONSECUTIVE NUMBERS, check the FEATURE: INK, Cons nos ink opt to see if the ink is available for Consecutive Numbers. If not, set exception for the Plant:
MESSAGE #G56510 APPROVE CONSEC. NUMBER INK 56.8. GENERAL EDITS
- 56.8.1. If more than one of the above features appears on any one ply of the proposal, set flag for review by the Sales Rep:

MESSAGE #G56804 ALL NON-LITHO AREAS MUST BE SAME COLOR

- 56.8.2. If there is more than one of the above features on any one ply, the areas for the different features may not overlap. If they do, set flag for review by the Sales Rep:

MESSAGE #G56805 NON-LITHO AREAS OVERLAP

- 56.8.3. If there is more than one of the above features on any one ply, all the features must be on the same face. If not, set exception for the Plant.

MESSAGE #G56806 NON-LITHO INKS: FRONT AND BACK

Folios. After the Product Code has been determined, the order entry system 10 will check to see if any FOLIOS are to be furnished for this Proposal. The functionality of this rule may be illustrated as follows:

75. FOLIOS
- 75.1. If the PRODUCT CODE is not in the FOLIO DISTRIB file, skip this edit.
- 75.2. If the PRODUCT CODE is found, and there is an entry in FOLIO DISTRIB—CODE, and an entry in the FOLIO DISTRIB—QUANTITY, add to the PROPOSAL: (QUANTITY) FOLIOS FOR CODE (X)

Ship List Quantity. The functionality of this rule may be illustrated as follows:

76. SHIP LIST QUANTITY
- 76.1. If there is more than one destination on the PROPOSAL, add the quantities for all the destinations.
- 76.2. If the total quantity for all destinations does not match the PROPOSAL QUANTITY, set a flag to send a message to the SALES Rep: "PROPOSAL QUANTITY DOES NOT MATCH DESTINATION QUANTITIES. THIS PROPOSAL CANNOT BECOME AN ORDER UNTIL THIS IS CORRECTED."
- 76.3. If one or more destinations are to a Warehouse (other than D21) the order entry system 10 will add the quantity for each storage destination and compare this sum with the "total quantity stored" on the STORAGE SCREEN.

If the quantities do not agree, set a flag and send a message to the Sales Rep.

Proofs. The functionality of this rule may be illustrated as follows:

77. PROOFS
- 77.1 Check each PROPOSAL to see if a Proof is required. If the PROPOSAL does not indicate a PROOF, skip this edit.
- 77.2 If the PROPOSAL indicates that a proof is required, compare the PROPOSAL data with the values in PROOFS.
- 77.3. If the TYPE OF PROOF requested is found for the PRODUCT, update the MFG Plan: PROOF=Type of Proof.
- 77.4 If the TYPE OF PROOF requested is not found for the PRODUCT, set exception for the CSR:

MESSAGE #G77141 (type of proof PROOF NOT AVAILABLE FOR THIS PRODUCT

Administrative. The functionality of this rule may be illustrated as follows:

78. ADMINISTRATIVE

INDEX OF RULES THAT RUN EVERY TIME VALIDATION RUNS:

78.1. Overrun, Underrun, Numbers
78.3. WAREHOUSE
78.5. EXPORT
78.8. VIA INSTRUCTIONS
78.9. SPECIAL INSTRUCTIONS
78.10.1 SHIP-TO
78.13 SIZE
78.14 ACCOUNT CODE
78.15 CREDIT CHECK
78.16 CONTRACT PRICING

INDEX OF RULES THAT RUN ONLY WHEN "PLACE ORDER" IS SELECTED:

78.2. COST CENTER
78.4. STARTING CONSEC. NUMBER
78.6. P.O. NUMBER
78.7. FORM NUMBER
78.10.2 SOLD-TO NUMBER
78.10.3 BILL-TO NUMBER
78.12 SALES REP EMPLOYEE NUMBER
78.17 DIFFERENTIAL
78.1. Overrun, Underrun, Numbers The rules relating to Overrun, Underrun and Missing/Guaranteed Numbers vary by product, and will be treated in the rules for each product.

78.2. COST CENTER
- 78.2.1. If the order is for Storage, the order entry system 10 will check the PRISM Profile: If Cost Center Required=Y If there is a direct shipment (warehouse=null), there must be an entry in COST CENTER.

If there is a warehouse shipment, and the storage invoice timing=invoice at storage, there must be an entry in COST CENTER.

If not, set exception for CSR:

MESSAGE #G78801 COST CENTER REQUIRED 78.3. WAREHOUSE
- 78.3.1. Check that each Warehouse destination must have a valid warehouse code or be D21. If not, send a message to the Sales Rep.

MESSAGE #G78802 WAREHOUSE REQUIRED

- 78.3.2. If any destination is a warehouse (other than D21) the order entry system 10 will check the STORAGE Screen to make sure that the following entries have been made:

INV STOR or INV REL

INCL IN PRICE or ADD-ON

If these fields have not been entered, set a flag and return the proposal to the Sales Rep.

MESSAGE #G78818 INV STORAGE CHGS: AT TIME OF STG OR REL? INCL IN PRICE?

- 78.3.3. If the proposal is marked for STORAGE, there must be a valid warehouse other than D21. If not, return the proposal to the Sales Rep.

MESSAGE #G78802 WAREHOUSE REQUIRED 78.4. STARTING CONSEC. NUMBER
- 78.4.1 If Consecutive Numbers have been selected, and CONTINUE UP has not been selected, there must be a starting number for each and every destination. If not. Set exception for CSR:

MESSAGE #G78804 STARTING CONSEC NO.

- 78.4.2. If "CONTINUE UP" has been selected by Order Entry, check the Order for Number of Destinations. If the Number of Destinations is greater than one, set exception for the CSR:

MESSAGE #G78420 MUST ENTER STARTING CONSEC NO.

NOTE: The check for the number of digits in a consecutive number is in the Validation for each product.

78.5. EXPORT
  78.5.1. If the proposal is for EXPORT, set a flag for review by World Trade. EXPORT is defined as any address that has F FOR as a zip code in CADD (Ship-to or Sold-to)

MESSAGE #G78511 ORDER MUST BE MANUALLY PRICED

MESSAGE #G78990 EXPORT
  78.5.2. The order entry system 10 will check for the Coded Special Instruction: "EXPORT ORDER". If it is not selected, set exception for the CSR:

MESSAGE #G78520 SELECT SPECIAL INSTRUCTION: EXPORT 78.6. P.O. NUMBER
  78.6.1. If there is no entry in the Purchase Order Field, set a flag and return the proposal to the Sales Rep.
  78.6.2. The requirements for a Purchase Order may be modified at a later time, based on the current policies.

MESSAGE #G78806 P.O. NUMBER REQUIRED 78.7. FORM NUMBER
  78.7.1. If no form number has been entered on the Proposal, set a flag and return the Proposal to the Sales Rep.

MESSAGE #G78808 FORM NUMBER REQUIRED 78.8. VIA INSTRUCTIONS
  78.8.1. If there is any entry in the VIA instructions, set a flag for review by the Plant.

MESSAGE #G78142 REVIEW VIA INST.

78.9. SPECIAL INSTRUCTIONS
  78.9.1 If there is any entry in the SPECIAL INSTRUCTIONS, other than the coded SPECIAL INSTRUCTIONS, set a flag for review by the Plant/Center.

MESSAGE #G78143 REVIEW SPECIAL INST.

78.10. SHIP-TO/SOLD-TO
  78.10.1. SHIP-TO Customer Number
    78.10.1.1. If the SHIP-TO number is BLANK, set exception for CSR and skip to 78.10.2:

MESSAGE #G78101 SHIP-TO NUMBER REQUIRED
    78.10.1.2. If the authorized for ship-to flag="N" and
    the authorized for bill-to flag="N" and
    the authorized for sold-to flag="N"
    set exception for CSR:

MESSAGE #G78105 SHIP-TO NUMBER HAS BEEN DELETED
    78.10.1.3. If the authorized for ship-to flag=N, then set exception for CSR:

MESSAGE #G78106 SHIP-TO NUMBER HAS BEEN TRANSFERRED 78.10.2. SOLD-TO Customer Number
    78.10.2.1. If the SOLD-TO number is BLANK, set exception for CSR:

MESSAGE #G78102 SOLD-TO NUMBER REQUIRED
    78.10.2.2. If the authorized for ship-to flag="N" and
    the authorized for bill-to flag="N" and
    the authorized for sold-to flag="N"
    set exception for CSR:

MESSAGE #G78107 SOLD-TO NUMBER HAS BEEN DELETED
    78.10.2.3. If the authorized for ship-to flag=N, then set exception for CSR:

MESSAGE #G78108 SOLD-TO NUMBER HAS BEEN TRANSFERRED 78.10.3 BILL-TO NUMBER
    78.10.3.1. If the BILL-TO number is BLANK, set exception for CSR:

MESSAGE #G78103 BILL-TO NUMBER REQUIRED
    78.10.3.2. If the authorized for ship-to flag="N" and
    the authorized for bill-to flag="N" and
    the authorized for sold-to flag="N"
    set exception for CSR:

MESSAGE #G78109 BILL-TO NUMBER HAS BEEN DELETED
    78.10.3.3. If the authorized for BILL-to flag=N, then set exception for CSR:

MESSAGE #G78110 BILL-TO NUMBER HAS BEEN TRANSFERRED 78.12 SALES REP EMPLOYEE NUMBER
  78.12.1. The order entry system 10 will check to make sure there is at least one valid Sales Employee Number on the Proposal. If not, return the proposal to the Sales Rep before it can become an order.

MESSAGE #G78822 SLS REP EMPLOYEE NUMBER 78.13 SIZE
  78.13.1. The order entry system 10 will check to make sure that a form size (width and length) has been entered.

NOTE: If there is an F3 file, the size will be obtained from the F3.
  If not, return the proposal to the Sales Rep before it can be routed.

MESSAGE #G78842 FORM SIZE REQUIRED 78.14 ACCOUNT CODE
  78.14.1 If the Parent Number for the SHIP-TO number is: 830370, there must be an entry (9-digit) in Account Code field. If not, exception to CSR:

MESSAGE #78144 ACCOUNT CODE REQUIRED 78.15 CREDIT CHECK
  78.15.1. The order entry system 10 will check the CUSTOMER ADDRESS file to see if there is an indicator in the STATUS field. If not, skip this rule.
  78.15.2 If the STATUS=A or B, set exception for Customer Accounting

MESSAGE #G78153 CREDIT CHECK REQUIRED FOR CUSTOMER 78.16 CONTRACT PRICING
  78.16.1. If the CSR has entered a Contract Number (O/E) the order entry system 10 will check the CADD—Sold-to Number to see if there is a contract number in the field, and that the contract number matches the contract number that was entered.
  78.16.2. If there is no contract number in file, set exception for CSR:

MESSAGE #G78162 NO CONTRACT IN FILE FOR THIS CUSTOMER
  78.16.3. If there is a contract number in file, but it does not match the contract number entered by the CSR, set exception for the CSR:

MESSAGE #G78163 INVALID CONTRACT NUMBER 78.17 DIFFERENTIAL
  78.17.1. This rule is to be run only at PLACE ORDER Time, and after Pricing has been completed.

78.17.2. If there is not a LIST PRICE and a SELL PRICE on the order, do not process this rule.
78.17.3. For all products except Stanfast
78.17.3.1. If the total List Price is equal to or greater than $5,000, and the differential is equal to or greater than 25%, set exception for the DSM:
MESSAGE #G78173 OFF LIST APPROVAL REQUIRED
78.17.3.2. If the total List Price is equal to or greater than $5,000, and the differential is equal to or greater than 40%, set exception for the GSM:
MESSAGE #G78174 OFF LIST APPROVAL REQUIRED
78.17.4. For StanFast Products (SHEETS, ENVELOPES, SETS)
78.17.4 If the total list price is equal to or greater than $1,000, and the differential is equal to or greater than 30%, set exception for the GSM:
MESSAGE #G78174 OFF LIST APPROVAL REQUIRED Coded Invoice Instructions. The functionality of this rule may be illustrated as follows:

80. CODED INVOICE INSTRUCTIONS
80.1. This rule will be processed only when PLACE ORDER is selected.
80.2. If any of the following CODED INVOICE INSTRUCTIONS have been selected, the order entry system 10 will assure that the corresponding UNIT OF MEASURE has also been selected for the order.
80.3. For each Invoice Instruction, the order may have any one of the associated FEATURE LIST elements.

| INVOICE INSTRUCTION | FEATURE LIST |
|---|---|
| Per Carton | Standard, Laser Pack, Special |

80.3.1. If not true, set exception for CSR:
MESSAGE #G80310 CARTON PACKAGING REQUIRED FOR INVOICING
Per each (no requirement)
Per Inner Carton Inner Carton
80.3.2. If not true, set exception for CSR:
MESSAGE #G80320 INNER CARTON PACKAGING REQUIRED FOR INVOICING
Per Package Polywrap, Kraft Wrap, Mailable Carton, Banding
80.3.3. If not true, set exception for CSR:
MESSAGE #G80330 PACKAGING TYPE REQUIRED FOR INVOICING
Per Pad/Book Padding, Stitching, Booking, Tape Binding, Comb Binding, Spiral Binding, Perfect Binding
80.3.4. If not true, set exception for CSR:
MESSAGE #G80340 BINDING TYPE REQUIRED FOR INVOICING
Per Roll Rolls
80.3.5. If not true, set exception for CSR:
MESSAGE #G80350 ROLL PACKAGING REQUIRED FOR INVOICING.

Release Exclusions. The purpose of this rule is to detect any Product, Feature, or attribute that is not available in a specific order entry system software release. The functionality of this rule may be illustrated as follows (any rules not expressly illustrated below have been described elsewhere in the specification):

81. RELEASE I EXCLUSIONS
81.01.1. If there is an exception for PAPER—Exception Message #G34001, the order entry system 10 will route the exception for paper.
81.01.2. If it determined that the order or quote is out of scope for Release I, no other routing will occur.
81.01.3 PRODUCTS
81.01.3.1 Only the following PRODUCTS and Manufacturing Processes are allowed in Release I: Custom Stanset, Limited Custom Stanset, Custom Zipset, Limited Custom Zipset, Continuous Singles, Limited Continuous Singles, Sheeted Singles, Limited Sheeted Singles, StanFast Sheets, StanFast Sets, StanFast Envelopes
81.01.3.2. If any other Product or Manufacturing Process is selected, set exception for the CSR:
MESSAGE #G81013 THIS ORDER MUST BE PRICED MANUALLY
81.01.3.3. Go to Home Plant Assignment, and discontinue any other Validation Rules.
81.01.4 Non-Priceable
81.01.4.1. If any FEATURE is marked "Non-Priceable", set exception for the CSR:
MESSAGE #G81014 THIS ORDER MUST BE PRICED MANUALLY
81.01.4.2. Go to Home Plant Assignment, and discontinue any other Validation Rules.
81.05.1. OCR
If the SWD Type=SCANNER, set exception for CSR:
MESSAGE #G81051 OCR ORDER NOT ALLOWED IN RELEASE I Invalid Combinations. The purpose of this rule is to detect invalid combinations of Feature Attributes that may not have been detected in the individual rules. The functionality of this rule may be illustrated as follows:

82. INVALID COMBINATIONS
82.0.1 CODED SPECIAL INSTRUCTIONS
82.0.1.1. If UNION BUG is selected, set exception for Mfg Hqtrs to assign Plant
MESSAGE #G82011 ASSIGN TO UNION PLANT
82.0.1.2. All Coded Special Instructions are not allowed on all Products/ Mfg Processes. Refer to the attached table to verify the availability of Coded Instructions by Product. An X indicates that the Instruction is not allowed.
82.0.1.3. If any Coded Special Instruction is selected and not allowed, set exception for the CSR:
MESSAGE #G82013 (Selected Instruction) NOT AVAILABLE FOR: (Product/Mfg Process)
82.21. PRESS PERFS
82.21.1. DIAGONAL
Diagonal Perf may not have attributes: Full, Split, Partial, Fold, Hit-skip, Horizontal, Vertical
If any of the above are present, set exception for CSR:
MESSAGE: G82211 DIAGONAL PERF MAY NOT HAVE (attribute)
82.41. CARBON
82.41.1. HOTSPOT
If the selected carbon is HOTSPOT, it must have KS holes on at least one side. If not, set exception for CSR:
MESSAGE: G82411 HOTSPOT CARBON MUST HAVE KS HOLES ON AT LEAST ONE SIDE.

82.41.2. FEATHEREDGE
82.41.2.1. If FEATHEREDGE has been selected, the carbon may not be narrow. If it is, set exception for the CSR:
MESSAGE: G82412 FEATHEREDGE CARBON MAY NOT BE NARROW
82.41.2.2. If the Carbon is narrow, FEATHEREDGE may not be selected. If it is, set exception for the CSR:
MESSAGE: G82413 NARROW CARBON MAY NOT HAVE FEATHEREDGE
Grouping. The functionality of this rule may be illustrated as follows:
83. GROUPING
83.1. If the CSR has selected GROUPING, the order entry system 10 will check the file: GROUPING to see if this order is for a legitimate group.
83.1.1. The following fields on the Order must match any one row in the GROUPING TABLE: Product Type, Market, Width, Length
83.1.2. If all of the fields on the order do not match one row in the table, set exception for CSR:
MESSAGE #P83120 ORDER NOT ELIGIBLE FOR GROUPING
83.1.3. Skip the balance of this rule.
83.2.1. Compare today's date with the IN-BY DATE in the GROUPING TABLE. Use the first instance where the current date is equal to or earlier than the IN-BY DATE.
83.2.3. If there is a "date desired" on the order, and it does not correspond with the OUT-BY date, set exception for the CSR:
MESSAGE #P83230 GROUPING CANNOT MEET THE DESIRED DATE
83.2.3. If today's date is equal to or earlier that an IN-BY DATE, add comment to the order:
MESSAGE #C83210 GROUPED ORDER - SHIP BY (OUT-BY DATE)
83.2.4. If today's date is later than the last IN-BY DATE in the GROUP TABLE, set exception for MFG HQTRS:
MESSAGE #P83240 UPDATE GROUP TABLE: IN-BY, OUT-BY Specific Product Validation Rules After the general validation rules have been checked, the order entry system 10 processes validation rules for the specific product to be ordered. For the purposes of describing and defining the present invention, it should be understood that a form or product comprises any of a variety of printed products, including, but not limited to those identified herein. For example, the order entry system 10 is programmed to process specific validation rules corresponding to the following products:

Stanset (continuous form product having narrow unprocessed carbons)
Limited Stanset (continuous form embodying characteristics falling within a limited selection of papers, inks, and other features)
Limited Stanset with MICR ink Zipset (individual form sheets bound together by paste or glue at a stub that fastens the form sheets together into a complete unit)
Limited Zipset (characteristics fall within a limited selection of papers, inks, and other features)
Continuous Singles (continuous sheets that are processed on pin-fed printers)
Limited Continuous Singles
Limited Continuous Singles with MICR ink
Sheeted Singles (continuous single ply forms that can be made with special xerographic bond or plain paper)
Limited Sheeted Singles
Stanfast® (cut sheet products, flat forms, cut forms, or singles with no stub, marginal punching, or perforated edges)
Stanfast® Sets
Stanfast® Envelopes (non-continuous envelopes with logos, names, addresses imprinted thereon)

A detailed description of the specific rules applied to each product follows.

Stanset Validation Rules

The following rules are processed for Stanset products: Check Collator/Secondary Operations, Punches, Affix Label, KS Removal, Check Consecutive Numbers, Check Press Perfs, Check Press Punches, Press Delivery, Home Plant Assignment, and Calcite Sets/Ctn. The functionality of each of these rules may be illustrated as follows (any rules not expressly illustrated below have been described elsewhere in the specification):

7. Check Collator/Secondary Operations.
7.1. FASTENING NAME—PLY
7.1.1. The order entry system 10 will compare the Proposal with the file: FASTENING to determine the type of fastening is available for the Proposal PLY. If not, set flag for review by the Plant.
MESSAGE #P07111 FASTENING NOT AVAILABLE
7.1.2. Update ORDER SPECS: FASTENING NAME
7.2. FASTENING LOCATION
7.2.1. The order entry system 10 will compare the Proposal with the file: FASTENING-NAME to determine if the location of the Fastening is available.
7.2.2. If the location is available, update ORDER SPECS: FASTENING LOCATION
7.2.2.1. If the location is not available for the FASTENING-NAME, set flag for review by the Plant.
MESSAGE #P07222 GLUE LOCATION EXCEEDS SPECS
7.3. CARBON
7.3.1. If there is no carbon on the Proposal, skip Rule 7.3.
7.3.2. The order entry system 10 will check the file: FASTENING SPECS-NAME for the following edits:
7.3.2.1. Each carbon—other than HOTSPOT—must be narrow on the glued side (GLUE LOCATION) by NARGLUE. If not, set flag for review by the Plant.
MESSAGE #P07129 NARROW ON GLUED SIDE
7.3.2.2. The width of each carbon must be at least ¾" narrower than the form above it. If not, set flag for review by the Plant.
MESSAGE #P07322 NARROW OPPOSITE SIDE
7.3.2.3. The width of each carbon must be equal to or greater than MINCBN. If not, set flag for review by the Plant.
MESSAGE #P07323 CARBON WIDTH
1. If the Carbon is HOTSPOT, it must have KS holes on the on the glued side. If not, set flag for review by the Plant.

MESSAGE #P07330 CBN MUST HAVE HOLES ON GLUED SIDE 7.4. PAPER
- 7.4.1. The order entry system 10 will check the file: GLUE SPECS-NAME for the following edits:
  - 7.4.1.2. The basis weight for the top paper (Ply #1) must be equal to or greater than MINTOP. If not, set flag for review by the Plant.

MESSAGE #P07412 PAPER WEIGHT EXCEEDS SPECS
- 7.4.1.4. If there are KS holes on only one side, the minimum Form Width must be equal to or greater than MINNARROW. If not, set flag for review by the Plant.

MESSAGE #P07414 FORM WIDTH EXCEEDS SPECS
- 7.4.1.6. The minimum width for at least one part must be equal to or greater than MINWIDTH. If not, set flag for review by the Plant.

MESSAGE #P07414 FORM WIDTH EXCEEDS SPECS
- 7.4.1.7. If the width of any part is less than the width of the widest part in the set, the narrow part must have KS Holes on at least one side. If not, set flag for review by the Plant.

MESSAGE #P07417 NO KS HOLES ON NARROW PLY 7.5 PLY
- 7.5.1. The order entry system 10 will check the file: GLUE SPECS-NAME for the following edits:
  - 7.5.1.1. If there is one or more HOTSPOT carbons, each HOTSPOT carbon is counted as a PLY in determining the PLY
  - 7.5.1.2. The PLY must be equal to or less than MAXPLY. If not, set flag for review by the Plant.

MESSAGE #P07512 PLY EXCEEDS SPECS.
- 7.5.1.3. If the last paper in the set=DRYGUM, and it is glued, set flag for review by the Plant.

MESSAGE #P07513 SLIP SHEET REQUIRED?
- 7.5.2. Update ORDER SPECS: PLY 7.7. PERFORATIONS
- 7.7.1. If there are horizontal perforations through all parts and carbons, use the following edits. If the horizontal perforations are for individual plies, see Rule #21 PRESS PERFS.
  - 7.7.1.1. If the distance between the horizontal perfs is a multiple of the form length, update ORDER SPECS-COLLATING-H-PERF=1 (one perf unit.)
  - 7.7.1.2. If the distance between the horizontal perfs is not an even multiple of the form length, set exception for the plant.

MESSAGE #P07712 HORIZ. PERF LOCATION
- 7.7.2. LETTEREDGE
  - 7.7.2.1. If the perf type is LETTEREDGE, and If the PLY is greater than 3, set flag for review by Engineering.

MESSAGE #P07864 APPROVE LETTEREDGE PERFS.
- 7.7.2.2. If the total Basis Weight (sum of all papers) of the set is greater than 50#, set flag for review by Engineering.

MESSAGE #P07864 APPROVE LETTEREDGE PERFS.

7.8 For this product, all parts must be glued or crimped. If not, set flag for review by the Plant.

MESSAGE #P07001 LOOSE PARTS IN SET 7.9. Go to the appropriate rule, depending on the FASTENING—NAME:
TEMPORARY go to Rule: 7.21
PERMANENT go to Rule: 7.31
FLEXIFAST go to Rule: 7.41
ZIPOUT go to Rule: 7.51

7.21. TEMPORARY FASTENING
- 7.21.1. The order entry system 10 will check to see that the type of TEMPORARY FASTENING is available for this product.
- 7.21.2. Go to the appropriate Rule, depending on the TEMPORARY FASTENING NAME:
STANDARD go to Rule: 7.22
SPECIAL go to Rule: 7.23
ZIPLINE go to Rule: 7.24
OTHER Set flag for review by the Plant.

MESSAGE #P07212 OTHER TEMPORARY FASTENING
Skip the balance of Rule 7.22. TEMPORARY FASTENING—STANDARD
- 7.22.1. The order entry system 10 will check the number of prongs and the crimp location. If any of the following are not true, change the STANDARD to SPECIAL and go to Rule: 7.23.
- 7.22.2. Must be 4 prongs
- 7.22.3. If the FORM LENGTH=4¼" or 8½" the crimps must be spaced: 3"–2½"–3", in repetitive cycles.
- 7.22.4. All other lengths: crimps must be spaced at 3"
- 7.22.5. The MARGIN must be equal to or greater than GLUE SPECS—NAME—MARGIN
- 7.22.6. Update ORDER SPECS: FASTENING—SCRIMP-STANDARD
- 7.22.7. Skip balance of Rule 7.

7.23. TEMPORARY FASTENING—SPECIAL
- 7.23.1. The location of Crimps and the number of Crimps/Folded Length will be selected from a table provided to Data Entry.
- 7.23.2. If OTHER is selected—configuration not on table—set flag for review by the Plant.

MESSAGE #P07232 SPECIAL FASTENING
- 7.23.3. If there is Carbon in the Set, the MARGIN must be equal to or greater than GLUE SPECS—NAME—MARGIN. If not, set exception for the Plant:

MESSAGE #P07233 MARGIN TOO NARROW
- 7.23.3.1. If there is not carbon in the set, the MARGIN must be at least ⅜" wide. If not, set exception for the Plant.

MESSAGE #P07233 MARGIN TOO NARROW
- 7.23.4. Update ORDER SPECS: FASTENING—SCRIMP-SPECIAL
- 7.23.5. Skip balance of Rule 7.

7.24 TEMPORARY FASTENING—ZIPLINE
- 7.24.1. The order entry system 10 will check each of the following edits. If any are not true, set flag for review by the Plant.
  - 7.24.1.1. Each carbon must be glued to the back of the preceding copy.
  - 7.24.1.2. The glue line must be ⅝" from the left side of the form.
  - 7.24.1.3. The carbon must be at least ¹¹⁄₃₂" but no more than ½" narrow on the glued side.
  - 7.24.1.4. The order entry system 10 will compare each paper with the File: ZIPLINE PAPERS to see if the papers are available for this feature. If not, set flag for review by the Plant.

MESSAGE #P07241 APPROVE ZIPLINE PAPER
  7.24.1.5. If any paper in the set is CARBONLESS, then cannot have Zipline Glue. Set flag an return order to Sales Rep.
MESSAGE #P07002 CANNOT HAVE CBNLESS WITH ZIPLINE
  7.24.2. The Proposal must have Crimping. After the above Rules are completed, go to Rule 7.22.
7.31. PERMANENT FASTENING
  7.31.1. The order entry system 10 will check to see that the type of PERMANENT FASTENING is available for this product.
  7.31.2. Go to the appropriate Rule, depending on the PERMANENT FASTENING NAME:
    ONE SIDE Copies and Carbons glued one side. Go to Rule:7.32.
    BOTH SIDES Copies and/or Carbons glued both sides. Go to Rule 7.36.
    Y WIRED Go to Rule 7.37.
7.32. ONE SIDE
  7.32.1. The order entry system 10 will check to see if this type of fastening is available for the product. If not, set flag for review by the Plant.
MESSAGE #P07321 FASTENING NOT AVAILABLE
  7.32.2. The width of the Stub must be at least as wide as: GLUE SPECS—NAME—MINSTUB. If not, set flag for review by the Plant.
MESSAGE #P07322 GLUE: MINIMUM STUB
  7.32.3. The total set weight (all copies and carbons) must be equal to or less than GLUE SPECS—MAXSET. If not, set flag for review by the Plant.
MESSAGE #P07327 GLUE: MAX SET WEIGHT
  7.32.6. All copies and their respective carbons must be glued on the same side. If not, a Construction Diagram is required. Set exception to CSR:
MESSAGE: #P07326 CONSTRUCTION DIAGRAM REQUIRED.
7.36. BOTH SIDES
SAME AS 7.32.1 thru 7.32.3.
  7.36.8. Carbons may not be glued on both sides. If not, set flag for review by the Plant
MESSAGE #P07368 CARBON GLUED BOTH SIDES
7.37. Y WIRED
  7.37.1. Set flag for review by the Plant.
MESSAGE #P07371 Y-WIRE CONSTRUCTION
7.41. FLEXIFAST
  7.41.6. If the PLY is 3 or greater, the last two copies must be glued together. If not, set flag for review by the Plant.
MESSAGE #P07416 FLEXIFAST CONSTRUCTION
  7.41.7. All Carbons must be 7# or 8# Basis weight. If not, set flag for review by the Plant.
MESSAGE #P07416 FLEXIFAST CONSTRUCTION
  7.41.8 If there are HOT SPOT carbons, the number of HOT SPOT Carbons must be added to the number of copies in determining the maximum number of plies allowed. If not, set flag for review by the Plant.
MESSAGE #P07416 FLEXIFAST CONSTRUCTION
7.51 ZIPOUT
  7.51.1. If ZIPOUT is selected, a Construction Diagram is required. Update ORDER SPECS: Construction Diagram Required.
9. Punches. The order entry system 10 will check the proposal to see if there are any punches. The following edits are to be used only if the punches are through all parts and carbons. If there are no punches, or if any punches are not through all parts and carbons, skip this rule (see below: PRESS PUNCHES).
  9.1. The order entry system 10 will compare the TYPE of punches on the PROPOSAL with the Data File: PUNCHES—TYPE
    9.1.1. For acceptable values SEE: PUNCHES—PRODUCT—TYPE—COLLATOR (06-28-1)
    9.1.2. If found, update ORDER SPECS—COLLATING—PUNCH-1=X (One punch unit required). If not found, set flag for review by the plant.
MESSAGE #P09120 PUNCH TYPE NOT AVAIL
  9.2 The order entry system 10 will compare the SIZE of punches on the PROPOSAL with the Data File: PUNCHES—SIZE
    9.2.1. For acceptable values SEE: PUNCHES—PRODUCT—SIZE—COLLATOR (06-28-1)
    9.2.2. If found, update ORDER SPECS—COLLATING—PUNCH-1=X (One punch unit required). If not found set flag for review by the Plant.
MESSAGE #P09922 PUNCH SIZE NOT AVAIL
  9.3. If there is more than one punch, and they are not in the same horizontal plane then the distance between the first and second horizontal planes must be equal to ½ FOLD LENGTH. If not, set flag for review by the Plant.
MESSAGE #P09300 PUNCHES—HORIZONTAL LOCATION
  9.4. If there is more than one punch, and they are not in the same vertical plane, then each vertical plane must be at least PUNCHES—CCVERT apart. If not, update ORDER SPECS—COLLATING—PUNCH-2=X (two punch units required.)
10. Affix Label.
  10.1. The order entry system 10 will check the Proposal to see if AFFIX LABEL is indicated. If not, skip Rule #10.
  10.2. The following must be available:
    10.2.1. A window on the form F3 file indicating "AFFIX LABEL". This window is to show the size and location of the label.
      10.2.1.1. If there is more than one AFFIXED LABEL on a copy, all the "WINDOWS" must be indicated on the F3 file.
    10.2.2. A separate F3 file showing the label itself, with the appropriate text if applicable.
      10.2.2.1. If there is more than one AFFIXED LABEL, and they are not the same, a separate F3 file must be available for each LABEL.
    10.2.3. Form #6347—AFFIX LABEL SPEC SHEET. If any of the above is not available, set flag for review by the Sales Rep.
MESSAGE #843 SPECS FOR AFFIXED LABEL
  10.3. The order entry system 10 will compare the label specifications on the proposal with the specifications in the Data File: LABEL AFFIX.
    10.3.1. Select LABEL AFFIX ID: LAB001
      10.3.1.1. If the label is circular, skip to rule #10.3.7.
    10.3.2. If the width of the label is less than MINWIDTH, set flag for review by the Plant
MESSAGE #VL195 AFFIX LABEL—WIDTH
    10.3.3. If the width of the label is greater than MAXWIDTH, set flag for review by the Plant MESSAGE #VL195 AFFIX LABEL—WIDTH
   10.3.4. If the depth of the label is less than MINDEPTH, set flag for review by the Plant
MESSAGE #VL196 AFFIX LABEL—DEPTH
   10.3.5. If the depth of the label is greater than MAXDEPTH, set flag for review by the Plant
MESSAGE #VL196 AFFIX LABEL—DEPTH
   10.3.6. If the ration of width to length is greater than RATIO, set flag for review by the Plant.
MESSAGE #VL198 AFFIX LABEL—RATIO
   10.3.6.1. Skip Rule #10.3.7. and 10.3.8.
   10.3.7. If the label diameter is less than MINDIAM, set flag for review by the Plant.
MESSAGE #VL197 AFFIX LABEL—DIAMETER
   10.3.8. If the label diameter is greater than MAXDIAM, set flag for review by the Plant.
MESSAGE #VL197 AFFIX LABEL—DIAMETER
   10.3.9. If the edge of the label is less than MINEDGE from the edge of the form, set flag for review by the Plant.
MESSAGE #VL199 AFFIX LABEL—LOCATION
   10.3.10. If the edge of the label is less than MINPERF from any perforation on the form, set flag for review by the Plant.
MESSAGE #VL199 AFFIX LABEL—LOCATION
   10.3.11. If the edge of the label is less than MINPERF from any file hole on the form, set flag for review by the Plant.
MESSAGE #VL199 AFFIX LABEL—LOCATION
   10.3.12. If the edge of the label is less than MINSEPAR from any other label on the form, set flag for review by the Plant.
MESSAGE #VL199 AFFIX LABEL—LOCATION
   10.3.13. If the basis weight of the form to which the label is affixed is less than MINWGT, set flag for review by the Plant.
MESSAGE #VL200 AFFIX LABEL—PAPER WGT
   10.3.14. If the form width (not the label) is less than MINFORMWID, set flag for review by the Plant.
MESSAGE #VL201 AFFIX LABEL—FORM WIDTH
   10.3.15. If the fonn width (not the label) is greater than MAXFORMWID, set flag for review by the Plant.
MESSAGE #VL201 AFFIX LABEL—FORM WIDTH
   10.3.16. If the form length (not the label) is less than MINFORMLEN, set flag for review by the Plant.
MESSAGE #VL202 AFFIX LABEL—FORM LENGTH
   10.3.17. If the form length (not the label) is greater than the MAXFORMLEN, set flag for review by the Plant.
MESSAGE #VL202 AFFIX LABEL—FORM LENGTH
   10.3.18. If the fold length for the form (not the label) is less than MINFLDLEN, set flag for review by the Plant.
MESSAGE #VL203 AFFIX LABEL—FOLD LENGTH
10.4. Update ORDER SPECS—SECOPS—AFFIX=X
10.5. The order entry system 10 will cross reference the Proposal for the Forms with the Proposal for the Labels.
   10.5.1. Update ORDER SPECS—AFFIX LABEL REF (reference code or name.)
19. KS Removal
   19.1. The order entry system 10 will check the Proposal for KS REMOVAL feature. If this feature is not on the Proposal, skip rule 19.
   19.2. The order entry system 10 will compare the TOTAL BASIS WEIGHT of all papers and carbons on the Proposal with the Data File: KS REMOVAL—MAXSET. If the total set weight is greater than MAXSET, set flag for review by the Plant.
MESSAGE #P19200 SET WGT. EXCEEDS KS—REMOVAL
   19.3. The order entry system 10 will compare the location of the KS REMOVAL stub on the Proposal with the Data File: KS REMOVAL—MINSTUB. If the KS REMOVAL stub is less than MINSUB, set a flag for review by the Plant.
MESSAGE #P19300 APPROVE KS REMOVAL
   19.4. If the Proposal is marked for KS REMOVAL on both sides, the order entry system 10 will set a flag for review by the Plant.
MESSAGE #P19400 KS—REMOVAL: BOTH SIDES
   19.5. Update Order Specs: SECONDARY OPS: KS—REMOVAL
20. Check Consecutive Numbers
   20.1. The order entry system 10 will check the Proposal to see if there are consecutive numbers. If there are no consecutive numbers, skip rule 20.
   20.2. If there are consecutive numbers, check the Proposal to see if the Consecutive Numbers are marked:
   PRESS See rule: 20.3
   COPYSAFE See rule: 20.4
PRESS NUMBERS
   20.3. Check the file: CONSNOS to see if the flag: PRESS is on for:
     20.3.1 NAME If PRESS not on, set flag for review by the Plant
   MESSAGE #P20410 PRESS NOS NOT AVAILABLE
   For the following edits, check only those elements in the CONSENOS file that have PRESS turned on.
     20.3.2. FRMLEN If the form length is not available for the selected NAME, set flag for review by the Plant.
   MESSAGE #P20146 PRESS NOS-FORM LENGTH
     20.3.3. TYPE FACE If the TYPE FACE is not available for the selected NAME, set flag for review by the plant.
   MESSAGE # P20147 PRESS NOS—TYPE FACE
     20.3.4. NUMBER OF CHARACTERS
     The order entry system 10 will use the Proposal Quantity to determine the minimum number of digits required in the Consecutive Number.
     The number of digits in the consecutive number must be =<MAX CHAR. If not, set flag for review by the plant.
   MESSAGE #P20148 TOO MANY DIGITS IN CONSEC NOS
     20.3.5. NAME SIZE If the NAME SIZE is not available for the selected NAME, set flag for review by the plant.
   MESSAGE #P20149 PRESS NOS—SIZE
     The order entry system 10 will check the Proposal to see how many consecutive numbers are on one form:
     than One Number See Rule 20.3.5.1
     Two Numbers See Rule 20.3.5.2.
     More two See Rule 20.3.5.3.
     20.3.5.1. ONE NUMBER PER FORM
        20.3.5.1.1. The orientation of the number (Regular, Right Angle, etc. will be part of the NAME, and does not have to be validated.
        20.3.5.1.2. The order entry system 10 will check the location of the Consecutive Number:

Distance from the top of the form must be =<MINTOP

Distance from the left edge must be =<MINLEFT.

Distance from the right edge must be =<MINRIGHT.

If ALL of above are true, ORDER SPECS—PRESS—NUMBERS=1 and ORDER SPECS—PRESS FEATURES=NUMBERS—TYPE If not, set flag for review by the Plant:

MESSAGE #P20150 LOCATION OF CONS. NOS 20.3.5.2. TWO NUMBERS PER FORM

Validate all of above, and 20.3.5.2.1. The order entry system 10 will check the distance between the Consecutive numbers:

HORIZONTAL SEPARATION=0, or >MINHORIZ ORDER SPECS—PRESS—NUMBERS=1 Unit

HORIZONTAL SEPARATION>0 AND <MINHORIZ ORDER SPECS—PRESS—NUMBERS=2 Units

VERTICAL-SEPARATION=0, or >MINVERT, ORDER SPECS—PRESS—NUMBERS=1 Unit

VERTICAL-SEPARATION>0 and <MINVERT, ORDER SPECS—PRESS—NUMBERS=2 Units 20.3.5.2.2. If the PROPOSAL has more than one TYPE, ORDER SPECS—PRESS—NUMBERS=2 Units 20.3.5.2.3. If the PROPOSAL has more than one size, ORDER SPECS—PRESS—NUMBERS=2 Units 20.3.5.2.4. If the PROPOSAL has more than one NUMBERING INK, ORDER SPECS—PRESS—NUMBERS=2 Units 20.3.5.2.5. If the PROPOSAL has more than one starting CONSEC NUMBERS on any ply, set flag for review by the Plant.

MESSAGE #P20151 MORE THAN ONE STARTING NUMBER 20.3.5.2.6. If any of the above edits cause 2 UNITS, set flag for review by the Plant.

MESSAGE #P20157 TWO NUMBER UNITS REQUIRED 20.3.5.3. MORE THAN TWO NUMBERS/FORM

If the PROPOSAL has more than two consecutive numbers on any ply, Set flag for review by the Plant

MESSAGE #P20152 MORE THAN 2 CONSEC. NUMBERS

COPYSAFE NUMBERS 20.4. Check the ply on the Proposal. If the ply is >6 set flag for the Sales Rep:

MESSAGE #P20828 MAXIMUM 6 PLY FOR COPYSAFE NUMBERS 20.4.0. Check the file: CONSNOS to see if the flag: COLLATOR is on for:

20.4.1. NAME If COLLATOR is not on, set flag for review by the Plant.

MESSAGE #P20153 COPYSAFE NOS NOT AVAILABLE

For the following edits, check only those elements in the CONSNOS file that have COLLATOR turned on.

20.4.2. FRMLEN If the form length is not available for the selected NAME, set flag for review by the Plant.

MESSAGE #P20154 COPYSAFE NOS—FORM LENGTH 20.4.3. TYPE FACT If the TYPE FACE is not available for the selected NAME, set flag for review by the Plant.

MESSAGE #P20155 COPYSAFE NOS—TYPE FACE 20.4.4. NUMBER OF CHARACTERS

The order entry system 10 will use the Proposal Quantity to determine the minimum number of digits required in the Consecutive Number.

The number of digits in the consecutive number must be =<MAXCHAR. If not, set flag for review by the Plant.

MESSAGE #P20148 TOO MANY DIGITS IN CONSEC NOS 20.4.4.1. The number of digits in the consecutive number must be at least 5. If not, set flag for review by the Sales Rep:

MESSAGE #P20829 MINIMUM 5 DIGITS IN COPYSAFE NUMBERS 20.4.5. NAME SIZE If the NAME SIZE is not available for the selected name, set flag for review by the plant.

MESSAGE #P20156 COPYSAFE NOS—SIZE

The order entry system 10 will check the Proposal to see how many consecutive number are on one form:

One Number See Rule: 20.4.5.1.

Two Numbers See Rule: 20.4.5.2.

More than two See Rule: 20.4.5.3.

20.4.5.1. ONE NUMBER PER FORM 20.4.5.1.1. The orientation of the number (Regular, Right Angle, etc. will be part of the NAME, and does not have to be validated.

20.4.5.1.2. The order entry system 10 will check the location of the Consecutive Number:

Distance from the top of the form must be =<MINTOP

Distance from the left edge must be =<MINLEFT.

Distance from the right edge must be =<MINRIGHT.

If ALL of above are true, ORDER SPECS—COLLATOR—NUMBERS=1 and ORDER SPECS—COLLATOR FEATURES=NUMBERS—TYPE If not, set flag for review by the Plant:

MESSAGE #P20150 LOCATION OF CONS. NOS 20.4.5.2. TWO NUMBERS PER FORM

Validate all of above, and 20.4.5.2.1. The order entry system 10 will check the distance between the Consecutive numbers:

HORIZONTAL SEPARATION=0, or >MINHORIZ ORDER SPECS—COLLATOR—NUMBERS=1 Unit

HORIZONTAL SEPARATION>0 AND <MINHORIZ ORDER SPECS—COLLATOR—NUMBERS=2 Units VERTICAL-SEPARATION=0, or >MINVERT, ORDER SPECS—COLLATOR—NUMBERS=1 Unit VERTICAL-SEPARATION>0 and <MINVERT, ORDER SPECS—COLLATOR—NUMBERS=2 Units 20.4.5.2.2. If the PROPOSAL has more than one TYPE, ORDER SPECS—COLLATOR—NUMBERS=2 Units 20.4.5.2.4. If the PROPOSAL has more than one size, ORDER SPECS—COLLATOR—NUMBERS=2 Units 20.4.5.2.4. If the PROPOSAL has more than one NUMBERING INK, ORDER SPECS—COLLATOR—NUMBERS=2 Units 20.4.5.2.5. If the PROPOSAL has more than one starting CONSEC NUMBERS on any ply, set flag for review by the Plant.

MESSAGE #P20151 MORE THAN ONE STARTING NUMBER 20.4.5.2.6. If any of the above edits cause 2 UNITS, set flag for review by the Plant.

MESSAGE #P20157 TWO NUMBER UNITS REQUIRED 20.4.5.4. MORE THAN TWO NUMBERS/FORM If the PROPOSAL has more than two consecutive numbers on any ply, Set flag for review by the Plant

MESSAGE #P20152 MORE THAN 2 CONSEC. NUMBERS

MICR NUMBERS 20.5. If there are MICR NUMBERS (Repetitive and/or Consecutive) see Rule #49.

MOD CHECK DIGIT 20.6. Data entry will request if the Consecutive Numbers have a Check Digit.

20.6.1. The there is no check digit, skip rule #20.6.

20.6.2. If there is a check digit, Data Entry will request the following:

20.6.2.1. Identification of the Modulous System (Data Entry will display a list of the MOD Check Digits that are available)

20.6.2.2. Data Entry will request: "Is this form an exact reorder of the previous order, and the MOD Check Digit calculation the same as the previous order?

20.6.2.2.1. If the response is YES, skip the balance of rule 20.6.

20.6.2.2.2. If the response is NO, continue to the next edit 20.6.2.3.

20.6.2.3. Data Entry will request a sample calculation. This will be a free-form field with sufficient room to show the calculations.

20.6.2.4. The sample calculation must be printed as part of the ORDER FORM at the plant.

21. Check Press Perfs. The functionality of this rule is discussed above in the description of the general validation rules.

22. Check Press Punches. The functionality of this rule is discussed above in the description of the general validation rules.

31. Press Delivery.

31.1. Update ORDER SPECS: PRESS DELIVERY= ROLLS

50. Home Plant Assignment. The functionality of this rule is discussed above in the description of the general validation rules 99. Calculate Sets/Ctn 99.1. Use the data file: PACK CHART to determine which column to use for selecting the Sets/Carton.)

99.2. Add up the caliper for each paper in the set.

99.2.1. If the caliper for any paper=0 (or blank), set flag and send message for review by Engineering.

MESSAGE #VL ENTER PAPER CALIPER 99.3. Add up the caliper for each carbon in the set.

99.3.1. If the caliper for any carbon=0 (or blank), set flag and send message for review by Engineering

MESSAGE #VL ENTER CARBON CALIPER 99.4 If the Proposal has any feature listed in the Data File: CALIPERS—SPECIAL, add the appropriate amount to the TOTAL CALIPER.

99.5. Select the QUANTITY/PACK from the Data File: PACK CALIPERS, using Column A.

99.6. If the Form Size (Width X Length) exceeds 185 sq. in., use 84% of the QUANTITY/PACK (10" PACK). Round the quantity to the nearest multiple of 10.

Limited Stanset Validation Rules (no MICR)

The following rules are processed for Limited Stanset products without MICR ink: 1. Check Form Length; 2. Check Form Width; 6. Quantity; 7. Collator/Secondary Operations; 10. Affix Label; 19. KS Removal; 20. Consecutive Numbers; 21. Check Press Perfs; 22. Check Press Punches; 31. Press Delivery; 34. Paper Specs; 41. Carbon; 47. Lockup; 55. Ink; and, 56. Non-Litho Printing. The respective functionalities of these rules may be described as follows (any rules not expressly illustrated below have been described elsewhere in the specification):

1. CHECK FORM LENGTH 1.1. Only the following LENGTHS (in inches) are available for this product: 3½, 3⅔, 4¼, 5½, 7, 8, 8½, 11.

If any other length is entered, set exception for CSR:

MESSAGE #P01001 LENGTH NOT AVAILABLE ON LIMITED

2. CHECK FORM WIDTH 2.1. Only the following WIDTHS (in inches) are available for this product: 8½, 9, 9½, 9⅞, 10⅝, 11¾, 12, 13⅝, 14⅞.

If any other width is entered, set exception for CSR:

MESSAGE #P02001 WIDTH NOT AVAILABLE ON LIMITED

6. QUANTITY 6.1. MAXIMUM QUANTITY 6.1.1. If the FORM LENGTH is less than 7", and the Quantity is greater than 500,000 set exception for CSR:

MESSAGE #P06110 QUANTITY EXCEEDS SPECS OVER 500,000 FOR LESS THAN 7" LENGTH 6.1.2. If the FORM LENGTH IS 7" or greater, and the Quantity is greater than 250,000, set exception for CSR:

MESSAGE #P06112 QUANTITY EXCEEDS SPECS OVER 250,000 FOR GREATER THAN 7" LENGTH 6.2. MINIMUM QUANTITY 6.2.1. If the FORM LENGTH is less than 7", the Minimum Quantity=the quantity of one carton, but not less than 5,000 forms. If false, set exception for CSR:

MESSAGE #P06210 MIN QUANTITY=(QTY/CTN) LESS THAN 5,000 FOR LESS THAN 7" LENGTH.

6.2.2. If the FORM LENGTH is 7" or greater, the Minimum Quantity=the quantity of one carton, but not less than 2,500 forms. If false, set exception for CSR:

MESSAGE #P06220 MIN QUANTITY=(QTY/CTN) LESS THAN 2,500 FOR GREATER THAN 7" LENGTH

7. CHECK COLLATOR/SECONDARY OPERATIONS
  7.1. FASTENING NAME—PLY
    7.1.1. The system will compare the Proposal with the file: FASTENING to determine the type of fastening is available for the Proposal PLY. If not, set flag for review by the Plant.
  MESSAGE #P07007 FASTENING NOT AVAIL FOR LIMITED
  7.2. FASTENING LOCATION
    7.2.1. Crimp is permitted through all copies and carbons. If any other requirement is specified, set exception for CSR:
  MESSAGE #P07008 CRIMP SPEC EXCEEDS LIMITED
    7.2.2. The Crimp may be located at: LEFT, RIGHT, or BOTH sides. If any other location is specified, set exception for CSR:
  MESSAGE #P07220 CRIMP SPEC EXCEEDS LIMITED
      7.2.2.1. If the location is available, update ORDER SPECS: FASTENING LOCATION
    7.2.3. Line glue is permitted on one side only—right or left. If any other location is specified, set exception for SCR:
  MESSAGE #P07230 GLUE ONE SIDE ONLY FOR LIMITED
      7.2.3.1. Up to two glue lines are available. One line must be less than ¼" from the edge of the paper; the other, if there is a second one, can only glue carbons to the preceding paper. If false, set exception for CSR:
  MESSAGE #P07231 GLUE LOCATION EXCEEDS SPECS
      7.2.3.2. If there is no carbon, the second glue line can glue two papers together. If any other construction is specified, set exception for CSR:
  MESSAGE #P07231 GLUE LOCATION EXCEEDS LIMITED
  7.3. CARBON
    7.3.1. The system will check the Data File: CARBON to see if the carbon is available for this product. If not, set exception for CSR:
  MESSAGE #P07311 CARBON NOT AVAIL FOR LIMITED
    7.3.2. Each carbon must be at least ¾" narrower than the preceding paper. If not, set exception for CSR:
  MESSAGE #P07320 CARBON SIZE NOT AVAIL FOR LIMITED
  7.4. PAPER
    7.4.1. The system will check the file: GLUE SPECS—NAME for the following edits:
      7.4.1.2. The basis weight for the top paper (Ply #1) must be equal to or greater than MINTOP. If not, set flag for review by the Plant.
  MESSAGE #P07132 PAPER WEIGHT EXCEEDS SPECS
      7.4.1.4. All papers must be the same width. If not, set exception for CSR:
  MESSAGE #P07013 NARROW COPIES NOT AVAIL FOR LIMITED
  7.5 PLY
      7.5.1.2. The maximum PLY allowed for this product =6. If not, set flag for review by the CSR.
  MESSAGE#P07015 PLY EXCEEDS SPECS
      7.5.2. Update ORDER SPECS: PLY
  7.6. LENGTHS
    7.6.1. The system will check the file: FRMLEN to see if the Length is available for this product. If not, set exception for CSR:
  MESSAGE #P07610 LENGTH NOT ALLOWED ON LIMITED
  7.7. PERFORATIONS
    7.7.1. If there are horizontal perforations through all parts and carbons, use the following edits. If the horizontal perforations are for individual plies, see Rule #21 PRESS PERFS.
      7.7.1.1. If the distance between the horizontal perfs is the same as one of the valid Form Lengths, and an even multiple of the form length, update ORDER SPECS–COLLATING–H-PERF=1 (one perf unit.)
      7.7.1.2. If the distance between the horizontal perfs is not the same as one of the valid Form Lengths, and an even multiple of the form length, set exception for CSR:
  MESSAGE P07713 HORIZ. PERF LOCATION NOT ALLOWED
    7.7.2. LETTEREDGE
      7.7.2.1. If the perf type is LETTEREDGE, and it is on any ply except the first ply in the set, set flag for review by CSR.
  MESSAGE #P07721 LETTEREDGE PERF NOT ALLOWED ON INTERNAL PLIES.
  7.8 For this product, all parts must be glued or crimped. If not, set flag for review by the Plant.
  MESSAGE #P07800 LOOSE PARTS NOT ALLOWED ON LIMITED
  7.9. Go to the appropriate rule, depending on the FASTENING-NAME:
    7.9.1 If the FASTENING TYPE=CRIMP, go to Rule: 7.21
    7.9.2. If the FASTENING TYPE=GLUE, go to Rule: 7.31
    7.9.3. If the FASTENING TYPE=anything else, set exception for CSR:
  MESSAGE #P07007 FASTENING NOT AVAIL FOR LIMITED
  7.21. CRIMP
    7.21.1. Only STANDARD Crimp is allowed:
    7.21.2. The default is 4 prongs. If anything else is specified, go to 7.23.
    7.21.3. If the FORM LENGTH=4¼" or 8½" the crimps must be spaced: 3"–2½"–3", in repetitive cycles. This is the default. Anything else is specified, go to 7.23.
    7.21.4. All other lengths: crimps must be spaced at 3". This is the default. Anything else is specified, go to 7.23.
    7.21.5. The MARGIN must be equal to or greater than GLUE SPECS—NAME—MARGIN. If not true, go to 7.23.
    7.21.6. Update ORDER SPECS: FASTENING—SCRIMP—STANDARD
    7.21.7. Skip balance of Rule 7.
  7.23 If any of the above are not true, set exception for CSR:
  MESSAGE: #P07235 CRIMP OUT OF SPEC FOR LIMITED 7.31. PERMANENT FASTENING
  7.31.1. If copies and carbons are glued at one side, go to rule 7.32.
  7.31.2. If copies and carbons are glued at both sides, set exception for CSR:
MESSAGE #P07312 GLUE ON BOTH SIDES NOT AVAIL. ON LIMITED
7.32. ONE SIDE
  7.32.1. The width of the Stub must be at least as wide as: GLUE SPECS—NAME—MINSTUB. If not, set flag for review by the Plant.
MESSAGE #P07324 STUB EXCEEDS MINIMUM
  7.32.2. The total set weight (all copies and carbons) must be equal to or less than GLUE SPECS—MAXSET. If not, set flag for review by the Plant.
MESSAGE #P07325 SET EXCEEDS MAX. FOR LIMITED
20. CONSECUTIVE NUMBERS
  20.1. The system will check the Proposal to see if there are consecutive numbers. If there are no consecutive numbers, skip edit 20.
  20.2. If there are consecutive numbers, check the Proposal to see if the Consecutive Numbers are marked:
    PRESS See rule: 20.3
    COPYSAFE See rule: 20.4
PRESS NUMBERS
  20.3. If the ply is 1, set exception for CSR:
MESSAGE #P20006 CHANGE PRODUCT TO LIMITED SINGLES
    20.3.1 If the ply is greater than 1, set exception for CSR:
MESSAGE #P20311 PRESS NUMBERS NOT AVAIL FOR LIMITED COPYSAFE NUMBERS
  20.4. Check the ply on the Proposal. If the ply is >6 set flag for the Sales Rep:
MESSAGE #P20828 MAXIMUM 6 PLY FOR COPYSAFE NUMBERS
    20.4.0. Check the file: CONSNOS to see if the flag: COLLATOR is on for:
    20.4.1. NAME If COLLATOR is notion, set flag for review by CSR
MESSAGE #P20145 CONSEC. NOS. NOT AVAILABLE FOR PROD.
For the following edits, check only those elements in the CONSNOS file that have COLLATOR turned on.
    20.4.2. FRMLEN If the form length is not available for the selected NAME, set exception for CSR
MESSAGE #P20421 CONSEC. NOS. NOT AVAILABLE FOR PROD.
    20.4.4. NUMBER OF CHARACTERS
    The system will use the Proposal Quantity to determine the minimum number of digits required in the Consecutive Number. The number of digits in the consecutive number must be =<MAXCHAR. If not, set exception for CSR
MESSAGE #P20442 CONSEC. NOS. NOT AVAILABLE FOR PRQD.
      20.4.4.1. The number of digits in the consecutive number must be at least 5. If not, set exception for CSR:
MESSAGE #P20829 MINIMUM 5 DIGITS IN COPYSAFE NUMBERS
The system will check the Proposal to see how many consecutive number are on one form:

One Number See Rule: 20.4.5.1.
Two Numbers See Rule 20.4.5.2.
More than two See Rule: 20.4.5.3.
    20.4.5.1. ONE NUMBER PER FORM
      20.4.5.1.1. The orientation of the number (Regular, Right Angle, etc. will be part of the NAME, and does not have to be validated.
      20.4.5.1.2. The system will check the location of the Consecutive Number:
      Distance from the top of the form must be =<MINTOP
      Distance from the left edge must be =<MINLEFT.
      Distance from the right edge must be =<MINRIGHT.
      If ALL of above are true, ORDER SPECS—COLLATOR—NUMBERS=1 and ORDER SPECS—COLLATOR FEATURES=NUMBERS—TYPE
      If not, set exception for CSR:
MESSAGE #P20007 LOCATION OF CONS NOS NOT ALLOWED
    20.4.5.2. TWO NUMBERS PER FORM
    Validate all of above, and
      20.4.5.2.0. Two Consecutive Numbers are allowed only on the following Form Lengths:
      7"
      8½"
      11"
      If the Form Length is not one of the above, set exception for CSR:
MESSAGE #P20008 TWO CONS. NOS NOT ALLOWED FOR THIS LENGTH
      20.4.5.2.1. The system will check the distance between the Consecutive numbers:
      If the HORIZONTAL SEPARATION=0, or >MINHORIZ, set ORDER SPECS—COLLATOR—NUMBERS =1 Unit
      If the HORIZONTAL SEPARATION>0 AND <MINHORIZ, set exception for CSR:
MESSAGE #P20002 CONS NOS NOT AVAILABLE FOR LIMITED
      If the VERTICAL—SEPARATION=0, or >MINVERT, ORDER SPECS—COLLATOR—NUMBERS=1 Unit
      If the VERTICAL-SEPARATION>0 and <MINVERT, set exception for CSR:
MESSAGE #P20002 CONS NOS NOT AVAILABLE FOR LIMITED
      20.4.5.2.2. If the PROPOSAL has more than one TYPE, set exception for CSR:
MESSAGE #P20002 CONS NOS NOT AVAILABLE FOR LIMITED
      20.4.5.2.4. If the PROPOSAL has more than one size, set exception for CSR:
MESSAGE #P20002 CONS NOS NOT AVAILABLE FOR LIMITED
      20.4.5.2.4. If the PROPOSAL has more than one NUMBERING INK, set exception for CSR:
MESSAGE #P20002 CONS NOS NOT AVAILABLE FOR LIMITED
      20.4.5.2.5. If the PROPOSAL has more than one starting CONSEC NUMBERS on any ply, set exception for CSR:
MESSAGE #P20002 CONS NOS NOT AVAILABLE FOR LIMITED 20.4.5.4. MORE THAN TWO NUMBERS/FORM
If the PROPOSAL has more than two consecutive numbers on any ply, set exception for CSR:

MESSAGE #P20002 CONS NOS NOT AVAILABLE FOR LIMITED

MICR NUMBERS 20.5. If there are MICR NUMBERS (Repetitive and/or Consecutive) see Rule #49.

MOD CHECK DIGIT 20.6. Data entry will request if the Consecutive Numbers have a Check Digit.
   20.6.1. The there is no check digit, skip rule #20.6.
   20.6.2. If there is a check digit, Data Entry will request the following:
      20.6.2.1. Identification of the Modulous System (Data Entry will display a list of the MOD Check Digits that are available)
      20.6.2.2. Data Entry will request: "Is this form an exact reorder of the previous order, and the MOD Check Digit calculation the same as the previous order?
         20.6.2.2.1. If the response is YES, skip the balance of rule 20.6.
         20.6.2.2.2. If the response is NO, continue to the next edit: 20.6.2.3.
      20.6.2.3. Data Entry will request a sample calculation. This will be a free-form field with sufficient room to show the calculations.
      20.6.2.4. Set exception for Plant:

MESSAGE #P20624 MOD CHECK DIGIT CALCULATION
      20.6.2.4. The sample calculation must be printed as part of the ORDER FORM at the plant.

21. CHECK PRESS PERFS
   21.1. DIAGONAL
      21.1.1. If the PROPOSAL has Diagonal Perfs, set exception for CSR:

MESSAGE #P21005 DIAGONAL NOT PERMITTED ON LIMITED 21.2. HORIZONTAL
      21.2.0. If there are no Horizontal Perfs on the order, skip rule 21.2.
      21.2.1. For each ply:
         21.2.1.1. If the HORIZ PERFS are on all PLIES, including Carbons if any, and in the same location on each PLY, see RULE 7.7: COLLATOR PERFS
      21.2.2. If there is more than one type of Horizontal Perf on the proposal, each TYPE must be checked.
         21.2.2.1. If the distance between HORIZ PERFS is an even multiple of ORDER SPECS—PRSLENGTH, update ORDER SPECS—PRESS FEATURES—HORIZ=1
         21.2.2.2. If the distance between HORIZ PERFS is not an even multiple of ORDER SPECS—PRSLENGTH, set exception for CSR:

MESSAGE #P21006 PERFS NOT ALLOWED ON LIMITED
         21.2.2.3. Update ORDER SPECS—PRESS FEATURES—PERF-TH=PROPOSAL—PERFS—HORIZONTAL—TYPE.

21.3. VERTICAL
      21.3.0 If there are no Vertical Perfs on the Proposal, skip rule 21.3.
      21.3.1. For each ply:
      21.3.2. If there is more than one type of VERT PERF on the proposal, each TYPE must be checked.
      21.3.3. If there is more than one PERF, the distance between the perfs must be equal to or greater than PERFORATIONS—V—PERF NAME—MINDIST. If not, set exception for CSR:

MESSAGE #P21010 VERT. PERFS OUT OF SPEC FOR LIMITED
      21.3.4. If there is more than one PERF, the number of perfs must be equal to or less than PERFORATIONS—V—PERF NAME—MAXNO. If not, set exception for CSR:

MESSAGE #P21010 VERT. PERFS OUT OF SPEC FOR LIMITED
      21.3.5. ORDER SPECS—PRESS FEATURES—PERF-TV=PROPOSAL—PERFS—VERTICAL—TYPE.

21.4. LETTEREDGE PERFS
      21.4.1. If the Perf TYPE=LETTEREDGE, and the Perf orientation is HORIZONTAL go to Rule #7.7—COLLATOR OPERATIONS—PERFS.

22. CHECK PRESS PUNCHES
If there are any carbons, and there are any punches through all parts and carbons, see: SECONDARY OPERATIONS above.
   22.1. Select: PROPOSAL DATA—PUNCHES
      22.1.1. BLANK—proceed to next edit
   22.2. PROPOSAL DATA: PUNCHES—TYPE
For acceptable values SEE: PUNCHES AVAIL
      22.2.1. If not found, set exception for CSR:

MESSAGE #P22410 PUNCHES NOT AVAIL ON LIMITED
      22.2.2. If Found, but the Product Flag is not on, set exception for CSR:

MESSAGE #P22420 PUNCHES NOT AVAIL ON LIMITED 22.3. PROPOSAL DATA: PUNCHES—SIZE
For acceptable values SEE: PUNCHES AVAIL—PRODUCT—SIZE
      22.3.1. If size not turned on, set exception for CSR:

MESSAGE #P22430 PUNCHES NOT AVAIL ON LIMITED 22.4. If the Form Length=11", up to 5 holes are allowed in the same horizontal plane. If the distance (C to C) for the holes is 1⅜", this counts as one punch.
      2.4.1. If the distance (C to C) between any of the holes is not 1⅜", each hole must be treated as one punch. In that case, the minimum C to C distance between the holes is: 2¾". If not, set exception for CSR:

MESSAGE #P22431 PUNCHES NOT AVAIL ON LIMITED 22.5. If the Form Length is less than 11" up to 3 punches, all in the same horizontal plane are allowed. If there are more than 3, set exception for CSR:

MESSAGE #P22432 PUNCHES NOT AVAIL ON LIMITED
      22.5.1. The distance between the holes (C to C) must be 2¾" or 4¼". If not, set exception for CSR:

MESSAGE #P22005 PUNCHES NOT AVAIL ON LIMITED.
      22.6.3. If there are more than one punch, and they are not in the same vertical plane, then each vertical plane must be at least 2¾" apart. If not, set exception for CSR:

MESSAGE #P22005 PUNCHES NOT AVAIL ON LIMITED 22.6.3.1. Punches are allowed if they are all in the same vertical plane up to the following limits:

| FORM LENGTH | MAX. # |
|---|---|
| Less than 7" | 2 |
| 7" to 8½" | 3 |
| Greater than 8½" | 5 |
| If not, set exception for CSR: | |

MESSAGE #P22005 PUNCHES NOT AVAIL ON LIMITED

31. PRESS DELIVERY 31.1. Update ORDER SPECS: PRESS DELIVERY= ROLLS

34. PAPER SPECS

For each ply, compare the PROPOSAL data with the values in the PAPER FILE.

1.1. The system will check the BASIS WGT., COLOR and TYPE against the PAPER GROUP: LTD STANSET W/O MICR 1.1.1. If the paper is found, go to the next edit;

1.1.2. If the paper is not found, set exception for the CSR:

MESSAGE #P34001 PAPER NOT ALLOWED ON LIMITED

41. CARBON

If there is no carbon on this PROPOSAL, skip this edit.

41.1. The system will check the CARBON FORMULAS for each Carbon against the CARBON FILE.

41.1.1. If the carbon is found, go to the next edit;

41.1.2. If any carbon is not found, set a flag for CSR:

MESSAGE #P41001 CARBON NOT AVAILABLE FOR LIMITED

47. LOCKUP 47.1. Use the rules in GENERAL to determine lockup. If successful, process RULE 47.3. for this product:

47.3. If there is not sufficient area for LOCKUP on any plate on the proposal, add one unit to the total number of printing units.

47.3.1. If the LOCKUP causes a 2-unit front plate to become a 3-unit front, and there is no back printing on the ply, 3-units are acceptable (even though the limit is 2-units front). Otherwise, set flag for CSR:

MESSAGE #P47144 INSUFFICIENT LOCKUP

55. INK

For each ply, compare the PROPOSAL—INK with the LIMITED INK FILE.

55.1. If any ink is not found, set exception for CSR:

MESSAGE #P55001 INK NOT AVAILABLE FOR LIMITED 55.2. If HEAT RESISTANT ink was selected, or if any ink had been changed to HEAT RESISTANT by Rule #4 (Primary Writing Device) set exception for CSR:

MESSAGE #P55200 INK NOT AVAILABLE FOR LIMITED 55.2.1. If the PROPOSAL has match ink set exception for CSR:

MESSAGE #P55210 INK NOT AVAILABLE FOR LIMITED 55.11. If the Proposal has a VOID PANTO, check the ink file for inks with the same COLOR 55.11.1. If invalid ink is selected for Void Panto, set exception for CSR:

MESSAGE #P55111 INK NOT AVAILABLE FOR LIMITED

56. NON-LITHO PRINTING 56.1. TITLES 56.1.1. If there are TITLES on the Proposal, Data Entry will request:
PLY NUMBER
FRONT
BACK 56.1.1.1. INK 56.1.1.1.1. Only PMS 199 or WARM RED is allowed for titles. If any other ink is selected, set exception for CSR:

MESSAGE #P56001 INK NOT AVAILABLE FOR TITLES 56.2. DISTINGUISHING FIGURES

If there are DISTINGUISHING FIGURES on the Proposal, Data Entry will request:
PLY NUMBER
TEXT FRONT:
TEXT BACK:
INK Only PMS 199 or WARM RED is allowed. If any other ink is selected, set exception for CSR:

MESSAGE #P56002 INK NOT AVAILABLE FOR DIST. FIGS.

56.2.1. The location for the Distinguishing Figure must be shown on F3.

56.2.2. Data Entry will allow only one Distinguishing Figure per ply 56.2.3. Update Order Specs:
PRESS—RUBBER—UNITS:
FRONT=Add 1. or
BACK =Add 1.
PRESS-RUBBER-INK=Selected Distinguishing Figure Ink 56.3. STOCK PHRASES If there are STOCK PHRASES on the Proposal, Data Entry will request:
PLY NUMBER
FRONT:
BACK:

56.3.1. INK Only PMS 199 or WARM RED is allowed. If any other ink is selected, set exception for CSR:

MESSAGE#P56003 INK NOT AVAILABLE FOR STOCK PHRASE 56.3.1. Update ORDER SPECS
PRESS-RUBBER-UNITS:
FRONT:=Add 1. or
BACK:=Add 1.
PRESS-RUBBER-INK=Selected Title Ink 56.3.2. Data Entry will allow only one STOCK PHRASE per ply.

56.4. LIMITED AREA PRINTING

Limited area printing is not allowed. If there is a limited area on the face of back of any ply, set exception for CSR:

MESSAGE P56004 LIMITED AREA NOT ALLOWED ON LIMITED

Limited Stanset Validation Rules (with MICR)

The following rules are processed for Limited Stanset products with MICR ink: 1. Check Form Length; 2. Check Form Width; 3. Check Ply; 6. Quantity; 7. Collator/Secondary Operations; 20. Consecutive Numbers; 21. Check Press Perfs; 22. Check Press Punches; 31. Press Delivery; 34. Paper Specs; 41. Carbon; 47. Lockup; 49. MICR; 50. Home Plant Assignment; and 56. Non-Litho Printing. The respective functionalities of these rules may be described as follows (any rules not expressly illustrated below have been described elsewhere in the specification):

1. CHECK FORM LENGTH:
   1.1. Only the following Lengths are available: 3½, 3⅔, 4¼, 5½, 7, 8½, 11.
   1.2. If the FORM LENGTH is any other than these, set exception for CSR:
   MESSAGE #P01001 LENGTH NOT AVAILABLE ON LIMITED
2. CHECK FORM WIDTH
   2.1. Only the following Widths are available: 8½, 9½, 9⅞, 10⅝, 11¾, 12, 13⅝, 14⅞, 15½
   2.2. If the FORM WIDTH is any other than these, set exception for CSR:
   MESSAGE #P02001 WIDTH NOT AVAILABLE ON LIMITED
3. CHECK PLY
   3.1. The maximum ply for this product=4. If the ply is greater than 4, set exception for CSR:
   MESSAGE: #P03100 PLY EXCEEDS LIMITED SPECS
6. QUANTITY
   6.1. Maximum quantity.
      6.1.1. If the order quantity is greater than 10000, set exception for CSR:
   MESSAGE #P06001 QUANTITY EXCEEDS SPECS
7. CHECK COLLATOR/SECONDARY OPERATIONS
   7.1. FASTENING NAME—PLY
      7.1.1. Only CRIMP is allowed. If any other fastening is selected, set exception for CSR:
   MESSAGE #P07007 FASTENING NOT AVAIL FOR LIMITED
   7.2. FASTENING LOCATION
      7.2.1. Crimp is permitted through all copies and carbons. If any other requirement is specified, set exception for CSR:
   MESSAGE #P07008 CRIMP SPEC EXCEEDS LIMITED
      7.2.2. The Crimp may be located at: LEFT, RIGHT, or BOTH sides. If any other location is specified, set exception for CSR:
   MESSAGE #P07008 CRIMP SPEC EXCEEDS LIMITED
         7.2.2.1. If the location is available, update ORDER SPECS: FASTENING LOCATION
   7.3. CARBON
      7.3.1. Only 812 Carbon is allowed. If any other Carbon is selected, set exception for CSR:
   MESSAGE #P07011 CARBON NOT AVAIL FOR LIMITED
      7.3.2. Each carbon must be ¾" narrower than the paper. If not, set exception for CSR:
   MESSAGE #P07012 CARBON SIZE NOT AVAIL FOR LIMITED
   7.4. PAPER
      7.4.1. The system will check the file: GLUE SPECS—NAME for the following edits:
         7.4.1.2. The basis weight for the top paper (Ply #1) must be equal to or greater than MINTOP. If not, set flag for review by the Plant.
   MESSAGE #P07132 PAPER WEIGHT EXCEEDS SPECS
         7.4.1.4. All papers must be the same width, with KS holes on both sides. If not, set exception for CSR:
   MESSAGE #P07013 NARROW COPIES NOT AVAIL FOR LIMITED
   7.7. PERFORATIONS
      7.7.1. If there are horizontal perforations through all parts and carbons, use the following edits. If the horizontal perforations are for individual plies, see Rule #21 PRESS PERFS.
         7.7.1.1. If the distance between the horizontal perfs is the same as one of the valid Form Lengths, and an even multiple of the form length, update ORDER SPECS–COLLATING–H-PERF=1 (one perf unit.)
         7.7.1.2. If the distance between the horizontal perfs is not the same as one of the valid Form Lengths, and an even multiple of the form length, set exception for CSR:
   MESSAGE #P07017 HORIZ. PERF LOCATION NOT ALLOWED
      7.7.2. LETTEREDGE
         7.7.2.1. If the perf type is LETTEREDGE, set flag for review by CSR
   MESSAGE #P07018 LETTEREDGE PERF NOT ALLOWED ON LIMITED
   7.8 For this product, all parts must be crimped. If not, set flag for review by the Plant.
   MESSAGE #P07019 LOOSE PARTS NOT ALLOWED ON LIMITED
   7.21. CRIMP
      7.21.1. Only STANDARD Crimp is allowed. If any other selection is made, set exception for the Plant:
   MESSAGE: #P07211 APPROVE CRIMP SPECS
      7.21.5. The MARGIN must be equal to or greater than GLUE SPECS—NAME—MARGIN. If not true, set exception for CSR:
   MESSAGE: #P07215 CRIMP OUT OF SPEC FOR LIMITED
      7.21.6. Update ORDER SPECS: FASTENING—SCRIMP—STANDARD
      7.21.7. Skip balance of Rule 7.
   7.23 If any of the above are not true, set exception for CSR:
20. CONSECUTIVE NUMBERS
   20.1. The system will check the Proposal to see if there are consecutive numbers. If there are no consecutive numbers, skip edit 20.
   20.2. If there are consecutive numbers, check the Proposal to see if the Consecutive Numbers are marked:
   PRESS See rule: 20.3
   COPYSAFE See rule: 20.4
PRESS NUMBERS
   20.3. Press Numbering is not available on this product. If PRESS Numbering is selected, set exception for CSR:
   MESSAGE #P20303 PRESS NUMBERS NOT AVAIL FOR LIMITED COPYSAFE NUMBERS
   20.4. Check the ply on the Proposal. If the ply is >4 set flag for the Sales Rep:
   MESSAGE #P20830 MAXIMUM 4 PLY FOR COPYSAFE NUMBERS
      20.4.0. Check the file: CONSNOS to see if the flag: SECONDARY is on for:
      20.4.1. NAME If SECONDARY is not on, set flag for review by CSR

MESSAGE #P20002 CONSEC. NOS. NOT AVAILABLE FOR PROD.

For the following edits, check only those elements in the CONSNOS file that have SECONDARY turned on.
    20.4.2. FRMLEN If the form length is not available for the selected NAME, set exception for CSR MESSAGE #P20002 CONSEC. NOS. NOT AVAILABLE FOR PROD.
    20.4.3. TYPE FACE If the TYPE FACE is not available for the selected NAME, set exception for CSR:

MESSAGE #P20002 CONSEC. NOS. NOT AVAILABLE FOR PROD.
    20.4.4. NUMBER OF CHARACTERS
    The system will use the Proposal Quantity to determine the minimum number of digits required in the Consecutive Number. The number of digits in the consecutive number must be =<MAXCHAR. If not, set exception for CSR MESSAGE #P20002 CONSEC. NOS. NOT AVAILABLE FOR PROD.
        20.4.4.1. The number of digits in the consecutive number must be at least 5. If not, set exception for CSR:

MESSAGE #P20829 MINIMUM 5 DIGITS IN COPYSAFE NUMBERS
    20.4.5. NAME SIZE If the NAME SIZE is not available for the selected name, set exception for CSR MESSAGE #P20156 COPYSAFE NOS—SIZE
    The system will check the Proposal to see how many consecutive number are on one form:
    One Number See Rule: 20.4.5.1.
    Two Numbers See Rule: 20.4.5.2.
    More than two See Rule: 20.4.5.3.
        20.4.5.1. ONE NUMBER PER FORM
            20.4.5.1.1. The orientation of the number (Regular, Right Angle, etc. will be part of the NAME, and does not have to be validated.
            20.4.5.1.2. Update MFG. PLAN—CONS. NOS. on NALE
        20.4.5.2. TWO NUMBERS PER FORM
        Validate all of above, and
            20.4.5.2.2. If the PROPOSAL has more than one TYPE, excluding MICR, set exception for CSR:

MESSAGE #P20002 CONS NOS NOT AVAILABLE FOR LIMITED
            20.4.5.2.4. If the PROPOSAL has more than one NUMBERING INK, excluding MICR, set exception for CSR:

MESSAGE #P20002 CONS NOS NOT AVAILABLE FOR LIMITED
            20.4.5.2.5. If the PROPOSAL has more than one starting CONSEC NUMBERS on any ply, set exception for CSR:

MESSAGE #P20002 CONS NOS NOT AVAILABLE FOR LIMITED
        20.4.5.4. MORE THAN TWO NUMBERS/FORM
        If the PROPOSAL has more than two consecutive numbers, excluding MICR on any ply, set exception for CSR:

MESSAGE #P20002 CONS NOS NOT AVAILABLE FOR LIMITED
MICR NUMBERS
    20.5. If there are MICR NUMBERS (Repetitive and/or Consecutive) see Rule #49.

MOD CHECK DIGIT
    20.6. Data entry will request if the Consecutive Numbers have a Check Digit.
        20.6.1. The there is no check digit, skip rule #20.6.
        20.6.2. If there is a check digit, Data Entry will request the following:
            20.6.2.1. Identification of the Modulous System (Data Entry will display a list of the MOD Check Digits that are available)
            20.6.2.2. Data Entry will request: "Is this form an exact reorder of the previous order, and the MOD Check Digit calculation the same as the previous order?
                20.6.2.2.1. If the response is YES, skip the balance of rule 20.6.
                20.6.2.2.2. If the response is NO, continue to the next edit: 20.6.2.3.
            20.6.2.3. Data Entry will request a sample calculation. This will be a free-form field with sufficient room to show the calculations.
            20.6.2.4. The sample calculation must be printed as part of the ORDER FORM at the plant.
21. CHECK PRESS PERFS
    21.1. DIAGONAL
        21.1.1. Diagonal Perfs are not allowed. If Diagonal is selected, set exception for CSR:

MESSAGE #P21002 PERFS NOT AVAIL FOR PRODUCT
    21.2. HORIZONTAL
        21.2.0. If there are no Horizontal Perfs on the order, skip rule 21.2.
            21.2.0.1. If the HORIZ PERFS are on all PLIES, including Carbons if any, and in the same location on each PLY, see RULE 7.7: COLLATOR PERFS
        21.2.1. For each ply:
            21.2.1.1. If the form length=7", one Horizontal perf is allowed. If the form length is anything else, and a Horizontal Perf is selected, set exception for CSR:

MESSAGE: #P21006 PERF NOT ALLOWED ON LIMITED
        21.2.2. If there is more than one type of Horizontal Perf on the proposal, set exception for CSR:

MESSAGE: #P21006 PERF NOT ALLOWED ON LIMITED
    21.3. VERTICAL
        21.3.0 If there are no Vertical Perfs on the Proposal, skip rule 21.3.
            21.3.1.1. If the VERT PERFS are on all PLIES, and in the same location on each PLY, see Rule 7.7: COLLATOR PERFS
        21.3.1. For each ply:
            21.3.1.1. If there is more than one type of VERT PERF on the proposal, each TYPE must be checked.
            21.3.1.2 Up to 2 vertical perfs are allowed. They must be located no more than ⅝" from the edge of the form.
                21.3.1.2.1. If the form length is 3½", one additional vertical perf is allowed anywhere on the form.
            21.3.1.3. If the number or location of the perfs exceeds these specs, set exception for the CSR:

MESSAGE #P21313 VERT PERFS NOT ALLOWED ON LIMITED.

21.4. LETTEREDGE PERFS
21.4.1. Letteredge Perfs are not allowed on this product. If selected, set exception for CSR:
MESSAGE: #P21410 LETTEREDGE PERF NOT ALLOWED.
22. CHECK PRESS PUNCHES
If there are any carbons, and there are any punches through all parts and carbons, see: SECONDARY OPERATIONS above.
22.1. If there are no punches, skip rule 22.
22.2. If the FORM LENGTH is not 7" set exception for CSR:
MESSAGE: #P22200 PUNCHES NOT ALLOWED ON LIMITED
22.3. One 2-hole punch is allowed. If any other punches are selected, set exception for CSR:
MESSAGE #P22005 PUNCHES NOT AVAIL ON LIMITED
22.4. The punch may be at the TOP, BOTTOM, or LEFT SIDE of the form. If any other location is selected, set exception for CSR:
MESSAGE #P22400PUNCH LOCATION NOT ALLOWED ON LIMITED
34. PAPER SPECS
For each ply, compare the PROPOSAL data with the values in the PAPER GROUP: LTD STANSET—MICR.
1.1. If the paper is found, go to the next edit;
1.2. If the paper type is OTHER, set flag for exception to CSR. MESSAGE #P34120 PAPER NOT ALLOWED ON LIMITED WITH MICR
1.3. If any paper is not found, set a flag for exception to CSR MESSAGE #P34130 PAPER NOT ALLOWED ON LIMITED WITH MICR
49. MICR
49.1.3. The following rules apply to MICR Printing on part one only.
49.1.4. Other parts in the set may have MICR Numbers, but those plies do not have to conform to the rules below.
49.2. FORM SIZE:
49.2.2. MICR is available on only the following Form Lengths: 3½, 3⅔, 7,
49.2.2.1. If the Form Length is any other, set exception for CSR:
MESSAGE #P49001 MICR NOT AVAIL FOR PRODUCT Zipset Validation Rules The following rules are processed for Zipset products: 1. Form Length; 2. Form Width; 7. Collator/Secondary Operations; 9. Punches; 10. Affix Label; 14. Booking; 15. Padding; 16. Edge Glue; 19. KS Removal; 20. Consecutive Numbers; 21. Check Press Perfs; 22. Check Press Punches; 29. Spec. Inst; 30. Construction Diagram; 31. Press Delivery; 32. Guillotine; and 39. Corner Cut. The functionality of each of these rules may be illustrated as follows (any rules not expressly illustrated below have been described elsewhere in the specification):
1. CHECK FORM LENGTH
If the PRODUCT is:
ZIPSET CUSTOM
LIMITED ZIPSET
The system will reverse the Form Width and Form Length in all references to form sizes, dimensions, locations, etc.
For FORM LENGTH, use the FORM WIDTH and check against GENERAL Rule G1.
2. CHECK FORM WIDTH
If the PRODUCT is: ZIPSET CUSTOM
The system will reverse the Form Width and Form Length in all references to form sizes, dimensions, locations, etc.
For FORM WIDTH, use the FORM LENGTH and check against GENERAL Rule G1
2.1. If the order WIDTH (stub length) is found, and the form width is not an exact multiple of the cylinder circumference, update MFG PLAN:
MFG STEP: BREAKAWAY=TRUE
2.2. If the order WIDTH (stub length) is not found, update MFG. PLAN:
MFG STEP=GUILLOTINE
MFG STEP: BREAKAWAY=FALSE
2.2.1 Use the next larger FORM LENGTH in the table to determine the Press and Collator cylinder size.
7. CHECK COLLATOR/SECONDARY OPERATIONS
7.1. 40" ROLLS. The system will compare the PROPOSAL with the specifications in the file: 40" ROLLS to determine if the order can be run on large rolls.
As soon as a NO condition is detected, mark the PROPOSAL—40' ROLL: NO, and skip all remaining edits in section 7.1.
7.1.2. If the Proposal has TAPE, TRANSTAPE must be on.
7.1.2.1. If there is Transfer Tape, add one to the number of plies, and reevaluate the MAX PLY.
7.1.2.2. If there is Reinforcement Tape, add one to the number of plies, and reevaluate the MAX PLY.
7.1.3. If there is HOTSPOT CARBON, add one to the number of plies for each Hotspot Carbon and reevaluate the MAX PLY
7.1.4. The Proposal QUANTITY must be equal to or greater then MIN QTY
7.1.5. If the Proposal has AFFIX LABEL, update MFG. PLAN: JUMBO=no.
7.1.6. If there are Forward Action Consecutive Numbers, skip the balance of rule 7.1.
7.1.7 The PLY must be equal to or less than the MAX PLY.
7.1.8. The number of Printing Units on the form must be equal to or less than MAX PRINT
7.1.9. If all the above edits pass, mark the PROPOSAL: 40" ROLLS
7.2 Deleted—save for future use
7.3. FASTENING
The system will compare the PROPOSAL with the specifications in the file: GLUE SPECS
7.3.1. The maximum basis weight for any paper in the glued set must be equal to or less than MAX PAPER. If not, set flag for review by the Plant.
MESSAGE #P07310 PAPER WEIGHT EXCEEDS SPECS
7.3.2. PAPER SIZE
7.3.2.1. The widest part in the PROPOSAL must be equal to or less than MAX LENGTH. If not, set flag for review by the Plant.
MESSAGE #P07321 FORM LENGTH EXCEEDS SPECS
7.3.2.2. The minimum length for at least one part must be equal to or greater than MIN LNGTH. If not, set flag for review by the Plant.
MESSAGE #P07321 FORM LENGTH EXCEEDS SPECS 7.3.3. PLY
- 7.3.3.1. NOTE: IF THERE IS ONE OR MORE HOT SPOT CARBONS IN THE SET, EACH HOT SPOT CARBON IS COUNTED AS A PLY IN DETERMINING THE MAXIMUM PLY.
- 7.3.3.2. The PLY must be equal to or less than MAX PLY. If not, set flag for review by the Plant.

MESSAGE #P07332 PLY EXCEEDS SPECS
- 7.3.3.3. If the total set caliper exceeds the MAXCALIPER, set flag for review by the plant.

MESSAGE #P07333 CALIPER EXCEEDS SPECS
- 7.3.4. If last paper in set=DRYGUM, and it is glued, set flag for review by the Plant.

MESSAGE #P07340 SLIP SHEET REQUIRED
- 7.3.5. If there is carbon in the last position of the set, add 1 to the total number of parts, and reevaluate MAXPLY. Add message to the order.

MESSAGE #P07340 SLIP SHEET REQUIRED
- 7.3.6. Update: ORDER SPECS—COLLATING—STATIONS=Total number of parts+total number of Hotspot carbons+number of Transfer Tapes.

7.4. PERFORATIONS
- 7.4.1. If the total caliper for the set exceeds MAXCAL—PRF, the perfs must be done on the press. See Rule #21—PRESS PERFS.
- 7.4.2. If there are Right Angle perforations through all parts and carbons use the following edits. If the Right Angle perfs are for individual plies, see: #21. Check Press Perfs
- 7.4.3. If the distance between the Right Angle perfs is a multiple of the form length: update: ORDER SPECS—COLLATING-H-PERF=1 (one perf unit required)
- 7.4.4. If the distance between the Right Angle perfs is not a multiple of the form length: update: ORDER SPECS—COLLATING-H-PERF=2 (two perf units required)

7.5. CROSS SPOT GLUE
- 7.5.1. If there is CROSS SPOT Glue, send to Plant for review

MESSAGE #P07510 CROSS SPOT GLUE 7.10 NO GLUE LINE
- 7.10.1. If there are no glue lines, the maximum ply=3. If more than 3, set exception for the Plant MESSAGE #P07101 MAX 3 PLY FOR UNGLUED
- 7.10.2. If there are any glue lines, each ply (paper) must have a glue line. If not, set exception for the Plant.

MESSAGE #P07102 APPROVE LOOSE COPIES IN SET 7.11. STUB SIZE
- 7.11.1. If the stub width is less than GLUE—SPECS—MINSTUB, set flag for review by the Plant.

MESSAGE #P07135 MARGIN OUT OF SPEC
- 7.11.2. CARBON INTERLEAVED: The stub size must be one of the following sizes:
  - ½"
  - ⅝"
  - 1"
  If not, set flag for review by the Plant.

MESSAGE #P07112 GLUE: MINIMUM STUB
- 7.11.3 If there is no carbon, the stub size may be any of the above, and: ⅜"
  - 7.11.3.1. If there is no carbon, and if the KS Holes are slit off, the stub may be any of the above, and ¼". If not, set exception for the Plant:

MESSAGE #P07113 MINIMUM STUB—NO CARBON
- 7.11.4 If the stub size is ¼" or ⅜", only one glue line is allowed in the stub. If there is more than one glue line in the stub, set flag for review by the Plant.

MESSAGE #P07112 GLUE: MINIMUM STUB

9. PUNCHES: Secondary

The system will check the proposal to see if there are any punches. The following edits are to be used only if the punches are through all parts and carbons. If there are no punches, or if any punches are not through all parts and carbons, skip Rule 9 (see below: PRESS PUNCHES)

NOTE: The location of punches will be determined as follows (any rules not expressly illustrated below have been described elsewhere in the specification):

ROUND: Center to center

ALL OTHERS: The lower left corner of a rectangle drawn around the punch.

- 9.1. The system will compare the TYPE of punches on the PROPOSAL with the Data File: PUNCHES—TYPE
  - 9.1.1. For acceptable values SEE: PUNCHES—PRODUCT—TYPE—SECONDARY (06-28-1)
  - 9.1.2. If found, update ORDER SPECS—DRILL=X (One punch unit required). If not found, set flag for review by the plant.

MESSAGE #P09120 PUNCH TYPE NOT AVAIL
- 9.2 The system will compare the SIZE of punches on the PROPOSAL with the Data File: PUNCHES—SIZE
  - 9.2.1. For acceptable values SEE: PUNCHES—PRODUCT—SIZE—SECONDARY (06-28-1)
  - 9.2.2. If found, update ORDER SPECS—DRILL=X (One punch unit required). If not found set flag for review by the Plant.

MESSAGE #P09220 PUNCH SIZE NOT AVAIL
- 9.3. If there is more than one punch, and they are not in the same horizontal plane then the distance between the first and second horizontal planes must be equal to or greater than PUNCH—PRODUCT—C C HORIZ. If not, set flag for review by the Plant.

MESSAGE #P09300 PUNCHES—HORIZ LOCATION
- 9.4. If there is more than one punch, and they are not in the same vertical plane, then each vertical plane must be at least PUNCHES—CCVERT apart. If not set flag for review by the Plant.

MESSAGE #P09400 PUNCHES—VERT LOCATION
- 9.5. The system will check the location of the punch in relation to the edge of the form. The values are in the data file: PUNCHES—SECONDARY. If any of these edits fail, set flag for review by the Plant:
  - 9.5.1. Distance from the top of the form must be equal to or greater than: PUNCHES—TOP
  - 9.5.2. Distance from the bottom of the form must be equal to or greater than: PUNCHES—BOTTOM
  - 9.5.3. Distance from the left edge of the form must be equal to or greater than: PUNCHES—LEFT
  - 9.5.4. Distance from the right edge of the form must be equal to or greater than: PUNCHES—RIGHT.

MESSAGE #P09540 PUNCH LOCATION
- 9.6. If any punch in located in the stub of the form, update ORDER SPECS—SECONDARY—DRILL 10. AFFIX LABEL
- 10.1. The system will check the REORDER TYPE code on the Proposal.
  - 10.1.1. If the Reorder Type=NEW, set flag for review by the Plant.

MESSAGE #139 LABEL AFFIX—NEW 10.1.1.1. Must have Form 6347 (Affix Label Spec Sheet—see Screen 11-02-61). If not, discontinue validation and return the Proposal to the Sales Rep.

10.1.2. If Reorder Type=REORDER must have (6347-REV). If not, discontinue validation and return the Proposal to the Sales Rep.

10.2. Update ORDER SPECS—SECOPS—AFFIX=X

14. BOOKING:

14.1 If there is BOOKING the system will compare the selected booking on the proposal with the DATA FILE: BOOK COVERS—STYLE. If the STYLE is not found for the product, set flag for review by the Sales Rep:

MESSAGE: 14001 BOOK COVER STYLE NOT AVAILABLE 14.2. The system will sum the calipers of all the parts/carbons included in the booking stub. If the total caliper exceeds BOOKS—MAXCAL, set flag for review by the Plant.

MESSAGE: 14002 CALIPER EXCEEDS SPEC FOR STUB 14.3. NOTE: NEED METHOD TO SUM ALL PAPERS, CALIPERS, CHIPBOARD AND COVER*OVERLAP. Cannot exceed ⅝"

14.4 Data entry will request the number of staples per book. Update the MFG.PLAN: X STAPLES PER BOOK.

14.5 If there are printed covers, there must be a Forms Design. For any printed cover, set flag for review by the Plant.

MESSAGE: 14003 PRINTED BOOK COVERS

NOTE: The plant will update the MFG PLAN to indicate if the Book Covers are to be printed in House, or if they will be sub-contracted.

15. PADDING 15.1. Data Entry will determine if there is to be a backer on the front only, the back only, or both.

15.1.1. Update the Manufacturing Plan:
(Chipboard on front
Chipboard on back
Chipboard: front and back)

15.2. Prior to processing this rule, the system will calculate the number of forms per carton—including the chipboard backer(s).

15.3. If the number of forms/pad exceeds the forms/carton, set flag for review by the Sales Rep:

MESSAGE #P15300 ONLY (sets/ctn) ALLOWED PER PAD

16. EDGE GLUE 16.1. If any paper is not in GROUP A1 (CARBONLESS), set flag for return to Sales.

MESSAGE #P16100 CARBONLESS PAPER ONLY—EDGE GLUE 16.2. If EDGE GLUE is selected, update MFG PLAN= SECONDARY OPERATION.

19. KS REMOVAL 19.1. The system will check the Proposal for KS REMOVAL feature. If this feature is not on the Proposal, skip rule 19.

19.2. If the TOTAL SET WEIGHT (sum of the basis weights for papers and carbons) on the Proposal is greater than: 125# set exception for the CSR:

MESSAGE #P19200 MUST PRICE MANUALLY 19.3. If the Proposal is marked for KS REMOVAL on the left and the right sides, the system will set a flag for review by the Plant.

MESSAGE #P19300 KS REMOVAL—BOTH SIDES 19.5. Update Mfg. Plan: KS—REMOVAL (RIGHT, LEFT,)

20. CHECK CONSECUTIVE NUMBERS 20.1. The system will check the Proposal to see if there are consecutive numbers. If there are no consecutive numbers, skip edit 20.

20.2. If there are consecutive numbers, check the Proposal to see if the Consecutive Numbers are marked:

MICR MICR consecutive numbers are not to be counted in the number of Consecutive Numbers per form. If there are MICR numbers, either alone or in combination with some other type of numbering, do the validation for the appropriate numbers below, and then validate MICR numbers separately: Rule 20.5.

PRESS See rule: 20.3

COPYSAFE See rule: 20.4

PRESS NUMBERS 20.3. Check the file: CONSNOS to see if the flag: PRESS is on for:

20.3.1 NAME If PRESS not on, set flag for review by the Plant

MESSAGE #P20310 PRESS NOS NOT AVAILABLE

For the following edits, check only those elements in the CONSNOS file that have PRESS turned on.

20.3.2. FRMWIDTH: If the form width is not available for the selected NAME, set flag for review by the plant

MESSAGE #P20320 PRESS NOS—FORM WIDTH 20.3.3. TYPE FACE If the TYPE FACE is not available for the selected NAME, set flag for review by the plant.

MESSAGE #P20330 PRESS NOS—TYPE FACE 20.3.4. NUMBER OF CHARACTERS

The system will use the Proposal Quantity to determine the minimum number of digits required in the Consecutive Number.

The number of digits in the consecutive number must be =<MAX CHAR. If not, set flag for review by the plant.

MESSAGE #P20340 TOO MANY DIGITS IN CONSEC NOS 20.3.5. NAME SIZE If the NAME SIZE is not available for the selected NAME, set flag for review by the plant.

MESSAGE#P20350 PRESS NOS—SIZE

The system will check the Proposal to see how many consecutive numbers are on one form:

One Number See Rule 20.3.5.1
Two Numbers See Rule 20.3.5.2.
More than two See Rule 20.3.5.3.

20.3.5.1. ONE NUMBER PER FORM 20.3.5.1.1. The orientation of the number (Regular, Right Angle, etc. will be part of the NAME, and does not have to be validated.

20.3.5.1.2. The system will check the location of the Consecutive Number:

Distance from the top of the form must be =<MINTOP

Distance from the left edge must be =<MINLEFT.

Distance from the right edge must be =<MINRIGHT.

If ALL of above are true, ORDER SPECS—PRESS—NUMBERS=1 and ORDER SPECS—PRESS FEATURES=NUMBERS—TYPE If not, set flag for review by the Plant:
MESSAGE #P20351 LOCATION OF CONS. NOS 20.3.5.2. TWO NUMBERS PER FORM Validate all of above, and 20.3.5.2.1. The system will check the distance between the Consecutive numbers:
HORIZONTAL SEPARATION=0, or >MINHORIZ ORDER SPECS—PRESS—NUMBERS=1 Unit
HORIZONTAL SEPARATION>0 AND <MINHORIZ ORDER SPECS—PRESS—NUMBERS=2 Units
VERTICAL—SEPARATION=0, or >MINVERT, ORDER SPECS—PRESS—NUMBERS=1 Unit
VERTICAL—SEPARATION>0 and <MINVERT, ORDER SPECS—PRESS—NUMBERS=2 Units 20.3.5.2.2. If the PROPOSAL has more than one TYPE, ORDER SPECS—PRESS—NUMBERS=2 Units 20.3.5.2.3. If the PROPOSAL has more than one size, ORDER SPECS—PRESS—NUMBERS=2 Units 20.3.5.2.4. If the PROPOSAL has more than one NUMBERING INK, ORDER SPECS—PRESS—NUMBERS=2 Units 20.3.5.2.5. If the PROPOSAL has more than one starting CONSEC NUMBERS on any ply, set flag for review by the Plant.

MESSAGE #P20356 MORE THAN ONE STARTING NUMBER 20.3.5.2.6. If any of the above edits cause 2 UNITS, set flag for review by the Plant.

MESSAGE #P20357 TWO NUMBER UNITS REQUIRED 20.3.5.3. MORE THAN TWO NUMBERS/FORM

If the PROPOSAL has more than two consecutive numbers on any ply, Set flag for review by the Plant

MESSAGE #P20358 MORE THAN 2 CONSEC. NUMBERS COPYSAFE NUMBERS 20.4. Check the ply on the Proposal. If the ply is >6 set flag for the Sales Rep:

MESSAGE #P20400 MAXIMUM 6 PLY FOR COPYSAFE NUMBERS 20.4.0. Check the file: CONSNOS to see if the flag: COLLATOR is on for:

20.4.1. NAME If COLLATOR is not on, set flag for review by the Plant.

MESSAGE #P20410 COPYSAFE NOS NOT AVAILABLE

For the following edits, check only those elements in the CONSNOS file that have COLLATOR turned on.

20.4.2. FRMWIDTH If the form width is not available for the selected NAME, set flag for review by the Plant.

MESSAGE #P20420 COPYSAFE NOS—FORM WIDTH 20.4.3. TYPE FACE If the TYPE FACE is not available for the selected NAME, set flag for review by the Plant.

MESSAGE #P20430 COPYSAFE NOS—TYPE FACE 20.4.4. NUMBER OF CHARACTERS

The system will use the Proposal Quantity to determine the minimum number of digits required in the Consecutive Number. The number of digits in the consecutive number must be =<MAX CHAR. If not, set flag for review by the Plant.

MESSAGE #P20440 TOO MANY DIGITS IN CONSEC NOS 20.4.4.1. The number of digits in the consecutive number must be at least 5. If not, set flag for review by the Sales Rep:

MESSAGE #P20441 MINIMUM 5 DIGITS IN COPYSAFE NUMBERS 20.4.5. NAME SIZE If the NAME SIZE is not available for the selected name, set flag for review by the plant.

MESSAGE #P20450 COPYSAFE NOS—SIZE

The system will check the Proposal to see how many consecutive number are on one form:
One Number See Rule: 20.4.5.1.
Two Numbers See Rule: 20.4.5.2.
More than two See Rule: 20.4.5.3.

20.4.5.1. ONE NUMBER PER FORM 20.4.5.1.1. The orientation of the number (Regular, Right Angle, etc. will be part of the NAME, and does not have to be validated.

20.4.5.1.2. The system will check the location of the Consecutive Number:
Distance from the top of the form must be <MINTOP. If not, change the numbers to PRESS and perform the Validation Rules for PRESS NUMBERS (20.3)
Distance from the left edge must be =<MINLEFT.
Distance from the right edge must be =<MINRIGHT.
If ALL of above are true, ORDER SPECS—COLLATOR—NUMBERS=1 and ORDER SPECS—COLLATOR FEATURES=NUMBERS—TYPE
If not, set flag for review by the Plant:

MESSAGE #P20451 LOCATION OF CONS. NOS 20.4.5.2. TWO NUMBERS PER FORM

Validate all of above, and 20.4.5.2.1. The system will check the distance between the Consecutive numbers:
HORIZONTAL SEPARATION=0, or >MINHORIZ ORDER SPECS—COLLATOR—NUMBERS=1 Unit
HORIZONTAL SEPARATION>0 AND <MINHORIZ ORDER SPECS—COLLATOR—NUMBERS=2 Units
VERTICAL—SEPARATION=0, or >MINVERT, ORDER SPECS—COLLATOR—NUMBERS=1 Unit
VERTICAL—SEPARATION>0 and <MINVERT, ORDER SPECS—COLLATOR—NUMBERS=2 Units 20.4.5.2.2. If the PROPOSAL has more than one TYPE, ORDER SPECS—COLLATOR—NUMBERS=2 Units 20.4.5.2.4. If the PROPOSAL has more than one size, ORDER SPECS—COLLATOR—NUMBERS=2 Units 20.4.5.2.4. If the PROPOSAL has more than one NUMBERING INK, ORDER SPECS—COLLATOR—NUMBERS=2 Units 20.4.5.2.5. If the PROPOSAL has more than one starting CONSEC NUMBERS on any ply, set flag for review by the Plant.

MESSAGE #P20455 MORE THAN ONE STARTING NUMBER 20.4.5.2.6. If any of the above edits cause 2 UNITS, set flag for review by the Plant.

MESSAGE #P20456 TWO NUMBER UNITS REQUIRED 20.4.5.4. MORE THAN TWO NUMBERS/FORM
If the PROPOSAL has more than two consecutive numbers on any ply, Set flag for review by the Plant

MESSAGE #P20454 MORE THAN 2 CONSEC. NUMBERS 20.5 CONSECUTIVE NUMBER PREFIX/SUFFIX 20.5.1. If there are more than 3 Alpha characters in the Consecutive
Number Prefix and/or Suffix, set flag for review by the Sales Rep.

MESSAGE #P20510 CONSC. NUMBER PREFIXISUFFIX TOO LONG

21. CHECK PRESS PERFS 21.0. If the STUB is at the TOP and/or BOTTOM of the form:
If there are HORIZONTAL PERFS, use the rule for PARALLEL PERFS
If there are VERTICAL PERFS, use the rule for RT. ANGLE PERFS If the STUB is at the RIGHT and/or LEFT of the form:
If there are HORIZONTAL PERFS, use the rule for RT. ANGLE PERFS
If there are VERTICAL PERFS, use the rule for PARALLEL perfs.

21.1. DIAGONAL 21.1.1. If PROPOSAL—PERFS—TYPE—DIAG, ORDER SPECS—PRESS FEATURES—DIAG=X 21.2. RIGHT ANGLE 21.2.1. For each ply:

21.2.2. The system will determine the number of RT. ANGLE perfs on the order. (This is needed for TOPS)

21.2.2.1. If the distance between RIGHT ANGLE PERFS=even multiple of the PRSLENGTH, update MFG. PLAN: PRESS FEATURE—RT. ANGLE PERF UNITS=1.

21.2.2.2. If the distance between RIGHT ANGLE PERFS is not an even multiple of PRSLENGTH, update MFG PLAN: PRESS FEATURE—RT. ANGLE PERF UNITS=1.

21.3. PARALLEL 21.3.1. For each ply:

21.3.1.1. If there is Carbon on the order, and PARALLEL PERFS are on all PLIES and Carbons, and in the same location on each PLY, update MFG PLAN: COLLATOR PERFS.
Use edits: COLLATOR PERFS 21.3.2. The system will determine the number of PARALLEL perfs on the order. (This is required for TOPS).

21.3.2.1. If the number of PARALLEL perfs is greater than MAX NUM PERFS, update MFG PLAN: COLLATOR PERFS.
Use edits: COLLATOR PERFS.

21.3.3. If the distance between the PARALLEL is less than the MULT PERF MIN DIST, update MFG PLAN: COLLATOR PERFS.
Use edits: COLLATOR PERFS.

22. CHECK PRESS PUNCHES

If there are any carbons, and there are any punches through all parts and carbons, see: SECONDARY OPERATIONS above.

22.1. The system will check to see if the Punches are available for the Product.
If not, set exception for the Plant:

MESSAGE #P22100 APPROVE PUNCHES FOR PRODUCT 22.2. The system will check to see if the Punches are available on the Press. If not, set exception for the Plant:

MESSAGE #P22201 APPROVE PUNCHES FOR PRESS 22.3. The system will check to see of the Punches are available in the selected size. If not, set exception for the Plant:

MESSAGE #P22300 APPROVE SIZE OF PRESS PUNCHES.

22.4.1. If there are more than one punch, and they are not in the same vertical plane, then each vertical plane must be at least 2 7/18" apart.

If not, ORDER SPECS—PRESS—PUNCHES=2

30. CONSTRUCTION DIAGRAM 30.1. A construction diagram is required whenever the order does not meet the following specifications:
A. Stub=5/8"
B. Each carbon is glued to the back of the preceding part.
C. No glue lines inside the KS Perf.

30.2. If any of the above are false, MFG PLAN: CONSTRUCT=X 30.3. If the order has SPOT GLUE, MFG PLAN: CONSTRUCT=X 30.4. If there is a double stub, MFG PLAN: CONSTRUCT=X 30.5. If the MFG PLAN: CONSTRUCT=X, then set flag for message to Sales:

MESSAGE #P30500 CONSTRUCTION DIAGRAM REQUIRED

31. PRESS DELIVERY ORDER SPECS—PRESS—DELIVERY=ROLL

32. GUILLOTINE 32.1. If the Form Width is not equal to SIZES—ZIPSET—CUSTOM—WIDTH, update MFG. PLAN=GUILLOTINE.

39. CORNER CUT 39.1 If there is a corner cut, update MFG PLAN: CORNER CUT.

Limited Zipset Validation Rules

The following rules are processed for Limited Zipset products: 7. Check Collator/Secondary Operations; 9. Punches, Secondary; 11. Transfer Tape; 14. Booking; 15. Padding; 19. KS Removal; 20. Consecutive Numbers; 21. Check Press Perfs; 22. Check Press Punches; 27. Determine Number Wide; 41. Carbon; 47. Lockup; 50. Home Plant Assignment; and, 56. Non-Litho Printing. The functionality of each of these rules may be illustrated as follows (any rules not expressly illustrated below have been described elsewhere in the specification):

7. CHECK COLLATOR/SECONDARY OPERATIONS
   7.1. If MFG PLAN=JUMBO, change PRODUCT to ZIPSET—CUSTOM
   MESSAGE #P07864 MAX 3 PLY FOR UNGLUED
   7.7 DOUBLE STUBS
      7.7.1. If there is more than one stub:
         7.7.1.1. All parts in the set must be One Standard Length, or One Standard Length plus ⅝". See DATAFILE: PRODUCT.XLS—WIDTHS.
         7.7.1.2 The stub length must be ⅝" for each stub.
         7.7.1.3. One double stub may contain 2 or 3 papers;
         7.7.1.4. If there are two double stubs, each may contain no more than 2 papers.
   If the order exceeds these limitations, set flag for review by the CSR:
   MESSAGE #P07003 SPECS EXCEED LIMITED ZIPSET
   7.8 Glue Line Location
      7.8.1. If there is more than one glue line on a form or carbon, up to two lines may be treated as a set.
         7.8.1.1. An area of ⅝" must be available for a set of glue lines.
         7.8.1.2. If not, set flag for review by the Sales Rep.
      MESSAGE #P07177 GLUE: MINIMUM STUB
      7.8.2. Up to two sets of glue lines may be located on a form.
         7.8.2.1. If there are more than two sets of glue lines, set flag for review by the Sales Rep.
      MESSAGE #P07004 TOO MANY GLUE LINES FOR LIMITED
      7.8.3. If there are two glue lines in a set, the distance between the lines (center to center) must be ¹¹⁄₃₂". If not, change product to ZIPSET CUSTOM.
      MESSAGE #P07005 GLUE LINE SPECS EXCEED LIMITED
   7.10 NO GLUE LINE
      7.10.1 If there are no glue lines, the maximum ply=1. If more than 1, set flag, send message to SALES:
      MESSAGE #P07865 MAX 1-PLY FOR UNGLUED
   7.11. STUB SIZE
      7.11.1. If the stub width is less than ⅝", set flag for review by the Plant.
      MESSAGE #P07135 MARGIN OUT OF SPEC
      7.11.2. CARBON INTERLEAVED: The stub size must be ⅝" or larger.
      If not, set flag for review by the Plant.
      MESSAGE #P07177 GLUE: MINIMUM STUB
      7.11.3 If there is no carbon, the stub size may be: ¼"
      7.11.4 If the stub size is ¼" or ⅜", only one glue line is allowed in the stub. If there is more than one glue line in the stub, set flag for review by the Plant.
      MESSAGE #P07177 GLUE: MINIMUM STUB
      7.11.5 If the stub size is ¼" or ⅜", there must be a ⅜" KS Removal feature. If not, set flag for CSR:
      MESSAGE #P07006 MUST HAVE ⅜" KS REMOVAL
9. PUNCHES—Secondary
   This rule deals with Punching that is not done on the Press. Generally, if a Zipset Order requires punches that cannot be done on the press, this will result in a drilling operation.
11. TRANSFER TAPE
   NOTE: Prior to processing this rule, GENERAL RULE 11. and Product Rule 11. should be processed.
      11.3. If there is more than one tape on any one ply, set flag to return to Sales Rep.
   MESSAGE #VL863—ONLY ONE TRANSFER TAPE/PLY
14. BOOKING
   14.4 If the order requires other than 2 staples per book, change the product to ZIPSET-CUSTOM
   14.5 If there are Printed Book Covers, change product to ZIPSET—CUSTOM
      14.5.1. If there are Consecutive Numbers on the Cover, change the product to ZIPSET—CUSTOM
   14.6 If the orders requires Chipboard Inserts, change the product to ZIPSET—CUSTOM.
15. PADDING
   15.1. The number of forms/pad must be entered. The acceptable values are:
   One Ply=50 or 100
   More than one Ply=50 or 25
      15.1.1. If no quantity is entered, or if the quantity is not one of the above, set flag for review by the Plant:
   MESSAGE #P15004 QTY/PAD NOT STANDARD
   15.1. If forms are to be padded, there must be a Chipboard backer. If not, set flag for Sales, and discontinue processing the order:
   MESSAGE: #P15002 CHIPBOARD BACKER REQUIRED
   15.3. Update the Manufacturing Plan:
   Chipboard on back
19. KS REMOVAL
   Limited—Add ⅜" to width, and then trim off to get correct finished size.
20. CONSECUTIVE NUMBERS
   20.1. The system will check the Proposal to see if there are consecutive numbers. If there are no consecutive numbers, skip edit 20.
   20.2. If there are consecutive numbers, check the Proposal to see if the Consecutive Numbers are marked:
   PRESS See rule: 20.3
   COPYSAFE See rule: 20.4
PRESS NUMBERS
   20.3 If the ply is 1, set exception for CSR:
   MESSAGE #P20301 CHANGE PRODUCT TO LIMITED SHEETS
      20.3.1. If the ply is greater than 1, set exception for CSR:
   MESSAGE #P20311 PRESS NUMBERS NOT AVAIL FOR LIMITED
COPYSAFE NUMBERS
   20.4. Check the ply on the Proposal. If the ply is >6 set flag for the Sales Rep:
   MESSAGE #P20828 MAXIMUM 6 PLY FOR COPYSAFE NUMBERS
      20.4.0. Check the file: CONSNOS to see if the flag: COLLATOR is on for:
      20.4.1. NAME If COLLATOR is not on, set flag for review by the Sales Rep:
   MESSAGE #P20153 COPYSAFE NOS NOT AVAILABLE
   For the following edits, check only those elements in the CONSNOS file that have COLLATOR turned on.
      20.4.2. FRMWIDTH If the form width is not available for the selected NAME, set flag for review by the Plant.
   MESSAGE #P20173 COPYSAFE NOS—FORM WIDTH
   MESSAGE #P20155 COPYSAFE NOS—TYPE FACE 20.4.4. NUMBER OF CHARACTERS The system will use the Proposal Quantity to determine the minimum number of digits required in the Consecutive Number.

The number of digits in the consecutive number must be =<MAX CHAR.

If not, set flag for review by the Plant.

MESSAGE #P20148 TOO MANY DIGITS IN CONSEC NOS
   20.4.4.1. The number of digits in the consecutive number must be at least 4. If not, set flag for review by the Sales Rep:

MESSAGE #P20829 MINIMUM 4 DIGITS IN COPYSAFE NUMBERS
   20.4.5. NAME SIZE If the NAME SIZE is not available for the selected name, set flag for review by the plant.

MESSAGE #P20156 COPYSAFE NOS—SIZE

The system will check the Proposal to see how many consecutive number are on one form:

One Number See Rule: 20.4.5.1.

Two Numbers See Rule: 20.4.5.2.
   20.4.5.1. ONE NUMBER PER FORM
      20.4.5.1.1. The orientation of the number (Regular, Right Angle, etc. will be part of the NAME, and does not have to be validated.
      20.4.5.1.2. The system will check the location of the Consecutive Number:
      For Parallel Numbers, the minimum distance from the edge of the form to the left-bottom of the Consecutive number is ⅞".
      For Right Angle Numbers, there is no minimum distance from the edge of the form.
      If ALL of above are true, ORDER SPECS—COLLATOR—NUMBERS=1 and ORDER SPECS—COLLATOR FEATURES=NUMBERS—TYPE
      If not, set flag for review by the Plant:

MESSAGE #P20150 LOCATION OF CONS. NOS
   20.3.5.2. TWO NUMBERS PER FORM
      20.3.5.2.1. The system will check the distance between the Consecutive numbers on one form, and the distance between the Consecutive numbers on two successive forms.
      20.3.5.2.2 Parallel: (vertical)
      VERTICAL—SEPARATION must be at least 2¾".
      TRUE: Update MFG PLAN: COLLATOR NUMBERS
      FALSE: Set flag for Sales Rep:

MESSAGE #P20352 CONSEC NUMBER SPACING NOT ALLOWED
      HORIZONTAL—SEPARATION must be at least 2¹⁵⁄₁₆".
      TRUE: Update MFG PLAN: COLLATOR NUMBERS
      FALSE: Set flag for Sales Rep:

MESSAGE: #P20352 CONSEC NUMBER SPACING NOT ALLOWED
      20.3.5.2.3 Right Angle (Horizontal)
      HORIZONTAL—SEPARATION must be at least 3³⁄₁₆" for the numbers on one form.
      TRUE: Update MFG PLAN: COLLATOR NUMBERS
      FALSE: Set flag for Sales Rep:

MESSAGE: #P20352 CONSEC NUMBER SPACING NOT ALLOWED
      VERTICAL—SEPARATION must be at least 2¹¹⁄₁₆" for the numbers on one form, and for the numbers on two successive forms.
      TRUE: Update MFG PLAN: COLLATOR NUMBERS
      FALSE: Set flag for Sales Rep:

MESSAGE: #P20352 CONSEC NUMBER SPACING NOT ALLOWED
      20.3.5.2.4. If the PROPOSAL has more than one TYPE, set flag for review by the Sales Rep:

MESSAGE: #P20252 CONSEC NUMBER SPACING NOT ALLOWED
      20.3.5.2.5. If the PROPOSAL has more than one size, set flag for review by the Sales Rep:

MESSAGE: #P20353 ONLY ONE NUMBER SIZE ALLOWED
      20.3.5.2.6. If the PROPOSAL has more than one NUMBERING INK, set flag for review by the Sales Rep:

MESSAGE: #P20354 ONLY ONE NUMBERING INK ALLOWED
      20.3.5.2.7. If the PROPOSAL has more than one starting CONSEC NUMBERS on any ply, set flag for review by the Sales rep:

MESSAGE: #P20355 ONLY ONE STARTING NUMBER ALLOWED 20.5 CONSECUTIVE NUMBER PREFIX/SUFFIX
   20.5.1. If there is more than 1 Alpha character in the Consecutive Number Prefix and/or Suffix, set flag for review by the Sales Rep.

MESSAGE #P20510 CONSEC. NO. PREFIX/SUFFIX TOO LONG

21. CHECK PRESS PERFS
   21.0. If the STUB is at the TOP and/or BOTTOM of the form:
      If there are HORIZONTAL PERFS, use the rule for PARALLEL PERFS
      If there are VERTICAL PERFS, use the rule for RT. ANGLE PERFS
   If the STUB is at the RIGHT and/or LEFT of the form:
      If there are HORIZONTAL PERFS, use the rule for RT. ANGLE PERFS
      If there are VERTICAL PERFS, use the rule for PARALLEL perfs.
   21.2. RIGHT ANGLE
      21.2.1. For each ply:
      21.2.2. Only one Right Angle perf per ply. If there is more than one, set flag for review by Sales:

MESSAGE: #P21220 ONLY ONE RT. ANGLE PERF ALLOWED
      21.2.2.1. If the Stub Length is not: 4¼", 5⅔", 8½" Set flag for review by Sales:

MESSAGE #P21221 RIGHT ANGLE PERF NOT ALLOWED
      21.2.3. If the RIGHT ANGLE Perf is not through PAPERS ONLY, set flag for review by Sales:

MESSAGE #P21230 PERF THROUGH CARBON NOT ALLOWED.
      21.2.4. Update MFG PLAN: 1 RT. ANGLE PERF.
   21.3. PARALLEL
      21.3.1. For each ply:
      21.3.2. Up to 4 PARALLEL perfs per ply. If there are more than 4, set flag for review by Plant:

MESSAGE: #P21231 ONLY 4 PARALLEL PERFS ALLOWED
    21.3.3. Only one PARALLEL PERF is allowed through the carbon.
    If there is more than one, set flag for review by Sales:
MESSAGE #P21330 ONLY ONE PERF THROUGH CARBON ALLOWED
    21.3.4. Update MFG PLAN: 1 PARALLEL PERF.
  21.4. DIAGONAL PERFS
    21.4.1. If any perf orientation=diagonal, set exception for CSR:
  MESSAGE #P21410 DIAGONAL PERFS NOT AVAIL. ON LIMITED
22. CHECK PRESS PUNCHES
  If there are any carbons, and there are any punches through all parts and carbons, see: SECONDARY OPERATIONS above.
  22.1. The system will check to see if the Punches are available for this Product.
    22.1.2. If not found, set flag for review by Sales:
  MESSAGE #P22005 PUNCHES NOT AVAILABLE FOR PRODUCT
  22.2. If the punches are located in the Stub area, go to Rule #9—SECONDARY PUNCHES.
  22.3. Number of Punches
    22.3.1. If the Form Width=3⅔", only one punch is allowed. If there is more than one go to Rule #9—SECONDARY PUNCHES.
    22.3.2. If the Form Width=8½", 5 holes are allowed in the same Vertical Plane (Parallel to the Stub) or the same Horizontal Plane (right angle to the stub).
      22.3.2.1. If the plane is parallel to the stub, the holes must be 1⅜" Center to Center
      If the plane is at right angles to the stub, the holes must be 2⅛" Center to Center
      22.3.2.2. Holes must be ⅜" from edge of form—top or bottom
      22.3.2.3. All holes must be in the same plane, parallel to the stub.
      22.3.2.4. If any of the above are false, set flag for Sales:
    22.3.3. Up to 3 holes are allowed for other Widths. If there are more than 3 holes, go to Rule #9—SECONDARY PUNCHES.
      22.3.3.1. The minimum distance Center to Center= 2½". If not, got to Rule #9—SECONDARY PUNCHES.
    22.3.4. If there are more than 3 holes, go to Rule #9—SECONDARY PUNCHES.
    22.3.5. If 2-hole, 3-hole or 5-hole punch has been selected, and there is any other punch on the form, go to Rule #9—SECONDARY PUNCHES.
27. DETERMINE NUMBER WIDE
  27.1. All Limited Zipsets are 1 wide.
41. Carbon
  41.1 If there is Face-up Carbon, set exception for CSR:
  MESSAGE #P41100 FACE UP CARBON NOT AVAILABLE ON LIMITED
  41.2. The minimum carbon dimension—perpendicular to the stub is 3½". If less, set exception for CSR:
  MESSAGE #P41200 CARBON TOO SHORT FOR LIMITED
  41.3. If there is featheredge carbon, and the featheredge is not ½" or ¼", set exception for the CSR:
  MESSAGE #P41300 FEATHEREDGE LENGTH NOT AVAILABLE ON LIMITED
  41.4. If there is more than one parallel perforation on the carbon, set exception for CSR:
  MESSAGE #P41400 ONLY ONE VERTICAL PERF ON CARBON ALLOWED ON LIMITED
47. LOCKUP
  47.1. For each color of printing there must be a clear area (NO PRINTING) across the form width, equal to or greater than 2/10"
  47.2. This area must be at the top and the bottom of the form.
  47.3. If there is sufficient LOCKUP, skip the balance of rule #47.
  47.4. If there is not sufficient area for LOCKUP on any plate on the proposal, set flag for the CSR:
  MESSAGE #P47400 INSUFFICIENT LOCKUP FOR LIMITED
56. NON-LITHO PRINTING
  56.1. If any non-litho printing features are on the order, the ink for the Non-Litho printing must be WARM RED.
  The Non-litho features are: TITLES, DISTINGUISHING FIGURES, STOCK PHRASES, PRESS CONSECUTIVE NUMBERS.
  56.2. If any other ink is selected for non-litho printing, set exception for CSR:
  MESSAGE #P56200 ONLY WARM RED INK IS ALLOWED FOR NON-LITHO PRINTING
    56.2.1. Discontinue Validation Continuous Singles Validation Rules The following rules are processed for Continuous Singles products: 9. Punches—Secondary; 10. Affix Label; 19. Ks Removal; 20. Consecutive Numbers; 21. Check Press Perfs; 22. Check Press Punches; 31. Press Delivery; 36. Pantographs; 49. MICR; and 50. Home Plant Assignment; 51. Security Features; 56. Non-Litho Printing. The functionality of each of these rules may be illustrated as follows (any rules not expressly illustrated below have been described elsewhere in the specification):

9. PUNCHES—COLLATOR/SECONDARY: The system will check the proposal to see if there are any punches. The following edits are to be used only if the punches are through all parts and carbons. If there are no punches, or if any punches are not through all parts and carbons, skip Rule 9 (see below: PUNCHES—PRESS)
  9.1. The system will compare the TYPE of punches on the PROPOSAL with the Data File: PUNCHES—TYPE
    9.1.1. For acceptable values SEE: PUNCHES—PRODUCT—TYPE—COLLATOR (06-28-1)
    9.1.2. If found, update ORDER SPECS—COLLATING—PUNCH-1=X (One punch unit required). If not found, set flag for review by the plant.
  MESSAGE #P09137 PUNCH TYPE NOT AVAIL
  9.2 The system will compare the SIZE of punches on the PROPOSAL with the Data File: PUNCHES—SIZE
    9.2.1. For acceptable values SEE: PUNCHES—PRODUCT—SIZE—COLLATOR (06-28-1)
    9.2.2. If found, update ORDER SPECS—COLLATING—PUNCH-1=X (One punch unit required). If not found set flag for review by the Plant.
  MESSAGE #P09220 PUNCH SIZE NOT AVAIL
  9.3. If there is more than one punch, and they are not in the same horizontal plane then the distance between the first and second horizontal planes must be equal to ½ FOLD LENGTH. If not, set flag for review by the Plant.

MESSAGE #P09300 PUNCHES—HORIZONTAL LOCATION 9.4. If there is more than one punch, and they are not in the same vertical plane, then each vertical plane must be at least PUNCHES—CCVERT apart. If not, update ORDER SPECS—COLLATING—PUNCH-2=X (two punch units required.)

10. AFFIX LABEL
   10.1. The system will check the Proposal to see if AFFIX LABEL is indicated. If not, skip Rule #10.
   10.2. The following must be available:
      10.2.1. A window on the form F3 file indicating "AFFIX LABEL". This window is to show the size and location of the label.
         10.2.1.1. If there is more than one AFFIXED LABEL on a copy, all the "WINDOWS" must be indicated on the F3 file.
      10.2.2. A separate F3 file showing the label itself, with the appropriate text if applicable.
         10.2.2.1. If there is more than one AFFIXED LABEL, and they are not the same, a separate F3 file must be available for each LABEL.
      10.2.3. Form #6347—AFFIX LABEL SPEC SHEET.
      If any of the above is not available, set flag for review by the Sales Rep.

MESSAGE #843 SPECS FOR AFFIXED LABEL 10.3. The system will compare the label specifications on the proposal with the specifications in the Data File: LABEL AFFIX.
      10.3.1. Select LABEL AFFIX ID: LAB001
         10.3.1.1. If the label is circular, skip to rule #10.3.7.
      10.3.2. If the width of the label is less than MINWIDTH, set flag for review by the Plant MESSAGE #VL 195 AFFIX LABEL—WIDTH
      10.3.3. If the width of the label is greater than MAXWIDTH, set flag for review by the Plant MESSAGE #VL195 AFFIX LABEL—WIDTH
      10.3.4. If the depth of the label is less than MINDEPTH, set flag for review by the Plant MESSAGE #VL196 AFFIX LABEL—DEPTH
      10.3.5. If the depth of the label is greater than MAXDEPTH, set flag for review by the Plant MESSAGE #VL196 AFFIX LABEL—DEPTH
      10.3.6. If the ration of width to length is greater than RATIO, set flag for review by the Plant.

MESSAGE #VL198 AFFIX LABEL—RATIO
      10.3.6.1. Skip Rule #10.3.7. and 10.3.8.
      10.3.7. If the label diameter is less than MINDIAM, set flag for review by the Plant.

MESSAGE #VL197 AFFIX LABEL—DIAMETER
      10.3.8. If the label diameter is greater than MAXDIAM, set flag for review by the Plant.

MESSAGE #VL197 AFFIX LABEL—DIAMETER
      10.3.9. If the edge of the label is less than MINEDGE from the edge of the form, set flag for review by the Plant.

MESSAGE #VL199 AFFIX LABEL—LOCATION
      10.3.10. If the edge of the label is less than MINPERF from any perforation on the form, set flag for review by the Plant.

MESSAGE #VL199 AFFIX LABEL—LOCATION
      10.3.11. If the edge of the label is less than MINPERF from any file hole on the form, set flag for review by the Plant.

MESSAGE #VL199 AFFIX LABEL—LOCATION
      10.3.12. If the edge of the label is less than MINSEPAR from any other label on the form, set flag for review by the Plant.

MESSAGE #VL199 AFFIX LABEL—LOCATION
      10.3.13. If the basis weight of the form to which the label is affixed is less than MINWGT, set flag for review by the Plant.

MESSAGE #VL200 AFFIX LABEL—PAPER WGT
      10.3.14. If the form width (not the label) is less than MINFORMWID, set flag for review by the Plant.

MESSAGE #VL201 AFFIX LABEL—FORM WIDTH
      10.3.15. If the form width (not the label) is greater than MAXFORMWID, set flag for review by the Plant.

MESSAGE #VL201 AFFIX LABEL—FORM WIDTH
      10.3.16. If the form length (not the label) is less than MINFORMLEN, set flag for review by the Plant.

MESSAGE #VL202 AFFIX LABEL—FORM LENGTH
      10.3.17. If the form length (not the label) is greater than the MAXFORMLEN, set flag for review by the Plant.

MESSAGE #VL202 AFFIX LABEL—FORM LENGTH
      10.3.18. If the fold length for the form (not the label) is less than MINFLDLEN, set flag for review by the Plant.

MESSAGE #VL203 AFFIX LABEL—FOLD LENGTH
   10.4. Update ORDER SPECS—SECOPS—AFFIX=X
   10.5. The system will cross reference the Proposal for the Forms with the Proposal for the Labels.
      10.5.1. Update ORDER SPECS—AFFIX LABEL REF: (reference code or name.)

19. KS REMOVAL
   19.1. The system will check the Proposal for KS REMOVAL feature. If this feature is not on the Proposal, skip rule 19.
   19.2. The system will compare the BASIS WEIGHT of the paper (and carbons) on the Proposal with the Data File: KS REMOVAL—MAXSET. If the total weight is greater than MAXSET, set flag for review by the Plant.

MESSAGE#157
   19.3 The system will compare the location of the KS REMOVAL stub on the Proposal with the Data File: KS REMOVAL—MINSTUB. If the KS REMOVAL stub is less than MINSUB, set a flag for review by the Plant.
   19.4. If the Proposal is marked for KS REMOVAL on both sides, the system will set a flag for review by the Plant.

MESSAGE #158
   19.5. Update Order Specs: KS—REMOVAL

20. CHECK CONSECUTIVE NUMBERS
   20.1. The system will check the Proposal to see if there are consecutive numbers. If there are no consecutive numbers, skip edit 20.
      20.1.1. MICR
         If there are MICR numbers, either alone or in combination with some other type of numbering, do the validation for the appropriate numbers below, and then validate MICR numbers separately: Rule #49

20.2. The system will check the REORDER TYPE:
  20.2.1. EXACT REORDER:
    20.2.1.1. If there are changes to any of the following: Go to Rule #20.3.
    CONSECUTIVE NUMBER—NAME
    CONSECUTIVE NUMBER—SIZE
    CONSECUTIVE NUMBER—NUMBER OF CHARACTERS
    CONSECUTIVE NUMBER—TYPE FACE
    CONSECUTIVE NUMBER—CHECK DIGIT
    20.2.1.2. If no starting consecutive number has been entered, and there was only one destination on the previous order, the system will add 1 to the ending number of the previous order, and use this as the starting number for the current order. Set a flag for review by the Sales Rep.
  MESSAGE #P20212 VERIFY STARTING NUMBER
        20.2.1.2.1. If the current order has more than one destination, or has number resets, the starting consecutive number must be entered for each destination and/or number reset.
    20.2.1.3. If a starting consecutive number has been entered, and the new starting number is lower than the ending number of the previous order, set a flag for review by the Sales Rep.
  MESSAGE #P20213 VERIFY STARTING NUMBER
    20.2.1.4. If there are no changes to the above skip Rule #20 until after Rule #50—HOME PLANT ASSIGNMENT.
    20.2.1.5. If the HOME PLANT=PREVIOUS PLANT, skip Rule #20.
    20.2.1.6. If the HOME PLANT does not equal the PREVIOUS PLANT, continue at Rule #20.3.
  20.2.2. REORDER WITH CHANGE:
    20.2.2.1. If there are changes to any of the above fields, and/or changes to the F3—CONSECUTIVE NUMBER AREA, such as:
    LOCATION OF CONSECUTIVE NUMBER
    DIRECTION OF NUMBER
    Go to Rule #20.3.
    20.2.2.2. If no starting consecutive number has been entered, and there was only one destination on the previous order, the system will add 1 to the ending number of the previous order, and use this as the starting number for the current order. Set a flag for review by the Sales Rep.
  MESSAGE #P20222 VERIFY STARTING NUMBER
    If a starting consecutive number has been entered, and the new starting number is lower than the ending number of the previous order, set a flag for review by the Sales Rep.
  MESSAGE #P20222 VERIFY STARTING NUMBER
    20.2.2.3. If there are no changes to the elements listed in rule #20.2.1.1., and there are no changes to the F3—CONSECUTIVE NUMBER AREA, skip Rule #20 until after Rule #50—HOME PLANT ASSIGNMENT.
    20.2.2.4. If the HOME PLANT does not equal the PREVIOUS PLANT, continue at Rule #20.3.
  20.2.3. REFERENCE ORDER: continue at 20.3.
  20.2.4. NEW ORDER: continue at 20.3.
20.3. If there are consecutive numbers, check the Proposal to see if the
  Consecutive Numbers are marked:
    PRESS See rule: 20.4

PRESS NUMBERS
  20.4. Check the file: CONSNOS to see if the flag: PRESS is on for:
    20.4.1 NAME If PRESS not on, set flag for review by the Plant
  MESSAGE #P20410 PRESS NOS NOT AVAILABLE
  For the following edits, check only those elements in the CONSNOS file that have PRESS turned on.
    20.4.2. FRMLEN If the form length is not available for the selected NAME, set flag for review by the plant
  MESSAGE #P20421 PRESS NOS—FORM LENGTH
    20.4.3. TYPE FACE If the TYPE FACE is not available for the selected NAME, set flag for review by the plant.
  MESSAGE #P20431 PRESS NOS—TYPE FACE
    20.4.4. NUMBER OF CHARACTERS
      The system will add the Proposal Quantity to the Starting Consecutive Number to determine the minimum number of digits required in the Consecutive Number.
      The number of digits in the consecutive number must be=<MAX CHAR. If not, set flag for review by the plant.
  MESSAGE #P20442 TOO MANY DIGITS IN CONSEC NOS
    20.4.5. NAME SIZE If the NAME SIZE is not available for the selected NAME, set flag for review by the plant.
  MESSAGE #P20451 PRESS NOS—SIZE
    The system will check the Proposal to see how many consecutive numbers are on one form:
      One Number See Rule 20.4.5.1
      Two Numbers See Rule 20.4.5.2.
      More than two See Rule 20.4.5.3.
    20.4.5.1. ONE NUMBER PER FORM
        20.4.5.1.1. The orientation of the number (Regular, Right Angle, etc. will be part of the NAME, and does not have to be validated.
        20.4.5.1.2. The system will check the location of the Consecutive Number:
        Distance from the top of the form must be =<MINTOP
        Distance from the left edge must be =<MINLEFT.
      Distance from the right edge must be =<MINRIGHT.
        If ALL of above are true, ORDER SPECS—PRESS—NUMBERS=1 and ORDER SPECS—PRESS FEATURES=NUMBERS—TYPE
        If not, set flag for review by the Plant:
  MESSAGE #P20452 LOCATION OF CONS. NOS.
    20.4.5.2. TWO NUMBERS PER FORM
      Validate all of above, and
        20.4.5.2.1. The system will check the distance between the Consecutive numbers:
        HORIZONTAL SEPARATION=0, or >MINHORIZ ORDER SPECS—PRESS—NUMBERS=1 Unit
        HORIZONTAL SEPARATION>0 AND <MINHORIZ ORDER SPECS—PRESS—NUMBERS=2 Units
        VERTICAL—SEPARATION=0, or >MINVERT, ORDER SPECS—PRESS—NUMBERS=1 Unit
        VERTICAL—SEPARATION>0 and <MINVERT, ORDER SPECS—PRESS—NUMBERS=2 Units 20.4.5.2.2. If the PROPOSAL has more than one TYPE, ORDER SPECS—PRESS—NUMBERS=2 Units 20.4.5.2.3. If the PROPOSAL has more than one size, ORDER SPECS—PRESS—NUMBERS=2 Units 20.4.5.2.4. If the PROPOSAL has more than one NUMBERING INK, ORDER SPECS—PRESS—NUMBERS=2 Units 20.4.5.2.5. If the PROPOSAL has more than one starting CONSEC NUMBER, set flag for review by the Plant.

MESSAGE #P20455 MORE THAN ONE STARTING NUMBER 20.4.5.2.6. If any of the above edits cause 2 UNITS, set flag for review by the Plant.

MESSAGE #P20456 TWO NUMBER UNITS REQUIRED 20.4.5.3. MORE THAN TWO NUMBERS/FORM
If the PROPOSAL has more than two consecutive numbers, Set flag for review by the Plant

MESSAGE #P20453 MORE THAN 2 CONSEC. NUMBERS

21. CHECK PRESS PERFS
21.1. If there are no perfs on the form, skip Rule #21
21.2. Compare each perforation with the Feature Type to assure that the perf is available for the Product and Process.
21.2.1. If not, set flag for review by Engineering
MESSAGE #P21210 INVALID PERF FOR PRODUCT
21.3. DIAGONAL PERF
21.3.1. If the perf TYPE is DIAG, update ORDER SPECS—PRESS FEATURES—DIAG=X
21.4. If there is more than one type (Feature List) of HORIZ PERF on the proposal, the following rules must be run for each type (e.g. Letteredge, Standard, Score, etc.)
21.5. LETTEREDGE
21.5.1. If the FEATURE LIST=LETTEREDGE, assure that the PAPER for this ply is approved for LETTEREDGE PERF.
21.5.1.1. If not, exception for Engineering:
MESSAGE#P21511 APPROVE LETTEREDGE PAPER
21.6 STANDARD
21.6.1. HORIZONTAL PERFS
21.6.1.1. If the distance between HORIZ PERFS is an even multiple of PRSLENGTH, update ORDER SPECS—PRESS FEATURES—HORIZ=1
21.6.1.2. Determine the maximum number of Horizontal Perfs for one unit:
(Cylinder)/(Press Size)*2
21.6.1.3. If the number of HORIZ perfs exceeds the maximum number, update ORDER SPECS—PRESS FEATURES—HORIZ=2
21.6.1.4. If the distance between HORIZ PERFS is not an even multiple of PRSLENGTH, ORDER SPECS—PRESS FEATURES—HORIZ=2
21.6.2 If the total number of perfs exceeds the "maximum number of Horizontal Perfs*2 (see 21.6.1.2.) set flag for review by the Plant
MESSAGE: #P21620 APPROVE HORIZONTAL PERFS.
21.7. VERTICAL
21.7.1. If there are no Vertical Perfs on the Proposal, skip Rule #21.7.
21.7.2. If there is more than one type of VERT PERF on the proposal, each TYPE must be checked.
21.7.3. If there is more than one PERF, the distance between the perfs must be equal or greater than PERFORATIONS—V-PERF NAME—MINDIST. If not, set flag for review by the Plant.
MESSAGE #P21730 APPROVE PERFS
21.7.4. If there is more than one PERF, the number of perfs must be equal to or less than PERFORATIONS-V-PERF NAME-MAXNO. If not, set flag for review by the Plant.
MESSAGE #P21740 APPROVE PERFS 22. CHECK PRESS PUNCHES
22.1. The system will check the Punches to see if they are available for the Product. If not, set flag for review by the Plant.
MESSAGE #P22101 APPROVE PUNCHES
22.2. The system will check to see if the Punches are available on the Press. If not, the validation will have to be processed in Rule #9—PUNCHES.
22.4. If there is more than one punch, and they are not in the same horizontal plane then the second horizontal plane must be ½ FOLD LENGTH from the first.
22.4.1. If there is more than one punch, and they are not in the same vertical plane, then each vertical plane must be at least 2⅞" apart.
If not, ORDER SPECS–PRESS–PUNCHES=2

31. PRESS DELIVERY
31.1. The system will check ORDER SPECS-COLLATING-TAPE. If X, update ORDER SPECS-PRESS-DELIVERY=ROLL
31.2. If ORDER SPECS-COLLATING-TAPE is not X, update ORDER SPECS-PRESS-DELIVERY=FOLD 36. PANTOGRAPHS
36.1. Pantographs may be selected only from the Data File: Pantographs.
36.2. If a pantograph is selected, the system will request the INK NUMBER for the Pantograph.
36.3. The system will request the % of screen for the Pantograph.
36.4. The system will request the angle of the Pantograph.
36.5. If any of the above are missing, the screen cannot be completed.

49. MICR
A form may have MICR repetitive and/or MICR consecutive numbers. In either event, any proposal that specifies MICR must be processed through this validation.
49.1. ORDER TYPE
49.1.2. The system will check the REORDER TYPE, and execute the validation rules depending on the TYPE:
49.1.2.1. EXACT REORDER: Rule #49.3. PAPER
49.1.2.2. REORDER W/CHANGE: All rules
49.1.2.3. NEW ORDER: All rules
49.1.2.4. REFERENCE: All rules
49.2. FORM SIZE:
49.2.1. Minimum form width: 6"
49.2.2. Minimum form length: 2¾"
49.2.6. If any of the above edits fail, set flag for review by the Sales Rep.
MESSAGE #VL848 FORM SIZE—MICR
49.3. PAPER
49.3.1. Any paper with MICR must be approved for MICR. See Data File: PAPER-MICR 49.3.2. Minimum Basis Wgt: 24#
49.3.3. If any paper is not OK for MICR, set flag for review by ENGR.
MESSAGE #VL039 APPROVE PAPER FOR MICR
49.4. INK
  49.4.1. Ink for MICR printing must be approved for MICR. See Data File: INK-MICR
  49.4.2. If any INK is not OK for MICR, set flag for review by ENGR
MESSAGE #VL040 APPROVE INK FOR MICR
49.5. CLEAR BAND
  49.5.1. An area, ⅝" deep, and extending ¼" to the left edge of the form must be free of all other MICR ink.
    49.5.1.1. Printing in other inks—not MICR—may appear in this clear band. If any other ink is in this area, the system will check the Data File: INK-MICR to assure that the ink is not approved for MICR.
  49.5.2. If not true, set flag for review by the Sales Rep.
MESSAGE #VL849 MICR CLEAR BAND NOT CLEAR
49.6. MICR AREA
  49.6.1. All MICR printing must be located within an area ½" deep, and parallel to the bottom edge of the form.
  49.6.2. The bottom edge of the MICR characters must be 3/16" from and parallel to the bottom of the form.
  49.6.3. If the above is not true, set flag for review by the Sales Rep.
MESSAGE #VL850 MICR PRINTING OUTSIDE MICR AREA
49.7. CONSTRUCTION
  49.7.1. The form must have a slit or a KS-REMOVAL perf to the right of the MICR area.
  49.7.2. If the KS-REMOVAL perf is not specified for the right side, set flag for review by the Sales Rep.
MESSAGE #VL851 KS REMOVAL REQUIRED ON RIGHT
50. HOME PLANT ASSIGNMENT
  50.1. MFG PLAN: COLLATING PUNCH:
    50.1.1. If there is a value in COLLATING—PUNCH, and the HOME PLANT is not DAY, change the HOME PLANT to DAY.
  50.2. FORM LENGTH
    50.9.2.1. If the HOME PLANT is FAY, and the form length is 3¼", change the HOME PLANT to MFG.
  50.3. UNION BUG
    50.3.1. If there is a Union bug, the HOME PLANT must be FAY.
  50.4. If there is TRANSFER TAPE on the order, and the HOME PLANT is DAY, change MFG PLAN—PRESS-DELIVERY to FOLD.

Limited Continuous Singles Validation Rules

The following rules are processed for Limited Continuous Singles products: 1. Check Form Length; 2. Check Form Width; 6. Quantity; 20. Consecutive Numbers; 21. Check Press Perfs; 22. Check Press Punches; 31. Press Delivery; 34. Paper Specs; 47. Lockup; 49. MICR; 50. Home Plant Assignment; 55. Ink; and, 56. Non-Litho Printing. The functionality of each of these rules may be illustrated as follows (any rules not expressly illustrated below have been described elsewhere in the specification):

6. QUANTITY
  6.1. MAXIMUM QUANTITY
    SAME AS STANSET-LIMITED
20. CONSECUTIVE NUMBERS
  20.1. The system will check the Proposal to see if there are consecutive numbers. If there are no consecutive numbers, skip edit 20.
  20.2. The system will check the REORDER TYPE:
    20.2.1. If no starting consecutive number has been entered, and there was only one destination on the previous order, the system will add 1 to the ending number of the previous order, and use this as the starting number for the current order. Set a flag for review by the Sales Rep.
MESSAGE #P20817 VERIFY STARTING NUMBER
    20.2.2. If the current order has more than one destination, or has number resets, the starting consecutive number must be entered for each destination and/or number reset.
    20.2.3. If a starting consecutive number has been entered, and the new starting number is lower than the ending number of the previous order, set a flag for review by the Sales Rep.
MESSAGE #P20817 VERIFY STARTING NUMBER
  20.2. If there are consecutive numbers, check the Proposal to see if the Consecutive Numbers are marked:
    PRESS See rule: 20.3
    COPYSAFE See rule: 20.4
PRESS NUMBERS
  20.3. Check the file: CONSNOS to see if the flag: PRESS is on for:
    20.3.1 NAME If PRESS not on, set exception for CSR
MESSAGE #P20145 CONS. NOS. NOT AVAILABLE FOR PRODUCT
For the following edits, check only those elements in the CONSNOS file that have PRESS turned on.
    20.3.2. FRMLEN If the form length is not available for the selected NAME, set exception for CSR
MESSAGE #P20145 CONS. NOS. NOT AVAILABLE FOR PRODUCT
    20.3.3. TYPE FACE If the TYPE FACE is not available for the selected NAME, set exception for CSR
MESSAGE #P20145 CONS. NOS. NOT AVAILABLE FOR PRODUCT
    20.3.4. NUMBER OF CHARACTERS
      The system will add the Proposal Quantity to the Starting Consecutive Number to determine the minimum number of digits required in the Consecutive Number.
      The number of digits in the consecutive number must be =<MAX CHAR. If not, set exception for CSR:
MESSAGE #P20145 CONS. NOS. NOT AVAILABLE FOR PRODUCT
    20.3.5. NAME SIZE If the NAME SIZE is not available for the selected NAME, set exception for CSR
MESSAGE #P20145 CONS. NOS. NOT AVAILABLE FOR PRODUCT
The system will check the Proposal to see how many consecutive numbers are on one form:

| One Number | See Rule 20.3.5.1 |
|---|---|
| Two Numbers | See Rule 20.3.5.2. |
| More than two | See Rule 20.3.5.3. |

20.3.5.1. ONE NUMBER PER FORM
  20.3.5.1.1. The orientation of the number (Regular, Right Angle, etc. will be part of the NAME, and does not have to be validated.

20.3.5.1.2. The system will check the location of the Consecutive Number:
Distance from the top of the form must be =<MINTOP
Distance from the left edge must be =<MINLEFT.
Distance from the right edge must be =<MINRIGHT.
If ALL of above are true, ORDER SPECS–PRESS–NUMBERS=1 and ORDER SPECS–PRESS FEATURES=NUMBERS–TYPE
If not, set flag for review by the Plant:
MESSAGE #P20150 LOCATION OF CONS. NOS.
  20.3.5.2. TWO NUMBERS PER FORM
    Validate all of above, and
    20.3.5.2.1. The system will check the distance between the Consecutive numbers:
    HORIZONTAL SEPARATION=0, or >MINHORIZ ORDER SPECS–PRESS–NUMBERS=1 Unit
    VERTICAL-SEPARATION=0, or >MINVERT, ORDER SPECS–PRESS–NUMBERS=1 Unit
    If not, set exception for CSR:
MESSAGE #P20150 LOCATION OF CONS. NOS.
  20.3.5.2.2. If the PROPOSAL has any of the following:
    More than one TYPE
    More than one size
    More than one NUMBERING INK
    More than two NUMBERS/FORM
    Set exception for CSR
MESSAGE #P20145 CONS. NOS. NOT AVAILABLE FOR PRODUCT COPYSAFE NUMBERS
20.4. Copysafe numbers are not available on Singles. If selected, set exception for CSR:
MESSAGE #P20145 CONS. NOS. NOT AVAILABLE FOR PRODUCT MICR NUMBERS
20.5. MICR Numbers are not available on this product. If selected, set exception for CSR:
MESSAGE #P20145 CONS. NOS. NOT AVAILABLE FOR PRODUCT MOD CHECK DIGIT
20.6. Data entry will request if the Consecutive Numbers have a Check Digit.
  20.6.1. The there is no check digit, skip rule #20.6.
  20.6.2. If there is a check digit, Data Entry will request the following:
    20.6.2.1. Identification of the Modulous System (Data Entry will display a list of the MOD Check Digits that are available)
    20.6.2.2. Data Entry will request: "Is this form an exact reorder of the previous order, and the MOD Check Digit calculation the same as the previous order?
      20.6.2.2.1. If the response is YES, skip the balance of rule 20.6.
      20.6.2.2.2. If the response is NO, continue to the next edit: 20.6.2.3.
    20.6.2.3. Data Entry will request a sample calculation. This will be a free-form field with sufficient room to show the calculations.
    20.6.2.4. The sample calculation must be printed as part of the ORDER FORM at the plant.
21. CHECK PRESS PERFS
NOTE: Use rule #21 CHECK PRESS PERFS from LIMITED STANSET VALIDATION except do not run:

21.4. LETTEREDGE PERFS
22. CHECK PRESS PUNCHES
NOTE: Use rule #22. CHECK PRESS PUNCHES, except do not run the two instructions immediately below:
  If punches are not through all parts and carbons, use the edits below.
  If any punches are through all parts and carbons, see: SECONDARY OPERATIONS above.
31. PRESS DELIVERY
  31.1. Update ORDER SPECS: PRESS DELIVERY= FOLD Limited Continuous Singles Validation Rules (with MICR)

The following rules are processed for Limited Continuous Singles products with MICR ink: 1. Check Form Length (see rule for Limited Continuous Singles—no MICR); 2. Check Form Width (see rule for Limited Continuous Singles—No MICR); 3. Check Ply; 6. Quantity (see rule for Limited Stanset With MICR); 20. Consecutive Numbers; 34. Paper Specs (see rule for Limited Stanset With MICR); and 49. MICR. The Following Rules May Also Be Processed: 21. Check Press Perfs; 22. Check Press Punches; 50. Home Plant Assignment; 31. Press Delivery; 41. Carbon; 47. Lockup; and, 56. Non-Litho Printing. The functionality of each of these rules may be illustrated as follows (any rules not expressly illustrated below have been described elsewhere in the specification):
20. CONSECUTIVE NUMBERS
  20.1. The system will check the Proposal to see if there are consecutive numbers. If there are no consecutive numbers, skip edit 20.
  20.2. If there are consecutive numbers, check the Proposal to see if the Consecutive Numbers are marked:

| PRESS | See rule: 20.3 |
|---|---|
| COPYSAFE | See rule: 20.4 |

PRESS NUMBERS
  Press Numbering is not available on this product, but to enable the Pricing Engine to price the order correctly, Validation will allow the selection of PRESS NUMBERS, but will use the rules for COPYSAFE NUMBERS.
  20.3. If Press Numbering is selected, use the following rules for COPY SAFE NUMBERING.
COPYSAFE NUMBERS
  20.4.0. Check the file: CONSNOS to see if the flag: SECONDARY is on for:
    20.4.1. NAME If SECONDARY is not on, set flag for review by CSR
MESSAGE #P20002 CONSEC. NOS. NOT AVAILABLE FOR PROD.
For the following edits, check only those elements in the CONSNOS file that have SECONDARY turned on.
    20.4.2. FRMLEN If the form length is not available for the selected NAME, set exception for CSR
MESSAGE #P20002 CONSEC. NOS. NOT AVAILABLE FOR PROD.
    20.4.3. TYPE FACE If the TYPE FACE is not available for the selected NAME, set exception for CSR:
MESSAGE #P20002 CONSEC. NOS. NOT AVAILABLE FOR PROD.
    20.4.4. NUMBER OF CHARACTERS The system will use the Proposal Quantity to determine the minimum number of digits required in the Consecutive Number. The number of digits in the consecutive number must be =<MAXCHAR. If not, set exception for CSR

MESSAGE #P20002 CONSEC. NOS. NOT AVAILABLE FOR PROD.

20.4.4.1. The number of digits in the consecutive number must be at least 5. If not, set exception for CSR:

MESSAGE #P20829 MINIMUM 5 DIGITS IN COPYSAFE NUMBERS 20.4.5. NAME SIZE If the NAME SIZE is not available for the selected name, set exception for CSR

MESSAGE #P20156 COPYSAFE NOS—SIZE

The system will check the Proposal to see how many consecutive number are on one form:

| One Number | See Rule: 20.4.5.1. |
| Two Numbers | See Rule: 20.4.5.2. |
| More than two | See Rule: 20.4.5.3. |

20.4.5.1. ONE NUMBER PER FORM
20.4.5.1.1. The orientation of the number (Regular, Right Angle, etc. will be part of the NAME, and does not have to be validated.
20.4.5.1.2. Update MFG. PLAN—CONS. NOS. on NALE 20.4.5.2. TWO NUMBERS PER FORM
Validate all of above, and
20.4.5.2.2. If the PROPOSAL has more than one TYPE, excluding MICR, set exception for CSR:

MESSAGE #P20002 CONS NOS NOT AVAILABLE FOR LIMITED 20.4.5.2.4. If the PROPOSAL has more than one NUMBERING INK, excluding MICR, set exception for CSR:

MESSAGE #P20002 CONS NOS NOT AVAILABLE FOR LIMITED 20.4.5.2.5. If the PROPOSAL has more than one starting CONSEC NUMBERS on any ply, set exception for CSR:

MESSAGE #P20002 CONS NOS NOT AVAILABLE FOR LIMITED 20.4.5.4. MORE THAN TWO NUMBERS/FORM
If the PROPOSAL has more than two consecutive numbers, excluding MICR on any ply, set exception for CSR:

MESSAGE #P20002 CONS NOS NOT AVAILABLE FOR LIMITED MICR NUMBERS 20.5. If there are MICR NUMBERS (Repetitive and/or Consecutive) see Rule #49.

MOD CHECK DIGIT
20.6. Data entry will request if the Consecutive Numbers have a Check Digit.
20.6.1. The there is no check digit, skip rule #20.6.
20.6.2. If there is a check digit, Data Entry will request the following:
20.6.2.1. Identification of the Modulous System (Data Entry will display a list of the MOD Check Digits that are available)
20.6.2.2. Data Entry will request: "Is this form an exact reorder of the previous order, and the MOD Check Digit calculation the same as the previous order?
20.6.2.2.1. If the response is YES, skip the balance of rule 20.6.
20.6.2.2.2. If the response is NO, continue to the next edit: 20.6.2.3.
20.6.2.3. Data Entry will request a sample calculation. This will be a free-form field with sufficient room to show the calculations.
20.6.2.4. The sample calculation must be printed as part of the ORDER FORM at the plant.

Sheeted Singles Validation Rules

The following rules are processed for Sheeted Singles: 5. Secondary Equipment; 8. Polywrap; 10. Affix Label; 14. Booking; 15. Gum Pad; 20. Consecutive Numbers; 21. Check Press Perfs; 22. Check Press Punches; 23. Packaging (optional); 31. Press Delivery; and, 52. Palletizing. For the purposes of this validation, sheeted singles are forms that will be delivered from the press in sheets. One-ply Forms that are delivered from the press in continuous strips, for subsequent operations, will be validated as singles. The sheeted singles product will be split into two products: standard sheeted singles and laser sheeted singles. Since most of the rules will be applicable to both products, only one set of rules will be developed, but each rule will stipulate standard or laser where applicable. The distinction between the two products is necessary because many of the values contained in the Data Files will be different depending on the type of sheeted singles product. The functionality of each of these rules may be illustrated as follows (any rules not expressly illustrated below have been described elsewhere in the specification):

5. CHECK SECONDARY EQUIPMENT
STANDARD
5.2. CONSECUTIVE NUMBER IN STACK
5.2.1. If there are no consecutive numbers on the forms, skip this rule.
5.2.1.1. If the CSR has note indicated TOP or BOTTOM for the Consecutive Numbers in a stack, set exception for the CSR MESSAGE #P05210 HIGH NUMBERS ON TOP or BOTTOM?

5.2.1.2. Update ORDER SPECS: USAGE–NUMBERS=(HIGH NUMBERS ON TOP or HIGH NUMBERS ON BOTTOM)

LASER
5.1. SIMPLEX of DUPLEX
5.1.1. The system will ask the Sales Rep if the form are SIMPLEX or DUPLEX. This will require a response.
5.1.2. Update ORDER SPECS: USAGE–IMAGING=(SIMPLEX or DUPLEX)

8. POLYWRAP
STANDARD
8.1. CHIPBOARD. The DATA ENTRY process will request if there are to be chipboards on TOP and/or BOTTOM.
8.6.1. If there are to be chipboards, add one or both of the following messages to the order:

MESSAGE #C08509 CHIPBOARD ON TOP
MESSAGE #C08510 CHIPBOARD ON BOTTOM

LASER
8.2. CHIPBOARD. The system will add both messages to the order:

MESSAGE #C08509 CHIPBOARD ON TOP
MESSAGE #C08510 CHIPBOARD ON BOTTOM

10. AFFIX LABEL
- 10.1. The system will check the Proposal to see if AFFIX LABEL is indicated. If not, skip Rule #10.
- 10.2. The following must be available:
  - 10.2.1. A window on the form F3 file indicating "AFFIX LABEL". This window is to show the size and location of the label.
    - 10.2.1.1. If there is more than one AFFIXED LABEL on a copy, all the 'WINDOWS' must be indicated on the F3 file.
  - 10.2.2. A separate F3 file showing the label itself, with the appropriate text if applicable.
    - 10.2.2.1. If there is more than one AFFIXED LABEL, and they are not the same, a separate F3 file must be available for each LABEL.
  - 10.2.3. Form #6347—AFFIX LABEL SPEC SHEET.

If any of the above is not available, set flag for review by the Sales Rep.

MESSAGE #843 SPECS FOR AFFIXED LABEL
- 10.3. The system will compare the label specifications on the proposal with the specifications in the Data File: LABEL AFFIX.
  - 10.3.1. Select LABEL AFFIX ID: LAB001
    - 10.3.1.1. If the label is circular, skip to rule #10.3.7.
  - 10.3.2. If the width of the label is less than MINWIDTH, set flag for review by the Plant MESSAGE #VL195 AFFIX LABEL—WIDTH
  - 10.3.3. If the width of the label is greater than MAXWIDTH, set flag for review by the Plant MESSAGE #VL195 AFFIX LABEL—WIDTH
  - 10.3.4. If the depth of the label is less than MINDEPTH, set flag for review by the Plant MESSAGE #VL196 AFFIX LABEL—DEPTH
  - 10.3.5. If the depth of the label is greater than MAXDEPTH, set flag for review by the Plant MESSAGE #VL196 AFFIX LABEL—DEPTH
  - 10.3.6. If the ration of width to length is greater than RATIO, set flag for review by the Plant.

MESSAGE #VL198 AFFIX LABEL—RATIO
    - 10.3.6.1. Skip Rule #10.3.7. and 10.3.8.
  - 10.3.7. If the label diameter is less than MINDIAM, set flag for review by the Plant.

MESSAGE #VL197 AFFIX LABEL—DIAMETER
  - 10.3.8. If the label diameter is greater than MAXDIAM, set flag for review by the Plant.

MESSAGE #VL197 AFFIX LABEL—DIAMETER
  - 10.3.9. If the edge of the label is less than MINEDGE from the edge of the form, set flag for review by the Plant.

MESSAGE #VL199 AFFIX LABEL—LOCATION
  - 10.3.10. If the edge of the label is less than MINPERF from any perforation on the form, set flag for review by the Plant.

MESSAGE #VL199 AFFIX LABEL—LOCATION
  - 10.3.11. If the edge of the label is less than MINPERF from any file hole on the form, set flag for review by the Plant.

MESSAGE #VL199 AFFIX LABEL—LOCATION
  - 10.3.12. If the edge of the label is less than MINSEPAR from any other label on the form, set flag for review by the Plant.

MESSAGE #VL199 AFFIX LABEL—LOCATION
  - 10.3.13. If the basis weight of the form to which the label is affixed is less than MINWGT, set flag for review by the Plant.

MESSAGE #VL200 AFFIX LABEL—PAPER WGT
  - 10.3.14. If the form width (not the label) is less than MINFORMWID, set flag for review by the Plant.

MESSAGE #VL201 AFFIX LABEL—FORM WIDTH
  - 10.3.15. If the form width (not the label) is greater than MAXFORMWID, set flag for review by the Plant.

MESSAGE #VL201 AFFIX LABEL—FORM WIDTH
  - 10.3.16. If the form length (not the label) is less than MINFORMLEN, set flag for review by the Plant.

MESSAGE #VL202 AFFIX LABEL—FORM LENGTH
  - 10.3.17. If the form length (not the label) is greater than the MAXFORMLEN, set flag for review by the Plant.

MESSAGE #VL202 AFFIX LABEL—FORM LENGTH
  - 10.3.18. If the fold length for the form (not the label) is less than MINFLDLEN, set flag for review by the Plant.

MESSAGE #VL203 AFFIX LABEL—FOLD LENGTH
- 10.4. Update ORDER SPECS–SECOPS–AFFIX=X
- 10.5. The system will cross reference the Proposal for the Forms with the Proposal for the Labels.
  - 10.5.1. Update ORDER SPECS—AFFIX LABEL REF: (reference code or name.)

14. BOOKING
- 14.1. The system will check the Proposal for BOOKING. If this feature is not on the Proposal, skip rule 14.
- 14.2. The system will compare the STYLE of cover on the proposal with the file: BOOKS—STYLE for the Product.
- 14.3. The system will check the quantity/book for the selected style.
- 14.4. The system will check to see if there is any printing on the cover.
  - 14.4.1. CONSECUTIVE NUMBERS.
    NOTE: BOOK COVER NUMBERS will be 3/16" Gothic. If anything else is required, it will have to be entered in Special Instructions.
    If there are consecutive numbers on the cover, the starting consecutive number must be entered. If not, set flag for correction by the Sales Rep.

MESSAGE #P14804 STARTING CONSEC. NO.
    - 14.4.1.1. There must be an F3 File showing the location of the consecutive number. If not, set flag for review by the Sales Rep.

MESSAGE #P14854 F3 LOCATION: BOOK NUMBERS
  - 14.4.2. OTHER PRINTING
    If there is any other printing on the cover, the Ink for the PRINTED COVER must be specified. If not, set flag for review by the Sales Rep.

MESSAGE #P14855 INK for BOOK COVER
    - 14.4.2.1. There must be an F3 File showing the printing for the cover. If not, set flag for review by the Sales Rep.

MESSAGE #P14856 F3 for BOOK COVER PRINTING
- 14.5. Update ORDER SPECS:
  BOOKS=Selected Style
  BOOK COVER NUMBERS=Y
  BOOK COVER NUMBER INK=
  BOOK COVER INK=
  QTY/BOOK=Selected Quantity

STANDARD

15. PADDING
- 15.1. The system will check the Proposal to see if there is Padding. If there is no padding, skip edit 15.

15.2. If there is Padding, the system will check to see if there is an entry in SETS/PAD. If not, set flag and return to the Sales Rep.

MESSAGE #P15L840 MUST HAVE SETS/PAD 15.3. The system will check: PACKING—PADS for the sets/pad.

15.3.1. If it is found, update ORDER SPECS—QTY/PAD.

15.3.2. If not found, set flag for review by the Plant.

MESSAGE #P15188 SPECIAL SETS/PACKAGE 15.4. The system will check to see if the location for the padded edge has been entered. Acceptable entries are: TOP, BOTTOM, LEFT, RIGHT If one of these locations has not been entered, set a flag for review by the Sales Rep.

MESSAGE #P15842 PADDED EDGE REQUIRED

LASER

Not available

20. CHECK CONSECUTIVE NUMBERS 20.1. The system will check the Proposal to see if there are consecutive numbers. If there are no consecutive numbers, skip edit 20.

PRESS NUMBERS 20.3. Check the file: CONSNOS to see if the flag: PRESS is on for:

20.3.1 NAME If PRESS not on, set flag for review by the Plant

MESSAGE #P20310 PRESS NOS NOT AVAILABLE

For the following edits, check only those elements in the CONSNOS file that have PRESS turned on.

20.3.2. FRMLEN If the form length is not available for the selected NAME, set flag for review by the plant

MESSAGE #P20146 PRESS NOS—FORM LENGTH 20.3.3. TYPE FACE If the TYPE FACE is not available for the selected NAME, set flag for review by the plant.

MESSAGE #P20147 PRESS NOS—TYPE FACE 20.3.4. NUMBER OF CHARACTERS

The system will use the Proposal Quantity to determine the minimum number of digits required in the Consecutive Number.

The number of digits in the consecutive number must be =<MAX CHAR. If not, set flag for review by the plant.

MESSAGE #P20148 TOO MANY DIGITS IN CONSEC NOS 20.3.5. NAME SIZE If the NAME SIZE is not available for the selected NAME, set flag for review by the plant.

MESSAGE #P20149 PRESS NOS—SIZE

The system will check the Proposal to see how many consecutive numbers are on one form:

One Number See Rule 20.3.5.1

Two Numbers See Rule 20.3.5.2.

More than two See Rule 20.3.5.3.

20.3.5.1. ONE NUMBER PER FORM 20.3.5.1.1. The orientation of the number (Regular, Right Angle, etc. will be part of the NAME, and does not have to be validated.

20.3.5.1.2. The system will check the location of the Consecutive Number:

Distance from the top of the form must be =<MINTOP

Distance from the left edge must be =<MINLEFT.

Distance from the right edge must be =<MINRIGHT.

If ALL of above are true, ORDER SPECS-PRESS-NUMBERS=1 and ORDER SPECS-PRESS FEATURES=NUMBERS-TYPE If not, set flag for review by the Plant:

MESSAGE #P20150 LOCATION OF CONS. NOS 20.3.5.2. TWO NUMBERS PER FORM Validate all of above, and 20.3.5.2.1. The system will check the distance between the Consecutive numbers:

HORIZONTAL SEPARATION 0, or >MINHORIZ ORDER SPECS-PRESS-NUMBERS=1 Unit

HORIZONTAL SEPARATION>0 AND <MINHORIZ ORDER SPECS-PRESS-NUMBERS=2 Units

VERTICAL-SEPARATION=0, or >MINVERT, ORDER SPECS-PRESS-NUMBERS=1 Unit

VERTICAL-SEPARATION>0 and <MINVERT, ORDER SPECS-PRESS-NUMBERS=2 Units 20.3.5.2.2. If the PROPOSAL has more than one TYPE, ORDER SPECS-PRESS-NUMBERS=2 Units 20.3.5.2.3. If the PROPOSAL has more than one size, ORDER SPECS-PRESS-NUMBERS=2 Units 20.3.5.2.4. If the PROPOSAL has more than one NUMBERING INK, ORDER SPECS-PRESS-NUMBERS=2 Units 20.3.5.2.5. If the PROPOSAL has more than one starting CONSEC NUMBERS on any ply, set flag for review by the Plant.

MESSAGE #P20151 MORE THAN ONE STARTING NUMBER 20.3.5.2.6. If any of the above edits cause 2 UNITS, set flag for review by the Plant.

MESSAGE #P20157 TWO NUMBER UNITS REQUIRED 20.3.5.3. MORE THAN TWO NUMBERS/FORM

If the PROPOSAL has more than two consecutive numbers on any ply, Set flag for review by the Plant

MESSAGE #P20152 MORE THAN 2 CONSEC. NUMBERS

MICR NUMBERS 20.5. If there are MICR NUMBERS (Repetitive and/or Consecutive) see Rule #49.

MOD CHECK DIGIT 20.6. Data entry will request if the Consecutive Numbers have a Check Digit.

20.6.1. The there is no check digit, skip rule #20.6.

20.6.2. If there is a check digit, Data Entry will request the following:

20.6.2.1. Identification of the Modulous System (Data Entry will display a list of the MOD Check Digits that are available)

20.6.2.2. Data Entry will request: "Is this form an exact reorder of the previous order, and the MOD Check Digit calculation the same as the previous order?

20.6.2.2.1. If the response is YES, skip the balance of rule 20.6.

20.6.2.2.2. If the response is NO, continue to the next edit: 20.6.2.3.

20.6.2.3. Data Entry will request a sample calculation. This will be a free-form field with sufficient room to show the calculations.
20.6.2.4. The sample calculation must be printed as part of the ORDER FORM at the plant.

21. CHECK PRESS PERFS
   21.5. PERF CUTS
      21.5.1. Reorder. If the proposal is a reorder, use the rules in 21.5.2.
         21.5.1.1. If the order is not a reorder, skip this rule.
      21.5.2. REORDER
         21.5.2.1. Compare each of the following specs on the proposal with the specs on the previous order. If any untrue statement is encountered, skip the balance of 21.5.2. and go to 21.5.3.
         21.5.2.2. The location of all perfs on the proposal must be identical to the location of the perfs on the previous order.
         21.5.2.3. The paper on the proposal must be identical to the paper on the previous order.
         21.5.2.4. The PRIMARY WRITING DEVICE on the proposal must be the same as the PRIMARY WRITING DEVICE on the previous order.
         21.5.2.5. The SECONDARY EQUIPMENT on the proposal must be the same as the SECONDARY EQUIPMENT on the previous order.
         21.5.2.50. Update the proposal with the perf cut information from the previous order:
            For each Horizontal Perf:
               HORIZONTAL=(from previous)
            For each Vertical Perf:
               VERTICAL PERF=(from previous)

22. CHECK PRESS PUNCHES
   22.1. Select: PROPOSAL DATA—PUNCHES
      22.1.1. BLANK—proceed to next edit
   22.2. PROPOSAL DATA: PUNCHES-TYPE
      For acceptable values SEE: PUNCHES AVAIL
      22.2.1. If not found, set flag for review by the Plant
   MESSAGE #P22137 PUNCH TYPE NOT AVAILABLE
      22.2.2. If TYPE=CORNER CUT, skip to Rule #22.5
   22.3. PROPOSAL DATA: PUNCHES-SIZE
      For acceptable values SEE: PUNCHES AVAIL-PRODUCT-SIZE
      22.3.1. If size not turned on, set flag for review by the Plant.
   MESSAGE #P22139 PUNCH SIZE NOT AVAILABLE
   22.4. If there are more than one punch, and they are not in the same horizontal plane then the second horizontal plane must be ½ FOLD LENGTH from the first.
      22.4.1. If there are more than one punch, and they are not in the same vertical plane, then each vertical plane must be at least 2⅞" apart.
         If not, ORDER SPECS–PRESS–PUNCHES=2
      22.4.2. Skip balance of rule #22.
   22.5. CORNER CUT
      22.5.1. Data Entry will specify the location of the Corner Cut(s). Acceptable values are:
         RT, LT, RB, LB—any combination.
      22.5.2. Update ORDER SPECS-PRESS-PUNCHES+1

23. PACKAGING
   If STANDARD PACKING is selected, use the rules following.
   If LASERPAK is selected, skip to Rule #23L—LASERPAK STANDARD
   23.1. The system will calculate STANDARD PACKING—SHEETED SINGLES.
      23.1.1. Refer to the structure: PAPER for the caliper.
         23.1.1.1. If any paper in the set does not have a CALIPER, set a flag for Engineering to enter the Caliper into the PAPER file.
   MESSAGE #P23038 (WGT, COL, TYPE) NEEDS CALIPER
      23.1.2. If the Proposal has any features that are listed in the structure: FEATURES, the system will add the caliper for that feature to the PAPER Caliper.
      23.1.3. COMBINATION OF FEATURES. If there is a combination of more than one different FEATURE on the proposal, use the caliper of the FEATURE with the highest caliper only, and delete the caliper for the other features.
      23.1.4. The system will select the proper column for determining STANDARD PACKING. The options are:
         1. SINGLES—NO PERF
            Use for one ply, with no perforations.
         2. SINGLES-PERFORATED
            Use for one ply, with one or more perforations.
      23.1.5. The system will refer to the PACKING CHART—TOTAL CALIPER, and the appropriate column as selected above to determine the number of forms/stack.
         If the exact TOTAL CALIPER is not in the list, use the next higher TOTAL SET CALIPER.
      23.1.7 Update ORDER SPECS-PACKING-STD QTY
   23.2. CALCULATE PACK HEIGHT
      23.2.1. The pack height obtained in the above rule is for a 12" high pack.
      23.2.2. The system will determine the height of a STANDARD CARTON
         23.2.2.1. FRMWIDTH=ORDER SPECS-FRMWIDTH FRMLENGTH=ORDER SPECS-FRMLENGTH
         23.2.2.2. Select FRMWIDTH and FRMLENGTH from the Data File: PACK HEIGHT.
         23.2.2.3. If the FRMWIDTH or FRMLENGTH is not in file, use the next higher FRMWIDTH and/or FRMLENGTH.
         23.2.2.4. Update ORDER SPECS-PACKING-STD HEIGHT=Height of carton
         23.2.2.5. If ORDER SPECS-PACKING-STD HEIGHT is not 12", calculate the number of sets in the STD HEIGHT.
         23.2.2.6. Update ORDER SPECS-PACKING-STD QTY
   23.3. The system will determine the number of stacks in a STANDARD CARTON.
      23.3.1. Refer to the file: PACK HEIGHT. Using the FRMWIDTH and FRMLENGTH selected above, select the PACKS/CTN.
      23.3.2. Update ORDER SPECS-PACKING-STD STACKS/CTN=(1,2,etc) STACKS/CTN
   23.6. The system will check to see if the Proposal is for a New order, Reorder, or Reference Order.
      23.6.1. Skip to the appropriate rule, depending on the type of previous order:
         REORDER Skip to rule: 23.7.
         REFERENCE Skip to rule: 23.7.
         NEW ORDER Skip to rule: 23.8.
   23.7. REORDER
      23.7.1. The system will compare the Proposal with the specifications on the previous order.

Product
Type of product
Form Width
Form length
Basis weight of paper
Number of perforations (horizontal and vertical)
Affix Label
  Material
  Location
Transfer Tape
Reinforcement Patch
23.7.2. If any of the elements listed above is different from the previous order, skip to RULE: 23.8.—NEW ORDER.
  23.7.2.1. If the Sales Rep has not specified a quantity per pack or carton, update ORDER SPECS STD QTY with the quantity/pack or carton from the previous order.
  23.7.2.2. If the quantity per carton is within the PACK QUANTITY VARIANCE of the calculated quantity, update ORDER SPECS: STANDARD PACKING=X
  23.7.2.3. If the quantity per carton is not within the PACK QUANTITY VARIANCE, update ORDER SPECS: SPECIAL PACKING=X.
  23.7.2.2. Skip TO 23.7.4. MORE THAN ONE TYPE OF PACKING
23.7.3. If the Sales Rep has entered the quantity per pack or carton, compare the quantity entered with the calculated quantity per pack or carton.
  23.7.3.1. If the entered quantity is within the PACK QUANTITY VARIANCE, update ORDER SPECS: STANDARD PACKING=X
  23.7.3.2. If it is not within the PACK QUANTITY VARIANCE, update ORDER SPECS: SPECIAL PACKING=X
23.7.4. MORE THAN ONE TYPE OF PACKING If more than one type of packing is specified, the quantity per carton/pack must be specified for the smallest unit of packaging. All other units must be a multiple of this unit. If not, set flag and return Proposal to the Sales Rep.
MESSAGE #P23833 CTN QTY NOT A MULTIPLE OF PACK QTY
23.8. NEW ORDER
  23.8.1. If no QTY/CTN was entered, and if no TYPE has been selected, skip the balance of rule #23.
  23.8.2. If a TYPE has been selected, and a quantity entered for that type:
    23.8.2.1. Check the Data File: PACKAGING to see if the type is available for the Product. If not, set flag and return to Sales Rep.
MESSAGE #P23835 PACKAGING NOT AVAILABLE FOR THIS PRODUCT
  23.8.3. If the Sales Rep has entered a quantity per pack calculate the Number of PACKS/CTN and the QTY/CTN.
    23.8.3.1. If more than one type of packaging has been selected, the system will start with the type having the smallest number of forms/pack.
    23.8.3.2. Calculate the height of one package.
      23.8.3.2.1. If the height of one package is greater than PACKAGING-MAXPACK, set a flag for review by the Plant.
MESSAGE #G08187 PACK HEIGHT EXCEEDS SPECS
    23.8.3.3. Calculate the number of packages that will fit into STD HEIGHT, without exceeding STD HEIGHT.
    23.8.3.4. Multiply the number of packages by ORDER SPECS-STD STKS/CTN
    23.8.3.5. Update ORDER SPECS-PACKING-PACKS/CTN.
  23.8.4. Compare the QTY/CTN with the STD QTY.
    23.8.4.1. If the difference is within the PACK QUANTITY VARIANCE of the STD QTY, update ORDER SPECS: STANDARD PACKING=X
  23.8.5. If the Sales Rep has entered a quantity per carton, compare the entered quantity per carton with STD QTY.
    23.8.5.1. If the difference is within the PACK QUANTITY VARIANCE, update ORDER SPECS: STANDARD PACKING=X
    23.8.5.2. If the difference is not within the PACK QUANTITY VARIANCE, update ORDER SPECS: SPECIAL PACKING=X
  23.8.6. If there is more than on TYPE of package specified, the quantity per package must be equal to or a multiple of the number of forms in the smallest package. If not, set a flag for review by the Sales Rep.
MESSAGE #P23833 CTN QTY MOT A MULTIPLE OF PACK QTY
23L. PACKAGING
LASERPAK
  23L.1. The system will calculate LASERPAK
    23L.1.1 If any of the following data has been entered, exception to CSR:
    PACKAGING (other than LASER PACK, including:
      Quantity per Pack
    INNER PACKAGING: (any)
    TRANSFER TAPE
    EYELET
    REINFORCEMENT PATCH
    REMOIST STRIP
    BINDERY (ANY)
  MESSAGE: #P23110 (*******) NOT ALLOWED FOR LASERPACK
    23L.1.1. The LASERPAK Packaging will be used for the following:

| BASIS WT. | QUANTITY |
|---|---|
| 20 | 2500 |
| 24 | 2000 |

If the Basis Weight of the Paper is any other than 20# or 24#, exception to the Plant:
  MESSAGE: #P23111 FURNISH QUANTITY FOR LASER PACK
    23L.1.2 Update MFG PLAN: LASERPACK
      Update MFG PLAN: QTY per CARTON
      Update MFG PLAN: CARTON HEIGHT=10"
31. PRESS DELIVERY
  31.1. If the proposal has AFFIX LABEL:
    ORDER SPECS-PRESS-DELIVERY=ROLL
  31.2. All other proposals:
    ORDER SPECS-PRESS-DELIVERY=SHEETER
52. PALLETIZING
  52.1. Standard Palletizing is allowed. If any other type is selected, set exception for Plant:
MESSAGE #P52100 SPECIAL PALLETIZING 52.2. If LASER PACK had been selected, the order quantity (with overrun) must be at least 170,000 or a greater multiple of 170000. If any other quantity is specified, set exception for CSR:

MESSAGE #P52200 LASER PACK PALLETS MUST BE 170000

Limited Sheeted Singles Validation Rules

The following rules are processed for Limited Sheeted Singles: 20. Consecutive Numbers; 21. Check Press Perfs; 22. Check Press Punches; 27. Determine Number Wide; 31. Press Delivery; and, 32. Guillotine. Additionally, the following rules from custom sheeted singles are processed for limited sheeted singles: 5. Check Secondary Equipment; 15. Padding; and, 52. Palletizing. The functionality of each of these rules may be illustrated as follows (any rules not expressly illustrated below have been described elsewhere in the specification):

20. CHECK CONSECUTIVE NUMBERS
   20.1. One Regular Consecutive Number (in addition to MICR) can be done on the press. If there is more than one consecutive number, or more than one MICR number, skip to rule #20.2 SECONDARY OPERATION.
      20.1.1. The system will check the SIZE and TYPE FACE. Only the following are allowed:

| SIZE | FACE |
|------|------|
| 3/16 | GOTHIC |

If any other size or face is selected, skip to rule #20.2. SECONDARY OPERATION
   20.1.2. If the above rule is true, and there are no other consecutive numbers except MICR, update MFG PLAN=PRESS CONSEC. NOS.
20.2 SECONDARY OPERATION
   20.2.1. The system will check to see if the selected Consecutive Number meets ALL of the following criteria:
      20.2.1.1. Size available for this Product
      20.2.1.2. Face available for this Product
      20.2.1.3. Available for SECONDARY Operation
      20.2.1.4. The maximum number of digits=9
      20.2.1.5. The minimum number of digits=4
   20.2.2. If any of the above edits fail, set flag for CSR:
MESSAGE #P20002 CONSEC. NOS. NOT AVAILABLE FOR LIMITED
20.3. Up to 3 Consecutive Numbers (not including MICR Numbers) are available.
   20.3.1. The system will check the distance between the Consecutive Numbers:
      VERTICAL SEPARATION=Even multiple of 11" (3⅔ or 5½). If not, set exception for CSR:
MESSAGE #P20310 NUMBER LOCATION NOT AVAIL FOR LIMITED
20.4. CONSEC. NUMBER INK:
   20.4.1. Only MICR Black (001) or WARM RED is allowed. If any other Consec. Number Ink is selected, set exception for CSR:
MESSAGE: P20009 CONSEC. NO. INK NOT AVAIL FOR LIMITED
   20.4.2. If the Regular Consecutive Numbers and the MICR Numbers are the same ink, update MFG. PLAN=1pass.
   20.4.3. If the Regular consecutive Numbers are other than the MICR ink, update MFG. PLAN=2 passes.
20.5. MICR NUMBERS If there are MICR NUMBERS (Repetitive and/or Consecutive) see Rule #49.

21. CHECK PRESS PERFS
   21.1. If there are Diagonal perfs, set flag for review by the CSR:
MESSAGE #P21001 DIAG PERF NOT AVAIL FOR PRODUCT
   21.2. HORIZONTAL (Right Angle)
      21.2.1. One full Right Angle perf is allowed anywhere on the form.
      21.2.2. If there is more than one Right Angle perf, the distance apart must be 3⅔" and/or 7⅓". If not, set flag for CSR:
MESSAGE #P21002 PERFS NOT AVAIL FOR PRODUCT
   21.3. VERTICAL (Parallel)
      21.3.1. Up to 4 parallel perfs are allowed per form. If there are more than 4, set exception for CSR
MESSAGE #P21310 MAX: 4 PARALLEL PERFS
      21.3.2. Each parallel perf must be at least 1" apart. If not, set exception for CSR:
MESSAGE #P21320 PARALLEL PERFS TOO CLOSE 22. CHECK PRESS PUNCHES
   22.1. Only ¼" round punches are available. If any other punches are selected, set exception for CSR:
MESSAGE #P22005 PUNCHES NOT AVAIL ON LIMITED
   22.4. Up to 7 punches are allowed in a Horizontal Row. Only one Horizontal row is allowed. These may be at the TOP or BOTTOM of the form. If there are more than 7, set exception for Plant:
MESSAGE #P22140 TOO MANY PUNCHES IN ROW
   22.5. Up to 7 punches are allowed in a Vertical Row. Only one Vertical row is allowed. The location of the Punches will depend on the Form Length. All distances are from the TOP edge of the form to the center of the hole:
      4¼" Length: ¾, 1½, 2, 2¼, 2¾, 3½
      8½" Length: ¾, 1, 1¼, 1½, 1¾, 2, 2¼, 2½, 2¾, 3, 3¼, 3½, 4, 4¼, 4½, 5, 5¼, 5½, 5¾, 6, 6¼, 6½, 6¾, 7, 7¼, 7½, 7¾

If the punches are in any other location, set exception for the Plant:

MESSAGE: #P22500 LOCATION OF PUNCHES
22. CHECK PRESS PUNCHES
   22.1. Only ¼" round punches are available. If any other punches are selected, set exception for CSR:
MESSAGE #P22005 PUNCHES NOT AVAIL ON LIMITED
   22.4. Up to 5 punches are allowed in a Horizontal Row. If there are more than 5, set exception for the CSR:
MESSAGE #P22140 TOO MANY PUNCHES IN ROW
      22.4.1. Only one Horizontal row is allowed. This row may be at the TOP or BOTTOM of the form. If the Horizontal Row is not at the top or bottom of the form, set exception for CSR:
MESSAGE #P22410 PUNCHES MUST BE AT TOP OR BOTTOM FOR LIMITED
      22.4.2. The location of the Punches is measured from the LEFT EDGE of the form. The Punches may be in the following locations:

| LEFT to CENTER OF HOLE |
| --- |
| 1½ |
| 2⅞ |
| 4¼ |
| 5⅝ |
| 7 |

If the punches are positioned in any other location, set exception for the CSR:

MESSAGE #P22420 LOCATION OF HORIZONTAL PUNCHES NOT ALLOWED ON LIMITED 22.5. Up to 7 punches are allowed in a Vertical Row.
   22.5.1. Only one Vertical row is allowed. This row may be at the left or the right side of the form. If the Vertical Row is not at the left or right, set exception for CSR:

MESSAGE #P22510 PUNCHES MUST BE AT LEFT OR RIGHT FOR LIMITED PRODUCT.
   22.5.2. The location of the Punches will depend on the Form Length. All distances are from the TOP edge of the form to the center of the hole:
      11" Length: 1¼, 3⅜, 4⅛, 5½, 6⅞, 7⅝, 9¾

If the punches are in any other location, set exception for the Plant:

MESSAGE: #P22500 LOCATION OF PUNCHES

27. DETERMINE NUMBER WIDE
   27.1. All forms are 2 wide.
   27.2. Update Mfg. Plan 31. PRESS DELIVERY
   All orders: SHEETER 32. GUILLOTINE
   32.1. The maximum form size for this product=8½×11.
   32.2. If the order form size is less than 8½×11, the Validation Engine will determine how many forms can fit on one sheet, and the number of cuts that will be required.
   32.3. Update MFG. PLAN:
      Number up=x
      Number of cuts=x
   32.4. If the order form size is less than 8½×11 (either dimension), update MFG PLAN:
      PRESS DELIVERY=Semi Finished
      SECONDARY OPERATION=Guillotine 56. NON-LITHO PRINTING
   56.1. Non-litho—except CONSECUTIVE NUMBERS—printing is not allowed on this product. If any non-litho features are selected, set exception for CSR:

MESSAGE #P56100 NON-LITHO NOT AVAILABLE ON LIMITED

Stanfast Validation Rules

The following rules are processed for Stanfast Products: 3. Product; 4. Size; 5. Ply; 8. Papers; 11. Inks; 12. Punching; 13. Perforations; 14. Consecutive Numbers; 15. Guillotine; 16. Polywrap; 17. Remoist Strip; 18. Transfer Tape; 19. Reinforcement Patch; 20. Reinforcement Tape; 21. Die Cutting; 22. Folding; 23. (Use Rule 23 From Rotary—General For Packing); and, 26. Center Selection. Additionally, the following rules from General Validation are processed for Stanfast Products: 78. Administrative; 80. Coded Invoice Instructions; 81. Release I Exclusions; and, 82. Invalid Combinations. The functionality of each of these rules may be illustrated as follows (any rules not expressly illustrated below have been described elsewhere in the specification):

3. PRODUCT
   3.2. QUANTITY If the Order quantity is greater than the PRODUCT-MAX QTY, set flag for review by MFG HQTRS.

MESSAGE #P03189 QUANTITY OUT OF SPEC
      3.2.1. If the Proposal Quantity is less than MIN QTY, set flag for review by the Plant.

MESSAGE #P03207 QUANTITY LESS THAN MINIMUM
   3.3. If the Order has more inks on any one ply than PRODUCT-MAX INK, set flag for review by the Plant.

MESSAGE #P03190 NUMBER OF INKS

4. SIZE

The system will check to see if the form size is available for product.
   4.1. The system will check to see if there is sufficient lockup. If there is not at lease (PRODUCT-LOCKUP) clear at the TOP or BOTTOM of the form, set flag for review by the Plant.

Message #P04144 INSUFFICIENT LOCKUP
   4.2. The system will compare the FORM SIZE on the PROPOSAL with the Sheet Sizes available for this product.
      4.2.1. See: DATA FILES—STANFAST—SHEET SIZES for a list of the sizes that are available.
   4.3. If the selected size is available, the system will:
      4.3.1. Add the corresponding PROD SIZE to ORDER SPECS.
      4.3.2. Add the value in #UP to the ORDER SPECS.
      4.3.3. Add the value in CUTS to ORDER SPECS
      4.3.4. Skip the balance of Rule 4.
   4.4. If the selected size is not available, the system will:
      4.4.1. Check the Primary Writing Device (if entered).
         4.4.1.1. If the GRAIN DIRECTION for the Primary Writing Device=LONG, go to Rule: 4.4.3.
      4.4.2. Reverse the PROPOSAL WIDTH AND the PROPOSAL LENGTH.
      Use the reversed width and length to check the available sizes.
         4.4.2.1. If the size is available, go to Rule: 4.3.
      4.4.3. Set exception for Home Plant:

MESSAGE #P04191 PRODUCTION SIZE REQUIRED
   4.5 To remove the flag, the Home Center will have to add PRODUCTION SIZE, #UP and CUTS to the PROPOSAL.
      4.5.1. The PROPOSAL may not become an order until this flag is removed.

5. PLY

The system will compare the PLY on the PROPOSAL to the maximum PLY available for this product.
   5.1. See DATA FILES—STANFAST PRODUCTS—MAXPLY for the maximum ply that is allowed on any product.
   5.2. If the PROPOSAL PLY exceeds the MAXPLY ply for the product, the system will set a flag for review by the Home Center.

MESSAGE #P05106 REVIEW PLY
      5.2.1. This flag must be removed before the PROPOSAL can become an ORDER.

8. PAPERS
   8.3. The system will compare the paper with the list of approved papers for StanFast. If OTHER is selected, set exception for Purchasing and Engineering:

MESSAGE G34001 NEW PAPER 8.4. If any paper is flagged as not available (PSHEET not on), set exception for Purchasing:

MESSAGE #P08301 PAPER AVAIL IN SHEETS 8.5. If any paper is flagged as not approved for production (PSHEET not on), send message to Engineering.

MESSAGE #P08013 APPROVE FOR SHEET PRODUCTION

11. INKS 11.1. The system will check each ink that is selected to see if the Feature List Attribute: stanfast opt is on.
  11.1.1. If the stanfast_opt is not on, set exception for the Print Center:

MESSAGE: P11110 APPROVE INK: (Ink name/PMS#)

11.2. If the stanfast opt is on
  11.2.1. If the stanfast special opt is on, update Mfg. Plan for Pricing: SPECIAL
  11.2.2. If the stanfast special opt is not on, update Mfg. Plan for Pricing: STANDARD.
 11.3. If an ink has been approved by the Print Center (see: 11.1.1. above), update the Mfg. Plan for Pricing: SPECIAL

12. PUNCHING

The system will check the proposal to see if there are any punches. If not, skip Rule #12

12.1. The system will compare the TYPE of punches on the PROPOSAL with the Data File: PUNCHES—NAME and SIZE—XREF-PRODUCT.
  12.1.1. If the NAME and SIZE are not available for the PRODUCT, set flag for review by the Plant.

MESSAGE #P12109 APPROVE PUNCHES 12.1.2. Skip the balance of Rule #12.
 12.2. If 2-HOLE punches is selected:
  12.2.1. The punches must be in the same vertical plane or horizontal plane;
  12.2.2. The center-to-center measurement must be equal to 4¼" or 8½"
  12.2.3. The distance from the center of each hole to the closest edge of the form must be equal to or greater than PUNCHES-LEFT or PUNCHES-RIGHT or PUNCHES-TOP or PUNCHES-BOTTOM
  12.2.4. (Reserved for future use)
  12.2.5. If any of the above are not true, set flag for review by the Sales Rep.

MESSAGE #P12846 CANNOT USE 2-HOLE PUNCH 12.2.6. Skip the balance of Rule #12
 12.3. If 3-HOLE punches is selected:
  12.3.1. The punches must be in the same vertical or horizontal plane;
  12.3.2. The center-to-center measurement must be equal to: PUNCHES-CCVERT or PUNCHES-CCHORIZ
  12.3.3. The distance from the center of each hole to the closest edge of the form must be equal to PUNCHES-LEFT or PUNCHES-RIGHT or PUNCHES-TOP or PUNCHES-BOTTOM
  12.3.5. If any of the above are not true, set flag for review by the Sales Rep.

MESSAGE #P12847 CANNOT USE 3-HOLE PUNCH 12.3.6. Skip the balance of rule #12
 12.4. If 5-HOLE punches is selected:
  12.4.1. The punches must be in the same vertical or horizontal plane;
  12.4.2. The center-to-center measurement must be equal to: PUNCHES-CCVERT or PUNCHES-CCHORIZ
  12.4.3. The distance from the center of each hole to the edge of the form must be equal to PUNCHES-LEFT or PUNCHES-RIGHT or PUNCHES-TOP or PUNCHES-BOTTOM
  12.4.5. If any of the above are not true, set flag for review by the Sales Rep.

MESSAGE #P12845 CANNOT USE 5-HOLE PUNCH 12.5. If COMBO-5 is selected, the holes must meet the following specifications:
 Form Size: 8½×11
 Number of punches: 5
 Size: ¼" ROUND
 Location: Left side only, ⅜" from left edge of form
 Location: Distance from top of form:
 1¼", 4⅛", 5½", 6⅞", 9¾
 If any of these are not true, set exception for the CSR:

MESSAGE P 12440 CANNOT USE COMBO-5 PUNCH 12.6 If COMBO-7 is selected, the holes must meet the following specifications:
  12.6.1. At least one dimension of the form must be 11"
  12.6.3. Number of punches=7
  12.6.4. Size=¼" ROUND
  12.6.5. Parallel to the 11" dimension, and ⅜" from the edge of the form.
  12.6.6. Distance from the edge of the form (edge that is perpendicular to the 11" dimension):
  1¼", 3¼", 4⅛", 5½", 6⅞", 7¾", 9¾"
 If any of the above (12.6.1. thru 12.6.6) are not true, set exception for the CSR:

MESSAGE #P12600 CANNOT USE COMBO-7 PUNCH 12.7 If COMBO-3 is selected, the holes must meet the following specifications:
  12.7.1 At least one dimension of the form must be 8½"
  12.7.2. Number of punches=3
  12.7.3. Size=¼" ROUND
  12.7.4. Parallel to the 8½" dimension, and ⅜" from the edge of the form.
  12.7.5. Distance from the edge of the form (edge that is perpendicular to the 8½" dimension):
  1½", 2¾", 2¾"
  If any of the above (12.7.1. thru 12.7.4.) is not true, set exception for the CSR:

MESSAGE #P12700 CANNOT USE COMBO-3 PUNCH 12.10. The system will check the NAME and SIZE of the punches on the form.
  12.10.1. If the number of punches on the form is greater than PUNCHES-MAXIMUM, set flag for review by the Plant.

MESSAGE #P12109 APPROVE PUNCHES 12.10.2. Skip the balance of Rule #12.
  12.10.3. Reserved for future use
  12.10.4. If there is more than one punch, and all are not in the same vertical or horizontal plane, set exception for the Plant.

MESSAGE #P12109 APPROVE PUNCHES

13. PERFORATIONS 13.1. Perforations will be selected from a screen. Only those perfs that are available for STANFAST will be displayed.
 13.2. If any perfs are requested that are not on the selection list, the system will set a flag for review by the Home Center.

MESSAGE #P13110 APPROVE PERFS 13.4. The location of the perfs will be shown on the F3 copy.
14. CONSECUTIVE NUMBERS
   14.1. The system will check the Proposal to see if there are consecutive numbers. If there are no consecutive numbers, skip rule 14.
   14.2. The system will check the Reorder Type:
      14.2.1. EXACT REORDER
         14.2.1.1. If there are changes to any of the following, go to Rule #14.3.—NEW ORDER:
            CONSECUTIVE NUMBER—NAME
            CONSECUTIVE NUMBER—SIZE
            CONSECUTIVE NUMBER—NUMBER OF CHARACTERS
            CONSECUTIVE NUMBER—TYPE FACE
            CONSECUTIVE NUMBER—CHECK DIGIT
         14.2.1.2. If no starting consecutive number has been entered, and there was only one destination on the previous order, the system will add 1 to the ending number of the previous order, and use this as the starting number for the current order.
         14.2.1.3. If the current order has more than one destination, or has number resets, the starting consecutive number must be entered for each destination and/or number reset.
   14.3. NEW ORDERS, R/O WITH CHANGE, REFERENCE ORDERS
      14.3.1. ONE CONSECUTIVE NUMBER PER FORM
         14.3.1.1. The system will check the Proposal Form Size against the Data File: CONSECUTIVE NUMBERS-PRODUCT: MIN FORM LEN, MAX FORM LEN, MIN FORM WIDTH, MAX FORM WIDTH. If the proposal FORM SIZE is not within the limits defined by these elements, set exception for the Print Center:
MESSAGE #P14111 APPROVE CONS. NOS
         14.3.1.2. The system will check the location of the Consecutive Number on the Form:
            The minimum distance from the edge of the form must be equal to or greater than MIN RIGHT, MIN LEFT, MIN TOP and MIN BOTTOM. If not, set a flag for review by the Print Center:
MESSAGE #P14111 APPROVE CONS. NOS.
         14.3.1.3. For 1-Ply forms, the system will check the Basis Paper Weight:
            14.3.1.3.1. The BASIS WGT must be within the range defined by the MIN PAPER and MAX PAPER.
            14.3.1.3.3. If the Basis Weight exceeds these limits, set flag for review by the Print Center.
MESSAGE #P14111 APPROVE CONS. NOS.
         14.3.1.4. The system will check the amount of space (number of digits) allowed for the CONSEC. NUMBER. The number of digits must be within the range set by the Data File: CONSECUTIVE NUMBERS—MAX CHAR SPACE and MIN CHAR SPACE.
            14.3.1.4.1. If the number of characters is not within the range set by these elements, set flag for review by the Print Center.
MESSAGE #P14111 APPROVE CONS. NOS.
         14.3.1.5. If all of the above edits pass, update Order Specs:
            14.3.1.5.1. If the PRODUCT is COLLATED SETS, ORDER SPECS-CONSEC. NUMBERS=COPYSAFE
MESSAGE #P14003 CONS NOS MUST BE COPY-SAFE
            14.3.1.5.2. All other Products, ORDER SPECS-CONSEC. NUMBERS=SECONDARY.
            14.3.1.5.3. Skip the balance of Rule #14.
         14.4.1. If there is more than one consecutive number per form, set flag for review by the Print Center.
MESSAGE #P14111 APPROVE CONS. NOS.
15. GUILLOTINE
   15.1. Guillotine will have been determined by the form size validation rules. If Guillotine is necessary, add the number of cuts to the Order Specs.
16. POLYWRAP (07-74)
   16.1. POLYWRAP options will be selected from a screen.
   16.2. If any polywrap options are requested that are not on the list, the system will set a flag for review by the Home Center.
MESSAGE #P16113
17. REMOIST STRIP
   17.1. The location of a Remoist Strip will be shown on F3 Copy.
      17.1.1. The location may be Vertical or Horizontal
      17.1.2. Default width=½"
   17.2. If Remoist is selected, the system will set a flag for review by the Home Center.
MESSAGE #P17114
18. TRANSFER TAPE
   18.1. The location and orientation of Transfer Tape will be shown on F3 Copy.
      The acceptable values are:
         FRONT
         BACK
   18.2. If a location for Transfer Tape is shown, but no size is selected, default to ½".
   18.3. ORDER SPECS-COLLATING-TAPE=X
   18.4 If Transfer Tape is selected, the system will set a flag for review by the home Center.
MESSAGE #P18115
19. REINFORCEMENT PATCH
   19.1. The kind of patch, size of patch, size of hole and location of Reinforcement Patches must be shown on F3.
   19.2. If REINFORCEMENT PATCH(S) is selected, set flag for review by the Home Center
MESSAGE #P19116 APPROVE REINFORCE PATCH
20. REINFORCEMENT TAPE
   20.1. The location and orientation of Reinforcement Tape will be shown on F3 Copy.
      The acceptable values are:
         FRONT
         BACK
   20.2. If a location for Reinforcement Tape is shown, but no size is selected, default to ½".
   20.3. ORDER SPECS-COLLATING-TAPE=X
   20.4 If Reinforcement Tape is selected, the system will set a flag for review by the home Center.
MESSAGE #P18115 APPROVE TRANSFER/REM TAPE
21. DIE CUTTING
   21.1. The location, shape and orientation of Die-cutting must be shown on F3 Copy.
   21.2. If Die-cutting is selected, the system will set a flag for review by the Home Center.

MESSAGE #P21117 APPROVE DIE-CUTTING

22. FOLDING

The system will check to see if the form size and type of folding is available for the product.

22.1. If there is not FOLDING on the Proposal, skip edit 22.

22.2. See: DATA FILES—FOLDING a list of the types of folding available.

22.2.1. If the selected type is not available, the system will set a flag for review by the Home Center.

MESSAGE #P22118 APPROVE FOLDING 22.2. See: DATA FILES—FOLDING for a list of the sheet sizes that are available for folding.

22.2.1. If the selected size is not available, the system will set a flag for review by the Home Center.

MESSAGE #P22118 APPROVE FOLDING

26. CENTER SELECTION 26.1. The system use the Mail Code for the primary Sales Rep and the PRODUCT access the file: DISTRICTS to determine the production Center.

26.1.1. If the PRODUCT has not been assigned to a Print Center for the District, set flag and send message to StanFast Headquarters.

MESSAGE #P26174 PLANT ASSIGNMENT

Stanfast Sets Validation Rules

The following rules are processed for Stanfast Set Products: 4. Size; 8. Papers; and 23. Fastening. Additionally, the following rules from General Validation are processed for Stanfast Sets: 78. Administrative; 80. Coded Invoice Instructions; 81. Release I Exclusions; and 82. Invalid Combinations; and the following Stanfast Validation rules are processed for Stanfast Sets: 3. Product; 5. Ply; 11. Inks; 12. Punching; 13. Perforations; 14. Consecutive Numbers; 15. Guillotine; and 16. Polywrap. The functionality of each of these rules may be illustrated as follows (any rules not expressly illustrated below have been described elsewhere in the specification):

4. SIZE

Use Rule #4 from StanFast Sheets. In addition, run the following rule:

4.1.0 If the ply is greater than 1, at least one dimension of the form,(Width or Length) must be the same for all plies. If not, generate exception message.

MESSAGE #P04841 ODD SIZE NOT ALLOWED

Use all other rules in STANFAST SHEETS—RULE #4

23. FASTENING

The system will check to see if any of the special Fastening Types have been selected for this proposal.

23.1. See: DATA FILES—FASTENING for a list of the fastening types that are available.

23.2. If EDGE GLUE is selected, all plies must be the same dimension on the glued side. If not, return the Proposal to the Sales Rep.

MESSAGE #P23819 UNIQUE DIMENSION—EDGE GLUE 23.2.1. If EDGE GLUE is the only Fastening Type, skip 23.3.

23.3. If any of the types of Fastening are selected, the system will set a flag for review by the Home Center.

MESSAGE #P23121 SPECIAL FASTENING 23.4. If the PROD is CARBONLESS SETS, there must be some entry in FASTENING. If not, set flag for review by the Sales Rep.

MESSAGE #P23L862 FASTENING REQUIRED

Stanfast Envelopes Validation Rules

The following rules are processed for Stanfast Envelopes: 3. Product; 4. Size; 8. Papers; 11. Inks; and 26. Center Selection. Additionally, the following rules from General Validation are processed for Stanfast Envelopes: 78. Administrative; 80. Coded Invoice Instructions; 81. Release I Exclusions; and 82. Invalid Combinations. The functionality of each of these rules may be illustrated as follows (any rules not expressly illustrated below have been described elsewhere in the specification):

3. PRODUCT 3.1. QUANTITY. If the order quantity is less than PRODUCT-MINQTY or greater than PRODUCT-MAXQTY, set flag for review by the Plant.

MESSAGE #P03189 QUANTITY OUT OF SPEC 3.2. The order quantity must be in even multiples of 500. If not, set flag for Sales:

MESSAGE #P03001 QTY MUST BE MULTIPLE OF 500

3.3. If the order has more inks (front, back, total) than the PRODUCT-MAX#-FRONT, MAX#-BACK, MAX#-TOTAL, set flag for review by the Plant.

MESSAGE #P03190 NUMBER OF INKS

4. SIZE 4.3. The system will check to see if there is sufficient lockup. If there is not at least (PRODUCT-LOCKUP) clear at the TOP or BOTTOM of the form, set flag for review by the Plant.

Message #P04144 INSUFFICIENT LOCKUP 4.10. ENVELOPES and WINDOW ENVELOPES. The system will check the Envelope size to see if it is available:

4.10.1. If the FORM SIZE (Width and Length) are available for the selected Paper—SIZE REFERENCE TABLE, update ORDER SPECS—WIDTH and LENGTH.

Update ORDER SPECS-#UP=1.

Skip balance of Rule #4

4.10.2. If the FORM SIZE is not available for the selected Paper, set flag for review by the Home Center.

MESSAGE #P04192 ENVELOPE SIZE NOT AVAILABLE

8. PAPERS 8.1. If any paper is flagged as not available for SHEET Production, send message to Purchasing.

MESSAGE #P08301 PAPER NOT AVAILABLE

11. INKS

NOTE: This rule is the same as Rule #11 for StanFast Sheets 11.1. Inks will be selected from a screen. Only inks that are available for STANFAST will be displayed for selection.

11.2. Each ink, when selected, will be marked as STANDARD or SPECIAL (for pricing)

11.3. If the Sales Rep requests some ink other than what is displayed for selection, the system will set a flag for review by the Home Plant.

MESSAGE #P11108

26. CENTER SELECTION 26.1. The system use the Mail Code for the primary Sales Rep and the PRODUCT access the file: DISTRICTS to determine the producing Center.

26.1.1. If the PRODUCT has not been assigned to a Print Center for the District, set flag and send message to StanFast Headquarters.

MESSAGE #P26174 PLANT ASSIGNMENT

Figure 6:
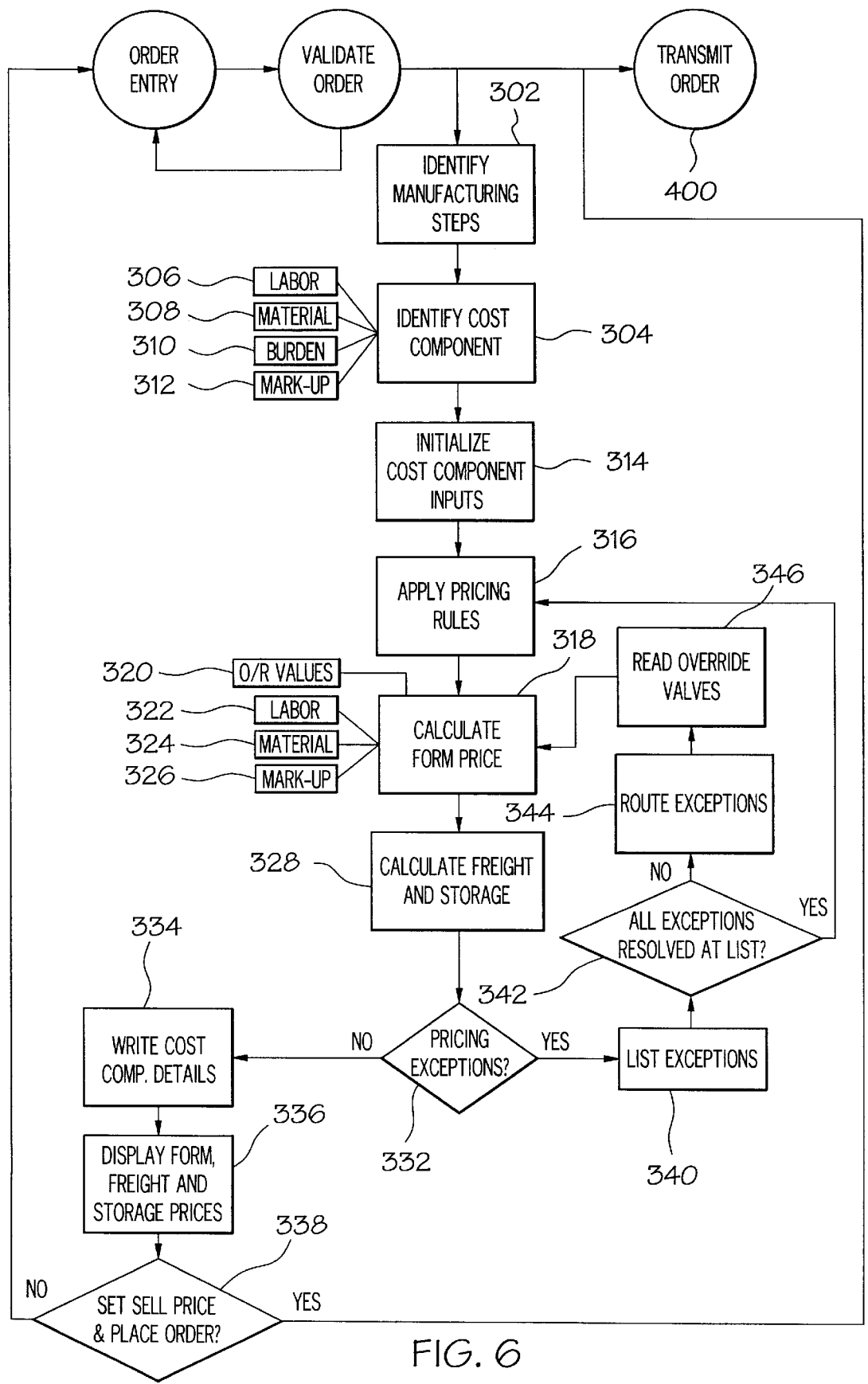

Referring now to FIGS. 2, 3 and 6, forms order pricing 300 is described in detail. A pricing engine 50 is resident in the second computer system 16. The pricing engine 50 operates in accordance with a set of pricing rules which are integral to order pricing 300. In order pricing 300, the manufacturing steps of the validated manufacturing plan are identified, i.e., input from the manufacturing steps generated during validation, see step 302 in FIG. 6 and step 212 in FIG. 5. Next, distinct cost components for each manufacturing step are identified, see step 304. Specifically, the pricing engine 50 is operative to extract from the manufacturing plan the labor steps necessary to produce the ordered form and develop a labor cost component 306 for each manufacturing step. Similarly, the pricing engine 50 is operative to identify the materials needed to produce the ordered form and develop a material cost component 308 for each material. Finally, the pricing engine 50 is operative to build a mark-up cost component 310 associated with the ordered form and a burden cost component 312 associated with the necessary freight and storage for the forms. An initial value for each cost component is developed based on the labor, material, burden, and mark-up cost components 306, 308, 310, 312, see step 314. Associated rules selected from the pricing rules resident in the pricing engine 50 are applied to each cost component to change the initialized value for each cost component and generate changed labor, material, and mark-up cost components 322, 324, 326. The form price is calculated based upon the changed labor, material, and mark-up cost components 322, 324, 326, see step 318. Freight and storage costs are calculated based on the burden cost component 310 once the form price is calculated, see steps 318 and 328. The form price may be calculated based upon cost components associated with a hypothetical manufacturing facility or the specific manufacturing facility selected in order validation 200.

The pricing engine 50 generates pricing exceptions in response to application of the pricing rules. For example, a pricing exception may arise if an order is associated with a special account or exceeds a predetermined paper weight limit, press impression limit, single ply equivalents limit, or an estimated total form price limit. If no exception is generated, each of the cost components and all cost component inputs are written to an order entry system database, not shown, for future reference, see step 334. The form freight and storage prices are displayed and may be printed, see step 336. To complete order pricing 300, a user is prompted to set the sell price and place the order, see step 338. If an exception is generated, the exceptions are listed to enable the CSR to review the list of exceptions and determine if there are any exceptions that can be resolved by the CSR, see step 340. If all exceptions are resolved by the CSR or another user at list, the pricing rules are again applied to the order, see steps 342 and 316. If one or more exceptions cannot be resolved at list, then the exceptions are routed to appropriate exception handling locations 48 where pricing override values 320 are assigned to the order by the exception handlers and the form price is calculated using the override values 320, see steps 344, 346, and 318. Specifically, the pricing engine 50 is programmed to operate in an override mode wherein at least one of the labor cost component 322, the material cost component 324, the burden cost component 310, and the mark-up cost component 326 for the ordered form are replaced by an override value 320, and wherein the pricing engine 50 is programmed to calculate the price based upon the override value 320.

The pricing rules comprise two sets of rules. The first set, the Rotary Pricing Rules, is processed for forms to be produced by traditional rotary printing facilities. The second set, the Stanfast® Pricing Rules, is processed for forms to be produced by Stanfast®, or quick print, facilities.

The Rotary Pricing Rules use rules and equations to identify the material, labor, markup, and freight and storage cost components associated with a specific order. The equations and rules for the material cost component are as follows (some pricing tables referred to below are not actually shown in the present specification because the content thereof is self explanatory):

Paper

Paper Equation

Step 1. Calculate the Paper Waste % for each ply.

Ply Waste % =

$$\left(\frac{\text{Ply Flat Waste Imps} \times \text{Press \# Wide} \times \text{Press \# Around}}{\text{Order Quantity}}\right) +$$

Ply Base Running Waste % +

$$\left[\frac{\text{Order Quantity} \times \text{Mfg Length} \times \left(\frac{\text{Paper Caliper}}{10{,}000}\right) \times 4}{\text{Press \# Wide} \times \left(\text{Mill Roll Outer Diameter}^2 - \text{Mill Roll Inner Diameter}^2\right) \times \pi \times} \times \left[\left(1 + \frac{\left(\frac{\text{Ply Flat Waste Imps} \times \text{Press \# Wide} \times \text{Press \#Around}}{\text{Order Quantity}}\right)}{1}\right) + \frac{\text{Ply Base Running Waste \%}}{1}\right]\right]$$

Core & Wrapper Waste % per Roll ×

Rounded up × $\dfrac{(\text{Mill Roll Outer Diameter}^2 - \text{Mill Roll Inner Diameter}^2) \times \pi \times \text{Press \# Wide}}{\text{Order Quantity} \times \left(\frac{\text{Paper Caliper}}{10{,}000}\right) \times 4 \times \text{Mfg Length}}$ +

Paper Attribute Waste % + Feature Waste % + Ply Secondary Operation Count × Secondary Operation Waste %

The equation shown above is based on the following:

Ply Waste % = Ply Fixed Waste % + Ply Variable Waste %

Ply Fixed Waste % = Ply Flat Waste % + Ply Base Running Waste %

Ply Flat Waste % = $\left(\dfrac{\text{Ply Flat Waste Imps} \times \text{Press \# Wide} \times \text{Press \# Around}}{\text{Order Quantity}}\right)$ Ply Variable Waste % = $\dfrac{\text{Number of Rolls Used} \times \text{Wasted Impressions Per Roll}}{\text{Required Impressions}}$ Number of Rolls Used = Round Up to Nearest Integer -continued $$\left(\frac{\text{Required Impressions} \times (1 + \text{Ply Fixed Waste \%})}{\text{Impressions per Unwind Roll}}\right)$$

Impressions per Unwind Roll =

$$\frac{((\text{Mill Roll Outer Diameter}^2 - \text{Mill Roll Inner Diameter}^2) \times \pi)}{\text{Press \# Around} \times \text{Press Run Length} \times \left(\frac{\text{Paper Caliper}}{10,000}\right) \times 4}$$

Wasted Impressions Per Roll = Core & Wrapper Waste % per Roll × Impressions per UnWind Roll $$\text{Required Impressions} = \frac{\text{Order Quantity}}{\text{Press \# Around} \times \text{Press \# Wide}}$$

Base Calculation Initializations:

1. Ply Flat Waste Imps is found in the Paper Waste Base table shown below.

2. Press #Wide and Press #Around are found in like named fields on the Press Manufacturing Step.

3. The Order Quantity is initialized to the value of Order_Qty on the Customer Order table.

4. Ply Base Running Waste Percent in found in the Paper Waste Base table shown below.

5. Mfg Length is set equal to the value of Mfg_Length on the Ply table.

6. Paper Caliper is found in the Paper Caliper attribute in the Feature Attribute List table for the paper attached to the current ply.

7. Mill Roll Outer Diameter and Mill Roll Inner Diameter are found in the Roll Type table shown below.

8. Core & Wrapper Waste Percent Per Roll are found in the Paper Waste Base table shown below.

9. Paper Attribute Adjustment should be initialized to 0.00 for base calculation.

10. Feature Waste Percent should be initialized to 0.00 for the base calculation.

11. Ply Secondary Operation Count should be initialized to 0 for the base calculation.

12. Secondary Operation Waste % is found in the Pricing Constants table.

Paper Waste Base Table (the base condition has 0 printing units, crimp fastening for Stanset and no consecutive numbers)

| Product Type | Jumbo | Ply Flat Waste Imps | Ply Base Running Waste % | Core & Wrapper Waste % per Roll |
|---|---|---|---|---|
| Sheeted Single | False | 2000 | 5% | 3% |
| Zipset | True | 2000 | 4% | 3% |
| Zipset | False | 2000 | 6% | 3% |
| Continuous Singles | False | 2000 | 5% | 3% |
| Stanset | True | 3000 | 4% | 3% |
| Stanset | False | 3000 | 6% | 3% |

Roll Type Table

| Roll Type | Jumbo | Outer Diameter | Inner Diameter |
|---|---|---|---|
| Mill Roll | T | 36 | 3 |
| Mill Roll | F | 36 | 3 |
| Finish | T | 39 | 3.5 |
| Finish | F | 20 | 3 |

Step 2. Find the Pounds of Paper Required for total order for each ply.

Ply Pounds Required = Order Quantity × Mfg Length ×

$$\text{Mfg Width} \times (1 + \text{Ply Waste \%}) \times \left(\frac{\text{Order As Weight}}{17 \times 22 \times 500}\right)$$

Base Calculation Initializations

1. Order Quantity is set equal to the Order_Qty field on the Customer Order table.

2. Mfg Length and Mfg Width are found in like named fields on the associated Ply record.

3. Ply Waste % was calculated in Step 1 above.

4. Order As Weight is found in the Feature List attribute table for the associated paper.

Step 3. Calculate Paper Cost/M.

Ply Paper Cost/$M$ =

$$\left\{\frac{\left(\left(\frac{\$}{CWT} + \frac{\text{Narrow Roll \$}}{CWT}\right) \div \frac{100 \text{ lbs.}}{CWT} \times \right)}{(1 - \text{Time Discount}) + \frac{\text{Freight \$}}{\text{lb.}}} \times \frac{1000}{\text{Order Quantity}}\right\} \times (1 - \text{Mfg Reduction\%})$$

Base Calculation Initializations

1. Look up $/CWT, Narrow Roll $/CWT, Time Discount and Freight $/lb by Paper ID and Minimum Pounds Required in the Material Cost/Price table. Note that you must add the Ply Pounds Required as calculated in Step 2 for all plies with the same paper (i.e. same Feature ID) and use this value in the Minimum Pounds field for this lookup. If Narrow Roll $/CWT, Time Discount and Freight $/lb are Null in the Material Cost Price table, use the default values from in the Supplier table.

2. Ply Pounds Required was calculated in Step 2.

3. Order Quantity is set equal to the Order_Qty field in the Customer Order table.

4. Manufacturing Reduction % should be set equal to 0.00 for the base calculation.

Paper Pricing Rules

| Pricing Rule | Rule Description | Input Effected | Factor | Operation |
|---|---|---|---|---|
| 1 | Each printing unit | Feature Waste % | 1% | Add |
| 2 | Press Consec #'s | Feature Waste % | 2% | Add |
| 3 | Press MICR Form Plies = 1 | Feature Waste % | 5% | Add |
| 4 | Press MICR Form Plies > 1 | Feature Waste % | 10% | Add |
| 5 | Set is Flat Glued | Feature Waste % | 5% | Add |
| 6 | Collator Consec #'s | Feature Waste % | 1% | Add |
| 7 | Carbonless Paper Weight < 80 lbs. | Paper Attribute Waste % | 1% | Add |
| 8 | Carbonless Paper Weight >= 80 lbs. | Paper Attribute Waste % | 2% | Add |
| 9 | Dry Gum Paper Weight < 20 lbs. | Paper Attribute Waste % | 5% | Add |
| 10 | Dry Gum Paper Weight >= 20 lbs. Paper Weight < 80 lbs. | Paper Attribute Waste % | 6% | Add |
| 11 | Dry Gum Paper Weight >= 80 lbs. | Paper Attribute Waste % | 7% | Add |
| 12 | Pressure Sensitive Paper Weight < 20 lbs. | Paper Attribute Waste % | 15% | Add |
| 13 | Pressure Sensitive Paper Weight >= 20 lbs. Paper Weight < 80 lbs. | Paper Attribute Waste % | 16% | Add |
| 14 | Pressure Sensitive Paper Weight >= 80 lbs. | Paper Attribute Waste % | 17% | Add |
| 15 | Safety Paper Weight < 80 lbs. | Paper Attribute Waste % | 1% | Add |
| 16 | Safety Paper Weight >= 80 lbs. | Paper Attribute Waste % | 2% | Add |
| 17 | Coated Paper Weight < 20 lbs. | Paper Attribute Waste % | 5% | Add |
| 18 | Coated Paper Weight >= 20 lbs. Paper Weight < 80 lbs. | Paper Attribute Waste % | 6% | Add |
| 19 | Coated Paper Weight > 80 lbs. | Paper Attribute Waste % | 7% | Add |
| 20 | Other Paper Weight >= 20 lbs. Paper Weight < 80 lbs. | Paper Attribute Waste % | 1% | Add |
| 21 | Other Paper Weight >= 80 lbs. | Paper Attribute Waste % | 2% | Add |
| 22 | Offset Paper Weight >= 50 lbs | Paper Attribute Waste % | 1% | Add |

Paper Burden

Paper Burden Equation

Paper Burden is calculated separately for each different paper. This is done to be flexible enough to handle a future possibility of assigning different burden rates to different papers. At present all paper will carry the same burden rate. To most easily incorporate the three ways PRIMAC may define paper burden, the equation shown calculates Paper Burden Cost for each ply separately.

Ply Paper Burden Cost/ $M$ =

$$\left\{ \begin{array}{l} (\text{Ply Pounds Required} \times \text{Burden \$/lb.}) + \\ \left( \text{Ply Pounds Required} \times \dfrac{17 \times 22}{\text{Order As Weight} \times 2} \times \text{Burden \$/}MSI \right) + \\ ((1 + \text{Ply Waste\%}) \times \text{Burden \$/Finished Sheet} \times 1000) \end{array} \right\} \times$$

$$(1 - \text{Mfg Reduction\%})$$

Base Calculation Initializations

1. Ply Pounds Required and Ply Waste % are calculated in the Paper Cost Component in steps 2 and 1, respectively.

2. Burden $/lb., Burden $/MSI and Burden $/Finished Sheet are all found in the Pricing Constants table. Note that only one of these three values will be non-zero.

3. Order As Weight is set equal to the Order As Weight Feature List attribute associated with the paper used for the current ply.

4. Manufacturing Reduction % for base is zero

Paper Burden Rules

No paper burden Pricing Rules have been defined at this time.

Carbon

Carbon Equation

Step 1. Calculate the number of Square Inches required for each carbon ply.

Ply square inches required=Order Quantity×Mfg Length×Mfg Width×(1+Carbon Waste %)

Base Calculation Initializations

1. Order Quantity is set equal to the Order_Qty field on the Customer Order table.

2. Mfg Length is set equal to Mfg_Length field on the associated Ply record.

3. Mfg Width is set equal to the Mfg_Width field on the associated Ply record.

4. Carbon Waste Percent is found in the Carbon_Waste table shown below.

Carbon Waste Table

| Product Type ID | Carbon Waste % |
|---|---|
| Stanset | 9% |
| Continuous Single | 9% |
| Zipset | 6% |

Step 2. Calculate the Carbon Cost/M.

Ply Carbon Cost/$M$ =

$$\text{Mfg Length} \times \text{Mfg Width} \times (1 + \text{Carbon Waste \%}) \times$$
$$(\text{Base } CPMSI + \text{Feature } CPMSI) +$$
$$\left( \text{Make Ready Indicator} \times \frac{\text{Makeready Cost} \times 1000}{\text{Order Quantity} \times \text{Average Order Count}} \right)$$

Base Calculation Initializations

1. Mfg Length is set equal to Mfg_Length field on the associated Ply record.

2. Mfg Width is set equal to the Mfg_Width field on the associated Ply record.

3. Carbon Waste Percent is found in the Carbon_Waste table shown above.

4. Base CPMSI and Make-ready Cost are found in the Material_Cost_Price table shown below.

NOTE that you must add the Ply Square Inches Required as calculated in Step 1 for all plies with the same carbon (i.e. same Feature ID and size and attached features) and use this value in the Material_Min field for this lookup. (i.e. this means that two carbons are unique if they have different feature Ids, different sized, different features attached to the carbon, or similar features but in different locations.

5. Feature CPMSI is set equal to 0.00 for the base calculation.

6. Make Ready Indicator should be set equal to 0 for the base calculation since most full coat slit carbon are stock and the make-ready charge spread over many orders is assumed to be negligible. This indicator may be turned on (set to 1) in the feature rules where appropriate.

7. Order Quantity is set equal to the value of Order_Qty in the Customer Order table.

8. Average Order Count should be set equal to 1 for the base calculation. This may be changed in feature rules to prorate make ready charge over a mix of stock and non stock rolls with feather edge and clean edge (stripe).

Material Cost Price Table
(only fields applicable to carbon shown)

| Feature_List_Id | Cost_Unit_Id | Material_Min | Type | Make_ready_Charge | Material_Charge |
|---|---|---|---|---|---|
| 712 | M Sq. In | 0 | Price | 47.50 | .04204 |
| 712 | M Sq. In | 24,000,000 | Price | 47.50 | .03950 |
| 714 | M Sq. In | 0 | Price | 47.50 | .04288 |
| 714 | M Sq. In | 24,000,000 | Price | 47.50 | .04033 |

Material Cost Price Table
(only fields applicable to carbon shown)

| Feature_List_Id | Cost_Unit_Id | Material_Min | Type | Make_ready_Charge | Material_Charge |
|---|---|---|---|---|---|
| 12812 | M Sq. In | 0 | Price | 90.00 | .0693 |
| 12812 | M Sq. In | 24,000,000 | Price | 90.00 | .0687 |
| 864 | M Sq. In | 0 | Price | 70.00 | .06475 |
| 864 | M Sq. In | 24,000,000 | Price | 70.00 | .06279 |

Note—The cost for all full coat carbons must be slit cost. Full coat processed carbon is generally used in the Stanwide product. Full coat processed carbon may be used in some rare Stanset constructions with manufacturing approval (exception). If pricing for full coat processed carbon is supported then either a field must be added to the Material_Cost_Price table to allow different material types to be attached to a unique feature id or a unique feature id must be established for each full coat processed carbon formula.

Carbon Pricing Rules

| Pricing Rule | Feature | Input Name | Factor | Operation |
|---|---|---|---|---|
| 1 | Vertical Perf | Feature CPMSI | .00833 | Replace |
|  |  | Make Ready Indicator | 1 | Replace |
| 2 | Striped Carbon | Feature CPMSI | .00833 | Replace |
|  |  | Make Ready Indicator | 1 | Replace |
|  |  | Average Order Count | 10 | Replace |
| 3 | Feather Edge Carbon | Feature CPMSI | .00833 | Replace |
|  |  | Make Ready Indicator | 1 | Replace |
|  |  | Average Order Count | 10 | Replace |

Miscellaneous Materials

Miscellaneous Material Equation

The following is the Order $ version of the Miscellaneous Material equation.

Miscellaneous Material Cost/$M$ =

$$\text{Feature Cost \$/}M + \left( \frac{\text{Feature Cost Flat \$} \times 1000}{\text{Order Quantity}} \right)$$

Base Calculation Initializations

1. Feature Cost $/M is set to $0.00 for the base calculation.

2. Feature Cost Flat $ is set to $0.00 for the base calculation.

3. Order Quantity is set to the value of Order_Qty in the Customer Order table.

Miscellaneous Material Pricing Rules:

| Pricing Rule | Feature | Input Name | Factor | Operation |
|---|---|---|---|---|
| 1 | Laser Cartons | Feature Cost $/M | .23 | Add |
|   |   | Feature Cost Flat $ | 10.00 | Add |
| 2 | Standard Palletizing Sequenced | Feature Cost $/M |   | Add |
|   |   | Feature Cost Flat $ |   | Add |
| 3 | Standard Palletizing Not Sequenced | Feature Cost $/M |   | Add |
|   |   | Feature Cost Flat $ |   | Add |
| 4 | Special Palletizing Sequenced | Feature Cost $/M |   | Add |
|   |   | Feature Cost Flat $ |   | Add |
| 5 | Special Palletizing Not Sequenced | Feature Cost $/M |   | Add |
|   |   | Feature Cost Flat $ |   | Add |
| 6 | New Match Ink | Feature Cost Flat $ |   | Add |

The equations and rules for the labor cost component are as follows:

Composition

Composition Equation

Composing Minutes/$M =$ $$\begin{bmatrix} \text{Number of 1 Line Change Faces} \times \text{Minutes per 1 Line Change Face} + \\ \text{Number of Minor Faces} \times \text{Minutes per Minor Face} + \\ \text{Number of Major Faces} \times \text{Minutes per Major Face} + \\ \text{Number of Extensive Faces} \times \text{Minutes per Extensive Face} + \\ \text{Number of Exact Reorder Faces} \times \text{Minutes per Exact Reorder Face} + \\ \text{Number of Same As Another Face} \times \text{Minutes per Same As Another Face} + \\ \text{Number of Camera Ready Faces} \times \text{Minutes per Camera Ready Face} + \\ \text{Number of Camera Ready 1 Line Faces} \times \text{Minutes per Camera Ready 1 Line Face} + \\ \text{Number of 1 Line Change Carbon Faces} \times \text{Minutes per 1 Line Change Carbon Face} + \\ \text{Number of Minor Carbon Faces} \times \text{Minutes per Minor Carbon Face} + \\ \text{Number of Major Carbon Faces} \times \text{Minutes per Major Carbon Face} + \\ \text{Number of Extensive Carbon Faces} \times \text{Minutes per Extensive Carbon Face} + \\ \text{Number of Exact Reorder Carbon Faces} \times \text{Minutes per Exact Reorder Carbon Face} + \\ \text{Number of Same As Another Carbon Faces} \times \text{Minutes per Same As Another Carbon Face} \end{bmatrix} \times \frac{1000}{\text{Order Quantity}}$$

Composition Labor Cost/$M =$ Composition Minutes/$M \times$ Composition Labor $/Hour $\div 60$ Minutes Base Calculation Initializations 1. The Number of Faces for each paper version will be determined by reading each paper ply and tallying them by the values found in Composition Complexity Front and Composition Complexity Back fields.

2. The Number of Faces for each carbon version will be determined by reading each carbon ply and tallying them by the values found in Composition Complexity Front and Composition Complexity Back fields.

3. Time for each version will be found in the Composition Minutes table shown below.

4. Order Quantity is set equal to the Order_Qty field on the Customer Order table.

5. Composition Labor Rate is found in the SRC Cost Center List table using the SRC Cost Center ID found in the Mfg Step table.

| Composition Type | Paper | Composing Minutes |
|---|---|---|
| 1 Line Change | True | 10 |
| Minor | True | 20 |
| Major | True | 45 |
| Extensive | True | 120 |
| Exact Reorder | True | 0 |
| Same As Another | True | 0 |
| Camera Ready | True | 0 |
| Camera Ready 1Line | True | 10 |
| 1 Line Change | False | 10 |
| Minor | False |   |
| Major | False |   |
| Extensive | False |   |
| Exact Reorder | False |   |
| Same As Another | False |   |

Composition Pricing Rules

There are no pricing rules currently defined for the Composition Cost Component.

Note: Composing direct labor in the future will be included in the markup calculation as an expense instead of factory cost

Photo Offset

Photo Offset Equation

Step 1. Calculate the Number of Extra Plates required for each unique original plate. Plates wear out. Many duplicates of the same plate may be required to run the entire order. A plate may be used to print one or more plies. The total number of impressions that need to be printed by the same plate will determine how many plates will be required. Since front and back printing are applied during the same press pass at two different stations, both a front and back plate are required. Therefore identical front and back composition requires two original plates. But if there are several plies that have identical composition on the same face, only one original plate is required.

Number of Extra Plates =

$$\left( \text{Rounded Up to Nearest Integer} \left[ \frac{\sum_{\text{each ply face}} \left( \frac{\text{Order Quantity}}{\text{Impression per Plate} \times \text{Number Wide} \times \text{Number Around}} \right)}{(\text{Carbonless Paper Factor} - \text{Screening Factor})} \right] \right) - 1$$

Base Calculation Initializations

1. Press #Wide and Press #Around is found on the Press Manufacturing Step record for the given ply.

2. Order Quantity is set equal to the Order_Qty field on the Customer Order table.

3. The Carbonless Paper Factor should be set to 0.5 if the ply currently being examined is carbonless and 1.0 if not. Whether the ply is carbonless can be found in the 'Paper Pricing Group' feature list attribute.

4. The Screening Factor should be set to 0.25 if the screening or reverse print indicator is TRUE for the current plate and 0.00 if not.

5. Impressions/Plate is found in pricing reference data tables for plate life. See below.

Plate Life Table

| Equipment Type | Plate Life Impressions |
|---|---|
| Offset Press | 300,000 |
| Transfer Letterpress | 1,000,000 |

Step 2. Calculate the amount of time required in Photo Offset.

Photo Offset Minutes/$M$ =

$$\begin{bmatrix} \text{Feature Minutes} + \\ \text{Number of New Plates} \times \text{Minutes per New Plate} + \\ \text{Number of 1 Line Change Plates} \times \text{Minutes per 1 Line Change Plate} + \\ \text{Number of Exact Reorder Plates} \times \text{Minutes of Exact Reorder Plate} + \\ \text{Number of Camera Ready Plates} \times \text{Minutes per Camera Ready Plate} + \\ \text{Number of Camera Ready 1 Line Change Plates} \times \\ \text{Minutes per Camera Ready 1 Line Change Plate} + \\ \text{Number of Extra Plates} \times \text{Minutes per Extra Plate} \end{bmatrix} \times \frac{1000}{\text{Order Quantity}}$$

Photo Offset Labor Cost/$M$ =

Photo Offset Minutes/$M$ × Photo Offset Labor \$/Hour ÷ 60 Minutes

Base Calculation Initializations

1. Feature Minutes is set to zero (0) for the base calculation.

2. The Number of plates for each version (except Extra) will be determined by reading each plate record and tallying them by the values found in the Plate Change Complexity field.

3. Number of Extra Plates is calculated in Step 1.

4. Minutes for each plate version are found in the Photo Offset Minutes table as shown below.

5. Photo Offset Labor Rate is found in the SRC Cost Center List table using the SRC Cost Center ID found in the Mfg Step table.

Photo Offset Minutes Table

| Plate Version | Photo Offset Minutes |
|---|---|
| New | 130 |
| 1 Line Change | 10 |
| Exact Reorder | 30 |
| Camera Ready | 75 |
| Camera Ready 1 Line Change | 85 |
| Extra Plates | 30 |

Photo Offset Pricing Rules

| Pricing Rule | Condition(s) | Affected Input | Factor | Operation |
|---|---|---|---|---|
| 1 | MICR Repetitive | Feature Minutes | 40 | Add |
| 2 | Optical Scanning | Feature Minutes | 60 | Add |

Press Setup

Press Setup Equation

The following is the equation of cost for the press setup operation for rotary products.

Press Flat Minutes/$M$ =

$$\left\{ \left[ \left( \frac{\begin{array}{c} \text{Base Minutes} + \\ \text{Add'l for Ply} \times (\text{Form Plys} - 2) + \\ \text{Add'l for \# Wide} \times \\ (\text{Max Press\# Wide} - 1) + \\ \text{Add'l for both Ply \& \# Wide} \times \\ (\text{Form Plys} - 2) \times (\text{Max Press \# Wide} - 1) \end{array}}{\text{Setup Lineup Factor}} \right) + \text{Feature Setup Minutes} \right] \times \frac{1000}{\text{Order Quantity}} \right\} \times$$

-continued $$\text{Press Flat Labor Cost}/M = \\ \text{Press Flat Minutes}/M \times \text{Press Labor \$/Hour} \div 60 \text{ Minutes/Hour} \cdot (1 - \text{Mfg Reduction})$$

Base Calculation Initializations

1. Base Minutes, Add'l for Ply, Add'l for #Wide, and Add'l for both Ply & #Wide are found in the Equipment Setup Minutes reference table shown below. This table has a Setup_Equip_Type field which holds the type of press for which the Equipment Setup record applies. The value to be used in the lookup for this part of the key is found in the first Press Mfg Step in the Equip_Type_ID field.

2. Order Quantity is set equal to Order_Qty on the Customer Order table.

3. Form Plies is initialized with the count of paper plies for the manufacturing order.

4. Press #Wide is determined by looking for the maximum number wide across all press steps or, if any press step has Semi-finished sheets as the delivery method, then set the value of Max Press #Wide to 1.

5. Feature Setup Minutes=0 in the base condition. Features add time. This is calculated separately and replaces the 0.

6. Setup Lineup Factor=1 in the base condition.

7. Manufacturing Reduction Percent should be initialized to 0.00 for the base calculation.

8. Press Labor Rate is found in the SRC Cost Center List table using the SRC Cost Center ID found in the Mfg Step table.

Equipment Setup Minutes Table (Press Values only)

| Product Type | Equip Type | Minimum # Around | Multiple Plies | Base Minutes | Add'l Mins. for over 2 Plies | Add'l Mins. for over 1 Wide | Add'l Mins. for Over on Ply and Wide |
|---|---|---|---|---|---|---|---|
| Stanset | Offset | 1 | True | 92.0 | 24.9 | 15.6 | 1.9 |
| Stanset | Offset | 2 | True | 94.1 | 25.8 | 17.8 | 2.8 |
| Stanset | Offset | 4 | True | 100.5 | 28.6 | 24.1 | 5.7 |
| Cont. Single | Offset | 1 | False | 125.2 | 0 | 14.6 | 0 |
| Cont. Single | Offset | 2 | False | 71.6 | 0 | 19.1 | 0 |
| Cont. Single | Offset | 4 | False | 110.0 | 0 | 25.5 | 0 |
| Zipset | Offset | 2 | True | 90.0 | 25.1 | 12.0 | 2.1 |
| Zipset | Offset | 3 | True | 90.3 | 26.2 | 14.4 | 3.2 |
| Zipset | Offset | 4 | True | 72.6 | 27.2 | 16.8 | 4.3 |
| Zipset | Offset | 5 | True | 95.0 | 28.3 | 19.1 | 5.3 |
| Zipset | Offset | 2 | False | 62.8 | 0 | 9.9 | 0 |
| Zipset | Offset | 3 | False | 64.1 | 0 | 11.2 | 0 |
| Zipset | Offset | 4 | False | 65.4 | 0 | 12.5 | 0 |
| Zipset | Offset | 5 | False | 66.7 | 0 | 13.8 | 0 |
| Sheeted Single | Offset | 1 | False | | | | |
| Sheeted Single | Offset | 2 | False | 119.6 | 0 | 19.1 | 0 |
| Sheeted Single | Offset | 4 | False | 158.0 | 0 | 25.5 | 0 |

Press Setup Rules

The criteria for some rules may be "none" which merely indicates that the rule should be run every time because of the existence of the manufacturing process and cost component.

| Pricing Rule | Criteria (Multiple Criteria on Multiple lines) | Affected Input | Change | Value |
|---|---|---|---|---|
| 1 | 3/16" Regular Number | Feature Setup Minutes | Add | Module B |
| 2 | Standard Perf<br>Orientation = Vertical<br>Type = Hit Skip | Feature Setup Minutes | Add | Module A |
| 3 | Standard Perf<br>Orientation = Vertical<br>Type = Full | Feature Setup Minutes | Add | Module A |
| 3 | Standard Perf<br>Orientation = Horizontal<br>Type = Partial | Feature Setup Minutes | Add | Module C |
| 4 | Standard Perf<br>Orientation = Horizontal<br>Type = Full | Feature Setup Minutes | Add | Module C |
| 5 | Any Ink exists on form | Feature Setup Minutes | Add | Module D |
| 6 | Any Plates used on form | Feature Setup Minutes | Add | Module D |

Press Run

Setup
Collator Setup Equation

The following is the equation of cost for the collator setup operation for rotary products.

Press Run Equation

Press Running Cost/M is calculated ply by ply. The calculation consists of three major portions: base running, unwind roll change time, and finished roll change time.

Step 1. Calculate FPM adjusted for paper weight slowdown.

Feature $FPM$=Base $FPM$×Paper Weight Slow Speed Factor

Base Calculation Initializations

1. Base FPM and Paper Weight Slow Speed Factor are found in Press Base Speed table shown below. Equipment Type and Delivery Method are found in the associated Mfg Step record.

2. Paper Weight Slow Speed Factor is found in the Paper Weight Speed Factor table also shown below. Delivery Method is found in the associated Mfg Step record and Paper Weight is found in the Feature List Attribute table for the paper being run during this operation.

Press Base Speed

| Equipment Type | Delivery Method | Finish RollChange Time | Base FPM |
|---|---|---|---|
| Offset Press | Fold | 0 | 541 |
| Offset Press | Roll | 5.3 | 618 |
| Offset Press | Finished Sheet | 0 | 541 |
| Offset Press | Semi-Finished Sheet | 0 | 309 |
| Offset Press | Spiral Fold | 0 | 256 |

Paper Weight Speed Factor

| Press Delivery Type | Min Paper Weight | % Of Base Fpm |
|---|---|---|
| Fold | 0 | 87.5% |
| Fold | 12.0 | 100.0% |
| Fold | 24.1 | 87.5% |
| Fold | 80.1 | 75.0% |
| Roll | 0 | 87.5% |
| Roll | 12.0 | 100.0% |
| Roll | 24.1 | 87.5% |
| Roll | 80.1 | 75.0% |
| Finished Sheet | 0 | 87.5% |
| Finished Sheet | 12.0 | 100.0% |
| Finished Sheet | 24.1 | 87.5% |
| Finished Sheet | 80.1 | 75.0% |
| Semi-Finished Sheet | 0 | 97.5 |
| Semi-Finished Sheet | 12.0 | 100.0% |
| Semi-Finished Sheet | 24.1 | 97.5% |
| Semi-Finished Sheet | 80.1 | 95.0% |
| Spiral Fold | 0 | 71.0% |
| Spiral Fold | 20.0 | 100.0% |
| Spiral Fold | 24.1 | 84.0% |
| Spiral Fold | 80.1 | 71.0% |

Step 2. Calculate Press Running Minutes

Press Running Minutes/$M =$ $$\left(\left(\frac{1000}{\text{Feature } FPM \times [100\% - (\text{Press \# Wide} + \text{No. of Units} - 2) \times \text{\# Wide \& No. of Units Slowdown Factor)}] \times 12 \times \text{Press \# Wide}} + \frac{\text{Mill Roll Change Time} \times \left(\frac{\text{Paper Caliper}}{10,000}\right) \times 4000}{(\text{Mill Roll Outer Diameter}^2 - \text{Mill Roll Inner Diameter}^2) \times \pi \times \text{Press \# Wide}}\right.\right.$$

$$\left.\left. + \frac{(\text{Finish Roll Change Time} + \text{Number Reset Time}) \times \left(\frac{\text{Paper Caliper}}{10,000}\right) \times 4000}{(\text{Finish Roll Outer Diameter}^2 - \text{Finish Roll Inner Diameter}^2) \times \pi \times \text{Press \# Wide}}\right) \times (1 + \text{Feature Special Delay \%}) + \right) \times$$

$$(1 - \text{Manufacturing Reduction \%}) \times \text{Mfg Length}$$

Press Run Labor Cost/$M$=Press Run Minutes/$M$×Press Labor $/Hour÷60 Minutes/Hour Base Calculation Initializations 1. Feature FPM was calculated in Step 1.
2. Press #Wide is found in the Mfg Step record.
3. No. of Units for the ply is a count of original litho plates used on this ply.
4. #Wide & No. of Units Slowdown Factor is found in the Pricing Constants table.
5. Mill Roll Change Time is found in the Pricing Constants table.[See Note 1]

[Note 1]: The Base FPM and base condition Base Mill Roll Change Minutes include PRESS TURNOVER ALLOWANCE=1.0526, PRESS CLAIM FACTOR=1.115 and NORMAL RUN & DAILY FACTOR of 1.1024.

6. Paper Caliper is found in the Feature List Attribute table for the paper associated with this press run step.
7. Mill Roll Inner and Outer Diameter are found in the Roll Type table shown below. The Roll Type looked up should be Mill Roll and the Jumbo indicator to use is found on the Mfg Order record.
8. Finish Roll Change Time is found in the Press Base Speed table shown above.
9. Number Reset Time should be initialized to zero (0) for the base calculation.
10. Finish Roll Inner and Outer Diameter are found in the Roll Type table shown below. The Roll Type looked up should be Finish Roll and the Jumbo indicator to use is found on the Mfg Order record.

11. Manufacturing Reduction Percent should be initialized to zero (0) for the base calculation.

12. Mfg Length should be initialized with the Mfg Length field in the associated Ply record.

13. Press Labor Rate is found in the SRC Cost Center List table using the SRC Cost Center ID found in the Mfg Step table.

14. Feature Special Delay % is set to 0.00 for the base calculation.

Roll Type Table

| Roll Type | Jumbo | Outer Diameter | Inner Diameter |
|---|---|---|---|
| Mill Roll | True | 36 | 3 |
| Mill Roll | False | 36 | 3 |
| Finish Roll | True | 39 | 3.5 |
| Finish Roll | False | 20 | 3 |

Press Running Pricing Rules

The criteria for some rules may be "none" which merely indicates that the rule should be run every time because of the existence of the manufacturing process and cost component.

| Pricing Rule | Feature | Input | Value | Operation |
|---|---|---|---|---|
| 1 | Carbonless | Feature FPM | 376 | Replace |
|   |   | Mill Roll Change Time | 12.5 | Replace |
| 2 | Dry Gum | Feature FPM | 210 | Replace |
|   |   | Mill Roll Change Time | 13.5 | Replace |
| 3 | Hit-Skip Perfs Vert | Feature FPM | 271 | Replace |
|   |   | Mill Roll Change Time | 13.5 | Replace |
| 4 | MICR Consec. Numbering | Feature FPM | 271 | Replace |
|   |   | Finish Roll Change Time | 3.8 | Add |
|   |   | Number Reset Time | Module E | Add |
| 5 | Over 12 Number Machines | Feature FPM | 271 | Replace |
| 6 | Spiral Folding | Mill Roll Change Time | 12.9 | Replace |
| 7 | Title Heat Resistant Ink | Feature Special Delay % | 5% | Add |
| 8 | Ink (each Litho ink on the ply) Heat Resistant Ink | Feature Special Delay % | 5% | Add |
| 9 | Micr Consec Number Heat Resistant Ink | Feature Special Delay % | 5% | Add |
| 10 | 3/16 Regular Consecutive Number Heat Resistant Ink | Feature Special Delay % | 5% | Add |
| 11 | 3/16 Regular Consecutive Number | Number Reset Time | Module E | Add |
| 12 | Prismatic Printing | No of Units | 1 | Add |

Collator

Collator Flat Minutes/$M =$ $$\left\{ \frac{\begin{pmatrix} \text{Base Minutes} + \\ \text{Add'l for Ply} \times ((\text{Form Ply} \times \text{Number of Streams}) - 2) + \\ \text{Add'l for \# Wide} \times (\text{Collator \# Wide} - 1) + \\ \text{Add'l for both Ply \& \# Wide} \times \\ ((\text{Form Ply} \times \text{Number of Streams}) - 2) \times \\ (\text{Collator \# Wide} - 1) \end{pmatrix}}{\text{Setup Lineup Factor}} \right\} + \text{Feature Setup}$$

$$(1 - \text{ManufacturingReduction\%}) \times \frac{1000}{\text{Order Quantity}}$$

Collator Flat Labor Cost/$M$=Collator Flat Minutes/$M$×Collator Labor \$/Hour÷60 Minutes/Hour Base Calculation Initializations 1. Base Minutes, Add'l for Ply, Add'l for #Wide, and Add'l for both Ply & #Wide are found in the Equipment Setup Minutes reference table shown below. This table has a Setup_Equip_Type field which holds the type of collator for which the Equipment Setup record applies. The value to be used in the lookup for this part of the key is found in the first Press Mfg Step in the Equip_Type_ID field.

2. Form Plies is initialized with the count of paper plies for the manufacturing order.

3. Number of Streams is from the Num_Streams field on the Manufacturing Step record.

4. Collator #Wide is set equal to the Number Wide field on the Collator Manufacturing Step record.

5. Feature Setup Minutes should be initialized to 0 for the base calculation.

6. Setup Lineup Factor should be initialized to 1 in the base condition.

7. Order Quantity is set equal to Order_Qty on the Customer Order table.

8. Manufacturing Reduction Percent should be initialized to 0.00 for the base calculation.

9. Collator Labor Rate is found in the SRC Cost Center List table using the SRC Cost Center ID found in the Mfg Step table.

| | | | | Equipment Setup Minutes (Collator Values Only) | | | |
|---|---|---|---|---|---|---|---|
| Product Type | Equip Type | Minimum # Around | Multiple Plies | Base Minutes | Add'l Mins. for over 2 Plies | Add'l Mins. for over 1 Wide | Add'l Mins. for Over on Ply and # Wide |
| Stanset | Crimp | 1 | True | 93.1 | 5.1 | 0 | 0 |
| Stanset | Crimp | 2 | True | 73.4 | 5.1 | 0 | 0 |
| Stanset | Crimp | 4 | True | 127.7 | 5.1 | 0 | 0 |
| Stanset | Glue | 1 | True | 93.1 | 5.1 | 0 | 0 |
| Stanset | Glue | 2 | True | 73.4 | 5.1 | 0 | 0 |
| Stanset | Glue | 4 | True | 127.7 | 5.1 | 0 | 0 |
| Cont. Single | Glue | 1 | False | | 0 | 0 | 0 |
| Cont. Single | Glue | 2 | False | | 0 | 0 | 0 |
| Cont. Single | Glue | 4 | False | | 0 | 0 | 0 |
| Zipset | Zipset | 2 | True | 46.6 | 3.8 | 0 | 0 |
| Zipset | Zipset | 3 | True | 80.0 | 3.8 | 0 | 0 |
| Zipset | Zipset | 4 | True | 87 | 3.8 | 0 | 0 |
| Zipset | Zipset | 5 | True | 93.7 | 3.8 | 0 | 0 |
| Zipset | Zipset | 2 | False | 42.8 | 0 | 0 | 0 |
| Zipset | Zipset | 3 | False | 76.2 | 0 | 0 | 0 |
| Zipset | Zipset | 4 | False | 83.2 | 0 | 0 | 0 |
| Zipset | Zipset | 5 | False | 89.9 | 0 | 0 | 0 |

Note:

Collator Setup Pricing Rules

The criteria for some rules may be "none" which merely indicates that the rule should be run every time because of the existence of the manufacturing process and cost component.

| Optional? | Feature | Cost Component Input | Factor | Operation |
|---|---|---|---|---|
| Yes | Filefold | Feature Setup Minutes | 90 | add |
| Yes | Cross web glue 1 glue unit | Feature Setup Minutes | 150 | add |
| Yes | Cross web glue 2 glue units | Feature Setup Minutes | 210 | add |
| Yes | Cross web glue 3 glue units | Feature Setup Minutes | 255 | add |
| Yes | Cross web glue 4 glue units | Feature Setup Minutes | 285 | add |

-continued

| Optional? | Feature | Cost Component Input | Factor | Operation |
|---|---|---|---|---|
| Yes | Accumod number | Feature Setup Minutes | 60 | add |
| Yes | Autographic number | Feature Setup Minutes | 60 | add |

Collator Run

Collator Run Equation

Collator running minutes/M are calculated differently by collator type. The equation shown can be used for Crimp, Glue and Zipset collating, but the supporting reference data is separate. The calculation consists of three major portions: base running, carbon roll change time, and paper roll change time.

$$\text{Collator Running Minutes}/M = \left\{ \left[ \left( \frac{1000}{[\text{Base } FPM - \text{Ply Adjustment} \times (\text{Form Plys} - 2)] \times 12 \text{ inches/foot}} \right) \times (1 + \text{Feature Base Adjustment}\%) \right] + \right.$$

$$\text{Feature Base Adjustment Min.}/M +$$

$$\frac{\text{Carbon Roll Change Time} \times \left( \frac{\text{Total Carbon Caliper}}{10,000} \right) \times 4000}{(\text{Carbon Roll Outer Diameter}^2 - \text{Carbon Roll Inner Diameter}^2) \times \pi \times \text{Collator \# Wide}} +$$

$$\left. \frac{(\text{Paper Roll Change Time} + \text{Number Reset Time}) \times \left( \frac{\text{Total Paper Caliper}}{10,000} \right) \times 4000}{(\text{Paper Roll Outer Diameter}^2 - \text{Paper Roll Inner Diameter}^2) \times \pi \times \text{Collator \# Wide}} \right\} \times$$

$$\text{Collator Run Labor Cost}/M = \text{Collator Run Minutes}/M \times \text{Collator Labor \$/Hour} \div 60 \text{ Minutes/H} \frac{\text{Mfg Length}}{\text{Number of Streams}} \times (1 - \text{Manufacturing}$$

Base Calculation Initializations (All Collator Types)

1. Form Plies is a count of the paper ply records for this manufacturing order.
2. Feature Base Adjustment should be initialized to 0.00 for the base calculation.
3. Feature Base Adjustment Min/M should be initialized to 0.00 for the base calculation.
4. Carbon Roll Change Time is found in the Pricing Constants table.
5. Total Carbon Caliper is the sum of all carbon calipers as found in the Feature List Attribute Carbon Caliper attached to each carbon Ply.
6. Carbon Roll Inner Diameter and Carbon Roll Outer Diameter are found in the Roll Type table shown below. These values are found in the Carbon Roll records where the Jumbo indicator matches that found on the Manufacturing Order record.
7. Collator #Wide is found on the collator Manufacturing Step record.
8. Paper Roll Change Time is found in the Pricing Constants table.
9. Number Reset Time should be initialized to 0 for the base calculation.
10. Total Paper Caliper is the sum of all paper calipers as found in the Feature List Attribute Paper Caliper attached to each paper Ply.
11. Paper Roll Inner Diameter and Paper Roll Outer Diameter are found in the Roll Type table shown below. These values are found in the Finish Roll records where the Jumbo indicator matches that found on the Manufacturing Order record.
12. Mfg Length should be set equal to the Maximum Mfg Length of all paper and carbon plies in the Ply table.
13. Number of Streams is initialized to the value of Num_Streams as found in the Collator Mfg Step record.
14. Manufacturing Reduction should be set to 0.00 for the base calculation.
15. Collator Labor Rate is found in the SRC Cost Center List table using the SRC Cost Center ID found in the Mfg Step table.

The Base FPM and Ply Adjustment FPM inputs are initialized differently depending on which type of collator is being used in the production of this form. The Equipment_Type_ID on the Mfg Step table for the collator operation identifies which collator to use. See the Equipment Type table for the actual Ids for these collator types.

Base Calculation Initializations (Stanset Crimp Collator)

1. Base FPM and Ply Adjustment FPM is initialized to the value found in the Crimp Collator Base Speed table shown below.

Base Calculation Initializations (Stanset Glue Collator)

1. Base FPM is initialized to the value found in the Glue Collator Base Speed table shown below.
2. Ply Adjustment FPM is set to 0 for the base calculation.

Base Calculation Initializations (Zipset Collator)

1. Base FPM is initialized to the value found in the Zipset Collator Base Speed table shown below.
2. Ply Adjustment FPM is set to 0 for the base calculation.

Roll Type Table

| Roll Type | Jumbo | O.D. | I.D. |
|---|---|---|---|
| Mill Roll | True | 36 | 3 |
| Mill Roll | False | 36 | 3 |
| Finish | True | 39 | 3.5 |
| Finish | False | 20 | 3 |
| Carbon | True | 27 | 3 |
| Carbon | False | 17 | 3 |

Jumbo (describes Press Finished Roll and Collator Paper and Carbon) is in Manufacturing Order Crimp Collator Base Speed

| Product Type | Jumbo | Base FPM | Ply Adjustment FPM |
|---|---|---|---|
| Stanset | False | 266 | 16.65 |
| Stanset | True | 288 | 19.66 |

Glue Collator Base Speed

| Product Type | Minimum Ply Weight | Carbonless | Jumbo | 1 Ply | 2 Ply | 3 Ply | 4 Ply | 5 Ply | 6 Ply | 7 Ply | 8 Ply | 9 Ply | 10 Ply |
|---|---|---|---|---|---|---|---|---|---|---|---|---|---|
| Stanset | 0 | False | True | 105 | 242 | 221 | 182 | 162 | 146 | 113 | 113 | 97 | 89 |
| Stanset | 12 | False | True | 242 | 282 | 262 | 242 | 203 | 182 | 146 | 130 | 105 | 97 |
| Stanset | 20 | False | True | 242 | 242 | 221 | 182 | 162 | 146 | 113 | 113 | 97 | 89 |
| Stanset | 60 | False | True | 203 | 242 | 146 | 130 | 130 | 81 | 81 | 73 | 73 | 73 |
| Stanset | 80 | False | True | 146 | 162 | 97 | 89 | 89 | 81 | 81 | 73 | 73 | 73 |
| Stanset | 100 | False | True | 146 | 113 | 97 | 89 | 89 | 81 | 81 | 73 | 73 | 73 |
| Stanset | 12 | True | True |  | 282 | 221 | 182 | 162 | 113 | 105 | 97 | 89 | 81 |
| Stanset | 20 | True | True |  | 242 | 146 | 130 | 130 | 113 | 105 | 97 | 89 | 81 |
| Stanset | 105 | True | True | 146 | 113 | 97 | 89 | 89 | 81 | 81 | 73 | 73 | 73 |

Glue Collator Base Speed

| Product Type | Minimum Ply Weight | Carbon-less | Jumbo | 1 Ply | 2 Ply | 3 Ply | 4 Ply | 5 Ply | 6 Ply | 7 Ply | 8 Ply | 9 Ply | 10 Ply |
|---|---|---|---|---|---|---|---|---|---|---|---|---|---|
| Stanset | 0 | False | False | 78 | 179 | 164 | 135 | 120 | 108 | 84 | 84 | 72 | 66 |
| Stanset | 12 | False | False | 179 | 209 | 194 | 179 | 150 | 135 | 108 | 96 | 78 | 72 |
| Stanset | 20 | False | False | 179 | 179 | 164 | 135 | 120 | 108 | 84 | 84 | 72 | 66 |
| Stanset | 60 | False | False | 150 | 179 | 108 | 96 | 96 | 60 | 60 | 54 | 54 | 54 |
| Stanset | 80 | False | False | 108 | 120 | 72 | 66 | 66 | 60 | 60 | 54 | 54 | 54 |
| Stanset | 100 | False | False | 108 | 84 | 72 | 66 | 66 | 60 | 60 | 54 | 54 | 54 |
| Stanset | 12 | True | False |  | 209 | 164 | 135 | 120 | 84 | 78 | 72 | 66 | 60 |
| Stanset | 20 | True | False |  | 179 | 108 | 96 | 96 | 84 | 78 | 72 | 66 | 60 |
| Stanset | 105 | True | False | 108 | 84 | 72 | 66 | 66 | 60 | 60 | 54 | 54 | 54 |

Zipset Collator Base Speed Table

| Number of Plies × Number of Streams (Minimum) | Number of Operators | Cutoff length > 4" | Breakaway | Jumbo | Base FPM |
|---|---|---|---|---|---|
| 1 | 1 | False | False | False | 1 |
| 1 | 1 | False | True | False | 130 |
| 1 | 1 | True | False | False | 115 |
| 1 | 1 | True | True | False | 150 |
| 1 | 1 | False | False | True | 185 |
| 1 | 1 | False | True | True |  |
| 1 | 1 | True | False | True |  |
| 1 | 1 | True | True | True |  |
| 1 | 2 | False | False | False | 125 |
| 1 | 2 | False | True | False | 185 |
| 1 | 2 | True | False | False | 175 |
| 1 | 2 | True | True | False |  |
| 1 | 2 | False | False | True |  |
| 1 | 2 | False | True | True |  |
| 1 | 2 | True | False | True |  |
| 1 | 2 | True | True | True |  |
| 2 | 1 | False | False | False |  |
| 2 | 1 | False | True | False |  |
| 2 | 1 | True | False | False |  |
| 2 | 1 | True | True | False |  |
| 2 | 1 | False | False | True |  |
| 2 | 1 | False | True | True |  |
| 2 | 1 | True | False | True |  |
| 2 | 1 | True | True | True |  |
| 2 | 2 | False | False | False |  |
| 2 | 2 | False | True | False |  |
| 2 | 2 | True | False | False |  |
| 2 | 2 | True | True | False |  |
| 2 | 2 | False | False | True |  |
| 2 | 2 | False | True | True |  |
| 2 | 2 | True | False | True |  |
| 2 | 2 | True | True | True |  |
| 4 | 1 | False | False | False |  |
| 4 | 1 | False | True | False |  |
| 4 | 1 | True | False | False |  |
| 4 | 1 | True | True | False |  |
| 4 | 1 | False | False | True |  |
| 4 | 1 | False | True | True |  |
| 4 | 1 | True | False | True |  |
| 4 | 1 | True | True | True |  |
| 4 | 2 | False | False | False |  |
| 4 | 2 | False | True | False |  |
| 4 | 2 | True | False | False |  |
| 4 | 2 | True | True | False |  |
| 4 | 2 | False | False | True |  |
| 4 | 2 | False | True | True |  |
| 4 | 2 | True | False | True |  |
| 4 | 2 | True | True | True |  |
| 7 | 1 | False | False | False |  |
| 7 | 1 | False | True | False |  |
| 7 | 1 | True | False | False |  |
| 7 | 1 | True | True | False |  |
| 7 | 1 | False | False | True |  |
| 7 | 1 | False | True | True |  |
| 7 | 1 | True | False | True |  |
| 7 | 1 | True | True | True |  |
| 7 | 2 | False | False | False |  |
| 7 | 2 | False | True | False |  |
| 7 | 2 | True | False | False |  |
| 7 | 2 | True | True | False |  |
| 7 | 2 | False | False | True |  |
| 7 | 2 | False | True | True |  |
| 7 | 2 | True | False | True |  |
| 7 | 2 | True | True | True |  |
| 10 | 1 | False | False | False |  |
| 10 | 1 | False | True | False |  |
| 10 | 1 | True | False | False |  |
| 10 | 1 | True | True | False |  |
| 10 | 1 | False | False | True |  |
| 10 | 1 | False | True | True |  |
| 10 | 1 | True | False | True |  |
| 10 | 1 | True | True | True |  |
| 10 | 2 | False | False | False |  |
| 10 | 2 | False | True | False |  |
| 10 | 2 | True | False | False |  |
| 10 | 2 | True | True | False |  |
| 10 | 2 | False | False | True |  |
| 10 | 2 | False | True | True |  |
| 10 | 2 | True | False | True |  |
| 10 | 2 | True | True | True |  |

| Collator Running Feature Rule Examples | | | | | | |
|---|---|---|---|---|---|---|
| Feature | 1st Condition | 2nd Condition | 3rd Condition | Variable Name | Value | Operation |
| Press Applied Consec. Numbers | Regular Collator | Crimp only | | Base FPM | −33.3 | Add |
| Press Applied Consec. Numbers | Regular Collator | Crimp Only | | Feature Base Adjustment % | 8.7 | Replace |
| Press Applied Consec. Numbers | Jumbo Collator | Crimp Only | | Base FPM | 39.3 | Add |
| Press Applied Consec. Numbers | Jumbo Collator | Crimp Only | | Feature Base Adjustment % | 7.0 | Replace |
| Hotspot | Crimp Only | | | Form Plies | 1 | Add |
| Any Ply is DRY GUM | 2 ply | Any Glue | Continuous | Base FPM | 120 | Replace |
| Any Ply is DRY GUM | 3 ply | Any Glue | Continuous | Base FPM | 108 | Replace |
| Any Ply is DRY GUM | 4 ply | Any Glue | Continuous | Base FPM | 96 | Replace |
| Any Ply is DRY GUM | 5 ply | Any Glue | Continuous | Base FPM | 96 | Replace |
| Any Ply is DRY GUM | 6 ply | Any Glue | Continuous | Base FPM | 84 | Replace |
| Any Ply is DRY GUM | 7 ply | Any Glue | Continuous | Base FPM | 78 | Replace |
| Any Ply is DRY GUM | 8 ply | Any Glue | Continuous | Base FPM | 72 | Replace |
| Any Ply is DRY GUM | 9 ply | Any Glue | Continuous | Base FPM | 66 | Replace |
| Any Ply is DRY GUM | 10 ply | Any Glue | Continuous | Base FPM | 60 | Replace |
| Transfer tape Reverse 50 or Less | | | Zipset | Form Plies | 1 | add |
| ½ in stub | With carbon | | | Feature base adjustment % | 20.0 | Replace |
| filefold | | | | Feature base adjustment min/m | 1 | add |
| cross web glue | cutoff length > 11 | | | Feature base adjustment min/m | 1.7 | add |
| cross web glue | cutoff length < 11 | | | Feature base adjustment min/m | 1.35 | add |
| ocr collator number | | | | Feature base adjustment % | 20.0 | replace |
| accumod number | | | | Feature base adjustment % | 10.0 | replace |
| autographic number | | | | Feature base adjustment % | 10.0 | replace |
| physicians perfs | | | | Feature base adjustment % | 10.0 | replace |

| feature | 1st cond # Operators | 2nd cond Cutoff Length >4" | 3rd cond Breakaway | 4th cond Jumbo | 5th cond product id | 6TH cond | Variable Name | factor | Operation | Increase Input |
|---|---|---|---|---|---|---|---|---|---|---|
| Reverse 50 or Less | 1 | N | N | N | zipset | | Base FPM | | Replace | F |
| Reverse 50 or Less | 1 | N | Y | N | zipset | | Base FPM | | Replace | F |
| Reverse 50 or Less | 1 | Y | N | N | zipset | | Base FPM | | Replace | F |
| Reverse 50 or Less | 1 | Y | Y | N | zipset | | Base FPM | | Replace | F |
| Reverse 50 or Less | 2 | N | N | N | zipset | | Base FPM | | Replace | F |
| Reverse 50 or Less | 2 | N | Y | N | zipset | | Base FPM | | Replace | F |
| Reverse 50 or Less | 2 | Y | N | N | zipset | | Base FPM | | Replace | F |
| Reverse 50 or Less | 1 | N | N | Y | zipset | | Base FPM | | Replace | F |
| Reverse 50 or Less | 1 | N | Y | Y | zipset | | Base FPM | | Replace | F |
| Reverse 50 or Less | 1 | Y | N | Y | zipset | | Base FPM | | Replace | F |
| Reverse 50 or Less | 1 | Y | Y | Y | zipset | | Base FPM | | Replace | F |
| PAPER > 50 LB | 1 | N | N | N | zipset | PLY WIDTH 50% OF LARGEST WIDTH | Base FPM | | Replace | F |
| PAPER > 50 LB | 1 | N | Y | N | zipset | PLY WIDTH 50% OF LARGEST WIDTH | Base FPM | | Replace | F |
| PAPER > 50 LB | 1 | Y | N | N | zipset | PLY WIDTH 50% OF LARGEST WIDTH | Base FPM | | Replace | F |
| PAPER > 50 LB | 1 | Y | Y | N | zipset | PLY WIDTH 50% OF LARGEST WIDTH | Base FPM | | Replace | F |

| Collator Running Feature Rule Examples | | | | | | | | | |
|---|---|---|---|---|---|---|---|---|---|
| PAPER > 50 LB | 2 | N | N | N | zipset | PLY WIDTH 50% OF LARGEST WIDTH | Base FPM | Replace | F |
| PAPER > 50 LB | 2 | N | Y | N | zipset | PLY WIDTH 50% OF LARGEST WIDTH | Base FPM | Replace | F |
| PAPER > 50 LB | 2 | Y | N | N | zipset | PLY WIDTH 50% OF LARGEST WIDTH | Base FPM | Replace | F |
| PAPER > 50 LB | 1 | N | N | Y | zipset | PLY WIDTH 50% OF LARGEST WIDTH | Base FPM | Replace | F |
| PAPER > 50 LB | 1 | N | Y | Y | zipset | PLY WIDTH 50% OF LARGEST WIDTH | Base FPM | Replace | F |
| PAPER > 50 LB | 1 | Y | N | Y | zipset | PLY WIDTH 50% OF LARGEST WIDTH | Base FPM | Replace | F |
| PAPER > 50 LB | 1 | Y | Y | Y | zipset | PLY WIDTH 50% OF LARGEST WIDTH | Base FPM | Replace | F |
| SPOT PASTE | 1 | N | N | N | zipset | | Base FPM | Replace | F |
| SPOT PASTE | 1 | N | Y | N | zipset | | Base FPM | Replace | F |
| SPOT PASTE | 1 | Y | N | N | zipset | | Base FPM | Replace | F |
| SPOT PASTE | 1 | Y | Y | N | zipset | | Base FPM | Replace | F |
| SPOT PASTE | 2 | N | N | N | zipset | | Base FPM | Replace | F |
| SPOT PASTE | 2 | N | Y | N | zipset | | Base FPM | Replace | F |
| SPOT PASTE | 2 | Y | N | N | zipset | | Base FPM | Replace | F |
| SPOT PASTE | 1 | N | N | Y | zipset | | Base FPM | Replace | F |
| SPOT PASTE | 1 | N | Y | Y | zipset | | Base FPM | Replace | F |
| SPOT PASTE | 1 | Y | N | Y | zipset | | Base FPM | Replace | F |
| SPOT PASTE | 1 | Y | Y | Y | zipset | | Base FPM | Replace | F |

Guillotine: Pads/Books
Guillotine: Pads/Books Equation

Guillotine Minutes/$M$ sets =

$$\left[\begin{array}{c} \text{Number Cuts} \times \text{Cut Minutes Per Lift} + \\ \text{Minutes Per Lift} \times \\ \dfrac{1000 \times (1 + \text{Feature Adjustment\%})}{\text{Round Down to Next Integer} \left(\dfrac{\text{Lift Height} \times (1 - \text{Carbonless\%})}{\left[\left(\dfrac{\text{Set Caliper}}{10{,}000}\right) \times \text{Quantity Per Group}\right] + \left(\dfrac{\text{Other Component Calipers}}{10{,}000}\right)}\right)} \\ \text{Quantity Per Group} \times \text{Group Factor} \times \text{Num Around} \end{array}\right] +$$

$$\dfrac{\text{Setup Mins} \times 1000}{\text{Order Quantity}}$$

Guillotine Labor Cost/$M$ = Guillotine Minutes/$M$ × Guillotine Labor $/Hour ÷ 60 Minutes/Hour The equation shown above is based on the following:

Guillotine Minutes/$M$ sets =
    Running Minutes Per $M$ + Setup Minutes Per $M$ Running Minutes Per $M$ =
$$\dfrac{(\text{Number Cuts} \times \text{Cut Minutes Per Lift} + \text{Minutes Per Lift}) \times 1000 \times (1 + \text{Feature Adjustment\%})}{\text{Lift Quantity}}$$

Life Quantity = # Groups Per Lift × Quantity Per Group × Group Factor × Num Around

Groups Per Lift =

$$\text{Round Down to Next Integer} \left(\dfrac{\text{Lift Height} \times (1 - \text{Carbonless\%})}{\text{Group Caliper}}\right)$$

$$\text{Group Caliper} = \left[\left(\dfrac{\text{Set Caliper}}{10{,}000}\right) \times \text{Quantity Per Group}\right] + \left(\dfrac{\text{Other Component Calipers}}{10{,}000}\right)$$

$$\text{Setup Minutes Per } M = \dfrac{\text{Setup Mins} \times 1000}{\text{Order Quantity}}$$

Base Calculation Initializations

1. Number Cuts is populated from Num_Cuts on the Guillotine: Pads/Books manufacturing step record.

2. Setup Minutes, Minutes/Flat Lift, Cut Minutes/Lift and Flat Lift Height are found in the Base Guillotine Time table shown below. The key, Mfg Step Desc Code, is a field in the associated Manufacturing Step record.

3. Lift Height should be set equal to Flat Lift Height for the base calculation.

4. Feature Adjustment should be initialized to 0.00 for the base calculation.

5. Quantity Per Group is the largest value of the QTY attribute for any of the following features in the Order Features table: Polywrap, Padding, Kraft Wrap (rel II) or Booking (rel II). If none of the listed features exist then Quantity Per Group is 1.

6. Carbonless % should be initialized to 0.00 for the base calculation.

7. Set Caliper is the sum of all paper and carbon ply calipers.

8. Other Component Caliper should be initialized to 0.0000 for the base calculation.

9. Group Factor is based on the value of Group Caliper. If Group Caliper>Lift Height then Group Factor is 0.5, otherwise Group Factor is 1. This is due to the fact that the pack height of a large wrap quantity may in some infrequent cases exceed the maximum lift height. In these cases the pack quantity split into 2 packs.

10. Num Around is found in the Num_Around field in associated manufacturing step.

11. Order Quantity is found in the Order_Qty field in the Customer_Order table.

12. Guillotine Labor Rate is found in the SRC Cost Center List table using the SRC Cost Center ID found in the Mfg Step table.

Base_Guillotine_Time

| Mfg Step Description Code | Setup Minutes | Minutes Flat Lift | Cut Minutes Lift | Flat Lift Height |
|---|---|---|---|---|
| GTRIMODD | 4.0 | .50 | .18 | 3.0 |
| GTRIMSTB | 4.0 | .88 | .18 | 3.0 |
| GMULTIUP | 4.0 | 1.86 | .18 | 2.4 |
| GPADBOOK | 4.0 | .36 | .18 | 5.5 |

Guillotine: Pads/Books Pricing Rules

| Rel II | Pricing Rule | Feature | Input Name | Factor | Operation |
|---|---|---|---|---|---|
|   | 1 | Padding | Other Component Caliper | 500 | Add |
| Y | 2 | Any Ply is Pressure Sensitive Paper | Feature Adjustment % | 25% | Replace |
|   | 3 | Any Ply is Carbonless Paper | Carbonless % | 33% | Replace |
|   | 4 | Collate Cutoff Length >= 22 | Minutes Per Lift | 0.60 | Replace |
|   | 5 | Product Type = Sheets | Minutes Per Lift | 0.60 | Replace |
|   | 6 | Different width Plies Collate Cutoff Length < 22 | Minutes Per Lift | 0.84 | Replace |
|   | 7 | Different width Plies Collate Cutoff Length >= 22 | Minutes Per Lift | 1.02 | Replace |
|   | 8 | Feather Edge Carbon | Minutes Per Lift | 4.32 | Replace |

Guillotine: Trim Odd Width
Guillotine: Trim Odd Width Equation

Guillotine Minutes / $M$ Sets =

$$\left[\frac{\begin{pmatrix}\text{Flat Indicator}\times\begin{pmatrix}\text{Cut Minutes Per Lift}\times\frac{\text{Form Width}}{\text{Blade Length}} + (\text{Minimum Indicator}\times\text{Minutes Per Flat Lift}) + \\ \left(\text{Maximum Indicator}\times\frac{\text{Form Width}}{\text{Blade Length}}\times\text{Minutes Per Flat Lift}\right)\end{pmatrix} + \\ \text{Fanned Indicator}\times(\text{Cut Minutes Per Lift} + \text{Minutes Per Fanned Lift} + \text{Feature Adjustment Minutes})\end{pmatrix}\times 1000\times(1+\text{Feature Adjustment\%})}{\text{Round Down to Next Integer}\left(\frac{\text{Flat Indicator}\times\text{Flat Lift Height} + \text{Fanned Lift Height}}{\left[\left(\frac{\text{Set Caliper}}{10,000}\right)\times\text{Quantity Per Group}\right] + \left(\frac{\text{Other Component Calipers}}{10,000}\right)}\right)\times \text{Quantity Per Group}\times\text{Group Factor}}\right] + \frac{\text{Setup Mins}\times 1000}{\text{Order Quantity}}$$

Guillotine Labor Cost/$M$=Guillotine Minutes/$M$×Guillotine Labor $/Hour÷60 Minutes/Hour The equation shown above is based on the following:

Guillotine Minutes / $M$ Sets =
$\quad$ Running Minutes Per $M$ + Setup Minutes Per $M$ Running Minutes Per $M$ =

$$\frac{(\text{Net Cut Minutes Per Lift} + \text{Handling Minutes Per Lift})\times 1000\times(1+\text{Feature Ajustment\%})}{\text{Lift Quantity}}$$

Net Cut Minutes per Lift = Cut Minutes Per Lift ×

$$\left[\left(\text{Flat Indicator}\times\frac{\text{Form Width}}{\text{Blade Length}}\right) + \text{Fanned Indicator}\right]$$

Handling Minutes Per Lift =

Flat Indicator× (Minimum Indicator× Minutes Per Flat Lift +

$$\text{Maximum Indicator}\times\frac{\text{Form Width}}{\text{Blade Length}}\times$$

Minutes Per Flat Lift) + Fanned Indicator ×

(Minutes Per Fanned Lift + Feature Adjustment Minutes)

Lift Quantity = # Groups Per Lift × Quantity Per Group × Group Factor

Groups Per Lift = Round Down to Next Integer $\left(\frac{\text{Lift Height}}{\text{Group Caliper}}\right)$ Lift Height = Flat Indicator× Flat Lift Height + Fanned Lift Height Group Caliper = $\left[\left(\frac{\text{Set Caliper}}{10,000}\right)\times\text{Quantity Per Group}\right] +$ $$\text{Setup Minutes Per } M = \frac{\text{Setup Mins} \times 1000}{\text{Order Quantity}} \left( \frac{\text{Other Component Calipers}}{10,000} \right)$$

Base Calculation Initializations

1. Flat Indicator should be initialized to 1 for the base calculation.
2. Setup Minutes, Minutes/Flat Lift, Cut Minutes/Lift and Flat Lift Height are found in the Base Guillotine Time table shown below. The key, Mfg Step Desc Code, is a field in the associated Manufacturing Step record.
3. Form_Width is set equal to the value of the Form_Width field in Manufacturing_Order table.
4. Blade Length is a lookup from the Pricing_Constants table.
5. Fanned Indicator should be initialized to 0 for the base calculation.
6. Minimum Indicator should be initialized to 1 for the base calculation.
7. Maximum Indicator should be initialized to 0 for the base calculation.
8. Minutes Per Fanned Lift should be set equal to 0 for the base calculation.
9. Feature Adjustment Minutes should be initialized to 0 for the base calculation.
10. Feature Adjustment % should be initialized to 0.00 for the base calculation.
11. Quantity Per Group is the largest value of the QTY attribute for any of the following features in the Order Features table: Polywrap, Padding, Kraft Wrap (rel II) or Booking (rel II). If none of the listed features exist, then Quantity Per Group is 1.
12. Group Factor is based on the value of Group Caliper. If Group Caliper>Lift Height then Group Factor is 0.5, otherwise Group Factor is 1. This is due to the fact that the pack height of a large wrap quantity may in some infrequent cases exceed the maximum lift height. In these cases the pack quantity split into 2 packs.
13. Fanned Lift Height should be initialized to 0 for the base calculation.
14. Set Caliper is the sum of all paper and carbon ply calipers.
15. Other Component Caliper should be initialized to 0.0000 for the base calculation.
16. Order Quantity is set equal to the Order_Qty field in the Customer Order table.
17. Guillotine Labor Rate is found in the SRC Cost Center List table using the SRC Cost Center ID found in the Mfg Step table.

| Base_Guillotine_Time | | | | |
|---|---|---|---|---|
| Mfg Step Description Code | Setup Minutes | Minutes/ Flat Lift | Cut Minutes/ Lift | Flat Lift Height |
| GTRIMODD | 4.0 | .50 | .18 | 3.0 |
| GTRIMSTB | 4.0 | .88 | .18 | 3.0 |
| GMULTIUP | 4.0 | 1.86 | .18 | 2.4 |
| GPADBOOK | 4.0 | .36 | .18 | 5.5 |

| Guillotine: Trim Odd Width Pricing Rules | | | | | |
|---|---|---|---|---|---|
| Rel II | Pricing Rule | Conditions | Input Name | Factor | Operation |
| | 1 | Form Width > 10.2" | Minutes Per Flat Lift | 2.2 | Replace |
| | | | Maximum Indicator | 1 | Replace |
| | | | Minimum Indicator | 0 | Replace |
| | 2 | Consecutive Numbers | Flat Lift Height | 2.4 | Replace |
| | | | Feature Adjustment Minutes | .8 | Replace |
| | 3 | Different Width Ply | Fanned Lift Height | 12 | Replace |
| | | | Minutes Per Fanned Lift | 2.5 | Replace |
| | | | Fanned Indicator | 1 | Replace |
| | | | Flat Indicator | 0 | Replace |
| | 4 | Feather Edge Carbon | Fanned Lift Height | 12 | Replace |
| | | | Minutes Per Fanned Lift | 4.7 | Replace |
| | | | Fanned Indicator | 1 | Replace |
| | | | Flat Indicator | 0 | Replace |
| Y | 5 | Any Ply is Pressure Sensitive Paper | Feature Adjustment % | 25% | Replace |
| | 6 | Padding | Other Component Caliper | 500 | Add |

Guillotine: Multi-Up Sheets

Guillotine: Multi-Up Sheets Equation

Guillotine Minutes/$M$ Sets =

$$\left[ \frac{\left( \begin{array}{c} \text{Number Cuts} \times \text{Cut Minutes Per Lift} + \\ \text{Minutes Per Flat Lift} \times 1000 \times (1 + \text{Feature Adjustment\%}) \end{array} \right)}{\left( \begin{array}{c} \text{Round Down} \\ \text{to Next Integer} \end{array} \left( \frac{\text{Flat Lift Height}}{\left[ \left( \frac{\text{Paper Caliper}}{10,000} \right) \times \text{QuantityPerGroup} \right] + \left( \frac{\text{Other Component Calipers}}{10,000} \right)} \right) \times \right.} \right.} \\ \left. \text{Quantity Per Group} \times \text{Group Factor} \times \text{Press Num Wide} \times \text{Press Num Around} \right) \right] + \frac{\text{Setup mins} \times 1000}{\text{Order Quantity}}$$

Guillotine Labor Cost/$M$=Guillotine Minutes/($M \times$Guillotine Labor $/Hour÷60 Minutes/Hour The equation shown above is based on the following:

Guillotine Minutes/$M$ Sets =

$$\text{Running Minutes Per } M + \text{Setup Minutes Per } M$$

Running Minutes Per $M$ =

$$\frac{\begin{array}{c}(\text{Number Cuts} \times \text{Cut Minutes Per Lift} + \\ \text{Minutes Per Flat Lift}) \times 1000 \times (1 + \text{Feature Ajustment\%})\end{array}}{\text{Lift Quantity}}$$

Lift Quantity = # Groups Per Lift × Quantity Per Group ×

Group Factor × Press Num Wide × Press Num Around

Groups Per Lift = Round Down to Next Integer $\left(\dfrac{\text{Flat Lift Height}}{\text{Group Caliper}}\right)$ Group Caliper = $\left[\left(\dfrac{\text{Paper Caliper}}{10{,}000}\right) \times \text{Quantity Per Group}\right] + \left(\dfrac{\text{Other Component Calipers}}{10{,}000}\right)$ Setup Minutes Per $M = \dfrac{\text{Setup Mins} \times 1000}{\text{Order Quantity}}$ Base Calculation Initialization:

1. Number Cuts should be set equal to the Num_Cuts field in the Guillotine Multi-up Sheets manufacturing step.
2. Setup Minutes, Minutes/Flat Lift, Cut Minutes/Lift and Flat Lift/Height are found in the Best Guillotine Time table shown below. The key, Mfg Step Desc Code, is a field in the associated Manufacturing Step record.
3. Feature Adjustment % should be initialized to 0.00 for the base calculation.
4. Quantity Per Group is the largest value of the QTY attribute for any of the following features in the Order Features table: Polywrap, Padding, Kraft Wrap (rel II) or Booking (rel II). If none of the listed features exist, then Quantity Per Group is 1.
5. Group Factor is based on the value of Group Caliper. If Group Caliper>Lift Height then Group Factor is 0.5, otherwise Group Factor is 1. This is due to the fact that the pack height of a large wrap quantity may in some infrequent cases exceed the maximum lift height. In these cases the pack quantity split into 2 packs.
6. Press Num Wide is set equal to the Num_Wide field in the Press Manufacturing Step record. Note that there is never more than one press step for sheeted singles which is the only product type that would have a Multi-Up Sheets Guillotine step.
7. Press Num Around is set equal to the Num_Around field in the Press Manufacturing Step record.
8. Paper Caliper is equal to the Paper Caliper attribute in the Feature List Attribute table.
9. Other Component Caliper should be initialized to 0.0000 for the base calculation.
10. Order Quantity is set equal to the Order_Qty field in the Customer Order table.
11. Guillotine Labor Rate is found in the SRC Cost Center List table using the SRC Cost Center ID found in the Mfg Step table.

Base_Guillotine_Time

| Mfg Step Description Code | Setup Minutes | Minutes/ Flat Lift | Cut Minutes/ Lift | Flat Lift Height |
|---|---|---|---|---|
| GTRIMODD | 4.0 | .50 | .18 | 3.0 |
| GTRIMSTB | 4.0 | .88 | .18 | 3.0 |
| GMULTIUP | 4.0 | 1.86 | .18 | 2.4 |
| GPADBOOK | 4.0 | .36 | .18 | 5.5 |

Guillotine: Multi-Up Sheets Pricing Rules

| Rel II | Condition | Input Name | Factor | Operation |
|---|---|---|---|---|
|  | Padding | Other Component Caliper | 500 | Add |
| Y | Any Ply is Pressure Sensitive Paper | Feature Adjustment % | 25% | Replace |

Guillotine: Trim Stub

Guillotine: Trim Stub Equation

Guillotine Minutes/$M$ Sets =

$$\left[\frac{\left(\begin{array}{c}\left(\text{Cut Minutes Per Lift} \times \dfrac{\text{Form Width}}{\text{Blade Length}} + \right) \\ (\text{Minimum Indicator} \times \text{Minutes Per Flat Lift}) + \\ \left(\text{Maximum Indicator} \times \dfrac{\text{Form Width}}{\text{Blade Length}} \times \right) \\ \text{Minutes Per Flat Lift}\end{array}\right)}{1000 \times (1 + \text{Feature Adjustment\%})} \times \right.$$

$$\left. \frac{\begin{array}{c}\text{Round Down} \\ \text{to Next Integer}\end{array} \left(\dfrac{\text{Flat Lift Height}}{\left[\left(\dfrac{\text{Set Caliper}}{10{,}000}\right) \times \text{Quantity Per Group}\right] + \left(\dfrac{\text{Other Component Calipers}}{10{,}000}\right)}\right) \times}{\text{Quantity Per Group} \times \text{Group Factor}}\right] +$$

Setup Minutes per $M$

Guillotine Labor Cost/M = Guillotine Minutes/M × Guillotine Labor \$/Hour ÷ 60 Minutes/Hour The equation shown above is based on the following:

Guillotine Minutes/$M$ Sets =

$$\text{Running Minutes Per } M + \text{Setup Minutes Per } M$$

Running Minutes Per $M$ =

$$\frac{(\text{Net Cut Minutes Per Lift} + \text{Handling Minutes Per Lift}) \times 1000 \times (1 + \text{Feature Ajustment\%})}{\text{Lift Quantity}}$$

Net Cut Minutes per Lift = Cut Minutes Per Lift × $\dfrac{\text{Form Width}}{\text{Blade Length}}$ Handling Minutes Per Lift = Minutes per Flat Lift ×

$$\left[ Minimum\ Indicatorum\ \text{Indi} + \left( Maximum\ Indicator \times \frac{Form\ W}{Blade\ Le} \right) \right]$$

Lift Quantity = # Groups Per Lift × Quantity Per Group × Group Factor

Groups Per Lift = Round Down to Next Integer $\left( \frac{Flat\ Lift\ Height}{Group\ Caliper} \right)$ Group Caliper = $\left[ \left( \frac{Set\ Caliper}{10,000} \right) \times Quantity\ Per\ Group \right] +$ $$\left( \frac{Other\ Component\ Calipers}{10,000} \right)$$

Setup Minutes Per $M = \frac{Setup\ Mins \times 1000}{Order\ Quantity}$

Base Calculation Initializations:
1. Feature Adjustment % should be initialized to 0.00 for the base calculation.
2. Setup Minutes, Minutes/Flat Lift, Cut Minutes/Lift and Flat Lift Height are found in the Base Guillotine Time table shown below. The key, Mfg Step Desc Code, is a field in the associated Manufacturing Step record.
3. Form_Width is set equal to the Form_Width field found in the Manufacturing_Order table.
4. Blade Length is a lookup from the Pricing_Constants table.
5. Minimum Indicator should be initialized to 1 for the base calculation.
6. Maximum Indicator should be initialized to 0 for the base calculation.
7. Set Caliper is the sum of all paper and carbon ply calipers.
8. Quantity Per Group is the largest value of the QTY attribute for any of the following features in the Order Features table: Polywrap, Padding, Kraft Wrap (rel II) or Booking (rel II). If none of the listed features exist, then Quantity Per Group is 1.
9. Group Factor is based on the value of Group Caliper. If Group Caliper>Lift Height then Group Factor is 0.5, otherwise Group Factor is 1. This is due to the fact that the pack height of a large wrap quantity may in some infrequent cases exceed the maximum lift height. In these cases the pack quantity split into 2 packs.
10. Other Component Calipers should be initialized to 0.0000 for the base calculation.
11. Order Quantity is set equal to the Order_Qty field in the Customer_Order table.
12. Guillotine Labor Rate is found in the SRC Cost Center List table using the SRC Cost Center ID found in the Mfg Step table.

Base_Guillotine_Time

| Mfg Step Description Code | Setup Minutes | Minutes Flat Lift | Cut Minutes/ Lift | Flat Lift Height |
|---|---|---|---|---|
| GTRIMODD | 4.0 | .50 | .18 | 3.0 |
| GTRIMSTB | 4.0 | .88 | .18 | 3.0 |
| GMULTIUP | 4.0 | 1.86 | .18 | 2.4 |
| GPADBOOK | 4.0 | .36 | .18 | 5.5 |

Guillotine: Trim Stub Pricing Rules

| Rel II | Pricing Rule | Conditions | Input Name | Factor | Operation |
|---|---|---|---|---|---|
|  | 1 | Form Length > 9.9" | Minutes Per Flat Lift | 4.0 | Replace |
|  | 2 | Padding | Maximum Indicator | 1 | Replace |
|  |  |  | Minimum Indicator | 0 | Replace |
|  |  |  | Other Component Caliper | 500 | Add |
| Y | 3 | Any ply is Pressure Sensitive Paper | Feature Adjustment % | 25% | Replace |

Padding

Padding Equation

Padding Minutes/$M =$

Padding Flat Minutes/$M$ + Padding Running Minutes/$M$

Padding Flat Minutes/$M = \frac{Padding\ Setup\ Minutes \times 1000}{Order\ Quantity}$ Padding Running Minutes/$M = \frac{1000 \times Minutes/Slab}{Forms/Pad \times Pad\ \#\ Around}$ Padding Labor Cost/$M =$ Padding Minutes/$M$ × Padding Labor $/Hour ÷ 60 Minutes/Hour Base Calculation Initializations:
1. Padding Setup Minutes and Minutes/Slab are found in Padding_Minutes data reference tables. See below.
2. Pad # Around is set equal to the Num_Around field in the Padding Manufacturing Step.
3. Order Quantity is set equal to the Order_Qty field on the Customer Order table.
4. Forms/Pad is set equal to the Qty display attribute associated to the Padding Feature.
5. Padding Labor Rate is found in the SRC Cost Center List table using the SRC Cost Center ID found in the Mfg Step table.

Padding_Minutes

| Multi Ply | Min Forms/Pad | Setup Minutes | Minutes/Slab |
|---|---|---|---|
| False | 1 | 15 | .082 |
| False | 50 | 15 | .111 |
| True | 1 | 15 | .111 |

Padding Pricing Rules

There are no Pricing Rules for the Padding Cost Component.

Wrapping

Wrapping Equation

Wrapping Minutes/$M =$

Wrapping Flat Minutes/$M$ + Wrapping Running Minutes/$M$

Wrapping Flat Minutes/$M =$ $$\frac{\left[ Wrapping\ Setup\ Minutes + (Feed\ Size\ Change\ Minutes \times Lineup\ Factor) \right] \times 1}{Order\ Quantity}$$

Wrapping Running Minutes/$M = \frac{1000 \times Minutes/Pack}{Forms/Pack}$

Wrapping Labor Cost/$M =$

-continued $$\text{Wrapping Minutes}/M \times \text{Wrapping Labor } \$/\text{Hour} \div 60 \text{ Minutes}/\text{Hour}$$

Base Calculation Initializations:
1. Wrapping Setup Minutes, Feed Size Change Minutes, Lineup Factor and Minutes/Pack are found in the Pricing Constants table.
2. Order Quantity is found in the Order_Qty field in the Customer Order table.
3. Forms/Pack is set equal to the Qty display attribute associated with Wrapping feature on the order.
4. Wrapping Labor Rate is found in the SRC Cost Center List table using the SRC Cost Center ID found in the Mfg Step table.

| | Wrapping Minutes | | | |
|---|---|---|---|---|
| Style | Minutes/Pack | Setup Minutes | Feed Size Change Minutes | Lineup Factor |
| Polywrap | .26 | 3.6 | 0 | 1 |
| Banding | .78 | 2.88 | 0 | 1 |
| Kraft Wrap | 1.26 | 2.88 | 26 | 1 |

Note: Only Polywrap is included and therefore, these are the only values that will be found in the Pricing Constants table.

Wrapping Pricing Rules

There are no Pricing Rules for the Wrapping Cost Component.

Outer Boxing

Outer Boxing Equation $$\text{Outer Boxing Minutes}/M = \text{MAX}\left[\left(\frac{\text{Std Outer Boxing Min}/\text{Carton}}{\text{Special Outer Carton Quantity}} - \frac{\text{Std Outer Boxing Min}/\text{Carton}}{\text{Std Outer Carton Quantity}}\right), 0\right] \times 1000$$

$$\text{Outer Boxing Labor Cost}/M = \text{Outer Boxing Minutes}/M \times \text{Boxing Labor } \$/\text{Hour} \div 60 \text{ Minutes}/\text{Hour}$$

Base Calculation Initializations:
1. Lookup Standard Outer Boxing Minutes Per Carton in Pricing Constants table.
2. Standard Outer Carton Quantity is set equal to the Std_Carton_Qty field in the Manufacturing Order table.
3. Special Outer Carton Quantity should be initialized to the value found in the Special Quantity Display attribute attached to the Special Feature (Feature Type= Packaging). If this feature or feature attribute is not defined for this order, the Special Outer Carton Quantity should be set equal to Standard Outer Carton Quantity.
4. Outer Boxing Labor Rate is found in the SRC Cost Center List table using the SRC Cost Center ID found in the Mfg Step table.

Outer Boxing Pricing Rules

There are no pricing rules currently defined for the Outer Boxing Cost Component.

Labor Burden

Labor Burden Equation

PRIMAC will potentially account for fixed and variable burden separately. The order entry system 10 (also referred to herein as STAR) will follow that same direction. Fixed Burden is calculated as dollars per labor hour. Variable Burden is calculated as a percent of direct labor cost. Pricing burden will be based on Practical Capacity utilization rather than actual utilization. For each Direct Labor Cost calculation there is a corresponding Labor Burden Cost calculation, although one generic Labor Burden Cost equation can be used in every case. In this equation shown below $$\text{Operation' Labor Burden Cost} =$$
$$(\text{Operation Variable Burden Rate} \times \text{Operation Labor Cost}/M) +$$
$$\left(\text{Operation Fixed Burden } \$/\text{Hour} \times \frac{\text{Operation Minutes}/M}{60 \text{ Minutes}/\text{Hour}} \times \text{MIN}\left[\frac{\text{Operation Actual Utilization Rate}}{\text{Operation Practical Capacity Utilization Rate}}, 1\right]\right)$$

Base Calculation Initializations:
1. Operation Variable Burden Rate, Operation Fixed Burden $/Hour, Operation Actual Utilization Rate, and Operation Practical Capacity Utilization Rate are found in the SRC Cost Center List table shown below. Note that the record selected from this table will vary according to the cost component that is currently being calculated.
2. Operation Labor Cost/M and Operation Minutes/M are the results of the associated cost component equations calculated earlier.

| | | | | | SRC Cost Center List Table | | | | | |
|---|---|---|---|---|---|---|---|---|---|---|
| Cost Center Descript | Mfg Process | Prod Type | Cyl Size | # op | Cost Center Type | Rate Type | Labor Rate | Variable Burden Percent | Fixed Burden $/Hr | Act. Use | Pract. Cpcty |
| Composing | Limited | | 0 | 1 | Comps | Corp | 11.50 | 0% | $0 | | 90% |
| Photo Offset | Limited | | 0 | 1 | Photo Off. | Corp | 14.76 | 267% | $0 | 59% | 90% |
| Press | Limited | | 22 | 1 | Press | Corp | 15.30 | 399% | $0 | 56% | 90% |
| Press | Limited | | 24 | 1 | Press | Corp | 14.88 | 363% | $0 | 95% | 90% |
| Press | Limited | | 28 | 1 | Press | Corp | 15.38 | 390% | $0 | 82% | 90% |
| Press | Limited | | 25.5 | 1 | Press | Corp | 15.62 | 361% | $0 | 85% | 90% |
| Press | Limited | | 32 | 1 | Press | Corp | 15.58 | 358% | $0 | | 90% |
| Press | Limited | | 20 | 1 | Press | Corp | 15.44 | 365% | $0 | | 90% |
| Collator | Limited | Stan | 0 | 1 | Collator | Corp | 14.71 | 322% | $0 | | 90% |
| Collator | Limited | Zip | 0 | 1 | Collator | Corp | 14.74 | 301% | $0 | | 90% |
| Collator | Limited | Zip | 0 | 2 | Collator | Corp | 26.38 | 301% | $0 | | 90% |
| Guillotine: Pads/ | Limited | | 0 | 1 | G: P/Bs | Corp | 13.61 | 267% | $0 | | 70% |

-continued

SRC Cost Center List Table

| Cost Center Descript | Mfg Process | Prod Type | Cyl Size | Num Oper | Cost Center Type | Rate Type | Labor Rate | Variable Burden Percent | Fixed Burden $/Hr | Actual Use | Pract. Cpcty |
|---|---|---|---|---|---|---|---|---|---|---|---|
| Books Guillotine: Trim Odd Width | Limited | | 0 | 1 | G: Wdth | Corp | | | | | 70% |
| Guillotine: Multi-Up Sheets | Limited | | 0 | 1 | G: Multi-Up | Corp | | | | | 70% |
| Guillotine: Trim Stub | Limited | | 0 | 1 | G: Stub | Corp | | | | | 70% |
| Drilling | Limited | | 0 | 1 | Drilling | Corp | 11.46 | 182% | $0 | | 70% |
| Booking | Limited | | 0 | 1 | Bking | Corp | 11.11 | 173% | $0 | | 70% |
| Wrapping | Limited | | 0 | 1 | Wrppng | Corp | 12.93 | 261% | $0 | | 70% |
| Boxing | Limited | | 0 | 1 | Boxing | Corp | | | | | 70% |
| Padding | Limited | | 0 | 1 | Padding | Corp | 10.59 | 236% | $0 | | 70% |
| Composing | Custom | | 0 | 1 | Composing | Corp | 11.50 | 0% | $0 | | 90% |
| Photo Offset | Custom | | 0 | 1 | Photo Off | Corp | 14.76 | 267% | $0 | 59% | 90% |
| Press | Custom | | 22 | 1 | Press | Corp | 15.30 | 399% | $0 | 56% | 90% |
| Press | Custom | | 24 | 1 | Press | Corp | 14.88 | 363% | $0 | 95% | 90% |
| Press | Custom | | 28 | 1 | Press | Corp | 15.38 | 390% | $0 | 82% | 90% |
| Press | Custom | | 25.5 | 1 | Press | Corp | 15.62 | 361% | $0 | 85% | 90% |
| Press | Custom | | 32 | 1 | Press | Corp | 15.58 | 358% | $0 | | 90% |
| Press | Custom | | 20 | 1 | Press | Corp | 15.44 | 365% | $0 | | 90% |
| Collator | Custom | Stan | 0 | 1 | Collator | Corp | 14.71 | 322% | $0 | | 90% |
| Collator | Custom | Zip | 0 | 1 | Collator | Corp | 14.74 | 301% | $0 | | 90% |
| Collator | Custom | Zip | 0 | 2 | Collator | Corp | 26.38 | 301% | $0 | | 90% |
| Guillotine: Pads/Books | Custom | | 0 | 1 | G: P/Bs | Corp | 13.61 | 267% | $0 | | 70% |
| Guillotine: Trim Odd Width | Custom | | 0 | 1 | G: Width | Corp | | | | | 70% |
| Guillotine: Multi-Up Sheets | Custom | | 0 | 1 | G: Multi-Up | Corp | | | | | 70% |
| Guillotine: Trim Stub | Custom | | 0 | 1 | G: Stub | Corp | | | | | 70% |
| Drilling | Custom | | 0 | 1 | Drilling | Corp | 11.46 | 182% | $0 | | 70% |
| Booking | Custom | | 0 | 1 | Booking | Corp | 11.11 | 173% | $0 | | 70% |
| Wrapping | Custom | | 0 | 1 | Wrapping | Corp | 12.93 | 261% | $0 | | 70% |
| Boxing | Custom | | 0 | 1 | Boxing | Corp | | | | | 70% |
| Padding | Custom | | 0 | 1 | Padding | Corp | 10.59 | 236% | $0 | | 70% |
| Press | Stanfas | | 0 | 1 | SF Pre-Fig | Corp | 0 | 0 | 0 | 0 | 0 |
| Gathering | Stanfas | | 0 | 1 | SF Gather | Corp | 0 | 0 | 0 | 0 | 0 |
| Guillotine | Stanfas | | 0 | 1 | SF Guill | Corp | 0 | 0 | 0 | 0 | 0 |
| Perf | Stanfas | | 0 | 1 | SF Perf | Corp | 0 | 0 | 0 | 0 | 0 |
| Folding | Stanfas | | 0 | 1 | SF Fold | Corp | 0 | 0 | 0 | 0 | 0 |
| Numbering | Stanfas | | 0 | 1 | SF Number | Corp | 0 | 0 | 0 | 0 | 0 |
| Padding | Stanfas | | 0 | 1 | SF Pad | Corp | 0 | 0 | 0 | 0 | 0 |
| Wrapping | Stanfas | | 0 | 1 | SF Wrap | Corp | 0 | 0 | 0 | 0 | 0 |
| Composg | Stanfas | | 0 | 1 | SF Comp | Corp | 0 | 0 | 0 | 0 | 0 |

Calculated Pricing Rule Effects

Variable Pricing Rule Effects

Some of the Pricing Rule Effects do not have constant values by which the Cost Component input will be effected but rather the value must be calculated based on feature counts and manufacturing conditions. The calculation for any given Pricing Rule Effect fits into one of the equations listed below. Upon calculating the Pricing Rule Effect, the Pricing Engine will return this value and use it like any Constant Effect would be used to update the value of the associated Cost Component input.

Module A—Flat Minutes Dependent on Number Wide

Additional Feature Setup Minutes =

(Initial Feature Count × Minutes Per Initial Unit +

Changed Feature Count × Minutes Per Changed Unit) ×

$$\text{Number Wide} + \frac{\text{Initial Feature Fixed Minutes} + \text{Changed Feature Fixed Minutes}}{\text{Lineup Factor}}$$

Module B—Flat Minutes Dependent on Number Wide and Number Around

Additional Feature Setup Minutes =

$$\text{(Initial Feature Count} \times \text{Minutes Per Initial Unit} +$$

$$\text{Changed Feature Count} \times \text{Minutes Per Changed Unit)} \times \text{Number}$$

$$\text{Wide} \times \text{Number Around} + \frac{\text{Initial Feature Fixed Minutes} + \text{Changed Feature Fixed Minutes}}{\text{Lineup Factor}}$$

2. Number Wide and Number Around are determined for each mfg step by validation. Where these calculations are being done for Setup Mfg Steps, the maximum Number Wide and Number Around should be used. Otherwise, use Number Wide and Number Around from the specific Running Mfg Step currently being processed.

3. Minutes Per Initial Unit, Minutes Per Changed Unit, Initial Feature Fixed Minutes, Changed Feature Fixed Minutes, and Lineup Factor are found in a reference data table. See below.

| | | | | | Pricing Rule Effect Input | | | |
|---|---|---|---|---|---|---|---|---|
| Feature | Equipment Type | Module | Minutes/ Initial Unit | Minutes/ Changed Unit | Initial Fixed Minutes | Changed Fixed Minutes | Lineup Factor |
| 3/16 Reg. Number | Press | B | .2 | .2 | 4.1 | 4.1 | 1 |
| Hitskip Vert. Perf. | Press | A | 6.1 | 0 | 18.6 | 18.6 | 1 |
| Full Vert. Perf. | Press | A | 1.8 | 0 | 1.1 | 1.1 | 1 |
| Full Horiz. Perf. | Press | C | 6.3 | 0 | 7.1 | 7.1 | 1 |
| Hitskip Horiz. Perf. | Press | C | 8.3 | 0 | 9.8 | 9.8 | 1 |
| Standard Inks (Litho) | Press | D | 24.5 | 0 | 0 | 0 | 1 |
| Standard Plates (Orig and Extra) | Press | D | 33.5 | 0 | 0 | 0 | 1 |
| 3/16 Reg. Number | Press | E | 0.2 | 0 | 0 | 0 | 1 |
| MICR Number | Press | E | 0.2 | 0 | 0 | 0 | 1 |

Module C—Flat Minutes Dependent on Number Around

Additional Feature Setup Minutes =

$$\text{(Initial Feature Count} \times \text{Minutes Per Initial Unit} +$$

$$\text{Changed Feature Count} \times \text{Minutes Per Changed Unit)} \times$$

$$\text{Number Around} + \frac{\text{Initial Feature Fixed Minutes} + \text{Changed Feature Fixed Minutes}}{\text{Lineup Factor}}$$

Module D—Flat Minutes Dependent on Feature Count Only

Additional Feature Setup Minutes=(initial Feature Count×Minutes Per Inital Unit)÷Lineup Factor Module E—Running Minutes Dependent on Number Wide and Number Around Minutes=(Feature Count×Minutes Per Initial Unit× Number Wide×Number Around)÷Lineup Factor Modules A, B, and C apply to features which require additional initial setup minutes for each occurrence of the feature on the same ply, but no additional time for the identical feature on subsequent plies. But, the same feature can exist on more than one ply, with some differences in the attributes of the feature on different plies. In these cases, one ply requires time for installation of the equipment for the feature, while another ply requires time to make modifications.

Module D is used for calculation of time for the setup of features such as ink and plate installations which depend on how many are required.

Calculation Initializations:
1. Initial Feature Count and Changed Feature Count are done in the pricing calculation code.

Pricing Constants
   Pricing Constants
   Pricing constants have been referenced throughout the equations. Listed below is the Pricing Constants table with the necessary data populated.

| Pricing Constants Table | |
|---|---|
| Constant | Value |
| Secondary Operation Waste % | 1% |
| Paper Burden $ per LB | 0 |
| Paper Burden $ per MSI | 0 |
| Paper Burden $ per Finished Sheet | 0 |
| Blade Length | 45 |
| PolyWrap Setup Minutes | 3.6 |
| PolyWrap Feed Size Change Minutes | 0 |
| PolyWrap Lineup Factor | 1 |
| PolyWrap Minutes per Pack | 0.26 |
| Standard Outer Boxing Minutes per Carton | 1.4 |
| Latitude Mileage Factor | 69.2 |
| Longitude Mileage Factor | 0.77 |
| Packaging Weight Factor | 10% |
| Truck Maximum Pounds | 44,000 |
| Truck Rate Minimum Pounds | 10,000 |
| Storage Average Releases | 12 |
| Storage Average Distance | 200 |
| HVCO Order Qualifier | $15,000 |
| HVCO Carton Qualifier | $140 |

The equations and rules for the markup cost component are as follows:
Markup
   Markup Equation
   The basis for markup is Factory Cost. Factory cost consists of two parts: material cost, which is the cost of the paper, carbon, and miscellaneous material purchased to produce the order; and conversion, which is the cost associated with the labor and burden involved in converting the purchased material into the finished form.

$$\text{Form List}/M = (1 + \text{Surcharge}\% + \text{ManufacturingReduction}\%) \times$$

$$\left[\left\{\left[\begin{pmatrix} \text{Total Factory Cost}/M + \text{Composition Labor Cost}/M + \text{Composition Labor Burden Cost}/M \\ + \dfrac{1000 \times (\text{Fixed Administrative Expense} + \text{Fixed Engineering Expense} + \text{Fixed Selling Expense})}{\text{Order Quantity}} \\ + \text{Conversion Cost}/M \times (\text{Variable Administrative Expense} + \text{Variable Engineering Expense}) \end{pmatrix} \times \right.\right.\right.$$

$$\left.\left(1 + \dfrac{\text{Variable Selling Expense}}{1 - (\text{Variable Selling Expense} + \text{Variable Profit Target})}\right) + \dfrac{1000 \times \text{Fixed Profit Target}}{\text{Order Quantity}}\right] \times$$

$$\left.\left(1 + \dfrac{(\text{Variable Profit Target} \times \text{Sales Volume}) - (\text{Fixed Profit Target} \times \text{Order Count})}{\text{Sales Volume} \times (1 - \text{Variable Profit Target}) + (\text{Fixed Profit Target} \times \text{Order Count})} + \dfrac{1000 \times \text{Fixed Differential Target}}{\text{Order Quantity}}\right)\right\} \times$$

$$\left.\left(1 + \dfrac{(\text{Variable Differential Target} \times \text{List Volume}) - (\text{Fixed Differential Target} \times \text{Order Count})}{\text{List Volume} \times (1 - \text{Variable Differential Target}) + (\text{Fixed Differential Target} \times \text{Order Count})}\right)\right] (1 + \text{Overrun}\%)$$

$$\text{Markup}\% = \left(\dfrac{\text{Form List}/M}{\text{Total Factory Cost}/M}\right) - 1$$

$$\text{Markup \$}/M = [(\text{Markup}\% + 1) \times \text{Total Factory Cost}/M] - \text{Total Factory Cost}/M$$

Base Calculation Initializations:
1. The Surcharge % should be set equal to 0.00 for the base calculation.
2. The Manufacturing Reduction % should be set equal to 0.00 for the base calculation.
3. The Overrun % should be set equal to 0.00 for the base calculation.
4. Conversion Cost/M is the cost associated with converting raw materials into the finished form. It is equal to the sum of all Labor Cost Components except for the Composition Labor and Composition Labor Burden Cost Components.
5. Total Factory Cost/M is the total cost incurred at the manufacturing facility to create the finished product. It is equal to the sum of the Conversion Cost/M, Paper Cost/M, Paper Burden Cost/M, Carbon Cost/M, and Miscellaneous Material Cost/M.
6. The Composition Labor Cost/M is the value of the Composition Labor Cost Component.
7. The Composition Labor Burden Cost/M is the value of the Composition Labor Burden Cost Component.
8. Order Quantity is set equal to the value of Order_Qty in the Customer Order table.
9. All other inputs are initialized from the Markup reference table shown below.

Markup Table (The values in this table represent only the Stanset product. Other rows would be created for other product types as well.)

| Product Type | Input Affected | Value |
|---|---|---|
| Stanset | Fixed Administrative Expense | $15.67 |
| Stanset | Variable Administrative Expense | 18.54% |
| Stanset | Fixed Engineering Expense | $0 |
| Stanset | Variable Engineering Expense | 3.44% |
| Stanset | Fixed Selling Expense | $86.52 |
| Stanset | Variable Selling Expense | 11.84% |
| Stanset | Fixed Profit Target | $0 |
| Stanset | Variable Profit Target | 15% |
| Stanset | Fixed Differential Target | $0 |
| Stanset | Variable Differential Target | 18% |
| Stanset | Sales Volume | $161,098,200 |
| Stanset | List Volume | $195,066,300 |
| Stanset | Order Count | 66,949 |

Markup Pricing Rules (sample set only)

| Pricing Rule | Conditions | Input Name | Factor | Operation |
|---|---|---|---|---|
| 1 | No Overrun Product Type = Zipset Order Quantity <= 50 M | Overrun % | 10% | Add |
| 2 | No Overrun Product Type = Zipset Order Quantity > 50 M Order Quantity <= 100 M | Overrun % | 5% | Add |

Pricing Constants

Pricing constants have been referenced throughout the equations. Listed below is the Pricing Constants table with the necessary data populated.

Pricing Constants Table

| Constant | Value |
|---|---|
| Secondary Operation Waste % | 1% |
| Paper Burden $ per LB | 0 |
| Paper Burden $ per MSI | 0 |
| Paper Burden $ per Finished Sheet | 0 |
| Blade Length | 45 |
| PolyWrap Setup Minutes | 3.6 |
| PolyWrap Feed Size Change Minutes | 0 |
| PolyWrap Lineup Factor | 1 |
| PolyWrap Minutes per Pack | 0.26 |
| Standard Outer Boxing Minutes per Carton | 1.4 |
| Latitude Mileage Factor | 69.2 |
| Longitude Mileage Factor | 0.77 |
| Packaging Weight Factor | 10% |
| Truck Maximum Pounds | 44,000 |
| Truck Rate Minimum Pounds | 10,000 |
| Storage Average Releases | 12 |
| Storage Average Distance | 200 |
| HVCO Order Qualifier | $15,000 |
| HVCO Carton Qualifier | $140 |

The equations and rules for the freight and storage cost component are as follows:
PRISM Freight
    PRISM Storage Equation This equation is calculated for all negotiated rate customers that choose a freight payment method of 'Prepaid'.

$$\text{Prepaid Freight \$ Per M} = \text{PRISM Freight Rate} \times \text{Forms Value per M}$$

Base Calculation Initializations:
1. PRISM Freight Rate is found in the Freight_Rate field in the PRISM_Storage table. The key to the Prism Storage table includes . . .

CADD Customer Number: This is found in the Sold-To Customer Address record. Category: Category is either 'Z' which indicates that the record is a customer level record or a 'P' which represents the record is at a Customer Form Number level. This field is used in combination with the Begin_Value and End_Value fields. The Pricing Engine should always look for more specific records first. If a customer level record exists and a form number level record exists for the same customer, the form number level record should be used. Therefore, the Pricing Engine will always try to find a Category 'P' record first where the value of Cust_Form_Number from the Customer Order table falls alphabetically within the range of values represented by the fields Begin_Value and End_Value. If this record cannot be found, then a search for a record at the customer level will be performed. This search will not use the Begin_Value and End_Value fields. If no customer level record is found, a not-priceable exception is raised.

Note: There may be multiple records returned that fit the customer form number criteria. In these cases, there should be only two, one which is for that specific customer form number only (i.e. Begin_Value=End_Value) and one where the specified customer form number fits within the range defined by Begin_Value and End_Value. In these cases, the record specific to the specified customer form number should be used (i.e. the one where Begin_Value=End_Value)

Storage_Method: This field is either 'C', which indicates the customer has requested full carton releases only, or a 'P', which allows the customer to release forms from Storage in less than full cartons. This value is set by examining the value of Full_Carton_Release on the Customer Order table. A value of 'Y' (True) in this field means that Storage_Method should be 'C'. A value of 'N' (False) indicates that Storage_Method should be 'P'.

Storage Invoice Timing: This field is either 'R', which indicates the customer will be invoiced for storage at release of stored forms or 'S', which designates the customers desire to be invoiced for storage when they are stored. This value is set equal to the value of Storage_invoice_Timing on the Customer Order table.

Effective Date: this value should be set equal to the current date.

2. Forms Value per M is either the Forms List Price as calculated by the Pricing Engine or the Forms Sell Price as set by the CSR or Sales Representative. Which to use is determined by looking at the Based_on_Sell_Price field on the PRISM_Storage record found in Step 1 above. If this value is 'Y' (True), then Forms Value per M should be set equal to the Forms Sell Price, otherwise, Forms Value per M should be set equal to the Forms List Price.

PRISM Freight Pricing Rules

No Pricing Rules have been identified for this cost component at this time.

Freight (Standard Rate)

Standard Freight Equation

Prepaid freight is calculated by using either a negotiated rate that has been predetermined and inserted in the Prism system or by using standard shipping rates.

If order qualifies for Prism rates, all shipments to the customer are based on the Prism rates. These include shipments direct from plants to customer as well as shipments from the warehouse to the customer. Freight cost for shipments from the plant to the warehouse are included in storage charges and therefore are not included in any freight calculations.

If order does not qualify for Prism rates, standard rates apply to all regular shipments to the customer. These rates are determined by the shipping mileage and the pounds shipped to each location. For direct shipments from the plant to the customer, the shipping mileage is determined by Zipcodes and the weight is calculated for the quantity of forms in each shipment. For shipments from a storage warehouse, the shipping mileage is based on an average shipping distance and shipping weight is based on the weight of forms stored divided by an average number of release from the warehouse.

Prism Prepaid Freight

See PRISM Freight Cost Equation from previous section for details on this cost component.

Standard Prepaid Freight

Standard freight requires a separate cost component for each prepaid shipment. The Prepaid Freight Charge per M value written to the database is the sum of all prepaid freight cost components as indicated by the following equation.

$$\text{Prepaid Freight \$ per M} = \Sigma \text{Destination Freight \$ per M}$$

If the price request does not qualify for Prism rates then standard freight must be used. Normally a shipment is handled by a pickup at the plant by a carrier and delivered in one step. However, shipments to Hawaii and Alaska as well as export shipments are handled in a three step process—Plant To Port, Port to Port and Port to final location. Hawaii and Alaska destinations are calculated by the price engine since standard freight rates apply. All other offshore destinations are export and require special manual freight calculation and therefore must be exceptioned.

Standard prepaid freight may be Store Door or Inside Delivery. Other premium freight variations (Desktop, Protective Signature Service, air, two man delivery, lift gate or export) will be exceptions (if charges are to be buried in list price),miscellaneous charges added by the user or Prepay and Charge. Most export orders have the word "FOR" in the ship to zipcode field. The exceptions are Puerto Rica (PI) with zipcodes 00601-00999, Virgin Islands (VI) with zipcodes 00801-00851, Guam(GU) with zipcodes 96910 to 96931 and Canada has a 6 digit zipcode. The zipcodes for export shipments will not be in the Zipcodes Coordinate table.

The shipping charges for a given destination consist of a basic store door charges plus optional charges for Inside Delivery and Lift Gate (Lift Gate is an option). Initialize above inputs as follows:

There are two areas in the database that indicate when a shipment is prepaid—Freight Payment_Method_Id field in the Customer Order table or Freight_Payment_Method_Ovr field in the Order Ship Destination table. If the order table data indicates Prepaid and the shipment table record is set to null, the shipment is Prepaid. If the order table indicates something other than prepaid but the shipment table record indicates prepaid, then the shipment is prepaid. The Destination Freight $ Per M is calculated follows:

Step 1. Determine Destination Shipping Pounds.

$$\text{Destination Pounds Shipped} = \text{Destination Quantity} \times \left( \sum \text{Ply Paper Mfg Length} \times \text{Ply Paper Mfg Width} \times \left(\frac{\text{Order As Weight}}{17 \times 22 \times 500}\right) + \sum \text{Ply Carbon Mfg Length} \times \text{Ply Carbon Mfg Width} \times \left(\frac{\text{Carbon Total Weight}}{20 \times 30 \times 500}\right) \right) \times (1 + \text{Packaging Weight \%})$$

Base Calculation Initialization:
1. Ply Paper Mfg Width and Ply Paper Mfg Length are found in the Mfg Width and Mfg Length fields on the paper ply record for each paper ply.
2. Ply Carbon Mfg Width and Ply Carbon Mfg Length are found in the Mfg Width and Mfg Length fields on the carbon ply record for each carbon ply.
3. Carbon Total Weight is a Feature List Attribute for each Carbon ID.
4. Packaging weight is found in the Pricing Constants table.
5. Set Destination Quantity equal to the value in the Ship Qty field in the Order Ship Destination table.
6. Order As Weight is a Feature List Attribute attached to each paper Id.

| Pricing Rule | | | | |
|---|---|---|---|---|
| Pricing Rule | Rule Description | Input Effected | Factor | Operation |
| 1 | Palletizing | Packaging Weight % | 2.5% | Add |

Step 2. Calculate Number of Full Trucks.

$$\text{Number Full Trucks} = \text{Round Down to Whole Number Including Zero}\left(\frac{\text{Destination Ship Pounds}}{\text{Truck Maximum Pounds}}\right)$$

Base Calculation Initialization:
1. Destination Ship Pounds was determined in step 1.
2. Truck Maximum Pounds is found in the Pricing Constants table.

Step 3. Calculate Partial Truck Pounds $$\text{Partial Truck Pounds} = [\text{Destination Ship Pounds} - (\text{Truck Maximum Pounds} \times \text{Number Full Trucks})]$$

Base Calculation Initialization:
1. Destination Ship Pounds was determined in step 1.
2. Truck Maximum Pounds is found in the Pricing Constants table.
3. Number Full trucks was determined in step 2.

Step 4. Calculate Destination Freight Charge per M.

$$\text{Destination \$/M} = \frac{\begin{bmatrix} \text{Minimum}\begin{bmatrix} \text{Maximum}\left(\text{Partial Truck Minimum \$}, \frac{\text{Partial Truck Pounds} \times \text{Partial Truck \$/CWT}}{100}\right), \\ \text{Maximum}\left(\text{Next Bracket Minimum \$}, \frac{\text{Next Bracket Pounds} \times \text{Next Bracket \$/CWT}}{100}\right) \end{bmatrix} + \\ \text{Minimum}\left[\text{Maximum}\left(\text{Inside Minimum \$}, \frac{\text{Partial Truck Pounds} \times \text{Inside \$/CWT}}{100}\right), \text{Inside Maximum \$}\right] + \\ \text{Lift Gate \$} + \\ \text{Number Full Trucks} \times (\text{Full Truck \$} + \text{Inside Maximum \$}) + \\ \text{Maximum}\left(\text{Ocean Freight Minimum \$}, \frac{\text{Order Quantity}}{\text{Quantity Per Carton}} \times \text{Ocean Freight \$/Ctn}\right) + \\ \text{Minimum}\begin{bmatrix} \text{Maximum}\left(\text{Port Partial Truck Minimum \$}, \frac{\text{Partial Truck Pounds} \times \text{Port Partial Truck \$/CWT}}{100}\right), \\ \text{Maximum}\left(\text{Port Next Bracket Minimum \$}, \frac{\text{Port Next bracket Pounds} \times \text{Port Next Bracket \$/CWT}}{100}\right) \end{bmatrix} + \\ \text{Number Full Trucks} \times \text{Port Full Truck \$} \end{bmatrix}}{(\text{Order Quantity})}$$

Base Calculation Initialization:
1. Partial Truck Pounds was determined in step 3.
2. Order Quantity is set equal to Order_Qty field on the Customer Order Table.
3. Quantity Per Carton should be initialized to any value greater than zero found in the Special Quantity display attribute attached to the Special feature id (Feature Type= Packaging). If this feature or feature attribute is not defined for this order then set equal to the Std_Carton_ Quantity field in the Manufacturing Order table.
4. Lookup values for Partial Truck Minimum $ and Partial Truck $/CWT in the Freight Rate table. Set Partial Truck Minimum $ equal to the value in the Freight Minimum Flat Charge field and Partial Truck $/CWT equal to the value in the Freight Variable Charge field. Note—convert the value in Freight Variable Charge field to $/CWT if necessary. If the value in the Variable Charge Unit Id field is $/CTN then convert Freight Variable Charge to $/CWT.

$$\$/CWT. = \frac{\$/Carton}{\left[\frac{\text{Destination Pounds Shipped}}{\left(\frac{\text{Destination Quantity}}{\text{Quantity Per Carton}}\right)}\right]} \times 100$$

Quantity Per Carton (see item #3 above under Base Calculation Initialization) $/Carton is the value in the Freight Variable Charge field. Destination Pounds Shipped was determined in step 1. Set Destination Quantity equal to the value in the Ship Qty field in the Order Ship Destination table. Three values are needed to locate the freight rate record—Freight Charge ID, mileage and Ship Pounds.

A. The value for Freight Charge ID is "Store Door."
B. Ship Pounds is equal to the Partial Truck Pounds value determined in step 3 when the destination is a direct ship from plant to the customer. If the destination is a storage warehouse the prepaid freight calculation represents the charges for releases from the warehouse. The quantity per release, the number of releases and the final customer destinations are generally not known at order placement time. Therefore the charge is based on an average Ship Pounds. Set the value for Ship Pounds equal to the Partial Truck Pounds value determined in step 3 divided by the value of the Storage Average releases found in the Pricing Constants table. Currently there are three possible value depending on the total List price value for the forms:

| Total Forms List Value | Average Number of Releases |
|---|---|
| 0 | 5 |
| 7,000 | 6 |
| 4,0000 | 10 |

C. Mileage

Mileage is a calculation when the destination is the customer. This calculation is based on latitude and longitude coordinates for the shipment's origin and destination zipcodes. If the value in the Whse_Id field in the Order Ship Destination table is null then the shipment is direct to the customer. If the Whse Id indicates a storage warehouse, then set mileage equal to the Storage Average Distance value found in the Pricing Constants table.

Mileage Calculation for Direct Ship To Customer

Set the destination zipcode equal to the zipcode of the Destination Id referred to in the Order_Ship_Destination table when the destination is not an offshore location (Hi. or Ark.). If destination location is offshore then destination zipcode is based on a departure port found in the Pricing Constants table. If destination is HI then set destination zipcode equal to the value for the Hawaii Departure Port Zipcode pricing constant. If destination is Alaska then set destination zipcode equal to the value for the Alaska Departure Port Zipcode pricing constant. The origin zipcode is determined from the Plant_Id found in the Order_Plant_ Assignment table. Lookup latitude and longitude coordinates and State for each zipcode in the Zipcode_ Coordinates table.

a. Convert latitude and longitude degrees, minutes and seconds to a total longitude and latitude value for each ship from and ship to location using the following equation.

$$\text{Total Value for Coordinate} = \text{Degrees} + \frac{\text{Minutes}}{60} + \frac{\text{Seconds}}{360}$$

The above conversion equation should be applied to each of the four coordinates.

Origin Total Latitude
Origin Total Longitude
Destination Total Latitude
Destination Total Longitude b. Use the total values for each of the four coordinates to compute shipping mileage.

$$\text{Mileage} = \text{HighwayMileageFactor} \times$$

$$\sqrt{\left(\frac{\text{Absolute Value(Origin Total Latitude} - \text{Destination Total Latitude)} \times}{\text{Latitude Mileage Factor}}\right)^2 + \left[\frac{\text{Absolute Value(Origin Total Longitude} - \text{Destination Total Longitude)} \times}{\left\{\begin{array}{l}\text{Latitude Mileage Factor} - \\ \left(\begin{array}{l}\text{Longitude Mileage Factor} \times \\ \text{Minimum(Destination Total Latitude, Origin Total Latitude)}\end{array}\right)\end{array}\right\}}\right]^2}$$

Latitude Mileage Factor (69.2), Longitude Mileage Factor (0.77) and Highway Mileage Factor (29%) are found be in the pricing constants table.

5. Next Bracket Minimum $, Next Bracket Pounds and Next Bracket $/CWT are initialized differently depending on the destination pounds. If the value of the Ship Pounds Minimum field for the record found in the above lookup (for Partial Truck $/CWT) is greater than or equal to the LTL Rate Minimum Pounds value found in the Pricing Constants table then select the next record after the one found for Partial Truck $/CWT. Set Next Bracket Minimum $ equal to the value in the Freight Minimum Flat Charge field, Next Bracket Pounds equal to the value in the Ship Pounds Minimum field and Next Bracket $/CWT equal to the value in the Freight Variable Charge field. If the value of the Ship Pounds Minimum field for the record found in the above lookup (for Partial Truck $/CWT) is less than the LTL Rate Minimum Pounds value found in the Pricing Constants table then set all three inputs equal to 0.

6. Set Inside Minimum $, Inside Maximum $ and Inside $/CWT equal to zero if the value for Delivery_Point in the Order Ship Destination table indicates Store Door delivery. If the value for Delivery_Point indicates Inside Delivery then lookup the values for the Inside Minimum $ and Inside $/CWT inputs in the Freight Rate table where the value in the Freight Charge Id field is equal to Inside Delivery and the value in the Ship Pounds Minimum field is the closest to but less than the value for Partial Truck Pounds determined in step 3.

If the value of the Ship Pounds Minimum field for the record found in the above lookup (for Partial Truck $/CWT) is less than the Truck Rate Minimum Pounds value found in the Pricing Constants table then set Inside Maximum $ equal to zero. If the value of the Ship Pounds Minimum field for the record found in the above lookup (for Partial Truck $/CWT) is greater than or equal to the Truck Rate Minimum Pounds value found in the Pricing Constants table then set Inside Maximum $ equal to the value for Inside Maximum $ in the Pricing Constants table.

7. Set Lift Gate $ equal to zero.

8. Full Truck $—the Number Full Trucks was determined in step 2. If the value for Number Full Truck is zero then set Full Truck $ equal to zero. If the value for Number Full Truck is greater than zero then lookup the charge for a full truck in the Freight Rate table using the Freight Charge Id, Mileage Minimum and Ship Pounds fields. The Freight Charge Id is equal to Store Door, the value in the Ship Pounds Minimum field should be equal to or greater than the Truck Rate Minimum Pounds value found in the Pricing Constants table. Set Full Truck $ equal to the value in the Freight Minimum Flat Charge field .

9. Ocean Freight $/Ctn, Port Partial Truck Minimum $, Port Partial Truck $/CWT, Port Next Bracket Minimum $, Port Next Bracket Pounds and Port Full Truck $—If destination location is not offshore (Hawaii or Alaska) or destination location is offshore and the destination is a warehouse, then set all inputs equal to zero. If destination location is offshore (Hawaii or Alaska) and a direct ship to customer, then initialize inputs as follows:

A. Ocean Freight $/Ctn and Ocean Freight Minimum $—Lookup values in the Freight Rate table by setting the value for freight Charge Id equal to "Ocean". Set Ocean Freight $/Ctn equal to Freight Variable Charge and Ocean Freight Minimum $ equal to Freight Minimum Flat Charge.

B. Port Partial Truck Minimum $ and Port Partial Truck $/CWT— Lookup values for Port Partial Truck Minimum $ and Port Partial Truck $/CWT in the Freight Rate table. Set Port Partial Truck Minimum $ equal to the value in the Freight Minimum Flat Charge field and Port Partial Truck $/CWT equal to the value in the Freight Variable Charge field. Note—convert the value in Freight Variable Charge field to $/CWT if necessary.

If the value in the Variable Charge Unit Id field is $/CTN then convert Freight Variable Charge to $/CWT.

$$\$/CWT. = \frac{\$/Carton}{\left(\frac{Destination\ Pounds\ Shipped}{\left(\frac{Destination\ Quantity}{Quantity\ Per\ Carton}\right)}\right)} \times 100$$

Quantity Per Carton (see item #3 above under Base Calculation Initialization) $/Carton is the value in the Freight Variable Charge field.

Destination Pounds Shipped was determined in step 1.

Set Destination Quantity equal to the value in the Ship Qty field in the Order Ship Destination table.

Three values are needed to locate the freight rate record for port shipments—Freight Charge ID, mileage and Ship Pounds.

1. The value for Freight Charge ID is "Store Door."
2. Ship Pounds is equal to the Partial Truck Pounds value determined in step 3.
3. Mileage is calculated the same as 4 C above except the origin zipcode must be set to the to either the Hawaii Destination Port Zipcode or the Alaska Destination Port Zipcode in the Pricing Constant table. Set the destination zipcode equal to the zipcode of the Destination Id referred to in the Order_Ship_Destination table.

C. Port Next Bracket Minimum $ and Port Next Bracket Pounds—Next Bracket Minimum $, Next Bracket Pounds and Next Bracket $/CWT are initialized differently depending on the destination pounds. If the value of the Ship Pounds Minimum field for the record found in the above lookup (for Port Partial Truck $/CWT) is greater than or equal to the LTL Rate Minimum Pounds value found in the Pricing Constants table then select the next record after the one found for Port Partial Truck $/CWT. Set Port Next Bracket Minimum $ equal to the value in the Freight Minimum Flat Charge field, Port Next Bracket Pounds equal to the value in the Ship Pounds Minimum field and Port Next Bracket $/CWT equal to the value in the Freight Variable Charge field. If the value of the Ship Pounds Minimum field for the record found in the above lookup (for Port Partial Truck $/CWT) is less than the LTL Rate Minimum Pounds value found in the Pricing Constants table then set all three inputs equal to 0.

D. Port Full Truck $—The Number Full Trucks was determined in step 2. If the value for Number Full Truck is zero then set Port Full Truck $ equal to zero. If the value for Number Full Truck is greater than zero then lookup the charge for a full truck in the Freight Rate table using the Freight Charge Id, Mileage Minimum and Ship Pounds fields. The value for Freight Charge Id is equal to "Store Door", the value in the Ship Pounds Minimum field should be equal to or greater than the Truck Rate Minimum Pounds value found in the Pricing Constants table. Set Port Full Truck $ equal to the value in the Freight Minimum Flat Charge field.

Freight Rate Table (sample data)

| Freight Charge ID | Mileage Minimum | Destination Pounds Minimum | Ship Type | Freight Minimum Flat Charge | Freight Variable Charge | Variable Charge Unit ID |
|---|---|---|---|---|---|---|
| Store Door | 0 | 0 | UPS | 0 | 5.00 | $/CTN |
| Store Door | 0 | 5 | UPS | 0 | 4.50 | $/CTN |
| Store Door | 0 | 20 | UPS | 0 | 4.00 | $/CTN |
| Store Door | 0 | 50 | UPS | 0 | 3.50 | $/CTN |
| Store Door | 500 | 0 | UPS | 0 | 6.00 | $/CTN |
| Store Door | 500 | 5 | UPS | 0 | 5.50 | $/CTN |
| Store Door | 500 | 20 | UPS | 0 | 5.00 | $/CTN |
| Store Door | 500 | 50 | UPS | 0 | 4.50 | $/CTN |
| Store Door | 0 | 200 | LTL | 22.00 | 15.00 | $/CTN |
| Store Door | 0 | 1000 | LTL | 40.70 | 10.00 | $/CTN |
| Store Door | 0 | 5000 | LTL | 52.00 | 8.00 | $/CWT |
| Store Door | 0 | 8000 | LTL | 87.20 | 5.00 | $/CWT |
| Store Door | 500 | 200 | LTL | 22.00 | 18.00 | $/CWT |
| Store Door | 500 | 1000 | LTL | 40.70 | 12.00 | $/CWT |
| Store Door | 500 | 5000 | LTL | 52.00 | 10.00 | $/CWT |
| Store Door | 500 | 8000 | LTL | 87.20 | 6.50 | $/CWT |
| Store Door | 0 | 10000 | TRUCK | 175.00 | 0 | None |
| Store Door | 500 | 10000 | TRUCK | 600.00 | 0 | None |
| Inside Delivery | 0 | 0 | UPS | 0 | 0 | None |
| Inside Delivery | 0 | 200 | LTL/TRUCK | 22.00 | 2.85 | $/CWT |
| Lift Gate | 0 | 0 | UPS | 0 | 0 | None |
| Lift Gate | 0 | 200 | LTL/TRUCK | 80.00 | 0 | None |
| Ocean | 0 | 0 | SHIP | 55.00 | 3.06 | $/CTN |

Storage

There are five storage rate variations available which may be included in list price.
1. Standard
2. Add On
3. Short Store Period Option (SSPO)
4. High Value Carton Option (HVCO)
5. Negotiated Rates (i.e., PRISM)

Standard, Add-On and SSPO are normally selectable by the CSR when storage is requested by the customer. The selected value will be stored in the Customer_Order table in the Storage_Type field.

Standard Storage:

A percentage of the form list price will be generated as the storage charge in this case. Also, a check will be performed to find out if this order is a candidate for HVCO rates. HVCO is not selectable but will be automatically used by the system if Standard storage is requested and the order total list price or the carton list price meets certain 'high value' qualifiers. In this case, the value of the Storage_Type field will remain unchanged and the HVCO_Storage indicator field on the Customer_Order table will be set to TRUE.

Add-On Storage:

Add On option has two rates; one is a flat charge per carton which is included in list price and the other is a per carton per month charge which is added to the invoice and is not included in list price.

Short Storage Period Option:

The SSPO option is a discounted storage option that is only given to customers who guarantee to have all forms released from storage is a period that is shorter than the standard 1 year. The SSPO type will always cause an exception because the rate must be manually calculated by a Distribution Services Specialist.

Negotiated Rates:

The only time that the user cannot choose which of the three storage variations will be used in when the customer has already been set up as a negotiated rate customer. In this case, the Storage_Type and HVCO_Storage fields will be NULL and the PRISM_Storage indicator field will be set to TRUE. This indicates that the Pricing Engine must use the PRISM_Storage table for storage and freight rate lookups. Please see the section following this Storage Cost Equation for a further discussion of the details surrounding identifying and processing Negotiated Rate storage orders. Separate cost components will be developed for PRISM Storage (negotiated rates) and for Standard Rate Storage.

PRISM Storage Equation (Negotiated Rates)

PRISM Storages $ Per M =

$$\left(\frac{\text{Storage Rate} \times \text{Quantity Stored}}{\text{Order Quantity}} \times \text{Form Value Per } M\right)$$

Base Calculation Initializations:
1. PRISM Storage Rate is found in the Storage_Rate field in the PRISM_Storage table. The key to the Prism Storage table includes . . .
   CADD Customer Number: This is found in the Sold-To Customer Address record.
   Category: Category is either 'Z' which indicates that the record is a customer level record or a 'P' which represents the record is at a Customer Form Number level. This field is used in combination with the Begin_Value and End_Value fields. The Pricing Engine should always look for more specific records first. If a customer level record exists and a form number level release of stored forms or 'S', which designates the customers desire to be invoiced for storage when they are stored. This value is set equal to the value of Storage_Invoice_Timing on the Customer Order table.
   Effective Date: this value should be set equal to the current date.
2. Quantity Stored is the summation of Ship_Qty field on all Order Ship Destination records where the destination is an SRC warehouse. Note: for simplification purposes, this calculation ignores a potential plant overrun and customers instruction for disposition of the overrun quantity (ship to storage or ship direct).
3. Order Quantity is set equal to the value of Order_Qty on the Customer Order table.
4. Forms Value per M is either the Forms List Price as calculated by the Pricing Engine or the Forms Sell Price as set by the CSR or Sales Representative. Which to use is determined by looking at the Based_on_Sell_Price field on the PRISM_Storage record found in Step 1 above. If this value is 'Y' (True), then Forms Value per M should be set equal to the Forms Sell Price, otherwise, Forms Value per M should be set equal to the Forms List Price.

PRISM_Storage Table (sample records only)

| CADD Customer Number | Category | Begin Value | End Value | Storage Method | Storage Invoice Timing | Storage Rate | Freight Rate |
|---|---|---|---|---|---|---|---|
| 1000 | P | U-001 | U-999 | C | Invoice Stored | 14% | 8% |
| 1001 | C | 8502 | 8502 | P | Invoice Release | 20% | 10% | record exists for the same customer, the form number level record should be used. Therefore, the Pricing Engine will always try to find a Category 'P' record first where the value of Cust_Form_Number from the Customer Order table falls alphabetically within the range of values represented by the fields Begin_Value and End_Value. If this record cannot be found, then a search for a record at the customer level will be performed. This search will not use the Begin_Value and End_Value fields. If no customer level record is found, a not-priceable exception is raised.

Note: There may be multiple records returned that fit the customer form number criteria. In these cases, there should be only two, one which is for that specific customer form number only (i.e. Begin_Value=End_Value) and one where the specified customer form number fits within the range defined by Begin_Value and End_Value. In these cases, the record specific to the specified customer form number should be used (i.e. the one where Begin_Value=End_Value)

Storage_Method: This field is either 'C', which indicates the customer has requested full carton releases only, or a 'P', which allows the customer to release forms from Storage in less than full cartons. This value is set by examining the value of Full_Carton_Release on the Customer Order table. A value of 'Y' (True) in this field means that Storage_Method should be 'C'. A value of 'N' (False) indicates that Storage_Method should be 'P'.

Storage Invoice Timing: This field is either 'R', which indicates the customer will be invoiced for storage at See the next section titled PRISM Freight and Storage Extra for more details on the use of the columns in this table.

PRISM Storage Pricing Rules

No Pricing Rules have been identified for the PRISM Storage calculation at this time.

Storage Equation (Standard Rates)

Storage $ Per M =

$$\left(\frac{\text{Storage Rate} \times \text{Quantity Stored}}{\text{Order Quantity}} \times \text{Form Value Per M}\right) +$$

$$\left(\frac{\text{Storage Per Ctn Total Charge}}{\text{Order Quantity}}\right)$$

where . . .

$$\text{Quantity Stored} = \sum \text{Warehouse Destination Ship\_Qty}$$

Storage Per Ctn Total Charge =

$$\text{MAX}\left[\text{MIN}\left(\text{Per Carton Charge} \times \left(\frac{\text{Quantity Stored}}{\text{Carton Quantity}}\right),\; \text{Storage Maximum}\right),\; \text{Per Carton Charge}\right]$$

Base Calculation Initializations:
1. Storage Rate is set equal to Storage_Pct in the Storage table when the order is not a 'negotiated' rate order. The key to the correct record for this lookup is based on . . .
   Storage_Type as defined in the Storage_Type field on Customer Order table. If Standard is chosen, the HVCO checks described below must be done and will be used instead of standard when the HVCO condition(s) are TRUE.

Invoice_Type as defined in the Storage_Invoice_Timing field on the Customer Order table.
2. Quantity Stored is the summation of Ship_Qty field on all Order Ship Destination records where the destination is an SRC warehouse. Note: for simplification purposes, this calculation ignores a potential plant overrun and customer's instruction for disposition of the overrun quantity (ship to storage or ship direct).
3. Order Quantity is set equal to the value of Order_Qty on the Customer Order table.
4. Form Value per M is the summation of all cost components across the entire Customer Order excluding Freight and Storage.
5. Per Carton Charge is set equal to Storage_Ctn in the Storage table.
6. The Carton Quantity is set equal to the Special Qty display attribute on the Special Packaging feature. If this feature does not exist, then this value is set to Std_Carton_Qty on the Mfg Order table.
7. Storage Maximum is set equal to Storage_Max in the Storage table.

Qualifier constant, then use HVCO rates. If not, continue with Standard rates.

Storage Pricing Rules
No Pricing Rules have been identified for the Storage calculation at this time.

PRISM Freight and Storage Extra
When SRC customers put their forms into storage, they have two options available on how those forms are released from storage. The first is to have them release in full cartons. Customers who select this option for all their stored forms will get standard freight and storage rates. The second option is to have forms shipped to them in less than full carton quantities. Those customers who select to have one or more of their stored forms released in this fashion are considered Pic-n-Pac customers and have special negotiated rates for freight and storage. This memo will discuss the data and process necessary for recognizing these customers and properly calculating freight and storage charges.

Data:
There are three tables in the order entry system 10 (also referred to herein as the STAR system) that will contain the data necessary to determine both if a customer is a Pic-n-Pac customer and what are the negotiated rates for that customer.
1. Customer Address table. This table will contain a Boolean indicator, STD_FULL_CTN, which will indicate if the Storage Table

| Storage_Type | Invoice_Type | Storage_Pct | Storage_Ctn | Storage_Max |
|---|---|---|---|---|
| Standard | Invoiced Stored | 8% | $0.00 | $000.00 |
| Standard | Invoiced Released | 14% | $0.00 | $000.00 |
| Add On | Invoiced Stored | 0% | $3.00 | $100.00 |
| Add On | Invoiced Released | 0% | $3.00 | $100.00 |
| HVCO | Invoiced Stored | 1% | $6.00 | $000.00 |
| HVCO | Invoiced Released | 6% | $6.00 | $000.00 |

HVCO Verifications:
If the user selected the Standard storage option, then check to see if order qualifies for HVCO storage rates. Both of the following conditions must be true in order to receive HVCO rates.

First HVCO Check: Value of Stored Forms
This check validates that the value of the stored forms hits the level necessary to receive HVCO rates.

$$\text{Value of Stored Forms} = \frac{\text{Form Value per M} \times \text{Quantity Stored}}{1000}$$

Compare this calculated value with the HVCO Order Qualifier found in the Pricing Constants table. If the calculated value is equal to or greater than the HVCO Order Qualifier constant, then continue with the second HVCO check. If not, skip the second check and continue with Standard rates.

Second HVCO Check: Value of Forms in One Carton
This check validates that the value of the forms contained within one carton hits the level necessary to receive HVCO rates.

$$\text{Value of Forms in One Carton} = \frac{\text{Form Value per M} \times \text{Carton Quantity}}{1000}$$

Compare this calculated value with the HVCO Carton Qualifier found in the Pricing Constants table. If the calculated value is equal to or greater than the HVCO Carton customer has one or more forms that are released in less than full carton.
2. Customer Order table. This table will contain a Boolean indicator, FULL_CARTON_RELEASE, which will indicate if the customer wishes to have this specific order released as full carton or less than full carton. It will also contain a numeric field, OVERRUN_STORAGE_PCT, to indicate the customer's wish regarding how much of any overrun quantity should be shipped to storage. This may be 0% if all overrun quantity is to be sent directly to the customer, 100% if all the overrun quantity should be stored or any percentage in between.
3. PRISM Storage table. This table will have one to many records in it to identify the negotiated rates for a Pic-n-Pac customer. The layout is as follows . . .

| PRISM_STORAGE: | | |
|---|---|---|
| CADD_CUST_NUM | Varchar2 (7) | Not Null |
| CATEGORY | Varchar2 (1) | Nullable |
| BEGIN_VALUE | Varchar2 (10) | Nullable |
| END_VALUE | Varchar2 (10) | Nullable |
| STORAGE_METHOD | Varchar2 (1) | Not Null |
| STORAGE_INVOICE_TIMING | Varchar2 (1) | Not Null |
| STORAGE_RATE | Number | Not Null |
| FREIGHT_RATE | Number | Not Null |
| EFFECTIVE_DATE | Date | Not Null |
| EXPIRATION_DATE | Date | Not Null |

A Pic-n-Pac customer may choose one of three options for determining which forms have a negotiated rate.

1. All forms

The customer can choose to have all their forms stored at the negotiated rate. In this case, the PRISM Storage record would have their CADD Customer number defined with Category, Begin Value and End Value being null.

2. A range of product codes

The customer may choose to have a single product code or set of product codes stored at a negotiated rate. In this case, the PRISM Storage record would contain the CADD Customer number with the Category being set to "C". The Begin Value and End Value will be used to set the range of product codes that are included in this negotiated rate.

3. A range of form numbers

The customer may choose to have a single form or set of forms stored at a negotiated rate. In this case, the PRISM Storage record would contain the CADD Customer number with the Category being set to "P". The Begin Value and End Value will be used to set the range of customer form numbers that are included in this negotiated rate.

In addition to these four fields, two others are used to identify the specific record that should be used for a given order.

1. Storage Method

This field will contain a "C" or a "P". The "C" indicates that this is a negotiated rate for an order that is to be released as full cartons only. This rate may or may not be different than the Standard full carton rate that non Pic-n-Pac customers receive. The "P" indicates that the record represents the negotiated rate for an order that will be released in less than full carton quantities.

2. Storage Invoice Timing

This field will indicate if the customer wishes to pay for storage when the forms are stored (Invoice Stored) or when the forms are released from storage (Invoice Release). This field will contain an "S" for Invoice Stored or an "R" for Invoice Release. The remaining fields hold the specific freight and storage rates for this Pic-n-Pac customer and/or form number/product code combination and the effective date range of the record.

Process:

There are four processes that will create and/or use the data as described above.

1. Conversion and Interfaces:

C&I will be responsible for populating STAR tables with data brought over from the PRISM system. Specifically, C&I will populate the STD_FULL_CTN Boolean field on Customer Address as well as all the data in the PRISM Storage table.

2. Order Entry:

If the customer is a Pic-n-Pac customer, CSRs will not be able to select a storage charge method as it will default to Pic-n-Pac and cannot be changed. In this case; however, the CSR must choose whether the customer wishes to have this specific order release in full carton or less than full carton quantities. This data will be stored in the Boolean field Full Carton Release.

The field OVERRUN_STORAGE_PCT must also be entered during the order entry process. This field must be entered for all orders that have any portion going to storage regardless of whether the customer is a Pic-n-Pac customer or not. This information will be passed to TOPS. It is TOPS who will determine how to break up the overrun quantity to be shipped directly among the various shipping destinations when more than one direct ship exists.

3. Validation:

Validation will be responsible for populating the Product Code field in the Manufacturing Order table. This code is developed from the product type and various features that exist on the form.

4. Pricing:

Pricing will use the data in STAR to determine if the customer is Pic-n-Pac and also to determine what rate should be used for both freight and storage.

First, pricing will determine if there is any storage for this order by looking for any records in the Order Ship Destination table to determine if any have the Warehouse ID is populated. If any are found, Pricing will read the Ship Quantity to determine how many forms are being stored.

If there is storage for the order, Pricing will then determine the data necessary to identify the specific PRISM Storage record that applies to the order. This data includes . . .

a) CADD Customer Number from the Customer Address table b) Customer Form Number from the Customer Order table c) Full Carton Release from the Customer Order table d) Product Code from the Manufacturing Order table e) Storage Invoice Timing from the Customer Order table.

Once it is determined that there is storage and it is a Pic-n-Pac customer, Pricing will select the correct PRISM storage record based on the data listed above. Pricing will always look for a record that is more specific first and work backwards toward more general records. For example, if there is a PRISM Storage record for all forms for a CADD Customer and a second for a specific form for that same CADD Customer, then Pricing would use the form specific record before using the general Customer record. The order of the data from most detailed to most general is . . .

1. Form Number
2. Product Code
3. CADD Customer

The storage method and invoice timing data will also need to be considered to select the correct record from the PRISM Storage table.

Miscellaneous Notes:

If a customer is marked as a Pic-n-Pac customer on the Customer Address record, we will always attempt to find the PRISM Storage record that should be used. If we are unable to find any record for that customer, the order will be exceptioned to a pricing analyst.

For split shipments, the portion of the shipment that is being shipped directly will receive the same freight rate as that portion that is stored. For instance, if a Pic-n-Pac customer requests 50% of the quantity to be shipped directly and 50% to be stored, the freight rate used for the 50% shipped directly will be the same as the PRISM freight rate for that customer order.

The Stanfast® Pricing equations and rules are as follows (some pricing tables referred to below are not actually shown in the present specification because the content thereof is self explanatory):

Cost Component Development

Cost component development for Stanfast Products follows the rules for Rotary cost component development with the exception of the Material cost components. Since we do not charge specifically for materials for Stanfast products, the code that develops material cost components in the Rotary world should not be run for Stanfast orders.

STANFAST Pre-Figured Cost

This equation represents the calculation of cost for the Stanfast products and includes the following base charges and upcharges . . .

Base List Price . . . Included in base

Paper Upcharge . . . Included in base

Soy Base Ink Upcharge

Ink Color Upcharge

Multiple Ink Color Upcharge
Heat Resistant Ink Upcharge
Backprinting Upcharge
Punching Upcharge
Special Packaging Quantity Upcharge
Multi-Destination Upcharge
PMT Proof Upcharge
Part to Part Upcharge The remainder of this section will discuss the evaluation of each of the types of charges in the following cost component equation.

Stanfast Pre-Figured Cost Equation:

Stanfast Pre-figured Cost=Base list Price+Paper Upcharge+Soy Base Ink Upcharge+Ink Color Upcharge+Multiple Ink Upcharge+Heat Resistant Ink Upcharge+Backprinting Upcharge+Punching Upcharge+Special Pkging Quantity Upcharge+Multi-Destination Upcharge+PMT Proof Upcharge+ Part to Part Upcharge.

Base List Price:

The base price of a Stanfast order includes the Base List Price charge and the Paper Upcharge. This is done primarily to make it more like the rotary orders that do not have the concept of a "base" paper. Therefore, the base rotary order is priced with the actual paper that will be used on the order. By including this upcharge in the Stanfast Base Price, this base price will also be based on the actual paper that is used for the order. The Base List Price for the Stanfast product is based on Stanfast product type, category, quantity, form size and number of plies.

Rule 2: Where Rule 1 cannot be accommodated, find the record which represents the smallest area (Dimension 1*Dimension 2) where . . .
  the lesser of Dimension 1 and Dimension 2 is >=the lesser of the customer specified length and width
  - AND -
  the greater of Dimension 1 and Dimension 2 is >=the greater of the customer specified length and width.

For example, a 5"×8.5" form could be run with a 5.5"× 8.5" paper (1 up) or with a 8.5"×11" paper (2 up). In this case, the 5.5"×8.5" paper would be chosen because it represents a smaller area.

Number of Plies

The number of plies field is calculated by counting the number of ply records that exist in the database for the current Manufacturing Order.

Paper Upcharge:

This charge will cover the additional costs of papers that are not considered part of the base specification for the given Stanfast product.

Paper Upcharge =

$$\begin{pmatrix} \text{Ply \#1 Upcharge LPMSI} + & \text{Ply \#2 Upcharge LPMSI} + \\ \text{Ply \#3 Upcharge LPMSI} + & \text{Ply \#4 Upcharge LPMSI} + \\ \text{Ply \#5 Upcharge LPMSI} & \end{pmatrix} \times$$

Brackett Dimension 1 × Brackett Dimension

Stanfast_Price Reference Table:

| Product Type | Quantity | Dimension 1 | Dimension 2 | Number Plies | Base List Price |
|---|---|---|---|---|---|
| Stanfast Cut Sheet | 500 | 5 ½ | 8 ½ | 1 | $85.60 |
| Stanfast Cut Sheet | 1,000 | 8 ½ | 11 | 1 | $68.56 |
| Stanfast Cut Sheet | 2,000 | 8 ½ | 11 | 1 | $75.90 |
| Stanfast Carbonless Sets | 1,000 | 5 ½ | 8 ½ | 2 | $92.75 |
| Stanfast Carbonless Sets | 2,000 | 4 ¼ | 11 | 3 | $129.82 |
| Stanfast Carbonless Sets | 3,000 | 8 ½ | 3 ½ | 4 | $115.60 |
| Stanfast Envelopes | 500 | 4 ⅛ | 9 ½ | 1 | $112.20 |
| Stanfast Envelopes | 1,000 | 3 ½ | 6 | 1 | $72.64 |

Note: This is only a sample of the data for this table. See the Stanfast Catalog for all data values.

The charge to be applied to this form for Base List Price will be a lookup in the Stanfast_Price table from above. The key fields are to this table are determined as follows . . .

Product Type

This value is looked up in the Manufacturing_Order table in the Product_Type_ID field. This value is then used directly as a lookup in the Stanfast_Price table. Note that the displayed values above are the decode of the Product_Type_IID field as defined in the STAR_Codes table.

Quantity

This value is looked up in the Customer_Order table in the Order_Qty field. The Stanfast_Price record selected should be the one with the largest Quantity that is less than or equal to Order_Qty.

Form Size

Form size includes both form length and form width. The record selected from the Stanfast_Price table should be selected in the following fashion . . .

Rule 1: Attempt to find a record where the customer specified form size is exactly equal to the Stanfast_ Price form size as indicated by Dimension 1 and Dimension 2.

Base Calculation Initializations:

1. Ply # Upcharge LPMSI should be set equal to 0 if the Ply # Paper is found in the Stanfast_Base_Specs table shown below. If it is not found in this table, this input should be set to the value of "Paper Upcharge LPMSI" as found in the Stanfast_Paper_Upcharge table. The key to this table is product type, Number of Form Plies, Request Paper ID, Base Paper ID and Brackett Square Inches.

Product Type is found in the like named field in the Manufacturing Order.

Number of Form Plies is calculated by counting the number of Paper plies in the Ply table for the current Mfg Order.

Request Paper ID is the Feature ID of the paper associated with this ply.

The Base Paper ID is the Feature ID of the paper as found in the Stanfast_Base_Specification table.

Brackett Square Inches is the multiplication of Dimension 1 and Dimension 2 (rounded to 3 decimal places) as determined necessary during the Form Size calculation of the Base Lookup described above. Note that this is not necessarily equal to the customer specified dimensions.

2. Brackett Dimension 1 and Brackett Dimension 2 are the same as found in the Form Size calculation of the Base Lookup described above.

Note: The calculated square inch value must fall in a range indicated by the Base_Price_Brachet_Minimum_Sq. In. and Base_Price_Bracket_Maximum_Sq. In. Otherwise, an error condition exist.

Stanfast_Base_Spec Table:

| Product Type ID | Ply Number | Feature ID | Form Plies |
|---|---|---|---|
| Stanfast Sheets | 1 | 20 Wht Bond | 1 |
| Carbonless Sets | 1 | 15 Wht CB | 2 |
| Carbonless Sets | 2 | 15 Canary CF | 2 |
| Carbonless Sets | 1 | 15 Wht CB | 3 |
| Carbonless Sets | 2 | 17 Can CFB | 3 |
| Carbonless Sets | 3 | 15 Pnk CF | 3 |
| Carbonless Sets | 1 | 15 Wht CB | 4 |
| Carbonless Sets | 2 | 17 Can CFB | 4 |
| Carbonless Sets | 3 | 17 Pnk CFB | 4 |
| Carbonless Sets | 4 | 15 Grod CF | 4 |
| Carbonless Sets | 1 | 15 Wht CB | 5 |
| Carbonless Sets | 2 | 17 Grn CFB | 5 |
| Carbonless Sets | 3 | 17 Can CFB | 5 |
| Carbonless Sets | 4 | 17 Pnk CFB | 5 |
| Carbonless Sets | 5 | 15 Grod CF | 5 |
| Envelope | 1 | 24 Wht Wove Envelope | 1 |

Stanfast_Paper_Upcharge Table

| Product Type | Form Plies | Requested Paper ID | Base Paper ID | Minimum Square Inches | Maximum Square Inches | Paper Upcharge LPMSI |
|---|---|---|---|---|---|---|
| Envelope | 1 | 24 wht Wove - Blue Inside Tint | 24 Wht Wove | 31.266 | 31.266 | 0.29425 |
| Envelope | 1 | 24 wht Wove - Blue Inside Tint | 24 Wht Wove | 34.391 | 34.391 | 0.26751 |
| Envelope | 1 | 24 wht Wove - Blue Inside Tint | 24 Wht Wove | 39.188 | 39.188 | 0.23477 |
| Envelope | 1 | 24 wht Wove - Black Inside Tint | 24 Wht Wove | 31.266 | 31.266 | 0.29425 |
| Envelope | 1 | 24 wht Wove - Black Inside Tint | 24 Wht Wove | 34.391 | 34.391 | 0.26751 |
| Envelope | 1 | 24 wht Wove - Black Inside Tint | 24 Wht Wove | 39.188 | 39.188 | 0.23477 |
| Envelope | 1 | 24 wht Wove - Blue Inside Tint With Window | 24 Wht Wove | 31.266 | 31.266 | 0.46441 |
| Envelope | 1 | 24 wht Wove - Blue Inside Tint With Window | 24 Wht Wove | 34.391 | 34.391 | 0.42221 |
| Envelope | 1 | 24 wht Wove - Blue Inside Tint With Window | 24 Wht Wove | 39.188 | 39.188 | 0.37053 |
| Envelope | 1 | 24 wht Wove - Black Inside Tint with Window | 24 Wht Wove | 31.266 | 31.266 | 0.46441 |
| Envelope | 1 | 24 wht Wove - Black Inside Tint with Window | 24 Wht Wove | 34.391 | 34.391 | 0.42221 |
| Envelope | 1 | 24 wht Wove - Black Inside Tint with Window | 24 Wht Wove | 39.188 | 39.188 | 0.37053 |
| Envelope | 1 | 24 wht Wove - with Window | 24 Wht Wove | 21.000 | 21.000 | 0.25333 |
| Envelope | 1 | 24 wht Wove - with Window | 24 Wht Wove | 23.563 | 23.563 | 0.22578 |
| Envelope | 1 | 24 wht Wove - with Window | 24 Wht Wove | 31.266 | 31.266 | 0.17015 |
| Envelope | 1 | 24 wht Wove - with Window | 24 Wht Wove | 34.391 | 34.391 | 0.15469 |
| Envelope | 1 | 24 wht Wove - with Window | 24 Wht Wove | 39.188 | 39.188 | 0.13576 |
| Envelope | 1 | 20 Wht 25% Rag | 24 Wht Wove | 39.188 | 39.188 | 1.91694 |
| Envelope | 1 | 24 wht 25% Rag | 24 Wht Wove | 39.188 | 39.188 | 2.13946 |
| Envelope | 1 | 24 wht Classic Laid | 24 Wht Wove | 39.188 | 39.188 | 1.73933 |
| Envelope | 1 | 24 Ivory Classic Laid | 24 Wht Wove | 39.188 | 39.188 | 1.95981 |
| Carbonless sets | 2 | 15 Grod CF | 15 Can CF | 0 | 187 | 0.00000 |
| Carbonless sets | 2 | 15 Pnk CF | 15 Can CF | 0 | 187 | 0.00000 |
| Carbonless sets | 3 | 15 Can CF | 15 Pnk CF | 0 | 187 | 0.00000 |
| Carbonless sets | 3 | 15 Grod CF | 15 Pnk CF | 0 | 187 | 0.00000 |
| Carbonless sets | 3 | 17 Pnk CFB | 17 Can CFB | 0 | 187 | 0.00000 |
| Carbonless sets | 3 | 17 Grn CFB | 17 Can CFB | 0 | 187 | 0.00000 |
| Carbonless sets | 4 | 15 Pnk CF | 15 Grod CF | 0 | 187 | 0.00000 |
| Carbonless sets | 4 | 15 Can CF | 15 Grod CF | 0 | 187 | 0.00000 |
| Carbonless sets | 4 | 17 Pnk CFB | 17 Can CFB | 0 | 187 | 0.00000 |
| Carbonless sets | 4 | 17 Grn CFB | 17 Can CFB | 0 | 187 | 0.00000 |
| Carbonless sets | 4 | 17 Can CFB | 17 Pnk CFB | 0 | 187 | 0.00000 |
| Carbonless sets | 4 | 17 Grn CFB | 17 Pnk CFB | 0 | 187 | 0.00000 |
| Carbonless sets | 5 | 15 Grod CF | 15 Can CF | 0 | 187 | 0.00000 |

-continued

Stanfast_Paper_Upcharge Table

| Product Type | Form Plies | Requested Paper ID | Base Paper ID | Minimum Square Inches | Maximum Square Inches | Paper Upcharge LPMSI |
|---|---|---|---|---|---|---|
| Carbonless sets | 5 | 15 Pnk CF | 15 Grod CF | 0 | 187 | 0.00000 |
| Carbonless sets | 5 | 15 Can CF | 15 Grod CF | 0 | 187 | 0.00000 |
| Carbonless sets | 5 | 17 Pnk CFB | 17 Can CFB | 0 | 187 | 0.00000 |
| Carbonless sets | 5 | 17 Grn CFB | 17 Can CFB | 0 | 187 | 0.00000 |
| Carbonless sets | 5 | 17 Can CFB | 17 Pnk CFB | 0 | 187 | 0.00000 |
| Carbonless sets | 5 | 17 Grn CFB | 17 Pnk CFB | 0 | 187 | 0.00000 |
| Carbonless sets | 5 | 17 Pnk CFB | 17 Grn CFB | 0 | 187 | 0.00000 |
| Carbonless sets | 5 | 17 Can CFB | 17 Grn CFB | 0 | 187 | 0.00000 |
| Carbonless sets | 2 | 15 Wht Ecobond CB | 15 Wht CB | 0 | 119 | 0.01412 |
| Carbonless sets | 2 | 15 Can Ecobond CF | 15 Can CF | 0 | 119 | 0.01412 |
| Carbonless sets | 2 | 15 PNK Ecobond CF | 15 Can CF | 0 | 119 | 0.01412 |
| Carbonless sets | 3 | 15 Wht Ecobond CB | 15 Wht CB | 0 | 119 | 0.01005 |
| Carbonless sets | 3 | 15 can Ecobond CF | 15 Pnk CF | 0 | 119 | 0.01005 |
| Carbonless sets | 3 | 15 PNK Ecobond CF | 15 Pnk CF | 0 | 119 | 0.01005 |
| Carbonless sets | 3 | 17 Can Ecobond CFB | 17 Can CFB | 0 | 119 | 0.01005 |
| Stanfast Sheets | 1 | 20 Wht Bond - 5 Hole | 20 Wht Bond | 93.5 | 93.5 | 0.08492 |
| Stanfast Sheets | 1 | 20 can bond | 20 Wht Bond | 0 | 187 | 0.07818 |
| Stanfast Sheets | 1 | 20 Pink bond | 20 Wht Bond | 0 | 187 | 0.07818 |
| Stanfast Sheets | 1 | 20 Blu bond | 20 Wht Bond | 0 | 187 | 0.07818 |
| Stanfast Sheets | 1 | 20 Grn bond | 20 Wht Bond | 0 | 187 | 0.07818 |
| Stanfast Sheets | 1 | 20 Grod bond | 20 Wht Bond | 0 | 187 | 0.07818 |
| Stanfast Sheets | 1 | 20 Buff bond | 20 Wht Bond | 0 | 187 | 0.07818 |
| Stanfast Sheets | 1 | 90 can Index | 20 Wht Bond | 0 | 187 | 0.42032 |
| Stanfast Sheets | 1 | 90 Pnk Index | 20 Wht Bond | 0 | 187 | 0.42032 |
| Stanfast Sheets | 1 | 90 Blu Index | 20 Wht Bond | 0 | 187 | 0.42032 |
| Stanfast Sheets | 1 | 90 Grn Index | 20 Wht Bond | 0 | 187 | 0.42032 |
| Stanfast Sheets | 1 | 90 Grod Index | 20 Wht Bond | 0 | 187 | 0.42032 |
| Stanfast Sheets | 1 | 90 Buff Index | 20 Wht Bond | 0 | 187 | 0.42032 |
| Stanfast Sheets | 1 | 110 can Index | 20 Wht Bond | 0 | 187 | 0.51615 |
| Stanfast Sheets | 1 | 110 Pnk Index | 20 Wht Bond | 0 | 187 | 0.51615 |
| Stanfast Sheets | 1 | 110 Blu Index | 20 Wht Bond | 0 | 187 | 0.51615 |
| Stanfast Sheets | 1 | 110 Grn Index | 20 Wht Bond | 0 | 187 | 0.51615 |
| Stanfast Sheets | 1 | 110 Grod Index | 20 Wht Bond | 0 | 187 | 0.51615 |
| Stanfast Sheets | 1 | 110 Buff Index | 20 Wht Bond | 0 | 187 | 0.51615 |
| Stanfast Sheets | 1 | 20 Wht 25% Rag Bond | 20 Wht Bond | 0 | 187 | 0.33914 |
| Stanfast Sheets | 1 | 24 Wht 25% Rag Bond | 20 Wht Bond | 0 | 187 | 0.38567 |
| Stanfast Sheets | 1 | 24 Wht Classic Laid | 20 Wht Bond | 0 | 187 | 0.35487 |
| Stanfast Sheets | 1 | 24 Ivory Classic Laid | 20 Wht Bond | 0 | 187 | 0.36246 |
| Stanfast Sheets | 1 | 60 Wht offset | 20 Wht Bond | 0 | 187 | 0.16535 |
| Stanfast Sheets | 1 | 90 Wht index | 20 Wht Bond | 0 | 187 | 0.35957 |
| Stanfast Sheets | 1 | 110 Wht index | 20 Wht Bond | 0 | 187 | 0.44128 |
| Stanfast Sheets | 1 | 50 Wht dry gum | 20 Wht Bond | 0 | 187 | 0.78652 |
| Stanfast Sheets | 1 | 20 Wht Ecobond 50/10 | 20 Wht Bond | 0 | 187 | 0.05348 |
| Stanfast Sheets | 1 | 24 Wht 25% Rag Ecobond 75/25 | 20 Wht Bond | 0 | 187 | 0.43840 |
| Stanfast Sheets | 1 | 20 Wht Xerographic | 20 Wht Bond | 93.5 | 119 | 0.00000 |
| Stanfast Sheets | 1 | 20 can Xerographic | 20 Wht Bond | 93.5 | 119 | 0.07818 |
| Stanfast Sheets | 1 | 20 Pnk Xerographic | 20 Wht Bond | 93.5 | 119 | 0.07818 |
| Stanfast Sheets | 1 | 20 Blu Xerographic | 20 Wht Bond | 93.5 | 119 | 0.07818 |
| Stanfast Sheets | 1 | 20 Grn Xerographic | 20 Wht Bond | 93.5 | 119 | 0.07818 |
| Stanfast Sheets | 1 | 20 Grod Xerographic | 20 Wht Bond | 93.5 | 119 | 0.07818 |
| Stanfast Sheets | 1 | 20 Buff Xerographic | 20 Wht Bond | 93.5 | 119 | 0.07818 |
| Stanfast Sheets | 1 | 20 Wht 25% Rag Xero Bond | 20 Wht Bond | 93.5 | 119 | 0.60032 |
| Stanfast Sheets | 1 | 24 Wht Xerographic | 20 Wht Bond | 93.5 | 119 | 0.09219 |
| Stanfast Sheets | 1 | 24 can Xerographic | 20 Wht Bond | 93.5 | 119 | 0.09262 |
| Stanfast Sheets | 1 | 24 Pnk Xerographic | 20 Wht Bond | 93.5 | 119 | 0.09262 |
| Stanfast Sheets | 1 | 24 Blu Xerographic | 20 Wht Bond | 93.5 | 119 | 0.09262 |
| Stanfast Sheets | 1 | 24 Grn Xerographic | 20 Wht Bond | 93.5 | 119 | 0.09262 |
| Stanfast Sheets | 1 | 24 Grod Xerographic | 20 Wht Bond | 93.5 | 119 | 0.09262 |
| Stanfast Sheets | 1 | 24 Buff Xerographic | 20 Wht Bond | 93.5 | 119 | 0.09262 |
| Stanfast Sheets | 1 | 24 Wht 25% Rag Xero Bond | 20 Wht Bond | 93.5 | 119 | 0.68278 |

Soy Base Ink Upcharge:

Soy Base Ink Upcharge = Soy Ink Charge × Number of Soy Inks

Base Calculation Initializations:
1. The Soy Ink Charge is set to 0.00/M for the base calculation. It will be updated via the rules where soy base inks exist on the form.
2. The Number of Soy Inks is determined by counting the total number of soy inks that are used across all ply faces for the order.

Ink Color Upcharge:
This charge will cover the additional costs of using colors that are not considered the base color for the given Stanfast product.

$$\text{Ink Color Upcharge} = \begin{bmatrix} (\# \text{ of Std Inks} \times \text{Std Ink Charge}) + \\ ((\# \text{ Inks} - \# \text{ of Std Inks} - \# \text{ of Base Inks}) \times \\ \text{Non Std Ink Charge}) \end{bmatrix} \times \frac{1000}{\text{Order Quantity}}$$

Base Calculation Initializations:
1. The Number of Base Inks is calculated by summing the number of unique colors of inks on the order where . . .
   the "Base Heat Ink" Feature List Attribute is TRUE and the "Heat Resistant Ind" Display Attribute is TRUE
   the "Base Non-Heat Ink" Feature List Attribute is TRUE and the "Heat Resistant Ind" Display Attribute is FALSE
2. The Number of Std Inks is calculated by summing the number of unique colors of inks on the order where . . .
   the "Standard Heat Ink" Feature List Attribute is TRUE and the "Heat Resistant Ind" Display Attribute is TRUE
   the "Standard Non-Heat Ink" Feature List Attribute is TRUE and the "Heat Resistant Ind" Display Attribute is FALSE
3. The Number of Inks is calculated by counting all unique inks across the entire form.
4. The Order Quantity is initialized with the Order_Qty field on the Customer Order table.
5. The Std Ink Charge and the Non-Std Ink Charge should be set to $0.00 for the base calculation. These values will be updated by the rules where these ink types exist.

Multiple Ink Upcharge:
This charge will cover the additional costs of using multiple colors of ink on a given ply.

$$\text{Multiple Ink Upcharge} = \left(\text{Multiple Ink Flat Charge} \times \frac{1000}{\text{Order Quantity}}\right) + (\text{Multiple Ink Running Charge} \times \# \text{ of Plys w/Multip})$$

Base Calculation Initializations:
1. The Order Quantity is initialized with the Order_Qty field on the Customer Order table.
2. The # of Plies w/Multiple Inks is calculated by examining the number of ink features per front ply face and counting the number of front ply faces that have more than one ink. This includes base inks, standard and non-standard inks.
3. The Multiple Ink Flat Charge and Multiple Ink Running Charge should be set to $0.00 for the base calculation. These values will be changed by the rules if multiple inks exist on any ply within the order.

Heat Resistant Ink Upcharge:
This charge will cover the additional costs of using heat resistant inks on a given ply.

$$\text{Heat Ink Upcharge} = \left(\text{Heat Ink Flat Charge} \times \frac{1000}{\text{Order Quantity}}\right) + (\text{Heat Ink Running Charge} \times \# \text{ Heat Inks})$$

Base Calculation Initializations:
1. The Order Quantity is initialized with the Order_Qty field on the Customer Order table.
2. The Heat Ink Flat Charge and Heat Ink Running Charge should be initialized to 0.00 for the base calculation.
3. The # Heat Inks should be calculated by counting the number of inks across all ply faces that have the Heat Resistant Ind display attribute is set to TRUE.

Backprinting Upcharge:
This charge will cover the additional costs of printing on the back face of a given ply.

$$\text{Backprinting Upcharge} = \left(\text{Backprinting Flat Charge} \times \frac{1000}{\text{Order Quantity}}\right) + (\text{Backprinting Running Charge} \times \# \text{ of Plys w/Bac})$$

Base Calculation Initializations:
1. The Order Quantity is initialized with the Order_Qty field on the Customer Order table.
2. The # of Plies w/Backprinting is calculated by examining the all plies and determining which have ink features that are located on the back face. Each ply should be counted only once regardless of the number of inks that exist on the ply.
3. The Backprinting Flat Charge and Backprinting Running Charge should be set to $0.00 for the base calculation. These values will be changed by the rules if backprinting exists on any ply within the order.

Punching Upcharge:
This charge will cover the additional costs of punching holes or lines of holes where the center of the holes is the same distance from a common edge of the form. Multiple holes where the center of the holes is not the same distance from the edge should be exceptioned.

$$\text{Punching Upcharge} = \left(\text{Punching Flat Charge} \times \frac{1000}{\text{Order Quantity}}\right) + (\text{Punching Running Charge} \times \# \text{ of Plys with Punching})$$

Base Calculation Initializations:
1. The Order Quantity is initialized with the Order_Qty field on the Customer Order table.
2. The # of Plies with Punching is initialized with the count of the number of ply records that exist for the current Manufacturing Order that have a punching feature attached.
3. The Punching Flat Charge and Punching Running Charge should be set to $0.00 for the base calculation. These values will be changed by the rules if a punch feature exists on the order.

Special Packaging Quantity Upcharge:
This charge will cover the additional costs of packing the forms in other than the standard quantity per box.
Special Packing Quantity Upcharge=Special Quantity Running Charge×Number of Plys Base Calculation Initializations:
1. The Special Quantity Running Charge should be set to $0.00 for the base calculation. This value will be changed by the rules if a special packaging feature exists on the order where special quantity is specified.
2. The Number of Plies should be populated with the number of ply records found in the ply table for the manufacturing order.

Multi Destination Upcharge:
This charge will cover the additional costs of shipping product to more than two destinations.

$$\text{Multi Destination Upcharge} = [(\text{Number of Destinations} - 2) \times \text{Multi Destination Upcharges}] \times \left(\frac{1000}{\text{Order Quantity}}\right)$$

Base Calculation Initializations:
1. The Multi Destination Upcharge should be set to $0.00 for the base calculation.
2. The Number of Destinations should be populated with the number of Order Ship Destination records found associated with this customer order.

PMT Proof Upcharge:

This charge will cover the additional costs of creating PMT Proofs for the customer.

$$PMT \text{ Proof Upcharge} = (\text{Number of } PMT \text{ Proofs} \times PMT \text{ Proof Upcharges}) \times \left(\frac{1000}{\text{Order Quantity}}\right)$$

Base Calculation Initializations:
1. The PMT Proof Upcharge should be set to $0.00 for the base calculation.
2. The Number of PMT Proofs is calculated by adding the "Qty" attribute for each Proof Feature where the "Type" attribute=PMT. For example, if the order had two proof features with the "Type" attribute=PMT and the first had a "Qty" attribute=1 and the second had a "Qty" attribute=3, then the value put into Number of PMT Proofs would be the sum of those numbers, 4.

Part to Part Upcharge:

This upcharge will cover manufacturing charges for composition changes that occur form paper ply to paper ply.

$$\text{Part to Part Upcharge} = \text{Part to Part Flat Charge} \times$$
$$\left(\begin{array}{l}\text{maximum (Number of Composition Complextities Front} - 1.0) + \\ \text{maximum (Number of Composition Complextities Back} - 1.0)\end{array}\right)$$
$$\times \frac{1000}{\text{Order Quantity}}$$

1. The Part to Part Flat Charge should be set to $0.00 for the base calculation. This value will be set by rules.
2. Number of Composition Complexities Front is determined by reading each paper ply and counting each complexity in the Composition Complexity Front field where the value is not Null and the value is not Same as Another.
3. Number of Composition Complexities Back is determined by reading each paper ply and counting each complexity in the Composition Complexity Back field where the value is not Null and the value is not Same as Another.

4. The Order Quantity is initialized with the Order_Qty field on the Customer Order table.

STANFAST Composition

The following is the equation of cost for the Composition operation for Stanfast products.

Composition Upcharge:

$$\text{Composition Upcharge} \$/M =$$
$$\left[\begin{array}{l}\text{Number of 1 Line Change Faces} \times \text{1 Line Change Upcharge} + \\ \text{Number of Minor Change Faces} \times \text{Minor Change Upcharge} + \\ \text{Number of Major Change Faces} \times \text{Major Change Upcharge} + \\ \text{Number of Extensive Change Faces} \times \text{Extensive Change Upcharge} + \\ \text{Number of Exact Reorder Faces} \times \text{Exact Reorder Upcharge} + \\ \text{Number of Same As Another Faces} \times \\ \text{Same As Another Upcharge} + \\ \text{Number of Camera Ready Faces} \times \\ \text{Camera Ready Upcharge} + \\ \text{Number of Camera Ready w/1 Line Change Faces} \times \\ \text{Camera Ready w/1 Line Change Upcharge}\end{array}\right] \times \frac{1000}{\text{Order Quantity}}$$

Base Calculation Initializations:
1. The Number of Faces for each version will be determined by reading each ply and tallying them by the values found in Composition Complexitity Front and Composition Complexity Back fields.
2. Upcharges for each version will be set to 0.00 for the base calculation. The upcharges will be applied via Pricing Rules.
3. Order Quantity is set equal to the Order Qty field on the Customer Order table.

STANFAST Gathering

The following is the equation of cost for the Gathering operation on Stanfast products.

Gathering Upcharge:
Gathering Upcharge $/M=Gathering Running Charge× Number of Plys Base Calculation Initializations:
1. The Gathering Running Charge is initialized to $0.00 for the base calculation. It will be updated by the pricing rules when the gathering operation is specified by the manufacturing plan.
2. The Number of Plies is initialized during the base calculation by counting the number of paper plies that are part of the manufacturing order.

STANFAST Guillotine

The following are the equation of cost and pricing rules for the Guillotine operation on Stanfast products.

Guillotine Equation:

$$\text{Guillotine Upcharge Total } \$ = $$
$$\text{Guillotine Running Charge } \$/M \times \left(\frac{\text{Order Quantity}}{1000}\right)$$

$$\text{Guillotine Upcharge } \$/M =$$
$$\text{Guillotine Upcharge Total } \$ \times \left(\frac{1000}{\text{Order Quantity}}\right)$$

Base Calculation Initializations:
1. The Guillotine Running Charge is initialized to $0.00 for the base calculation. It will be updated by the pricing rules when the guillotine operation is specified by the manufacturing plan.
2. The Order Quantity is initialized with the Order_Qty field on the Customer Order table.

STANFAST Perf/Score

The following is the equation of cost for the Perfing/Scoring operation on Stanfast products.
Perf/Score Upcharge:

$$\text{Perf/Score Upcharge } \$/M = \left(\text{Perf/Score Flat Charge} \times \frac{1000}{\text{Order Quantity}}\right) + (\text{Perf/Score Running Charge} \times \text{Number of Plys}$$

Base Calculation Initializations:
1. The Perf/Score Flat Charge is initialized to $0.00 for the base calculation. It will be updated by the pricing rules when full horizontal or vertical perfs or scores exist.
2. The Perf/I Score Running Charge is initialized to $0.00 for the base calculation. It will be updated by the pricing rules when full horizontal or vertical perfs or scores exist.
3. The Order Quantity is initialize with the Order_Qty field on the Customer Order table.
4. The Number of Plies is initialized by counting the number of paper ply records for this manufacturing order that have the perf/I score feature attached.

STANFAST Folding

The following are the equation of cost and pricing rules for the Folding operation on Stanfast products.
Folding Equation:

$$\text{Folding Upcharge } \$/M = \left(\text{Folding Flat Charge} \times \frac{1000}{\text{Order Quantity}}\right) + \text{Folding Running Charge}$$

Base Calculation Initializations:
1. The Folding Flat Charge is initialized to $0.00 for the base calculation. It will be updated by the pricing rules when the Folding operation is specified by the manufacturing plan.
2. The Folding Running Charge is initialized to $0.00 for the base calculation. It will be updated by the pricing rules when the Folding operation is specified by the manufacturing plan.
3. The Order Quantity is initialized with the Order_Qty field on the Customer Order table.

STANFAST Numbering

The following is the equation of cost for the Numbering operation on Stanfast products.
Numbering Upcharge:

$$\text{Numbering Upcharge } \$/M = \left(\text{Numbering Flat Charge} \times \frac{1000}{\text{Order Quantity}}\right) + \text{Numbering Running Charge}$$

Base Calculation Initializations:
1. The Numbering Flat Charge is initialized to $0.00 for the base calculation. It will be updated by the pricing rules where the Numbering operation exists.
2. The Numbering Running Charge is initialized to $0.00 for the base calculation. It will be updated by the pricing rules where the Numbering operation exists.
3. The Order Quantity is initialize with the Order_Qty field on the Customer Order table.

STANFAST Padding

The following are the equation of cost and pricing rules for the Padding operation on Stanfast products.
Padding Equation:

$$\text{Padding Upcharge Total } \$ = \text{Padding Running Charge } S/M \times \left(\frac{\text{Order Quantity}}{1000}\right)$$

$$\text{Padding Upcharge } \$/M = \text{Padding Upcharge Total } \$ \times \left(\frac{1000}{\text{Order Quantity}}\right)$$

Base Calculation Initializations:
1. The Padding Running Charge is initialized to $0.00 for the base calculation. It will be updated by the pricing rules when the Padding operation is specified by the manufacturing plan.
2. The Order Quantity is initialized with the Order_Qty field on the Customer Order table.

STANFAST Wrapping

The following is the equation of cost for the Wrapping operation on Stanfast products.
Wrapping Upcharge:

$$\text{Wrapping Upcharge } \$/M = (\text{Wrapping Upcharge } \$/\text{Package} + \text{Label Upcharge } \$/\text{Package}) \times \frac{1000}{\text{Quantity per Pack}}$$

Base Calculation Initializations:
1. The Wrapping Upcharge $/Package is initialized to zero (0) for the base calculation.
2. The Label Upcharge $/Package is initialized to zero (0) for the base calculation.
3. The Quantity per Pack is set equal to the value found in the "Qty" order feature attribute attached to the Poly-Wrapping feature.

STANFAST Minimum Quantity

The following is the equation of cost for the Minimum Quantity cost component on Stanfast products. This cost component is added to any Stanfast order where the order quantity is less than 500.
Minimum Quantity Upcharge:

$$\text{Minimum Quantity } \$/M = \text{Prepaid Forms Value}/M \times \text{MAX}\left(0, \left(\frac{500}{\text{Order Quantity}} - 1\right)\right)$$

Base Calculation Initializations:
1. The Prepaid Forms Value/M is initialized to the sum of all Stanfast cost components except PRISM or Standard Storage.
2. The Order Quantity is set equal to the order_qty field on the Customer Order table.

STANFAST Freight

The following is the equation of cost for Prepaid Freight on Stanfast products.
Prepaid Freight Upcharge:
Note—Each prepaid ship destination will have a separate cost component. There are two areas in the database that indicate when a shipment is prepaid—Freight_Payment_Method_Id field in the Customer Order table or Freight_

Payment_Method_Ovr field in the Order Ship Destination table. If the order table data indicates Prepaid and the shipment table record is set to null, the shipment is Prepaid. If the order table indicates something other than prepaid but the shipment table record indicates prepaid, then the shipment is prepaid.

$$\text{Freight Upcharge \$}/M = \left\{ \begin{array}{l} (\text{Freight Rate} \times \text{Base List Price}) + \\ \text{MAX}\left[\left\{(\text{Freight Flat \$}) \times \left(\frac{1000}{\text{Destination Qty}}\right)\right\}, \right. \\ \left. (\text{Inside Delivery Additional Freight Rate} \times \text{Base List Price})\right] \end{array} \right\}$$

Base Calculation Initializations:
1. The Freight Rate is initialized to 0.00 for the base calculation.
2. The Base List Price is set equal to the value of the Base List Price input in the Stanfast Pre-figured Cost Component.
3. The Freight Flat $ is initialized to $0.00 for the base calculation.
4. The Inside Delivery Additional Freight Rate is set to 0.00 for the base calculation.
5. Set Destination Quantity equal to the value in the Ship Qty field in the Order Ship Destination table STANFAST Storage There are five storage rate variations available which may be included in list price.
1. Included
2. Add On
3. ShortStorePeriod Option (SSPO)
4. High Value Carton Option (HVCO)
5. Negotiated Rates Included, Add-On and SSPO are normally selectable by the CSR when storage is requested by the customer. The selected value will be stored in the Customer_Order table in the Storage_Type field.

Included Storage:
A percentage of the form list price will be generated as the storage charge in this case. Also, a check will be performed to find out if this order is a candidate for HVCO rates. HVCO is not selectable but will be automatically used by the system if Included storage is requested and the order total list price or the carton list price meets certain 'high value' qualifiers. In this case, the value of the Storage_Type field will remain unchanged and the HVCO_Storage indicator field on the Customer_Order table will be set to TRUE.

Add-On Storage:
Add On option has two rates; one is a flat charge per carton which is included in list price and the other is a per carton per month charge which is added to the invoice and is not included in list price.

Short Storage Period Option:
The SSPO option is a discounted storage option that is only given to customers who guarantee to have all forms released from storage is a period that is shorter than the standard 1 year. The SSPO type will always cause an exception because the rate must be manually calculated by a Distribution Services Specialist.

Negotiated Rates:
The only time that the user cannot choose which of the three storage variations will be used in when the customer has already been set up as a negotiated rate customer. In this case, the Storage_Type and HVCO_Storage fields will be NULL and the PRISM_Storage indicator field will be set to TRUE. This indicates that the Pricing Engine must use the PRISM_Storage table for storage and freight rate lookups. Please see the section following this Storage Cost Equation for a further discussion of the details surrounding identifying and processing Negotiated Rate storage orders. Separate cost components will be developed for PRISM Storage (negotiated rates) and for Standard Rate Storage.

PRISM Storage Equation (Negotiated Rates)

$$PRISM\ \text{Storage \$ Per } M = \left(\frac{\text{Storage Rate} \times \text{Quantity Stored}}{\text{Order Quantity}} \times \text{Form Value Per } M\right)$$

Base Calculation Initializations:
1. PRISM Storage Rate is found in the Storage_Rate field in the PRISM_Storage table. The key to the Prism Storage table includes . . .
   CADD Customer Number: This is found in the Sold-To Customer Address record.
   Category: Category is either 'Z' which indicates that the record is a customer level record or a 'P' which represents the record is at a Customer Form Number level. This field is used in combination with the Begin_Value and End_Value fields. The Pricing Engine should always look for more specific records first. If a customer level record exists and a form number level record exists for the same customer, the form number level record should be used. Therefore, the Pricing Engine will always try to find a Category 'P' record first where the value of Cust_Form_Number from the Customer Order table falls alphabetically within the range of values represented by the fields Begin_Value and End_Value. If this record cannot be found, then a search for a record at the customer level will be performed. This search will not use the Begin_Value and End_Value fields. If no customer level record is found, a not-priceable exception is raised.
   Note: There may be multiple records returned that fit the customer form number criteria. In these cases, there should be only two, one which is for that specific customer form number only (i.e. Begin_Value=End_Value) and one where the specified customer form number fits within the range defined by Begin_Value and End_Value. In these cases, the record specific to the specified customer form number should be used (i.e. the one where Begin_Value=End_Value)
   Storage_Method: This field is either 'C', which indicates the customer has requested full carton releases only, or a 'P', which allows the customer to release forms from Storage in less than full cartons. This value is set by examining the value of Full_Carton_Release on the Customer Order table. A value of 'Y' (True) in this field means that Storage_Method should be 'C'. A value of 'N' (False) indicates that Storage_Method should be 'P'.
   Storage Invoice Timing: This field is either 'R', which indicates the customer will be invoiced for storage at release of stored forms or 'S', which designates the customers desire to be invoiced for storage when they are stored. This value is set equal to the value of Storage_Invoice_Timing on the Customer Order table.
   Effective Date: this value should be set equal to the STAR Date (i.e. current date).
2. Quantity Stored is the summation of Ship_Qty field on all Order Ship Destination records where the destination is an SRC warehouse. Note: for simplification purposes, this calculation ignores a potential plant overrun and customer's instruction for disposition of the overrun quantity (ship to storage or ship direct).
3. Order Quantity is set equal to the value of Order_Qty on the Customer Order table.
4. Forms Value per M is either the Forms List Price as calculated by the Pricing Engine or the Forms Sell Price as set by the CSR or Sales Representative. Which to use is determined by looking at the Based_on_Sell_Price field on the PRISM_Storage record found in Step 1 above. If this value is 'Y' (True), then Forms Value per M should be set equal to the Forms Sell Price, otherwise, Forms Value per M should be set equal to the Forms List Price.

Storage_Type as defined in the Storage_Type field on Customer Order table. If Included is chosen, the HVCO checks described below must be done and will be used instead of included when the HVCO condition(s) are TRUE.
Invoice_Type as defined in the Storage_Invoice_Timing field on the Customer Order table.
2. Quantity Stored is the summation of Ship_Qty field on all Order Ship Destination records where the destination is an SRC warehouse. Note: for simplification purposes, this calculation ignores a potential plant overrun and customer's instruction for disposition of the overrun quantity (ship to storage or ship direct).
3. Order Quantity is set equal to the value of Order_Qty on the Customer Order table.

PRISM_Storage Table (sample records only)

| CADD Customer Number | Category | Begin Value | End Value | Storage Method | Storage Timing | Invoice | Storage Rate | Freight Rate |
|---|---|---|---|---|---|---|---|---|
| 1000 | P | U-001 | U-999 | C | Invoice | Stored | 14% | 8% |
| 1001 | C | 8502 | 8502 | P | Invoice | Release | 20% | 10% |

See the next section titled PRISM Freight and Storage Extra for more details on the use of the columns in this table.
Storage Equation (Standard Rates)

Storage $ Per $M$ =

$$\left(\frac{\text{Storage Rate} \times \text{Quantity Stored}}{\text{Order Quantity}} \times \text{Form Value Per } M\right) +$$

$$\left(\frac{\text{Storage Per } Ctn \text{ Total Charge} \times 1000}{\text{Order Quantity}}\right)$$

4. Form Value per M is the summation of all cost components across the entire Customer Order excluding Freight and Storage.
5. Per Carton Charge is set equal to Storage_Ctn in the Storage table.
6. The Carton Quantity is set equal to the Special Qty display attribute on the Special Packaging feature. If this feature does not exist, then this value is set to Std_Carton_Qty on the Mfg Order table.
7. Storage Maximum is set equal to Storage_Max in the Storage table.

Storage Table

| Storage_Type | Invoice_Type | Storage_Pct | Storage_Ctn | Storage_Max |
|---|---|---|---|---|
| Included | Invoiced Stored | 8% | $0.00 | $000.00 |
| Included | Invoiced Released | 14% | $0.00 | $000.00 |
| Add On | Invoiced Stored | 0% | $3.00 | $100.00 |
| Add On | Invoiced Released | 0% | $3.00 | $100.00 |
| HVCO | Invoiced Stored | 1% | $6.00 | $99,999.99 |
| HVCO | Invoiced Released | 6% | $6.00 | $99,999.99 | where . . .

$$\text{Quantity Stored} = \sum \text{Warehouse Destinations Ship\_Qty}$$

Storage Per Ctn Total Charge =

$$\text{MAX}\left[\text{MIN}\left(\text{Per Carton Charge} \times \left(\frac{\text{Quantity Stored}}{\text{Carton Quantity}}\right), \text{Storage Maximum}\right), \text{Per Carton}\right]$$

Base Calculation Initializations:

1. Storage Rate is set equal to Storage_Pct in the Storage table when the order is not a 'negotiated' rate order. The key to the correct record for this lookup is based on . . .

HVCO Verifications:
If the user selected the Included storage option, then check to see if order qualifies for HVCO storage rates. Both of the following conditions must be true in order to receive HVCO rates.
First HVCO Check: Value of Stored Forms
This check validates that the value of the stored forms hits the level necessary to receive HVCO rates.

$$\text{Value of Stored Forms} = \frac{\text{Form Value per } M \times \text{Quantity Stored}}{1000}$$

Compare this calculated value with the HVCO Order Qualifier found in the Pricing Constants table. If the calculated value is equal to or greater than the HVCO Order Qualifier constant, then continue with the second HVCO check. If not, skip the second check and continue with Included rates.

Second HVCO Check: Value of Forms in One Carton

This check validates that the value of the forms contained within one carton hits the level necessary to receive HVCO rates.

$$\text{Value of Forms in One Carton} = \frac{\text{Form Value per } M \times \text{Carton Quantity}}{1000}$$

Compare this calculated value with the HVCO Carton Qualifier found in the Pricing Constants table. If the calculated value is equal to or greater than the HVCO Carton Qualifier constant, then use HVCO rates. If not, continue with Included rates.

PRISM Freight and Storage Extra

When SRC customers put their forms into storage, they have two options available on how those forms are released from storage. The first is to have them release in full cartons. Customers who select this option for all their stored forms will get standard freight and storage rates. The second option is to have forms shipped to them in less than full carton quantities. Those customers who select to have one or more of their stored forms released in this fashion are considered Pic-n-Pac customers and have special negotiated rates for freight and storage. This memo will discuss the data and process necessary for recognizing these customers and properly calculating freight and storage charges.

Data:

There are three tables in the STAR system that will contain the data necessary to determine both if a customer is a Pic-n-Pac customer and what are the negotiated rates for that customer.

1. Customer Address table. This table will contain a Boolean indicator, STD_FULL_CTN, which will indicate if the customer has one or more forms that are released in less than full carton.
2. Customer Order table. This table will contain a Boolean indicator, FULL_CARTON_RELEASE, which will indicate if the customer wishes to have this specific order released as full carton or less than full carton. It will also contain a numeric field, OVERRUN_STORAGE_PCT, to indicate the customer's wish regarding how much of any overrun quantity should be shipped to storage. This may be 0% if all overrun quantity is to be sent directly to the customer, 100% if all the overrun quantity should be stored or any percentage in between.
3. PRISM Storage table. This table will have one to many records in it to identify the negotiated rates for a Pic-n-Pac customer. The layout is as follows . . .

| PRISM_STORAGE: | | |
|---|---|---|
| CADD_CUST_NUM | Varchar2 (7) | Not Null |
| CATEGORY | Varchar2 (1) | Nullable |
| BEGIN_VALUE | Varchar2 (10) | Nullable |
| END_VALUE | Varchar2 (10) | Nullable |
| STORAGE_METHOD | Varchar2 (1) | Not Null |
| STORAGE_INVOICE_TIMING | Varchar2 (1) | Not Null |
| STORAGE_RATE | Number | Not Null |
| FREIGHT_RATE | Number | Not Null |
| EFFECTIVE_DATE | Date | Not Null |
| EXPIRATION_DATE | Date | Not Null |

A Pic-n-Pac customer may choose one of three options for determining which forms have a negotiated rate.

1. All forms

The customer can choose to have all their forms stored at the negotiated rate. In this case, the Storage record would have their CADD Customer number defined with Category, Begin Value and End Value being null.

2. A range of product codes

The customer may choose to have a single product code or set of product codes stored at a negotiated rate. In this case, the Storage record would contain the CADD Customer number with the Category being set to "C". The Begin Value and End Value will be used to set the range of product codes that are included in this negotiated rate.

3. A range of form numbers

The customer may choose to have a single form or set of forms stored at a negotiated rate. In this case, the storage record would contain the CADD Customer number with the Category being set to "P". The Begin Value and End Value will be used to set the range of customer form numbers that are included in this negotiated rate.

In addition to these four fields, two others are used to identify the specific record that should be used for a given order.

1. Storage Method

This field will contain a "C" or a "P". The "C" indicates that this is a negotiated rate for an order that is to be released as full cartons only. This rate may or may not be different than the Standard full carton rate that non Pic-n-Pac customers receive. The "P" indicates that the record represents the negotiated rate for an order that will be released in less than full carton quantities.

2. Storage Invoice Timing

This field will indicate if the customer wishes to pay for storage when the forms are stored (Invoice Stored) or when the forms are released from storage (Invoice Release). This field will contain an "S" for Invoice Stored or an "R" for Invoice Release.

The remaining fields hold the specific freight and storage rates for this Pic-n-Pac customer and/or form number/product code combination and the effective date range of the record.

Process:

There are four processes that will create and/or use the data as described above.

1. Conversion and Interfaces:

C&I will be responsible for populating STAR tables with data brought over from another system. Specifically, C&I will populate the STD_FULL_CTN Boolean field on Customer Address as well as all the data in the Storage table.

2. Order Entry:

If the customer is a Pic-n-Pac customer, CSRs will not be able to select a storage charge method as it will default to Pic-n-Pac and cannot be changed. In this case; however, the CSR must choose whether the customer wishes to have this specific order release in full carton or less than full carton quantities. This data will be stored in the Boolean field Full Carton Release.

The field OVERRUN_STORAGE_PCT must also be entered during the order entry process. This field must be entered for all orders that have any portion going to storage regardless of whether the customer is a Pic-n-Pac customer or not. This information will be passed to TOPS. It is TOPS who will determine how to break up the overrun quantity to be shipped directly among the various shipping destinations when more than one direct ship exists.

3. Validation:

Validation will be responsible for populating the Product Code field in the Manufacturing Order table. This code is developed from the product type and various features that exist on the form.

4. Pricing:

Pricing will use the data in STAR to determine if the customer is Pic-n-Pac and also to determine what rate should be used for both freight and storage.

First, pricing will determine if there is any storage for this order by looking for any records in the Order Ship Destination table to determine if any have the Warehouse ID is populated. If any are found, Pricing will read the Ship Quantity to determine how many forms are being stored.

If there is storage for the order, Pricing will then determine the data necessary to identify the specific Storage record that applies to the order. This data includes . . .

a) CADD Customer Number from the Customer Address table b) Customer Form Number from the Customer Order table c) Full Carton Release from the Customer Order table d) Product Code from the Manufacturing Order table e) Storage Invoice Timing from the Customer Order table.

Once it is determined that there is storage and it is a Pic-n-Pac customer, Pricing will select the correct storage record based on the data listed above. Pricing will always look for a record that is more specific first and work backwards toward more general records. For example, if there is a Storage record for all forms for a CADD Customer and a second for a specific form for that same CADD Customer, then Pricing would use the form specific record before using the general Customer record. The order of the data from most detailed to most general is . . .

1. Form Number
2. Product Code
3. CADD Customer

The storage method and invoice timing data will also need to be considered to select the correct record from the Storage table.

Miscellaneous Notes:

If a customer is marked as a Pic-n-Pac customer on the Customer Address record, we will always attempt to find the Storage record that should be used. If we are unable to find any record for that customer, the order will be exceptioned to a pricing analyst.

For split shipments, the portion of the shipment that is being shipped directly will receive the same freight rate as that portion that is stored. For instance, if a Pic-n-Pac customer requests 50% of the quantity to be shipped directly and 50% to be stored, the freight rate used for the 50% shipped directly will be the same as the freight rate for that customer order.

Figure 7:
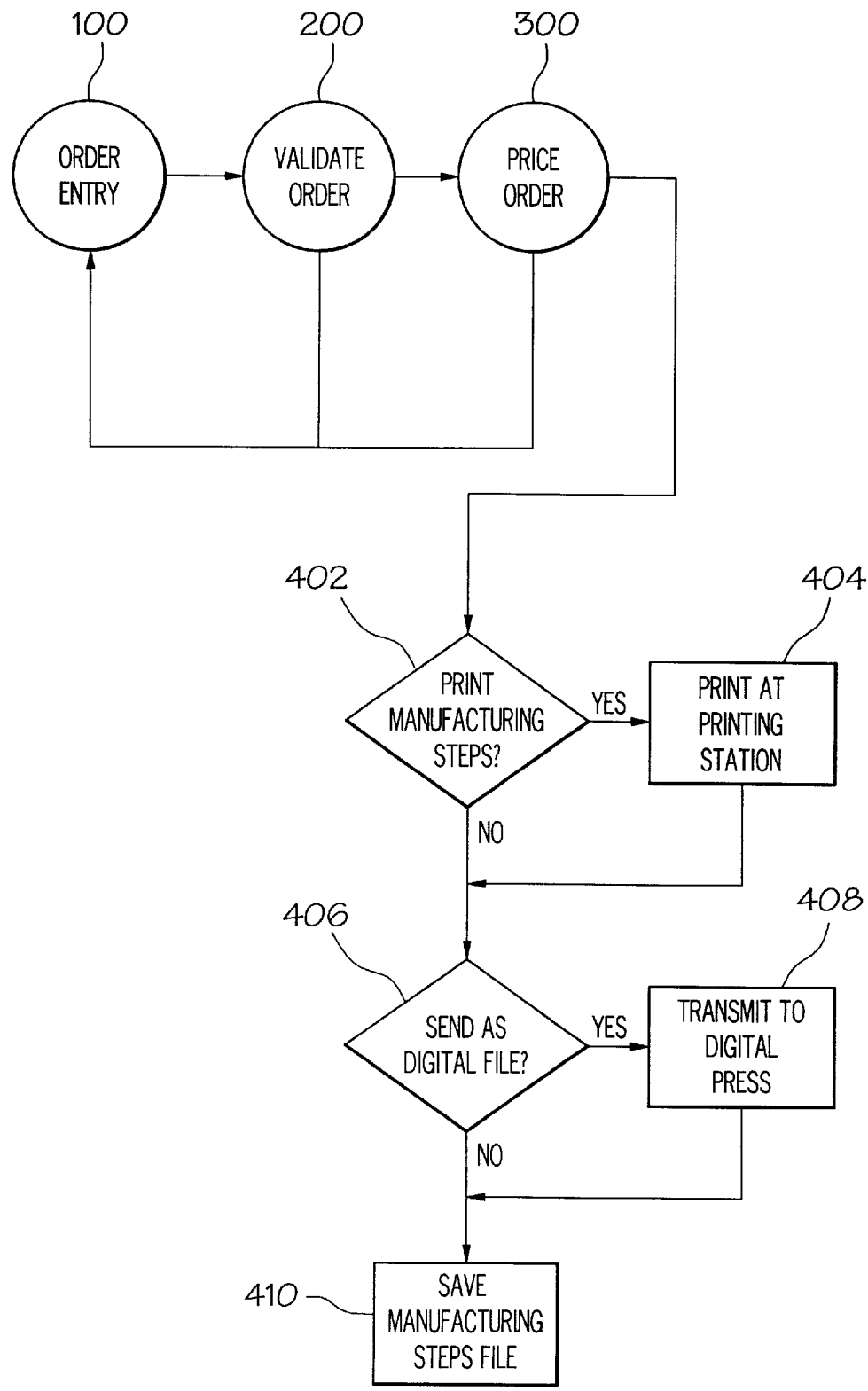

Referring now to FIGS. 2, 3 and 7, forms order transmission 400 is described in detail. Following order entry 100, order validation 200, and order pricing 300, the priced and validated order is transmitted to the printing station computer system 14 where a user is prompted to select whether the manufacturing steps are to be printed at printer 46, transmitted to the digital press 44 as a digital file, or both, see steps 402, 404, 406, and 408. Additionally, the manufacturing steps are saved in a data file, see step 410.

As will be appreciated by those of ordinary skill in the art, the order entry system of the present invention is a computer based system which operates with the aid of a conventional operating system, e.g., the Microsoft® Windows® 95 operating system available from the Microsoft Corporation. Additionally, the order entry system may utilize or may be programmed to be compatible with the following commercially available software: Windows NT (network GUI operating system, available from Microsoft Corp.); Exchange (electronic mail, available from Microsoft Corp.); Powerbuilder (GUI development tool, available from Sybase Inc., Cincinnati, Ohio); Tuxedo/WS (transaction manager—client, available from BEA Systems, Sunnyvale, Calif.); Tuxedo /T, /Q (transaction manager, available form BEA Systems); Oracle SQLnet (database access—client, available from Oracle Corporation, Redwood City, Calif.); Oracle RDBMS (relational database, available from Oracle Corporation); PDW (forms design tool, available from F3 Software Corporation, Burlington, Mass.); SDM Client (repository—client, available from Filenet Corporation, Columbus, Ohio); Mezzanine (forms repository, available from Filenet Corp.); AION DS, ES (rule based system, available from Platinum Software Corporation, Teaneck, N.J.); CA-Unicenter (security system, available from Computer Associates, Alameda, Calif.); XCOM (file transfer tool, available from Computer Associates); and, AIX (UNIX operating system, available from IBM Corp., Wilkesboro, N.C.). As will be appreciated by those skilled in the art, these and other system functions may be executed with software created in accordance with the preferred operational features of the present invention.

Having described the invention in detail and by reference to preferred embodiments thereof, it will be apparent that modifications and variations are possible without departing from the scope of the invention defined in the appended claims.

What is claimed is:

1. A forms order entry system comprising:

a first computer system including a user interface, wherein said first computer system is programmed to capture form design data representative of a forms order entered at said user interface, and wherein said form design data comprises order specifications and a graphic form design file;

a printing station computer system; and a second computer system remote from and in communication with said first computer system and said printing station computer system, wherein said second computer system is programmed to generate a price corresponding to said form design data as a function of a set of pricing rules, validate said forms order by associating said order specifications and said graphic form design file and populating said order specifications from said graphic form design file, generate a form design populate report indicative of non-populated portions of said order specifications, and transmit a validated and priced order to said printing station computer system.

2. A forms order entry system as claimed in claim 1 wherein said price generated by said second computer system comprises a list price corresponding to said form design data.

3. A forms order entry system as claimed in claim 1 wherein said order specifications are designated within said first computer system.

4. A forms order entry system as claimed in claim 1 wherein said graphic form design file is designated within said first computer system.

5. A forms order entry system as claimed in claim 1 wherein said order specifications are designated within said first computer system and said graphic form design file is designated within said first computer system, and wherein said second computer system is further programmed to associate and populate said order specifications from said graphic form design file.

6. A forms order entry system comprising:
a first computer system including a user interface, wherein said first computer system is programmed to capture form design data representative of a forms order entered at said user interface, and wherein said form design data comprises order specifications and a graphic form design file;
a printing station computer system; and
a second computer system remote from and in communication with said first computer system and said printing station computer system, wherein said second computer system is programmed to
generate a price corresponding to said form design data as a function of a set of pricing rules,
validate said forms order by associating said order specifications and said graphic form design file and populating said order specifications from said graphic form design file,
generate a form design populate report indicative of discrepancies between said graphic form design file and said order specifications, and
transmit a validated and priced order to said printing station computer system.

7. A forms order entry system as claimed in claim 1 wherein said forms order stag comprises a modified existing forms order.

8. A forms order entry system as claimed in claim 1 wherein said forms order comprises an original forms order.

9. A forms order entry system comprising:
a first computer system including a first server coupled to a first plurality of user interfaces, wherein said first computer system is programmed to generate form design data representative of a forms order entered at one of said first plurality of user interfaces, and wherein form design files corresponding to said forms order entered at one of said first plurality of user interfaces are stored in said first server;
a form design repository remote from and in communication with said first computer system; and
a second computer system remote from and in communication with said first computer system and said form design repository wherein said second computer system is programmed to
create an index of form design files corresponding to said form design files stored in said first server, and
store said index of form design files in said form design repository,
wherein said first computer system includes a least one additional server coupled to a second plurality of user interfaces, wherein said first computer system is programmed to generate form design data representative of a forms order entered at one of said second plurality of user interfaces, wherein form design files corresponding to said forms order entered at one of said second plurality of user interfaces are stored in said additional server, and wherein said index of form design files created by said second computer system corresponds to said form design files stored in said first server and said second server.

10. A forms order entry system comprising:
a user interface; and
a computer system in communication with said user interface, said computer system being programmed to
generate manufacturing steps based on form design data representative of a forms order entered at said user interface, wherein said form design data defines the appearance and construction of an ordered form and wherein said manufacturing steps correspond to a specific manufacturing process for creating said ordered form,
determine manufacturability of said ordered form by comparing said form design data to a set of validation rules, wherein said validation rules comprise a set of rules and values arranged to enable a determination as to whether all the information necessary for manufacturing an ordered form is present and correct in said form design data, and wherein said validation rules include general validation rules and specific product validation rules, and
transmit said manufacturing steps and said form design data to a printing station according to whether said ordered form is determined to be manufacturable.

11. A forms order entry system as claimed in claim 10 wherein said computer system is further programmed to determine usability of said ordered form by comparing said form design data to a set of validation rules.

12. A forms order entry system as claimed in claim 10 wherein said computer system is remote from and in communication with said user interface.

13. A forms order entry system as claimed in claim 10 wherein said printing station includes a digital press and wherein said manufacturing steps and said form design data are transmitted to said digital press in digital format.

14. A forms order entry system as claimed in claim 10 wherein data indicative of said manufacturing steps is reproduced at said printing station in a printed format.

15. A forms order entry system comprising:
a user interface;
a validation engine in communication with said user interface, wherein said validation engine is programmed to
generate manufacturing steps based on form design data captured at said user interface, wherein said form design data defines the appearance and construction of an ordered form, and wherein said manufacturing steps correspond to a specific manufacturing process for creating said ordered form,
determine manufacturability of said ordered form by comparing said form design data to a set of validation rules, and
generate at least one manufacturing exception based upon said manufacturability determination; and
a pricing engine in communication with said user interface, wherein said pricing engine is programmed to calculate a price corresponding to said ordered form as a function of a set of pricing rules, wherein said pricing engine and said validation engine are resident on a second computer system remote from and in communication with said user interface, and wherein said second computer system is programmed to route said manufacturability exception to a selected one of a plurality of exception handling locations according to the nature of said exception to update said manufacturing steps accordingly.

16. A forms order entry system as claimed in claim 15 wherein said exception handling locations are selected from the group consisting of a purchasing department, an engineering department, a manufacturing plant, a pricing department, a customer accounting department, and combinations thereof.

17. A forms order entry system comprising:

a user interface;

a validation engine in communication with said user interface, wherein said validation engine is programmed to
generate manufacturing steps based on form design data captured at said user interface, wherein said form design data defines the appearance and construction of an ordered form, and wherein said manufacturing steps correspond to a specific manufacturing process for creating said ordered form,
determine manufacturability of said ordered form by comparing said form design data to a set of validation rules, and
generate at least one manufacturing exception based upon said manufacturability determination; and a pricing engine in communication with said user interface, wherein said pricing engine is programmed to calculate a price corresponding to said ordered form as a function of a set of pricing rules, wherein said pricing engine and said validation engine are resident on a second computer system remote from and in communication with said user interface, and wherein said second computer system is programmed to route said usability exception to a selected one of a plurality of exception handling locations according to the nature of said exception to update said manufacturing steps accordingly.

18. A forms order entry system comprising:

a user interface;

a validation engine in communication with said user interface, wherein said validation engine is programmed to
generate manufacturing steps based on form design data captured at said user interface, wherein said form design data defines the appearance and construction of an ordered form, and wherein said manufacturing steps correspond to a specific manufacturing process for creating said ordered form,
determine manufacturability of said ordered form by comparing said form design data to a set of validation rules, and
generate at least one manufacturing exception based upon said manufacturability determination; and a pricing engine in communication with said user interface, wherein said pricing engine is programmed to calculate a price corresponding to said ordered form as a function of a set of pricing rules, wherein said pricing engine is programmed to calculate said price as a function of capabilities of a hypothetical manufacturing plant and said form design data.

19. A forms order entry system comprising:

a user interface;

a validation engine in communication with said user interface, wherein said validation engine is programmed to
generate manufacturing steps based on form design data captured at said user interface, wherein said form design data defines the appearance and construction of an ordered form, and wherein said manufacturing steps correspond to a specific manufacturing process for creating said ordered form,
determine manufacturability of said ordered form by comparing said form design data to a set of validation rules, and
generate at least one manufacturing exception based upon said manufacturability determination; and a pricing engine in communication with said user interface, wherein said pricing engine is programmed to calculate a price corresponding to said ordered form as a function of a set of pricing rules, wherein said price comprises a combination of a form price, a freight price, and a storage price.

20. A forms order entry system comprising:

a first computer system including a user interface, wherein said first computer system is programmed to capture form design data representative of a forms order entered at said user interface, wherein said form design data defines the appearance and construction of an ordered form; and a pricing engine in communication with said user interface, wherein said pricing engine is programmed to calculate a price corresponding to said ordered form by
identifying a set of manufacturing steps corresponding to a specific manufacturing process for said forms order,
determining a labor cost component for at least one of said manufacturing steps,
determining a material cost component for at least one of said manufacturing steps,
determining a burden cost component and a mark-up cost component for said ordered form, and
applying a set of pricing rules to said identified labor, material, burden, and mark-up cost components to enable calculation of said price.

21. A forms order entry system as claimed in claim 20 wherein said pricing engine is programmed to calculate said price by determining a labor cost component for each of said manufacturing steps.

22. A forms order entry system as claimed in claim 20 wherein said pricing engine is programmed to initialize cost component inputs prior to applying said pricing rules.

23. A forms order entry system as claimed in claim 20 wherein said pricing engine is programmed to calculate said price by determining a plurality of labor cost components to set up and run at least one of said manufacturing steps.

24. A forms order entry system as claimed in claim 20 wherein said pricing engine is programmed to calculate said price by determining a plurality of material cost components for consumption and waste for at least one of said manufacturing steps.

25. A forms order entry system as claimed in claim 20 wherein said pricing engine is programmed to:
produce a pricing exception in response to application of said pricing rules, and
route said pricing exception to a selected one of a plurality of pricing exception handling locations according to the nature of said pricing exception.

26. A forms order entry system as claimed in claim 20 wherein said pricing exception is selected from the group consisting of a paper weight limit, a press impression limit, a single-ply equivalents limit, an estimated total form price limit, a special customer account identifier, and combinations thereof.

27. A forms order entry system as claimed in claim 20 wherein said pricing engine is programmed to operate in an override mode wherein at least one of said labor cost component, said material cost component, said burden cost component, and said mark-up cost component for said ordered form are replaced by an override value, and wherein said pricing engine is programmed to calculate said price based upon said override value.

28. A forms order entry system as claimed in claim 20 wherein said forms order entry system further comprises a validation engine programmed to generate said manufacturing steps for input to said pricing engine.

* * * * *

UNITED STATES PATENT AND TRADEMARK OFFICE
CERTIFICATE OF CORRECTION

PATENT NO : 6,076,080
DATED : June 13, 2000
INVENTOR(S) : Morscheck et al.

It is certified that error appears in the above-identified patent and that said Letters Patent are hereby corrected as shown below:

Claim 7, Column No. 203, line 28, "forms order stag comprises" should read - - forms order comprises - - .

Signed and Sealed this

Third Day of April, 2001

Attest:

NICHOLAS P. GODICI

*Attesting Officer*      *Acting Director of the United States Patent and Trademark Office*